United States Patent
Verheyen

(10) Patent No.: US 12,126,603 B2
(45) Date of Patent: Oct. 22, 2024

(54) SECURE DATA EXCHANGE NETWORK

(71) Applicant: Henry Verheyen, Marina (CA)

(72) Inventor: Henry Verheyen, Marina (CA)

( * ) Notice: Subject to any disclaimer, the term of this patent is extended or adjusted under 35 U.S.C. 154(b) by 277 days.

(21) Appl. No.: 17/492,438

(22) Filed: Oct. 1, 2021

(65) Prior Publication Data

US 2022/0150220 A1 May 12, 2022

Related U.S. Application Data

(63) Continuation-in-part of application No. 17/008,573, filed on Aug. 31, 2020, now Pat. No. 11,159,312.

(60) Provisional application No. 62/894,684, filed on Aug. 30, 2019.

(51) Int. Cl.
 *H04L 9/40* (2022.01)

(52) U.S. Cl.
 CPC ........ *H04L 63/045* (2013.01); *H04L 63/0435* (2013.01); *H04L 63/0442* (2013.01)

(58) Field of Classification Search
 CPC ............... H04L 63/045; H04L 63/0435; H04L 63/0442; H04L 9/0833; H04L 9/50; H04L 63/0478; H04L 63/0464
 See application file for complete search history.

(56) References Cited

U.S. PATENT DOCUMENTS

| | | | | |
|---|---|---|---|---|
| 11,050,723 B1 * | 6/2021 | Mahdavi | ............ | H04L 63/0478 |
| 2007/0028090 A1 * | 2/2007 | Lopez | ................. | H04L 9/0822 |
| | | | | 713/153 |
| 2008/0109395 A1 * | 5/2008 | Loeb | ................... | G06F 16/2255 |
| 2008/0260149 A1 | 10/2008 | Gerhmann | | |
| 2009/0103734 A1 * | 4/2009 | Hammell | ........... | H04L 63/0464 |
| | | | | 380/278 |
| 2011/0311044 A1 | 12/2011 | Westerveld et al. | | |
| 2015/0172304 A1 * | 6/2015 | Kleczynski | ......... | H04L 63/1441 |
| | | | | 726/23 |
| 2015/0271153 A1 | 9/2015 | Rohloff et al. | | |
| 2016/0134594 A1 | 5/2016 | Teo et al. | | |
| 2016/0149899 A1 | 5/2016 | Abbott | | |

(Continued)

FOREIGN PATENT DOCUMENTS

WO  WO 2021/028155 A1  2/2021

OTHER PUBLICATIONS

International Search Report and Written Opinion, Patent Cooperation Treaty Application No. PCT/US2020/048846, dated Nov. 27, 2020, fourteen pages.

(Continued)

*Primary Examiner* — Henry Tsang
(74) *Attorney, Agent, or Firm* — Fenwick & West LLP

(57) ABSTRACT

A secure data exchange system permits device to exchange secure message keys and securely transmit messages between devices. The devices may initially exchange temporary message keys that are used to encrypt permanent message keys. In addition, devices may have pairing managed that authenticates devices. Devices may be associated with an address ledger that maintains address information and is accessible with a public ledger key, which may provide different access to address information to different paired devices. Data within the system may also be encrypted with user device keys that prevents unauthorized access to data while permitting recreation of the user device key for data backup and migration.

16 Claims, 76 Drawing Sheets

(56) References Cited

U.S. PATENT DOCUMENTS

| | | |
|---|---|---|
| 2016/0373418 A1 | 12/2016 | Stahl |
| 2017/0041296 A1 | 2/2017 | Ford et al. |
| 2018/0234388 A1 | 8/2018 | Reddy et al. |
| 2018/0343505 A1 | 11/2018 | Loheide et al. |
| 2018/0376329 A1 | 12/2018 | Gapastione et al. |
| 2019/0260667 A1 | 8/2019 | Telefónica et al. |
| 2020/0007327 A1 | 1/2020 | Garg et al. |
| 2020/0304477 A1* | 9/2020 | Venkataraman .... H04L 12/4633 |
| 2021/0067328 A1 | 3/2021 | Verheyen |
| 2022/0150220 A1 | 5/2022 | Verheyen |

OTHER PUBLICATIONS

United States Office Action, U.S. Appl. No. 17/008,573, filed Dec. 10, 2020, 10 pages.

United States Office Action, U.S. Appl. No. 17/008,573, filed Mar. 22, 2021, 12 pages.

Extended European Search Report, European Patent Office Application No. 20858117.3, mailing date Sep. 1, 2023, 10 pages.

International Search Report and Written Opinion, Patent Cooperation Treaty Application No. PCT/US2022/045501, dated Feb. 28, 2023, 17 pages.

Legrand, J., "The Future Use Cases of Blockchain for Cybersecurity," Cyber Management Alliance, Sep. 4, 2020, 16 pages, Retrieved on Jan. 18, 2023 from <https://www.cm-alliance.com/cybersecurity-blog/the-future-use-cases-of-blockchain-for-cybersecurity>.

Menezes, A.J., et al., "Chapter 1: Overview of Cryptography", Handbook of Applied Cryptography; [CRC Press Series on Discrete Mathematices and Its Applications], CRC Press, Boca Raton, FL, US, pp. 1-48, Oct. 1, 1996 (Oct. 1, 1996), XP001525001, ISBN: 978-0-8493-8523-0, Retrieved from the Internet: URL:http://www.cacr.math.uwaterloo.ca/hac/ p. 32.

Menezes, A.J., et al., "Chapter 12: Key Establishment Protocols", Handbook of Applied Cryptography; [CRC Press Series on Discrete Mathematices and Its Applications], CRC Press, Boca Raton, FL, US, pp. 489-541, Oct. 1, 1996 (Oct. 1, 1996), XP001525012, ISBN: 978-0-8493-8523-0, Retrieved from the Internet: URL:http://www.cacr.math.uwaterloo.ca/hac/ section 12.5.1; paragraph [0494].

Phan R C-W: "Fixing The Integrated Diffie-Hellman-DSA Key Exchange Protocol", IEEE Communications Letters, IEEE Service Center, Piscataway, NJ, US, vol. 9, No. 6, Jun. 1, 2005 (Jun. 1, 2005), pp. 570-572, XP001230491, ISSN: 1089-7798, DOI: 10.1109/LCOMM.2005.1437374 the whole document.

* cited by examiner

Metadata 0: Takes action on end device, usually operating on Data

*Example:*

| Example: Corporate Server updates a presentation:<br><br>foreach device (corporate group)<br>   update ( server, server-path, device-path) | Example: User received message on mobile, wants to read it on PC:<br><br>myMsg = find("context", mobile_device)<br>   copy (myMsg, this_device) |

Data Commands:
Jump, Store, Report, Delete, Sign, Copy, Count, License Until, Update, RunProg-i, Search, Request, ...

| Example: Corporate Server adds a new presentation:<br><br>foreach device (corporate group)<br>   push ( server, server-path, device-path) | Example: User received message on mobile, wants to transfer it to PC:<br><br>myMsg = find("context", mobile_device)<br>   transfer (myMsg, this_device) |

Metadata 1: Takes action on intermediary server, usually embedded in protocols

*Example:*

| Example: Check back to sending device:<br><br>   call-back ( server, sendDevice, Metadata 1) | Example: Initiate protocol forward<br><br>   call-forward ( server, sendDevice, Metadata 1) |

Protocol Commands:
Trace, Count, Call-back, Call-forward, Validate, Initiate, Reference, Parallel, Integrity ...

| Example: Network Check<br><br>   validate ( server, Metadata 1 or local trigger) | Example: Initiate new protocol<br><br>   initiate ( server, Metadata 1) |

FIG. 45

| Search | Type | Selection | Filters |
|---|---|---|---|
| • Keywords | • Paired<br>• Group<br>• Public<br><br>• Local<br>• Proxy<br><br>Default: all Wildcards | • Name(s) Paired Devices<br>• Name(s) Paired Groups<br><br>• Influences by criteria(s)<br>  - location, keyword, other<br><br>Default: all Wildcards | • Filter(s) for Paired search<br>• Filter(s) for Group search<br>• Filter(s) for Public search<br>• Data Range<br>• Filter(s) for Local<br>• Filter(s) for Proxy (e.g. "nearby")<br><br>Default: all Wildcards |

SECURE DATA EXCHANGE NETWORK

CROSS REFERENCE TO RELATED APPLICATIONS

This application is a continuation-in-part of U.S. application Ser. No. 17/008,573, "Secure Data Exchange Network" filed Aug. 31, 2020; which claims the benefit of U.S. Provisional Application No. 62/894,684, "Secure Data Exchange Network" filed Aug. 30, 2019. All of the foregoing is incorporated by reference in their entirety.

BACKGROUND

This invention relates generally to network communications, and in particular to secure exchange of data across a network.

Internet protocols are vulnerable in ways, which can be categorized broadly as security, trust, privacy, and authentication. Security relates to online services (e.g., web servers) maintaining integrity, free of hacking, fraud, and other theft. Trust relates to how nodes communicate with one another, including protocols, domain name resolution (DNS), and message exchange services. Privacy relates to security of user data, including compliance with relevant law such as health privacy requirements (e.g., HIPAA) and data privacy requirements (GDPR). Authentication relates to how a user (or a device) identifies itself. This varies from simple passwords to complex method (e.g., REST API) to enable access to databases stored on a server. Together, addressing these potential vulnerabilities represent cornerstones of successful and effective development of further networking technologies.

Initially, when the internet (world-wide-web) grew popular, most was driven by public display of information: think science papers, encyclopedia, and sales fronts. All data was put up to be seen by as many people as possible, and few of these vulnerabilities were addressed.

Subsequently, we have seen the rise of the social networks, and a much higher level of global connectedness which has led to the aforementioned four corner stones of the internet emerging as major issues. In addition, encryption (protection) and user hiding (VPN) have become more proliferous and are stopgaps to aid in maintaining these four corner stones.

There are several problems in current technologies in addressing the vulnerabilities discussed above. In general terms, all data being accessed over the internet is insecure. This is demonstrated by famous database breaches, password/profile hacking, crypto wallet theft, and so on. Laws that could prevent some of the malware and malicious servers are slow in keeping up with the fast-moving technology, and internet users are generally begin to grow leery of who has access to and who stores copies of their data.

In addition, the internet itself is becoming more and more insecure. In past years, the internet was mostly being administered by 'known good companies', whereas nowadays, malicious servers and protocols can add themselves to the internet easier than in prior years. Domain Name System (DNS) tables can now be seen on untrusted servers and may be used improperly by hackers. In addition, domain resolution (i.e., how a service resolves a domain name to a network address) has various security and privacy/tracking flaws.

In addition, IPv6 has enabled to grow the pool of internet connected devices (IoT) dramatically, but has not given much thought to the inherently required security. Many companies are coming up with cyber security solutions, both for servers, users, and IoT devices.

Supported by many news stories that increase in frequency regarding data breaches and internet hacking, users have become aware of privacy and security issues and the trust that was once established is waning. In terms of authentication, the once trusted password method is no longer sufficient for many websites/protocols, and two-factor authentication (2FA) is now in place in many places, leading to more frustration for users and delays in accessing services.

Most proposed solutions are difficult to understand, some bring their own data and user privacy issues, others are not widely used enough to reach critical mass, other are simply too esoteric and expensive. For example, private VPN, data encryption, incognito browsers, IP hiding, are all growing in popularity but are at risk of various vulnerabilities including more AI-driven intelligence.

Existing structures, such as the public key infrastructure, is used to assure integrity of (particular) internet web portal servers. This infrastructure includes significant complexity and includes various components such as a certificate authority, registration authority, validation authority, and timestamping authority.

Despite all the activity in these areas, a better solution is needed which handles these four corner stones of the internet in a better and more elegant solution.

In addition, virtually all applications that run on handheld devices struggle with the user identification. They struggle in multiple levels: user privacy, user protection (secure identification) and secure backup/restore. Furthermore, they are usually based on a central server, which can become a target for hackers.

Another problem that has complicated unique user identification is that many applications, including virus and hacker driven, misuse such information. Also, advertising and other data-mining applications need such information, and are now frantically seeking (proposing) new solutions and the existing methods are being disabled one by one.

For example, one can no longer rely on these once mainstay approaches: IMEI, UUID, UDID, MAC, ECID, NSUUID, and VendorID. In fact, applications that still use these by 2020 will be banned from iTunes (Apple) and GooglePlay (Android) it seems. This would then require devices to side load on a jail-broken or rooted device.

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

SUMMARY

We describe herein approaches that can cover all four corner stones of security, trust, privacy, and authentication, while enabling login free device authentication (once authenticated), assurance of privacy and security, with multiple benefits, including the option for private data search. Using these approaches, devices may be authenticated on the network with reduced or eliminated risk of it being cloned, spoofed, listened to, or otherwise compromised.

One aspect of the technology described herein is that it goes away from server (cloud) centric solutions and partitions a complex solution into many (recoverable) parts and pieces that work together in a cohesive manner.

Another aspect of this technology is that it leverages both block chain and encryption in such a way that data and/or security breaches may be ineffective because there is no central database or central point to 'hack' into. This makes this a safe and secure approach.

A software system is described which enables secure digital data exchange over non-secure (public) networks. Mobile, PC, desktop, and sever applications can be added to provide further functionality which leverages the embedded user privacy and user data protection. The system enables applications that run on user mobile and desktop devices and multiple sets of servers (managed by us as administrators, simply to register devices, aka DNS, in a secure manner). This allows users to have direct communication and not be subjected to a 3rd party monitoring (and filtering) of their every communication, while securing message content to be undecipherable.

Certain embodiments link devices which have externally visible network addresses to each other, using distributed ledger record keeping methods. The described method can be extended to devices that are not externally visible (e.g. using a 'handler') and other, non-distributed ledger, record keeping methods (e.g. local, centralized, or cloud based databases).

Device security may be protected with multiple types of protection: network address encryption, session encryption, and message encryption. They work together to jointly prevent undesired access to user data and enhance user privacy. Note that not all three are required, but all three may be present.

In particular, network addresses are stored in an address ledger specific to each device on the network. The address ledger is accessible only to devices holding a public ledger key shared by the device. The device may then update its address ledger to notify other devices of the location of the device. In addition, the ledger may include different layers that reveal different information to different public ledger keys, such that different devices and servers may receive different information about the address of a device, for example to give certain devices direct access and direct other devices to a relay or forwarding server.

In addition, devices maintain an individual 'address book' of paired devices, including messaging keys for communicating with each paired device. The messaging keys are securely shared and received from the devices, permitting effective message encryption between devices. In one embodiment, devices initially share a temporary message key with one another that is used to encrypt a permanent message key. Because the encrypted permanent message key can only be decrypted by the device that issued the public temporary key, the devices can be assured that the permanent public key is held only by the paired device. Accordingly, messages received from that device and decrypted by the permanent private key can be verified.

Finally, data can be encrypted at the device with a private user device key that is not stored by other devices, and in some embodiments is not stored by the device itself. The private user device key can be re-generated based, in part, on user input, allowing the device to decrypt data when the user enters the code, and allowing device data to be backed up and migrated to another device when the user enters the appropriate user input. The stored data may also be tagged and have metadata that allows for private user data searches across different devices.

In addition, in one embodiment, applications would not require additional login password or biometrics. Because devices are uniquely paired, when another device receives a message, it can be confident that the device is the same device that previously paired with it. As a result, authentication can be reduced and, in some embodiments, authentication only takes place in three cases: joining the network, retrieving a backup, migrating to a new device. That is, using the app is natural and instinctive, while security is assured at the highest levels.

Finally, the approach can reduce spam and other unsolicited messages. In this system, spam would only be possible after pairing has been done first. But in doing so, a potential spammer has to identify its existence first and thus can be subsequently blocked or removed from a device pairing. Furthermore, pairing requires an active user acceptance, and information, such as a user profile, must be exchanged in advance. If a user is identified as a spammer, the user can un-pair such user, and notify the system to remove the spamming user from all paired records.

Other aspects include components, devices, systems, improvements, methods, processes, applications, computer readable mediums, and other technologies related to any of the above.

BRIEF DESCRIPTION OF THE DRAWINGS

FIG. 45 depicts examples of commands inside messages.

FIGS. 51A and 51B depict how search functions become distributed search functions.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Chapter I

A known technique for secure communication between systems over the internet is known as SSH (secure shell) and SSL (secure socket layer). SSH is mainly applied to connections on insecure networks, whereas SSL is mainly applied to connections between websites and clients. TLS (transport security layer), the current layer of security of the HTML web browsers is a newer version of SSL. SSH uses network tunnels, whereas SSL uses SSL/TLS certificates.

In all versions of SSH/SSL/TLS there are two entities, a sending and a receiving device, and the message encryption method is based on a key exchange protocol. We are not discussing the details, but rather wish to point out the differences with the ThunderPort network, which is an example of some of the approaches described herein.

Both SSH and SSL/TLS (in https mode) are (secure) channel based: once a connection is established, it can be kept open, and the remote host then operates as a virtual terminal for the client.

Additionally, in the SSH/SSL/TLS messaging, IPv4/IPv6 internet IP routing is used, which includes metadata such as IP Address, Server IP Address, Domain, and Server Port (Systems typically use port 43 for TLS, port 25 for SMTP, port 22 for SSH, and so on).

When such metadata is desired to be hidden, e.g., for privacy reasons, users have to resort to using a VPN (virtual private network) solution, or resorting to using TOR (the onion router) for internet routing, or similar approaches.

In the ThunderPort network the same level of secure messaging, as SSH/SSL/TLS provides, is achieved without the need for a secure channel. In addition, the ThunderPort network has the ability to hide all metadata.

This is done through a multitude of different elements, as explained in more detail below.

Figure 1:
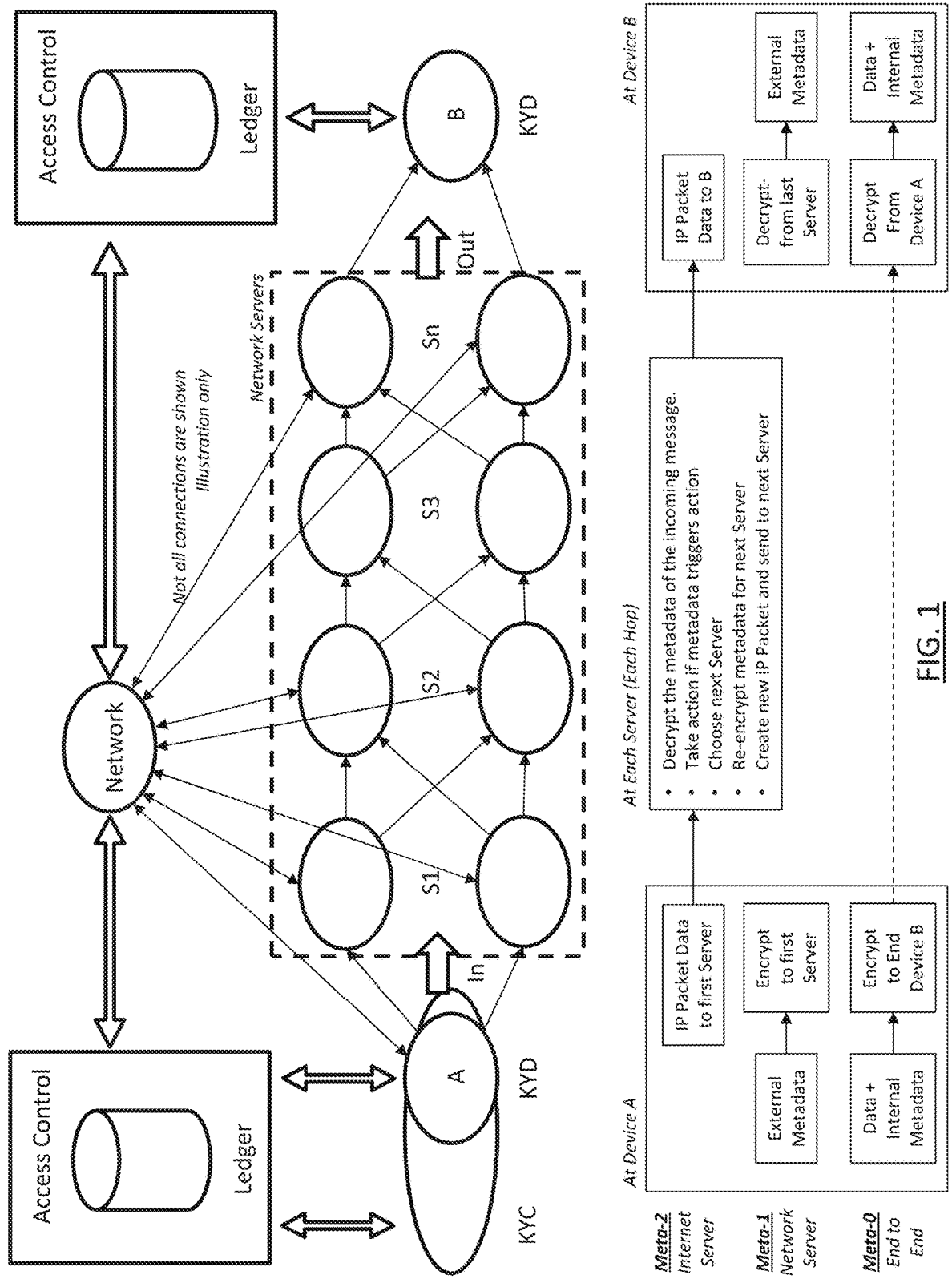
FIG. 1 is an overview of the ThunderPort network.

FIG. 1 is an overview of the ThunderPort network, as described in more detail below.

Figure 2:
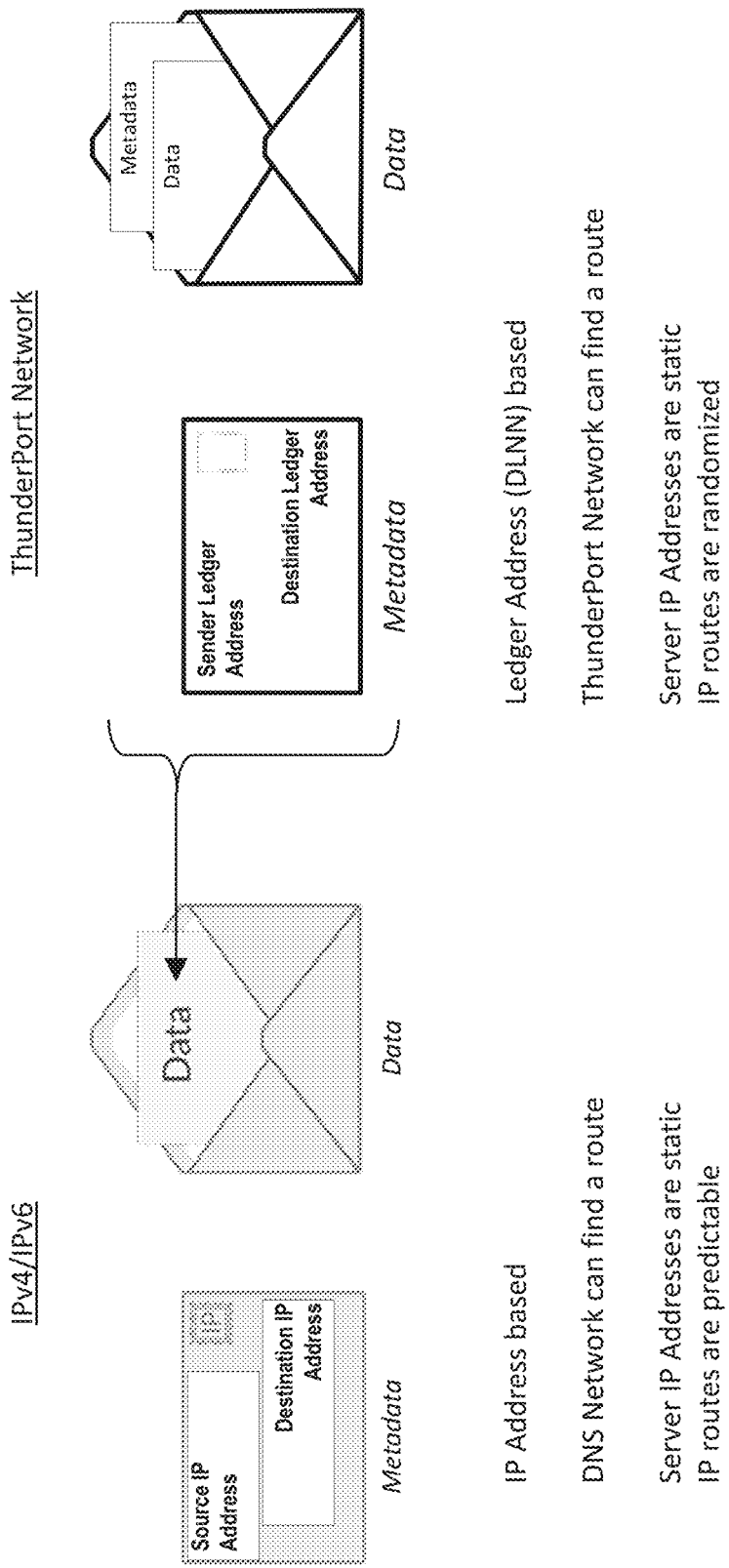
FIG. 2 illustrates use of metadata and data.

FIG. 2 Illustrates Use of Metadata and Data.

FIG. 2 depicts a typical IPv4/IPv6 encrypted message exchange: one shows this as an envelope, which has readable metadata (such as the IP addressing) on the outside, and has the encrypted metadata on the inside. In the ThunderPort network we use the envelope metaphor, but we place the first envelope inside a second envelope. This way, both the metadata of the first envelope, and the (encrypted) content of the second envelope are not visible to the IPv4/IPv6 protocols.

Figure 3:
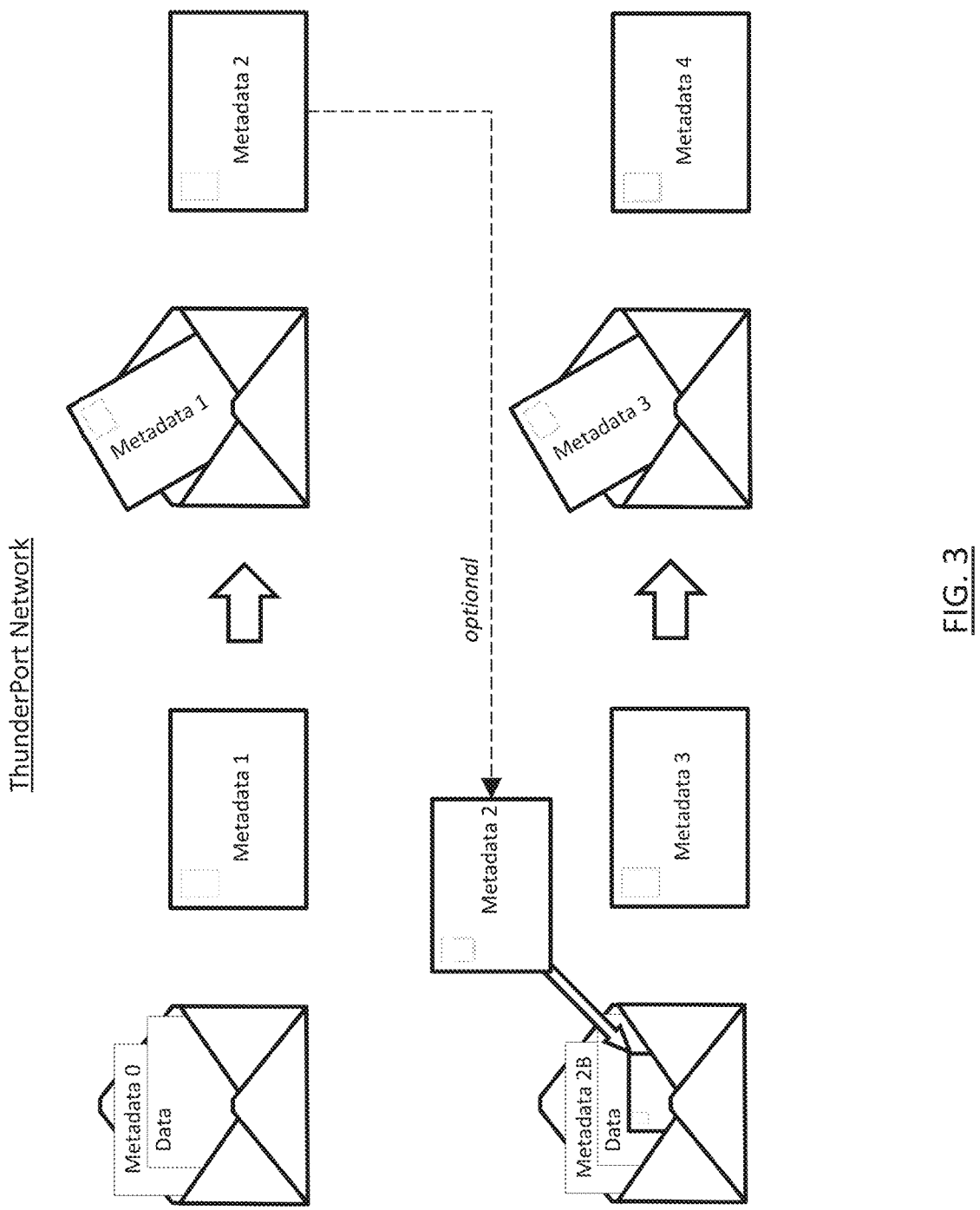
FIG. 3 shows the ThunderPort network extension of the approach in FIG. 3.

FIG. 3 Shows the ThunderPort Network Extension of the Approach in FIG. 3.

The different levels of metadata are referred to as Metadata 0, Metadata 1, Metadata 2, etc. FIG. 3 shows how Metadata 0 and Data are put (encrypted) inside an envelope with addressing info Metadata 1. This entire envelope is then put (encrypted) into a second envelope with addressing info Metadata 2.

If desired, this process can be repeated, showing the optional sequence of placing the envelopes again in a next set, with addressing info Metadata 3 and Metadata 4.

This process, of putting an envelope inside a second envelope, has a number of characteristics that may be inconsistent with conventional internet 'rules'. For example, the addressing (From-to) information is hidden. The IPv4/IPv6 packets can no longer see the originating and receiving devices. This is by design. The IPv4/IPv6 packets are rerouted through ThunderPort network servers, and, in doing so, they from a sequence of 'hops' between them to perform the routing. Since each hop is a new packet, the internet footprint only shows ThunderPort server to server activity, not device to device activity.

Figure 4:
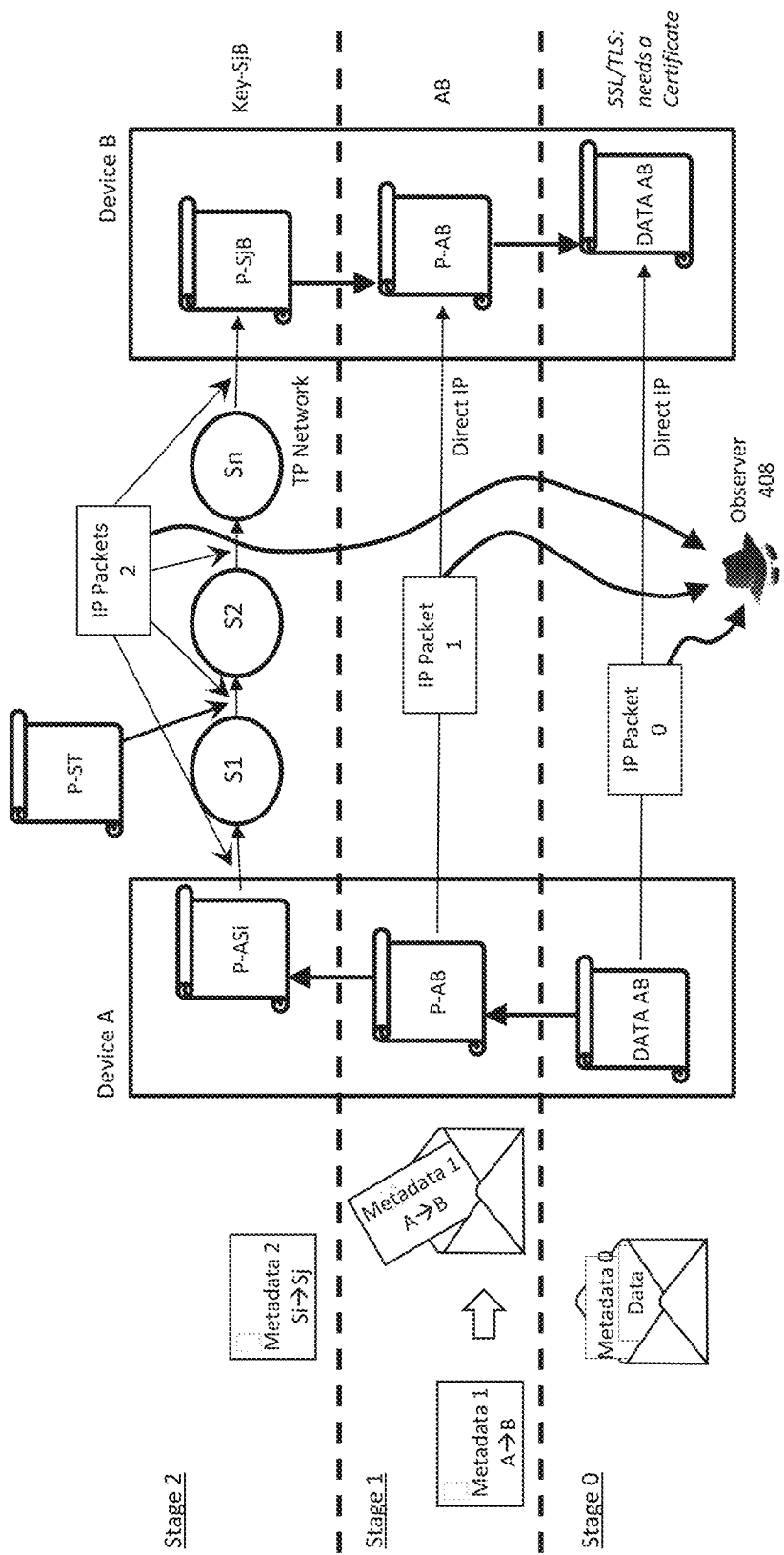
FIG. 4 details the stages of formatting and sending messages in the ThunderPort network.

FIG. 4 Details the Stages of Formatting and Sending Messages in the ThunderPort Network.

We show this in FIG. 4 at the top (Stage 2) as the TP (ThunderPort) Network, where servers S1, S2, and S3 form a sequence between devices A and B. The details, as to how the sequence is formed, and how the network performs an encrypted exchange, is explained in chapters II and III.

Here we merely mention that we use a device ledger to provide information to the ThunderPort network to perform the routing, coupled with the Metadata 1 information. Furthermore, the ThunderPort network relies on pairing between adjacent servers in a sequence. Pairing meaning that the two servers have a pre-selected encryption and decryption method available to them.

In addition, it is worth mentioning here, but will be explained further in chapter III all devices and servers are given unique IDs on the ThunderPort network, and have a unique Ledger address, which forms a basis for network activity. This process is administered in such a way that devices (and account) register prior to joining the ThunderPort network, and many known attack methods, e.g., spoofing, man-in-the-middle, phishing, do not apply, while security measures, e.g., certificates, host check, pivoting, no-key-reuse, port mapping/forwarding, become unnecessary.

In fact, we will show in chapter II that all ThunderPort network activity can arrive at any server at a given port, and there is no need for channels to be kept open. Authentication is built-in and methods are deemed secure.

To explain all this in detail (with claims) we have arranged the description in the following chapters:

| | |
|---|---|
| I | Message Formatting |
| II | Key Exchange, Message Encryption/Decryption, Message Relay |
| III | Ledger, Routing Info & Method |
| IV | Metadata Usage, Protocol Verification/Execution, Remote Execution |
| V | Grouping, Backup and Recovery |

There are more aspects to the ThunderPort network that are not detailed in these applications, but that were described in the priority applications and are incorporated by reference herein. As described herein, it should become clear that a secure data exchange network can be formed. Various embodiments may include the following characteristics: All devices and servers in the network are fully authenticated. Network breach is eliminated. Message security is enforced. Internet routing is obfuscated such that traceback cannot be done.

In this Part A, we will describe further the two-envelope method for messaging.

FIG. 4 depicts the double encryption method. We refer to Stage 0 as the unencrypted original Data and Metadata 0 (which usage we will explain in detail in chapter IV). Metadata 1 is used in Stage 1, and, in its simplest format, states that device A wishes to send a message to device B. If this message gets elevated to Stage 2, then we see that the original envelope gets inserted (encrypted) into a second envelope which now has Metadata 2 as its routing information.

In FIG. 4 we can identify at device A first packet DATA AB, which represents the unencrypted Data and Metadata 0. In SSH/SSL/TLS, this data would be encrypted using a key exchange and session method. For SSL/TLS, the receiving device must have a certificate, which is only available for DNS registered IP addresses, and requires licensing fees to be paid up. If encryption is not used, the IP Packet 0, which would contain the unencrypted packet DATA AB, is visible to any Internet Observer 408, and there would be no security nor privacy for the exchanged data DATA AB and the identity of the devices A and B. SSL/TLS/https security can be added, but only if a web-client pathway is created and the web server is registered in the DNS system and has been issued a certificate.

At Stage 1, the DATA AB packet gets encrypted (put inside the envelope) with the key method that has been established between the sending device A and the receiving device B. Metadata 1 then holds the From-to information, which is used upon receipt in device B to decide on the decryption key and method. Packet P-AB thus includes the encrypted DATA AB and the Metadata 1 which hold the From-to-information. IP Packet 1, which would contain Packet P-AB, if sent directly from device A to device B, would be visible to an Internet Observer 408, but the Internet Observer 408 can only see the Metadata 1, but not the Metadata 0 and Data (DATA AB) as this has been encrypted. This is similar to how an SSH/SSL/TLS packet would be sent through the internet. Since Metadata 1 is visible, the internet observer can derive from this Metadata which device is communicating to which other device, and when.

At Stage 2, the P-AB packet is also encrypted, leaving only Metadata 2 visible to Internet Observer 408. Furthermore, the path chosen is no longer direct from device A to device B, but from device A to a first server, P-ASi, then it 'hops' between servers, depicted as packet P-ST (from server S to server T), until it hits server Sn, at which point Packet P-SjB is formed which is sent to device B. Metadata 2 of each of these packets holds the from-to information for the hop for that packet. An Internet Observer 408 can see each of the individual packets, such as P-ASi, P-ST, and P-SjB from the corresponding IP packets 2, but these packets are no longer linked, as each P-ST packet is a stand-alone server to server handoff, with no visible information to the Internet Observer 408 which relates the packet to device A or device B. We will later explain in chapter III about the routes being dynamically chosen, and not statically linked.

Figure 5:
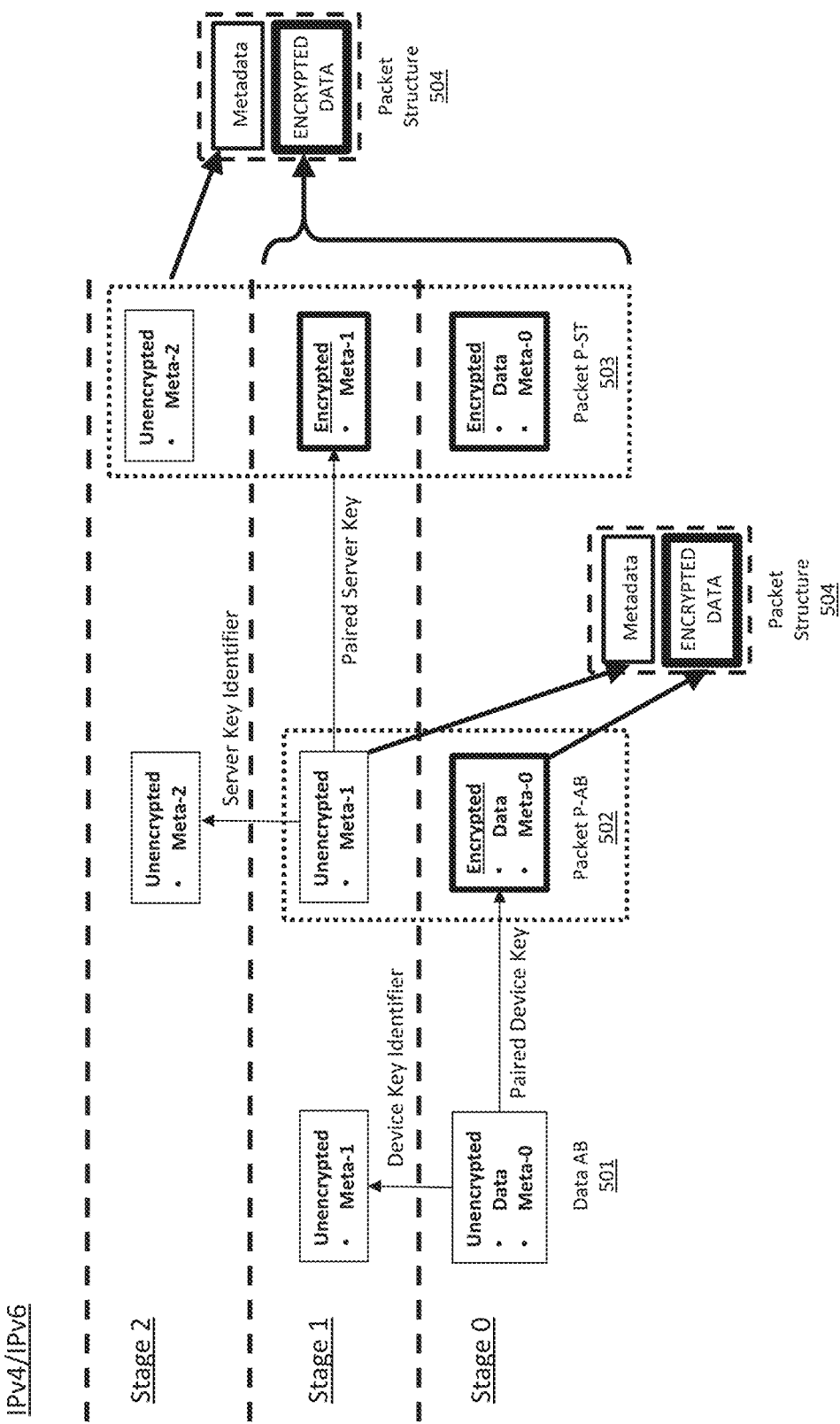
FIG. 5 highlights Stage 1 (P-AB) and Stage 2 (P-ST) packaging.

As packet P-SjB is received at device B, the Metadata 2 is used to find which key and method is needed to decrypt such packet. The resulting packet, P-AB is then retrieved, which has Metadata 1 information which is used to find the proper decryption key to decrypt the content DATA AB. As only device B has the proper key for this decryption, none of the servers that forward the data packets P-ST in its variations can see DATA AB, but they can see P-AB, and hence the Metadata 1. Servers in the ThunderPort network are trusted, meaning it is ok for Metadata 1 to be visible. FIG. 5 Highlights Stage 1 (P-AB) and Stage 2 (P-ST) Packaging.

FIG. 5 shows a different view of this process. This figure depicts how at Stage 0 the unencrypted Data and Metadata 0 (META-0) gets encrypted using a paired key with device B. This forms the ENCRYPTED DATA segment of the packet P-AB 504. The Metadata provided includes information about both the sending device A and the receiving device B.

Figure 6:
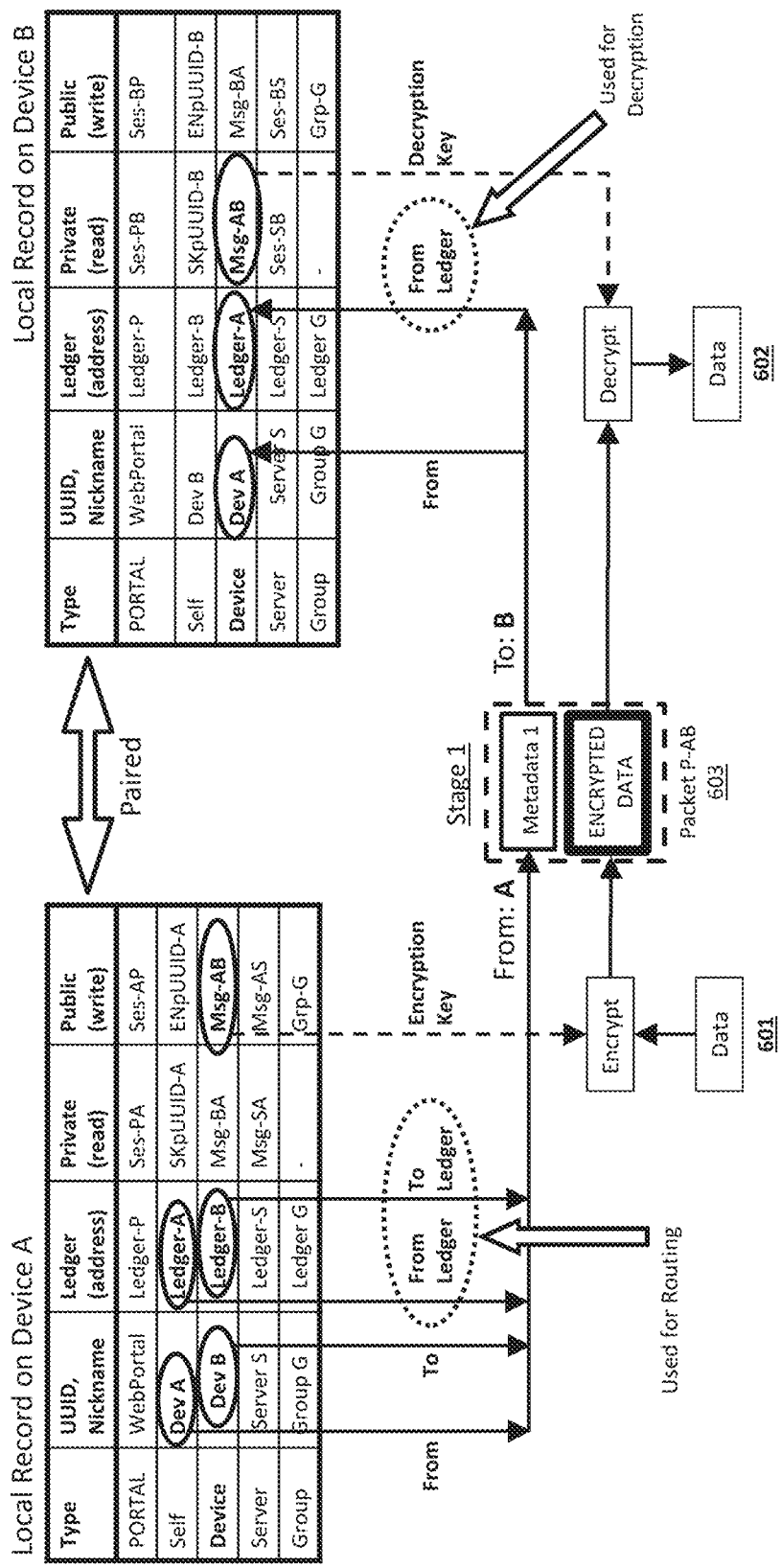
FIG. 6 illustrates usage of Local Records on devices A and B for P-AB packets.

After packet P-AB 502 is formed, it is encrypted once more. At this point, packet P-ST 503 is formed. This results in an encrypted segment which contains both Metadata 1 (META-1) and the DATA-AB 501 (Encrypted Data and META-0). Thus, all information about device A and device B is then hidden. The unencrypted Metadata 2 (META-2) is then created and thus packet P-ST is formed. Packet P-AB and packet P-ST have a same packet structure 504, in that an unencrypted Metadata portion contains to-from information and an encrypted portion contains the data to be transmitted. They also use different keys for encryption and decryption. FIG. 6 Illustrates Usage of Local Records on Devices A and B for P-AB Packets.

FIG. 6 explains the first step, which is the formation of packet P-AB. This figure is taken from chapter II, and this shows how Local Records on device A and device B have been populated. Each row is a different device. The columns are the UUID of the device, the ledger for the device, the private key for decrypting packets from that device, and the public key for encrypting packets to that device. In this case, four parameters are included in the Metadata 1, namely: Dev A, Dev B, Ledger-A, and Ledger-B. And the Public Msg-AB key is used for encryption of Data 601. Packet P-AB 603 is then formed by combining the ENCRYPTED DATA with Metadata 1.

Figure 7:
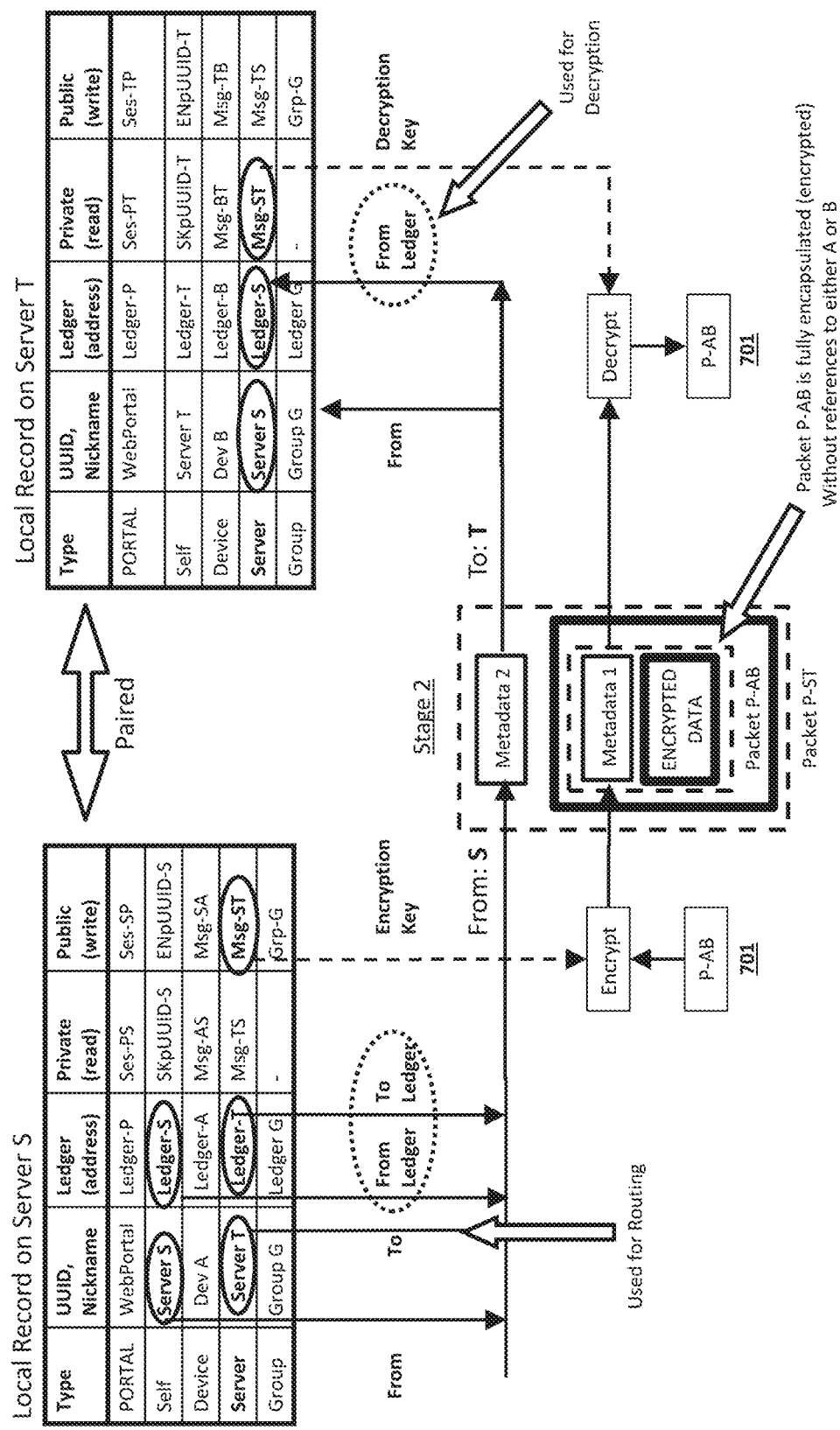
FIG. 7 illustrates usage of Local Records on servers S and T for P-ST packets.

Chapter II further explains specific details as to how the Local Records get populated, and how they are used. Chapter III further explains how the Ledger addresses play a role in finding a route and protecting device and data integrity. FIG. 7 Illustrates Usage of Local Records on Servers S and T for P-ST Packets.

Figure 8:
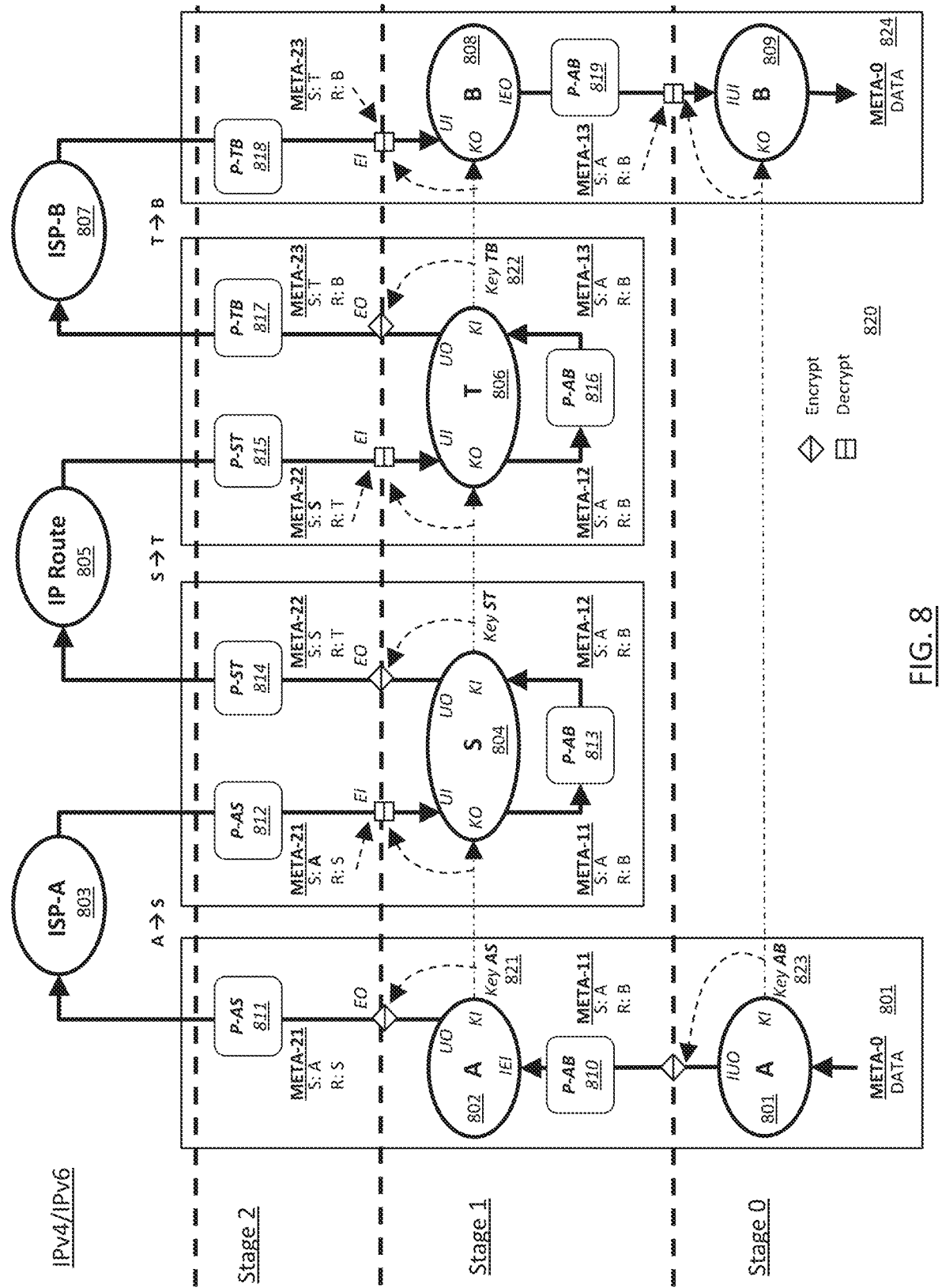
FIG. 8 shows a flow diagram of sending a packet from device A to device B through server S and T.

Once Packet P-AB is formed, FIG. 7 depicts the next step, which is the formation of packet P-ST. This is identical to FIG. 6 except that FIG. 7 depicts a server S to server T connection, which is reflected in the Local Record Data. Devices A and B are not referenced in this packet in Metadata 2. The only exception is for the first packet (device A to first server) and the last packet (last server to device B). FIG. 8 Shows a Flow Diagram of Sending a Packet from Device a to Device B Through Server S and T.

FIG. 8 shows the flow of the data from device A to device B step by step. It is assumed that two servers are used, a first server S 804 and a second server T 806. This is for illustration, typically more servers will be used in sequence.

At Stage 0, Metadata 0 (META-0) and DATA 801 are encrypted to form packet P-AB 810 with Metadata 11 (META-11). META-11 only holds information regarding sending device A and receiving device B, as depicted in the previous figure. This is now at Stage 1. We are showing on labels how data moves through the device: Device A, at position 801, shows two ports: KI and IUO. KI stands for Key Input, and this is the port that was previously used to exchange a key with device B 809, which has the corresponding KO, Key Output, port. In the ThunderPort network system, receiving devices choose their own key and key method, so device B controls the key to be used for encryption and decryption, hence we use KI for the received key, even though this is the encryption key. In more detail, the read key is the private key, which never leaves the device at which it is generated.

Port IUO stands for Internal Unencrypted Out, which goes to port IEI, Internal Encrypted Input. These are logical ports, and they help in explaining the data flow. Device A at position 802 now has the encrypted DATA and corresponding META-11 that formed packet P-AB 810.

At this point, the Stage 2 packet is formed by targeting the first server, server S in this case. The corresponding packet, P-AS 811, is formed similarly as P-AB by connecting the UO port to the EO, or Unencrypted Out to Encrypted Out. Packet P-AS 811 can then be properly formatted to form an IP packet that connects device A 802 to server S 804.

Typically, if we start at a user device, such device connects to the internet through a first ISP server, depicted as ISP-A 803. Server S 804 may not connect to server ISP-A, and we ignore the IP route from ISP-A 803 to server S 804. Given that we have the IP addresses of both device A 810 and server S 804, we can surmise that an IP route exists and that the packet P-AS 811 can be sent across and be received as P-AS 812 on server S, which should be identical to the packet P-AS 811 sent out on device A 802.

On server S, the packet P-AS is decrypted using the META-21 information, using the paired key per the method in FIG. 7. Paired Server Key AS 821 reflects the key pairing between device A and server S, needed for decoding the P-AS 812 packet using the META-21 information.

At this point, Server S has packet P-AB 813 which is identical to packet P-AB 812. The Metadata META-11 is exposed, and can be altered by server S. If server S touches the original sender A and receiver B information, the packet will eventually die, as the handle to the decryption method is then lost. The ThunderPort network relies on trusted servers that use the Metadata META-11 in a secure manner, and all the servers are trusted in the network. The internet servers are not, so packet P-AB is moved from server to server, and in a typical fashion, Metadata is added to META-11, forming META-12, META-13, and so on. When device B receives the final packet, it also can see the history of how it got to device B. This is optional, this can e.g., be stripped at the last server, in this case server T. Data flowing from server S to server T use the internet with IP addressing. Servers S and T are not DNS registered; one can think of them as being part of the 'deep web'. That is addressable by IP address, not by domain name. Each path between such servers forms an IP Route 805 which can represent several internet servers, depending on where servers S and T are placed on the internet. The packet P-ST is a newly formed internet packet, and is built from packet P-AB 813, similar to how packet P-AS was built from packet P-AB 810. Since this is a new packet, the internet trace would only reflect an exchange between S and T, technically from S to T. This step can be repeated numerous times, as is explained in chapter III.

Eventually, device B receives packet P-TB on its EI, Encrypted Input, port, and decrypts it using the associated key for the server T to device B connection, shown as Paired Server Key TB 822. The retrieved packet P-AB 813 now shows Metadata META-13 which tells device B that it must use the Paired Device Key AB 823 for decryption, and the data flows then from IEO, Internal Encrypted Output to IUI, Internal Unencrypted Input to produce the results META-0 and DATA 824.

Figure 9:
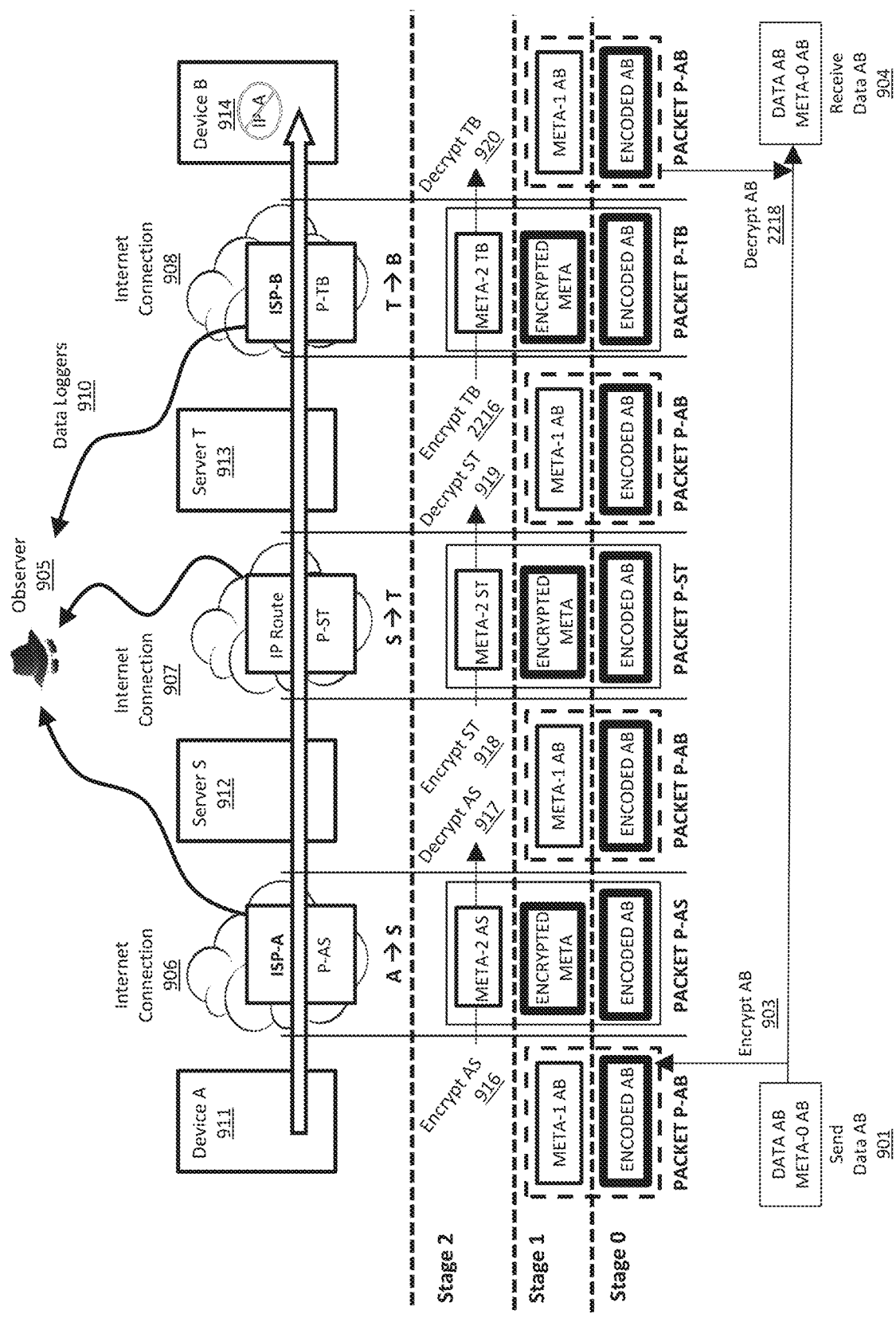
FIG. 9 shows a data-oriented diagram of sending a packet from device A to device B through server S and T.

FIG. 9 Shows a Data-Oriented Diagram of Sending a Packet from Device A to Device B Through Server S and T.

FIG. 9 shows the same information as FIG. 8 does, but more from a data centric perspective, so it is easier to see how the data is manipulated along the path. We can follow how the Send DATA AB 901 becomes Receive DATA AB 902 by moving from Stage 0 to Stage 1 and then going up to Stage 2 and back down to Stage 1. Each server, upon decryption, has access to packet P-AB, meaning that the Metadata META-1 AB is unencrypted, but the DATA AB and META-0 AB data remains encrypted. Each internet connection, shown as ISP-A, IP Route, and ISP-B, similar nomenclature as in FIG. 8, shows that it has the packet at Stage 2, P-AS, P-ST, and P-TB. P-ST reflecting the server-to-server hops, which can be repeated as many times as one likes, and the first connection device A to server S and the last connection server T to device B.

It should also be mentioned that the packet changes in size between the hops, on purpose, to defeat 'nation level' AI solutions that monitor internet traffic, and key off time-stamps and packet sizes. When the packet P-TB is received on device B, device B has no information as to the actual IP address of device A. In fact, the Metadata can be stripped such that device B can also not detect which server was the first server which connected to device A, server S, or which servers were used in succession.

However, for the network cohesiveness, debugging, verification and other purposes, the network can aggregate metadata from each server along the path and include this in the messages going forward. We will explain in chapter III that paths cannot be predicted. Each message will select a different path through the network, so the metadata which is aggregated has limited use.

Figure 10:
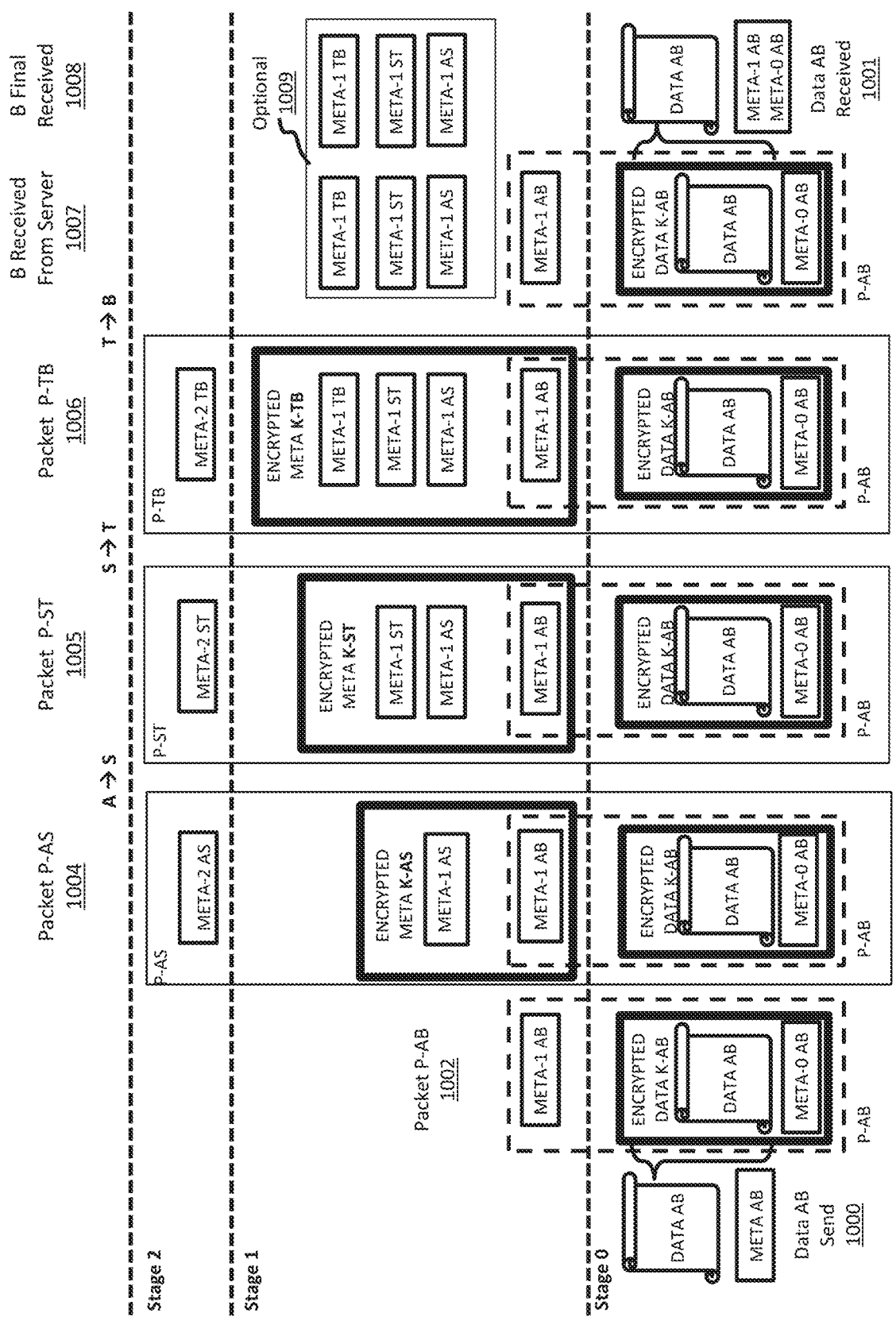
FIG. 10 shows the diagram from FIG. 9 in more detail.

We are depicting this in FIG. 10 as Optional metadata 1009. Typically, device B only needs Metadata META-1 TB to decode the last server T to device B packet P-TB at Stage 2, and then it only needs META-1 AB to decode the packet P-AB at Stage 1. All other Metadata at level 1 is unnecessary, but can be made use of for different purposes, as we will explain in chapter IV.

FIG. 10 Shows the Diagram from FIG. 9 in More Detail.

FIG. 10 shows the same information as FIG. 9, but now it shows the data packets only at each state and host. We can see how DATA AB Send 1000 at Stage 0 forms Packet P-AB at Stage 1 on Device A, followed by packet P-AS at Stage 2. The Metadata META K-AS at Stage 1 include META-1 AS which is data which will be visible to server S. Decoding however is done using Metadata META-2 AS, as previously explained. The Stage 2 metadata has no need to be preserved, this merely reflects the server to server (and first and last device) metadata. The same metadata, with additional information is also kept at the META-1 level, which is sent encrypted from server to server. Upon each transition, A→S, S→T, T→B, this information can thus grow, and we have specific uses for such information.

At device B, received from server 1007, Metadata META-1 AB is then used to retrieve the proper key and method to decrypt received packet P-AB and obtain Data AB Received 1001.

Figure 11:
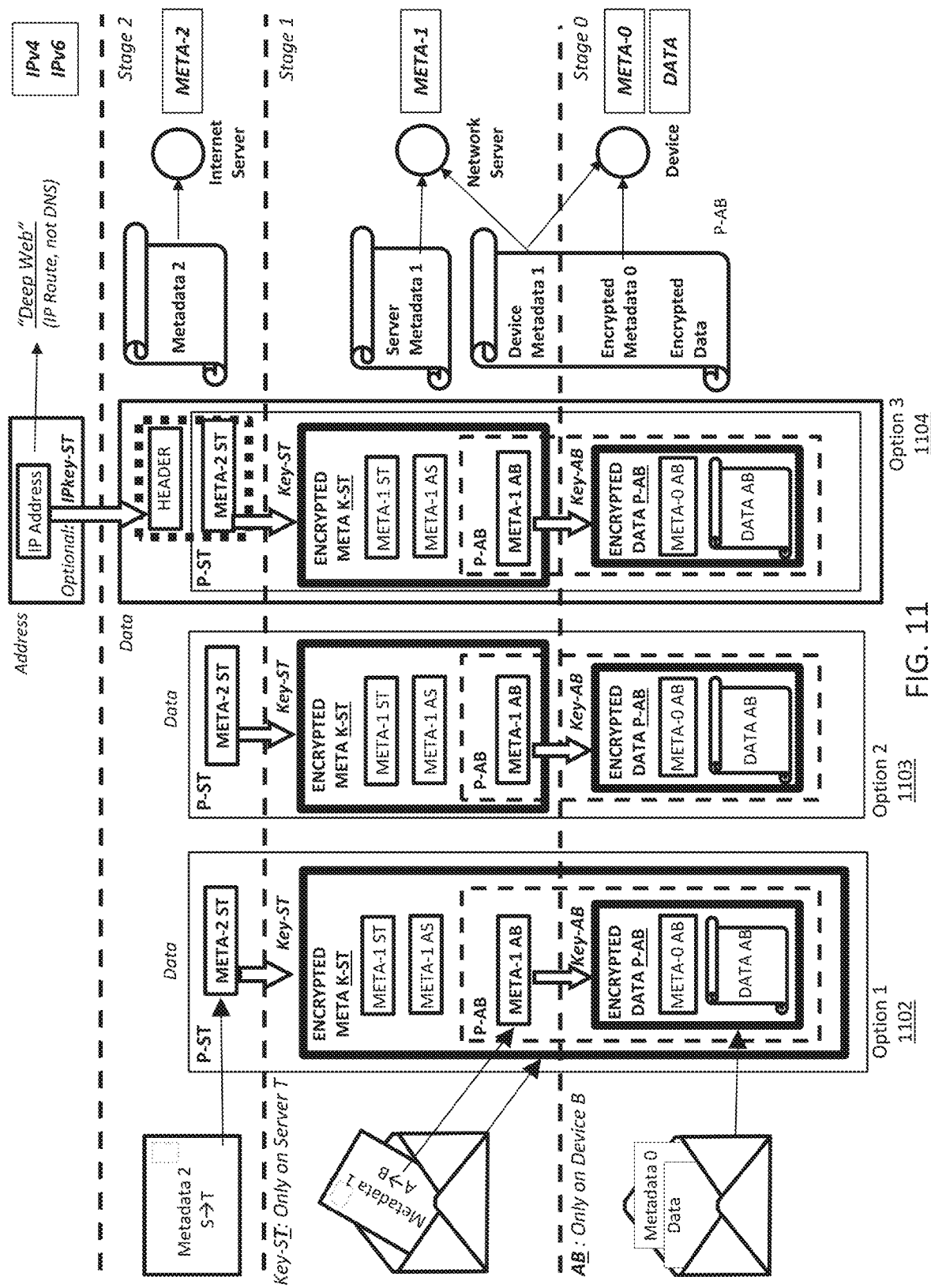
FIG. 11 shows alternate encryption options for data and metadata.

FIG. 11 Shows Alternate Encryption Options for Data and Metadata.

FIG. 11 depicts the messaging levels and shows us three different options. In one embodiment we chose option 2 1103 as there is no need to re-encrypt the already encrypted data in packet P-AB. Option 1 1102 implies that the entire data segment gets re-encrypted using the encryption key for Stage 2. This is however unnecessary, only the metadata at Stage 1 is encrypted here in option 2 1103. Similarly, Option 3 1104 shows how the Stage 2 metadata META-2 ST can also be encrypted. However, for this encryption, there is no paired key, so this would resort back to standard methods that are IP address and standard key exchange method based. This allows more rigidity, but our approach does not mind the metadata at Stage 2, META-2 being exposed to the internet.

Again, already mentioned above, the servers are addressed by IP address, not by DNS or domain name. This is also referred to as Deep Web addressing, and is fairly common on IPv4/IPv6 internet hosts.

Figure 12:
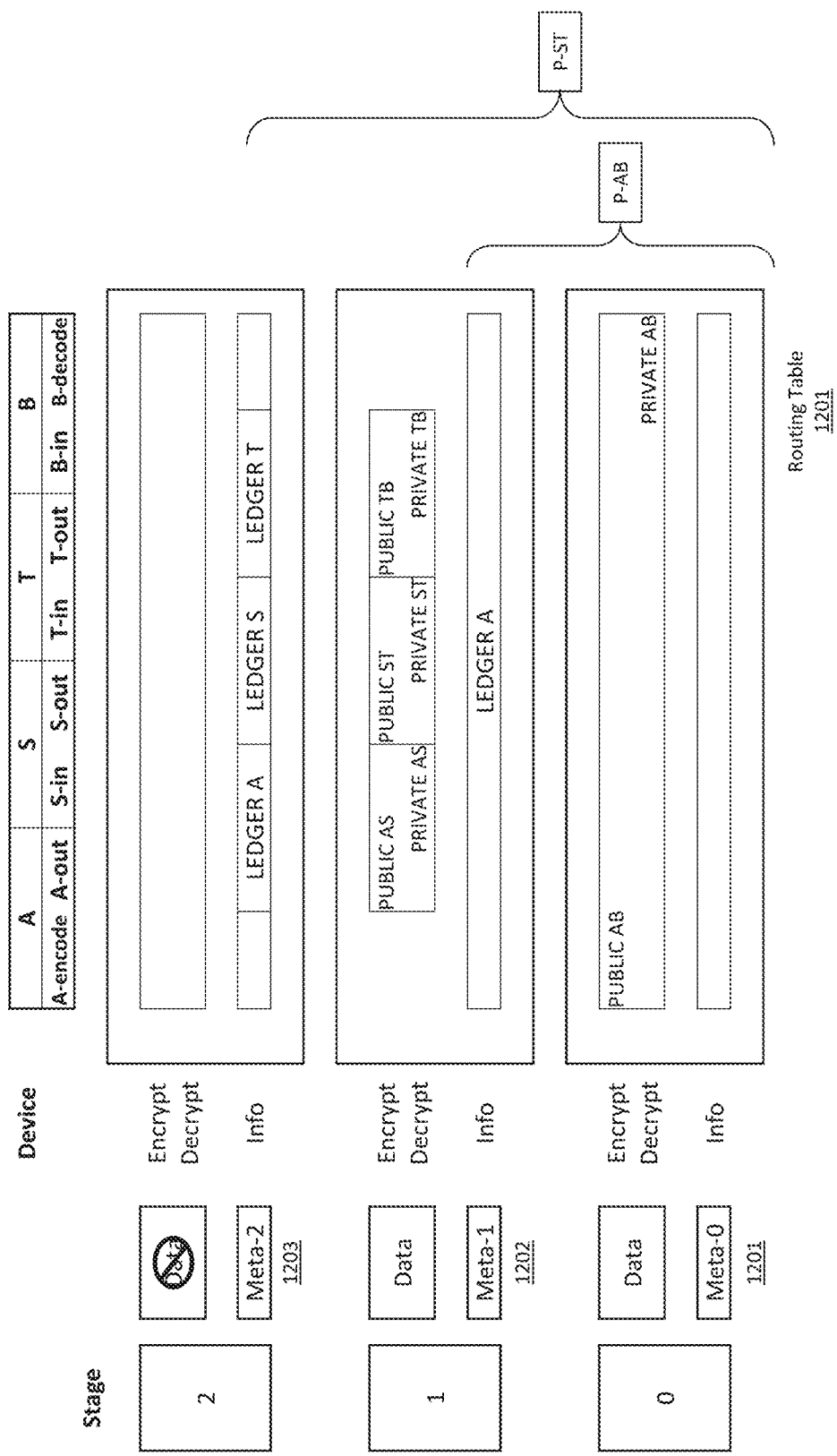
FIG. 12 shows the data exchange from A to S to T to B as a Routing Table.

FIG. 12 Shows the Data Exchange from a to S to T to B as a Routing Table.

FIG. 12 shows the device A to server S to server T to device B transaction in a tabulated view.

Stage 0 refers to the internal encryption for the data to be decrypted by the end recipient. In this case, device A encrypts the data with the keys previously exchanged with device B, during a pairing step. In this case we use public/private key pairs (it can be done with symmetric keys as well). Device A encrypts the DATA with Public Key AB for device B to decrypt this upon receipt with Private Key AB.

The source identification, in this case device A, is added as Metadata 1 (META-1), outside the encrypted payload, and this forms the packet P-AB, as we detailed earlier as a 'stage 0 packet'. This is end-to-end encryption, and only device B can decrypt this data.

Then, at stage 1, the Metadata is encrypted using a different set of keys. In this case, as the packet moves from device A to server S to server T to device B, we would form packets P-AS, P-ST, P-TB in succession. Each packet has again a prior exchanged key pair: P-AS uses Public Key AS (stored on device A) for encryption and Private Key AS (stored on server S) for decryption and so on. At each server, and at the final receiving node (server or device), packet P-AB is unbundled, and Metadata META-1 is visible. Only at the final receiving node, META-1 provides the information for decryption, as the required decryption key Private Key AB is only stored at the final recipient.

After formation of each packet 'P-ST', a short hand for 'stage 1 packets', an internet packet is formed which has Metadata META-2 unencrypted, and the encrypted 'payload', consisting out of Metadata META-1 and the Stage 0 Data and META-0.

As we stated above, there is no need to protect the Metadata META-2 from the internet, as this is also visible in the IP addressing for the internet packets. If so desired, one could use another form of encryption (standard method) to hide this Metadata META-2. E.g., this could be desired if one does not want the internet to have access to the device ID at the first transfer. For mobile devices, that register with multiple IP addresses this would hide its footprint. Alternatively, one can choose to use a VPN and thus hide the originating IP address.

In another method, the device identifier can be hidden in hash or mapping methods, to make retrieval more difficult. As these form static methods, they are not as robust as general encryption methods.

In terms of privacy protection, a 'nation state' observer—i.e., someone observing 'all' internet traffic—would be able to track known IP (e.g., a mobile location, home or business address) only to the extent that the device (such as device A) communicates to a first server (such as server S). This is a subset of being able to track that the device connects to a first ISP server, which cannot be hidden. A VPN can hide content and origin downwards (past the VPN server), but the connection to the VPN server still goes through the ISP server.

For this reason, the value of seeing the Ledger-A address is low. It demonstrates that a device is communicating with the network, but the 'nation state' observer cannot trace the packet through the ThunderPort network to its destination.

However, note that each server has access to the Metadata META-1, which exposes device A to all servers (which is needed for routing). We use trusted servers (the network owns them) so this is not deemed to be an issue. We address more of this in chapter III. The ThunderPort network does guarantee that the Data itself (Stage 0) is protected and is only available to the recipient, not to any intermediary nodes.

Also, one should note that at Stage 2 there is no Data—Stage 2 is merely a wrapper for an internet packet. Only the Info field is populated, and no encryption is needed.

There is more to the ThunderPort network in terms of how the network creates and controls the routing of packets. This is explained in detail in chapter III.

Figure 13:
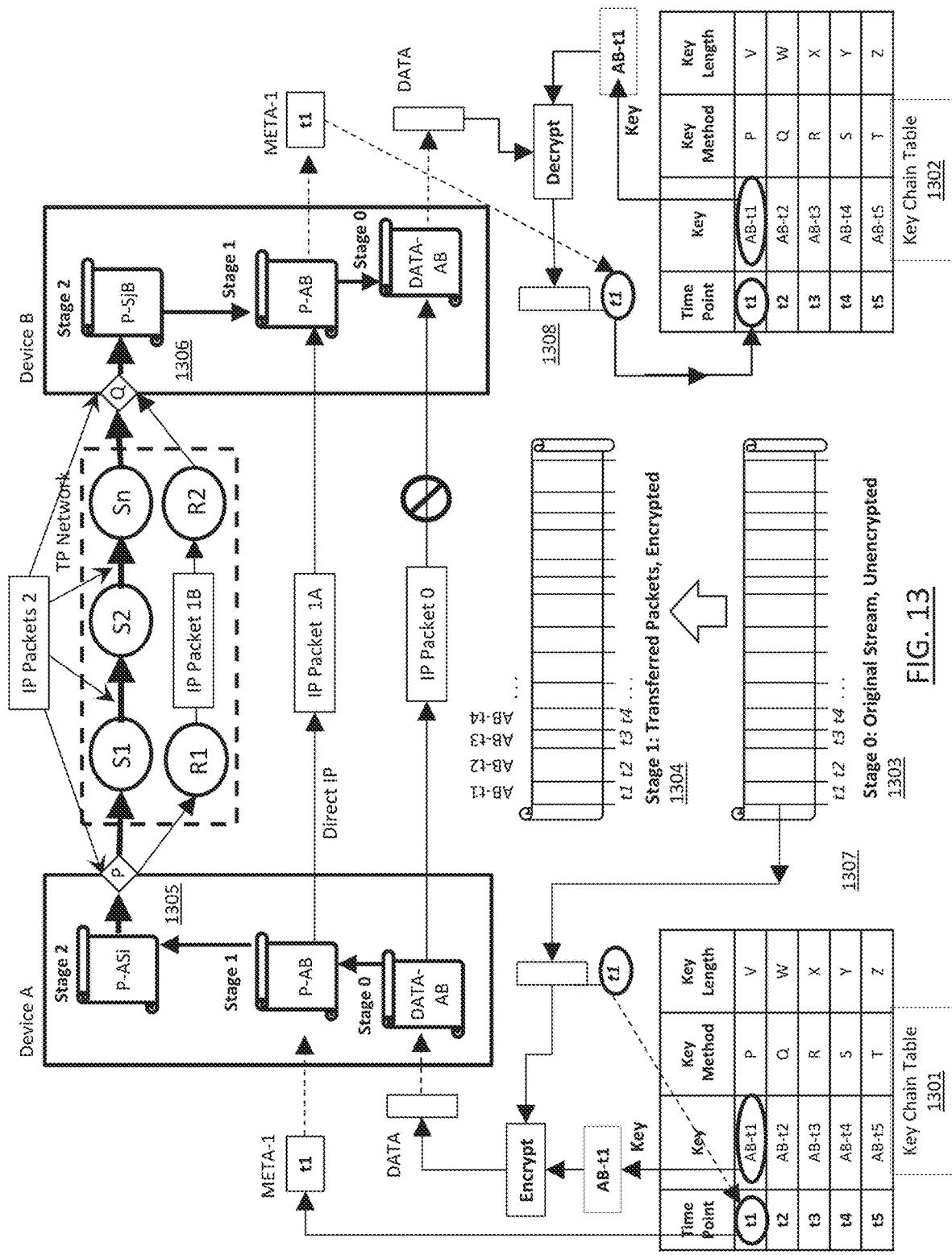
FIG. 13 shows an encryption method for streaming data.

FIG. 13 Shows an Encryption Method for Streaming Data

FIG. 13 addresses an optimization which addresses the dilemma between asymmetric and symmetric encryption, or better, high effort and low effort encryption.

A common complaint from CDN (Content Distribution Networks)—the datacenters for media content distribution—is that high effort encryption is too expensive to implement. This is also compounded by the data size, which can be significant for video data.

In addition, the method of exchanging a symmetric key in an asymmetric message exchange first, and then using the symmetric key for the decryption of the stream does not address the computational problem. E.g., AES-128 uses 10 modification rounds, AES-192 uses 12 rounds, and AES-256 uses 14 rounds, and TwoFish uses 16 rounds, regardless of key-strength (length), each level increasing the computational complexity. But these symmetric encryption methods are all significantly faster than asymmetric methods (e.g., compare AES to RSA). For purposes of this explanation, we assume that symmetric encryption for streaming media is more acceptable than asymmetric encryption from the perspective of the CDN providers.

Video-on-Demand (VOD), usually 'over cable', is still gaining in popularity and Over-the-Top (OTT), usually 'over the internet', is becoming a more prevalent method as internet access and bandwidth has been increasing for many. All popular methods use AES for DRM enforcement.

NIST points out that strength of any method depends on two factors: "(1) The strength of the keys and the effectiveness of mechanisms and protocols associated with the keys; and (2) the protection of the keys through key management (secure key generation, storage, distribution, use and destruction)". They further state that: "Strong algorithms combined with poor key management are as likely to fail as poor algorithms embedded in a strong key management context."

In FIG. 13 we show an improvement over current streaming solutions, both for VOD and OTT, in which we make use of a Key Chain. We introduce a Key Chain Table 1301 which is generated when a customer accesses a video. This Key Chain table is then transmitted from the source device A (the CDN provider) to the receiving device B (the customer device) and received, after asymmetric decryption, as Key Chain Table 1302. In VOD, this could be a set-top-box, in OTT this could be a mobile device.

The Key Chain Table holds a list of randomly created Time Points (t1 through t5), which could have short intervals of e.g., 20 seconds on average. Each Time Point has an associated Key (AB-t1 through AB-t5), as well as a Key Method and a Key Length. Examples of Key Methods are Block Ciphers (AES, Blowfish, DES, Triple DES, Serpent, TwoFish, et. al.), Stream Ciphers (A5/1, A5/2, E0, Crypto-1, RC4, ChaCha, et. al.), and so on. Examples of Key Strength are 64, 128, 256, commonly referred to as Key Length. Key Length and Encryption Strength are not directly correlated, as the Encryption Strength also depends on the chosen encryption algorithm.

A 2-hour (120 min) movie requires (at 20 seconds on average) 120×3=360 different entries in the Key Chain Table. Depending on movie playback resolution, the total amount of data to be transferred can vary from 500 MB to over 3 GB for HD. A typical internet packet would have up to 64 KB for payloads, so a movie could generate tens of thousands of packets. E.g., a HD movie generating 50,000 internet packets, using 360 different keys, would, on average, use the same key for 143 internet packets. This makes movie decryption without the Key Chain Table a lot more complex than a single key encryption method. Not only does one need to generate each key, one also has to decode at what Time Point a new key must be applied.

However, from the CDN perspective, the encryption effort can actually be reduced: e.g., one can chose to intermix many lower strength keys, such as using 128 whereas 256 was used before.

Furthermore, the user can fast forwards, skip ahead, as encryption and decryption are done 'in flight'. So only the segments that are 'viewed' are actually encrypted at the CDN source and decrypted at the viewer's device.

FIG. 13 details more of the process. As the Key Chain Table has been sent using the 'standard' message exchange from Device A to device B, we now describe how the movie stream is broken up and transferred.

The unencrypted movie stream 1303 is essentially the DATA at Stage 0. In creating Packet P-AB, as explained earlier, the stream 1303 is converted into the encrypted movie stream 1304. The image depicted illustrates that each section of the movie has an associated Time Point (marked) and encryption method (different shading) and key (labelled). Each such section has multiple internet packet transfers as well. The Time Point is added to the Metadata 1 at Stage 1, and this is used as in index into the Key Chain Table 1302 for decryption.

The Time Point can be the actual time of the broadcast. As long as both the encryption side (device A using Key Chain Table 1301) and the receiving side (device B using Key Chain Table 1302) agree on the interpolation value of interim values. Usually there will be multiple messages, at multiple time points, before the encrypted key and method change again.

The second stage encryption, Stage 2, creates the P-ASi packet, also as described previously.

We next explain four layers of communication, marked as IP Packet 0, IP Packet 1A, IP Packet 1B, and IP Packets 2. As earlier explained, IP Packet 0 is not used in the ThunderPort network as it is unencrypted, and encryption would require standard encryption and key exchange methods (SSH/SSL/TLS), as well as DNS registration of the recipient device.

However, the first stage, Stage 1, packet, P-AB, already has the fully encrypted payload. Remember, in one embodiment we propose to not re-encrypt the P-AB packet going to Stage 2, only the Metadata at Stage 1 gets encrypted.

So, sending the Packet P-AB directly from device A to device B, using path IP Packet 1A, is warranted. The drawback is that this fully exposes the IP addresses of device A and B to each other, which is not necessarily an issue. It also exposes the activity between device A and device B to the internet, including the ISP providers on both ends.

One could introduce a VPN, but a more natural solution for the ThunderPort network is to use IP Packet 1B. In IP Packet 1B routing, there is a designated server (R1 for device A and R2 for device B, also referred to as Relay Servers), and such designated servers have a direct pathway between them in the ThunderPort's routing tables. Thus, a packet P-R1R2 can be generated from the first server R1 to the second server R2, and the path completes using only two servers. In the ThunderPort network, R1 and R2 actually represent a 'set' of servers each, but this will be explained in chapter III.

Lastly, the path IP Packets 2 represents that typical ThunderPort network packet routing. This is also explained in detail in chapter III.

P 1305 and Q 1306 can be seen as decision points to perform a route using IP Packet 1B or IP Packets 2. E.g., one could choose IP Packets 2 for highly secure video transmission, in which one wants to hide that the transmission actually took place, whereas IP Packets 1B does leave a footprint of data streaming from server R1 to server R2 on the internet.

It is not clear from the image, but IP Packets 2 uses different servers for different transmissions, making it very difficult to track activity between any two nodes on the ThunderPort network. IP Packets 1B does not provide this level of obfuscation.

The Key Chain Table method can be added to existing distribution methods for streaming media. Essentially, when a session gets initiated, the Key Chain Table is created. During the streaming, the actual encoding can be envisioned as a subroutine in both the source (device A, typically CDN provider) and the recipient (device B, typically the customer device). It is not necessary for existing solutions to use the ThunderPort network, as they can use a method already established for broadcasting. The Key Chain Table can be seen as a DRM management system. However, the key exchange problem remains in this case, whereas the ThunderPort network solves this, as explained in chapter II.

In chapter V, we will also demonstrate how this approach can be used to enable encrypted multi-participant online streaming media—such as audio and video.

Also, the Key Chain Table may have a fixed length. When a media stream overruns the timepoints in such table, the table will have a 'modulo' value, which tells both encryption and decryption side where to point in the table when the time-index is out of bounds. E.g., a table with a max time point value of 7,200 would include a modulo of 7,200, that is each time point value between 7,201 and 14,400 is subtracted by 7,200, each value between 14,401 and 21,600 is subtracted by 14,400, and so on. Therefore, the table size and the media stream play time do not have to depend on one another. When interactive media is used, such as audio or video streaming, there is no time limit.

Chapter II

Figure 14:
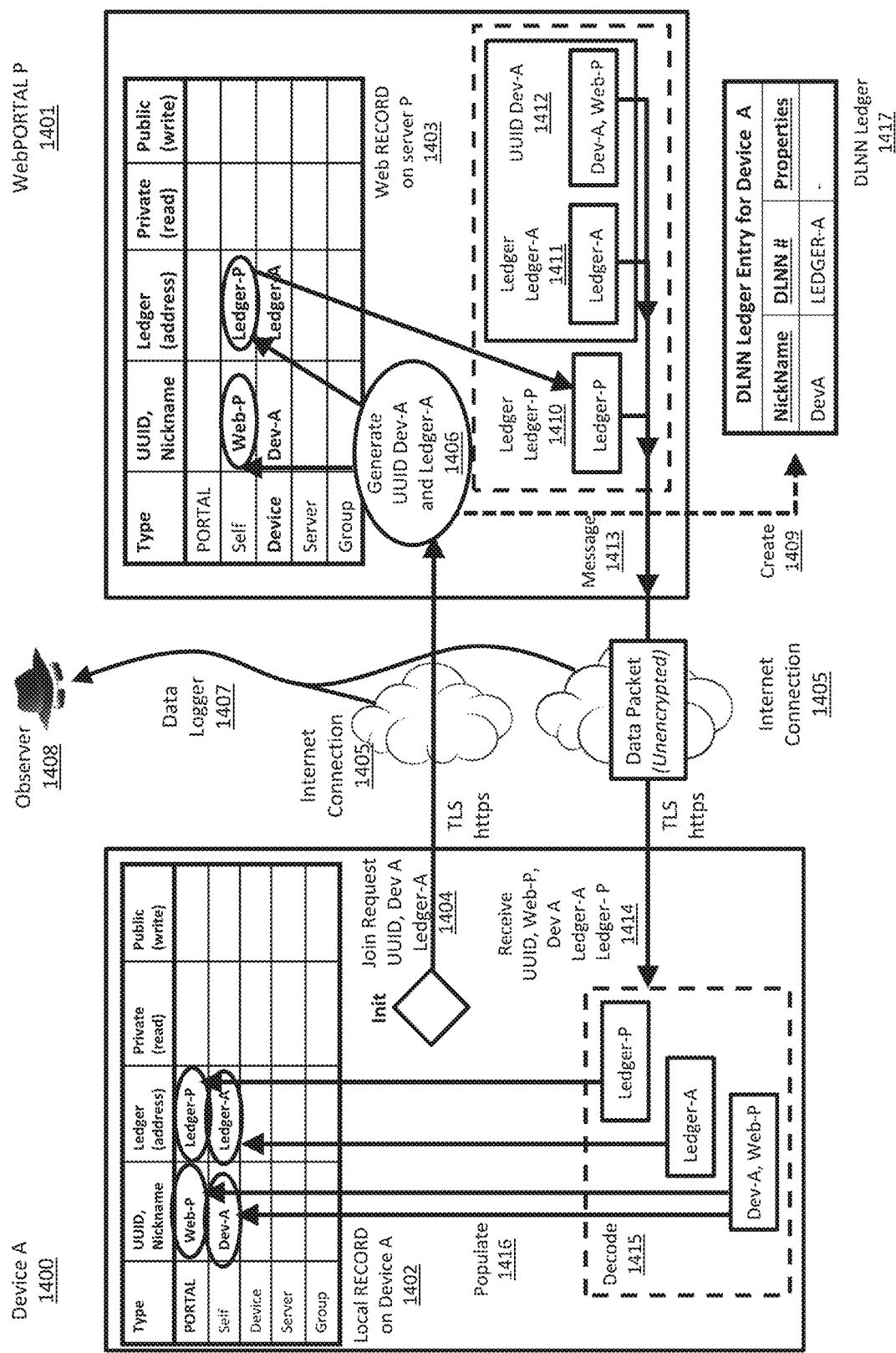
FIG. 14 is an example description of a device pairing to the administration server.

FIG. 14 is an Example Description of a Device Pairing to the Administration Server.

FIG. 14 depicts Device A 1400 and WebPORTAL Server P 1401. FIG. 1 also depicts three databases for the network to function in a decentralized fashion: 1) The "Local RECORD" 1402 on each device in the network; 2) The Web RECORD 1403 on the WebPORTAL Server; and 3) a Distributed Ledger Node Network (DLNN) Entry for Device A 1417.

The DLNN, or in short "Ledger", is a distributed database within the ThunderPort network, in which each device will have an entry. Data stored at this entry is retrievable on the network by those servers (nodes) and devices which have access to the Ledger and have appropriate decryption keys to disseminate information stored within. We will expand further on this Ledger and its other uses in FIG. 33 and below. At this point, we are only concerned with the Ledger Address of each device, such as LEDGER-A for device A.

Before discussion of FIG. 14 in more detail, we will briefly discuss these three databases.

In our description, we use the term WebPORTAL Server to identify a central server which does administrative functions. In one embodiment, such a service is performed using a central server that every device utilizes. In another embodiment, the network includes many servers that operate independently, but share certain data aspects. One aspect is the unique identifier which is assigned to each device. The algorithm which generates unique identifiers is centralized in this example embodiment. Such can be done through a central administration server, such as the WebPORTAL Server, or such can be done through a protocol which is followed by many servers that operate independently. Either way, the network operates in a decentralized fashion, but with certain centralized functions and standards. In one embodiment we have chosen to use the WebPORTAL Server for certain administration purposes. This embodiment is also easier to explain. The term WebPORTAL was chosen to depict a central access point. It is in no way a requirement for the network, merely to simplify the discussion.

Web RECORD: This refers to the records kept at the WebPORTAL Server (whether decentralized or not). We view this as central administration data, and, as stated, this central approach is used to allow for a main 'network-joining' protocol as well as 'unique ID generation', among other steps. In this description we will explicitly explain the network-joining protocol, i.e., the pairing to the WebPORTAL Server, and later on other servers, and the pairing between devices.

Local RECORD: This refers to the records kept at each device. Two features are Security and Backup. Security is provided by encrypting each Local RECORD with a local encryption key which is inaccessible outside the application and outside the device, protecting both such key and the record contents itself. The Local RECORDS on each device are also backed up to backup servers using a similar local encryption key, rendering the backup useless to any other device or server, other than the device from which it was backed up (which has the required decryption key).

The DLNN Ledger (one of its functions is to form pathways within the network) was described in the provisional text as a Distributed Ledger Node Network (DLNN), which can be realized in different fashions. One realization is through a blockchain-based ledger network which is decentralized. Other realizations could be distributed or central databases. Write operations into this DLNN Ledger are kept low, which reduces the cost of blockchain-based ledgers, as the write costs are significantly higher than the read costs in such networks. Read access to the DLNN Ledgers are key-restricted. There are several solutions for this: directly key-paired read access, group (by type) read-access, dynamic (key chain) read access, rotating key (keys change over set periods) read-access. Typically, several fields use several types of encryptions, and may exist multiple times to enable multiple access methods. As a ledger, access can also be restricted by the ledger access method, which might rely on an encrypted message or protocol, guaranteeing that only qualified Network servers (and devices) are given access to the DLNN.

We will explain how devices join the network, pair with the administration and other servers, and how such a DLNN ledger is used to form pathways within the network.

We will start with the assumption that the three databases, Web RECORD, Local RECORD, and DLNN Ledger already exist. Given their existence, we will discuss how data is written and read from these three databases.

In FIG. 14 we show the first step that a device enters in joining the ThunderPort network: A Join request for UUID, Dev A, Ledger A 1404. This signifies a request from the device to be given a unique ID, a name and nickname, and a ledger address. (We use the term UUID as UID and UDID are terms already used in the literature). Such a Join Request 1404 is sent over a client-server connection from Device A to WebPORTAL server P.

In the ThunderPort network, WebPORTAL server P is registered under DNS and uses TLS and https on internet communications, however it only responds to the incoming and outgoing ports on which it listens to the network.

The initial request to join the ThunderPort network and pair to the server uses TLS for encryption. Once a device (or server) has joined the ThunderPort network, all further communications will follow ThunderPort network encryption standards and this makes TLS redundant. As such, other than the WebPORTAL server, ThunderPort servers do not need to be registered under DNS and do not need to provide TLS services.

Even though communication 1405 is to the WebPORTAL server P, and takes place over TLS or https protected sessions, but we assume that such session protocols are not safe and that the data going through Internet Connection 1405 can be collected by a Data Logger 1407 and sent to an Observer 1408. We therefore assume that any unencrypted data (such as visible Metadata or IP trace route information) is unsafe, and we will explain how the network addresses this.

Given that the WebPORTAL server P receives a Join request from Device A, it executes a series of steps: Generation of the UUID, Dev-A nickname, Ledger-A 1406. The WebPORTAL server P also generates the request to Create 1409 an DLNN Ledger Entry for Device A 1417. In one embodiment, such Ledger-A address is computed on the server P, in another embodiment, such a Ledger-A address is computed on Device A itself, using the UUID, among other data. The simpler method is the former, where server P computes Ledger-A address, so that it can store this immediately in the Web RECORD 1403 for Device A and creates a corresponding entry for Device A also in the DLNN ledger. Step 1406 depicts that such data is both generated and stored in the Web RECORD.

In this embodiment we follow the diagram in FIG. 14 further, which shows that server P can then send a packet of information back to device A which contains the UUID, the nickname Web-P of server P and Dev-A for Device A 1412, the ledger address for device A 1411, and the ledger address for the server Ledger-P 1410. This is sent as a message 1413, which is unencrypted, and received on Device A 1414. That is, the message is not yet encrypted in the ThunderPort network, but the connection is made over TLS, which does encrypt communications 1405. A message format or identifier is used to identify each entry in the message, in a Decode 1415 step, and Device A is then able to Populate 1416 its Local RECORD with these four entries: Web-P, Dev-A, Ledger-P, and Ledger-A.

There are different embodiments that all achieve the same result, i.e., population of the circled fields in the Local RECORD and in the Web RECORD, and the creation of an entry for Device A at the Ledger-A address.

Figure 15:
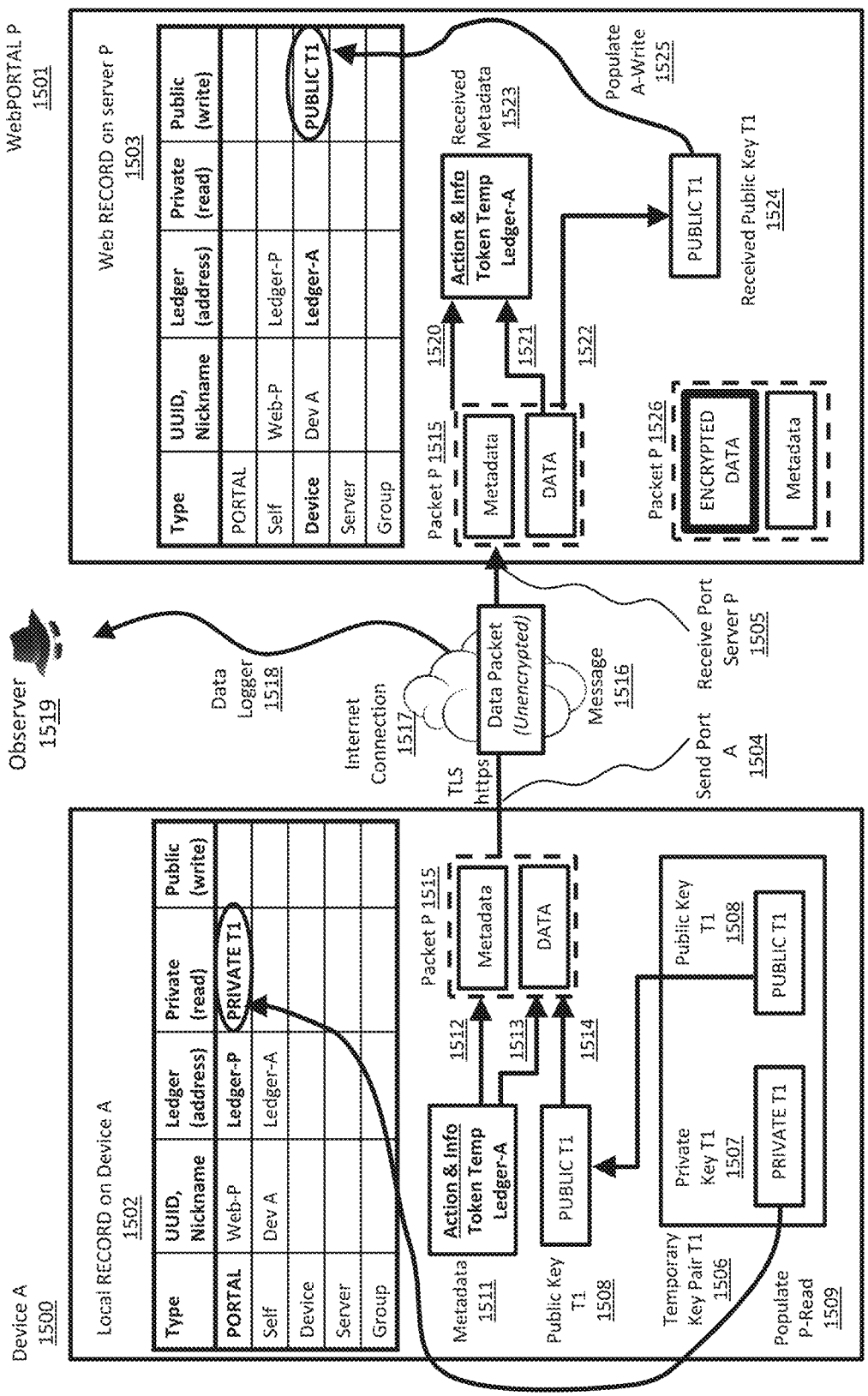
FIG. 15 is an example of the first temporary key exchange to the administration server when pairing to it.

FIG. 15 is an Example of the First Temporary Key Exchange to the Administration Server when Pairing to it.

FIG. 15 depicts the same arrangement as in FIG. 14, showing a Device A 1500, a WebPORTAL server P 1501, a Local RECORD 1502 on Device A and a Web RECORD 1503 on server P.

Also Send Port A 1504 and Receive Port Server P 1505 are shown.

Next, we will introduce a temporary key exchange between Device A and Server P. This method can be used in either direction (from A to P or from P to A). In the shown embodiment, the temporary key is generated on Device A. A Temporary Key Pair T1 1506 is generated. The Temporary Key Pair T1 comprises a Private Key T1 1507 and a Public Key T1 1508.

Using Populate P-Read 1509 connection, the Private Key T1 1508 is placed inside the Local RECORD 1502 in the Private (read) column for the row identified by Ledger-P, and also PORTAL. The Public Key T1 1508 is then put inside a message.

We also introduce Metadata 1511 which is used in a multi-purpose way.

Next, we introduce a message packet P 1515, which has two distinct fields: Metadata and DATA. In the given example in FIG. 14, the Public Key T1 1508 is placed in the DATA field, using connection 1514, and the Metadata 1511 is split between Metadata using connection 1512, and DATA, using connection 1513. The split is dependent on whether the Metadata fields are meant solely for the addressed recipient, in which case the DATA field is used, or whether it is meant for the network servers, in which case the Metadata field is used. A unique identifier, we use Ledger-A address here, is also present in the Metadata field. This identifier will be hidden from the internet, but not from the network servers and the addressed recipient as we will explain.

At this point, Packet P 1515 is formed and can be sent as Message 1516. In one embodiment, such message is unencrypted as no encryption method has been established at this point. In another embodiment a pre-defined encryption protocol can be selected, or a standard encryption method, such as Diffie Hellman or its current derivates (such as Elliptical Curve).

Again, TLS and https methods are also in use as the message is sent from Send Port A 1504 to Receive Port Server P 1505. We further assume that Internet Connection 1517 is unsafe and that Message 1516 going across can be seen by Data Logger 1518 and Observer 1519. Data Logger 1518 can e.g., be placed inside an internet server, used to route message 1516 between device A and WebPORTAL server P. Message 1516 remains unencrypted in the ThunderPort network but remains encrypted using TLS or https protocols. It's observable content, such as the IP headers and TLS-encrypted data, is deemed non-critical, in terms of ThunderPort network security. TLS decryption by Observer 1519, if possible, also would not yield usable damaging information.

Packet P 1526 is also shown. This is to highlight that in future message exchanges the DATA section is encrypted (ENCRYPTED DATA, shown with a bold outline) but that the Metadata section will not be encrypted, shown with a standard outline). Packet P 1526 depicts the standard packet, whereas Packet P 1515 in one embodiment has both DATA and Metadata sections as unencrypted sections.

Packet P 1515, upon receipt at WebPORTAL Server P, can be decomposed back into Received Metadata 1523, by combining the sections 1520 and 1521 (which reflect the earlier split per 21512 and 1513), and Received Public Key T1 1524, per connection 1522. From the Metadata information, WebPORTAL Server P then Populates using Populate A-Write 1525 in the Web RECORD 1503 the field Public (write) for Device A, using the given Ledger-A address in the Metadata as the row identifier.

Figure 16:
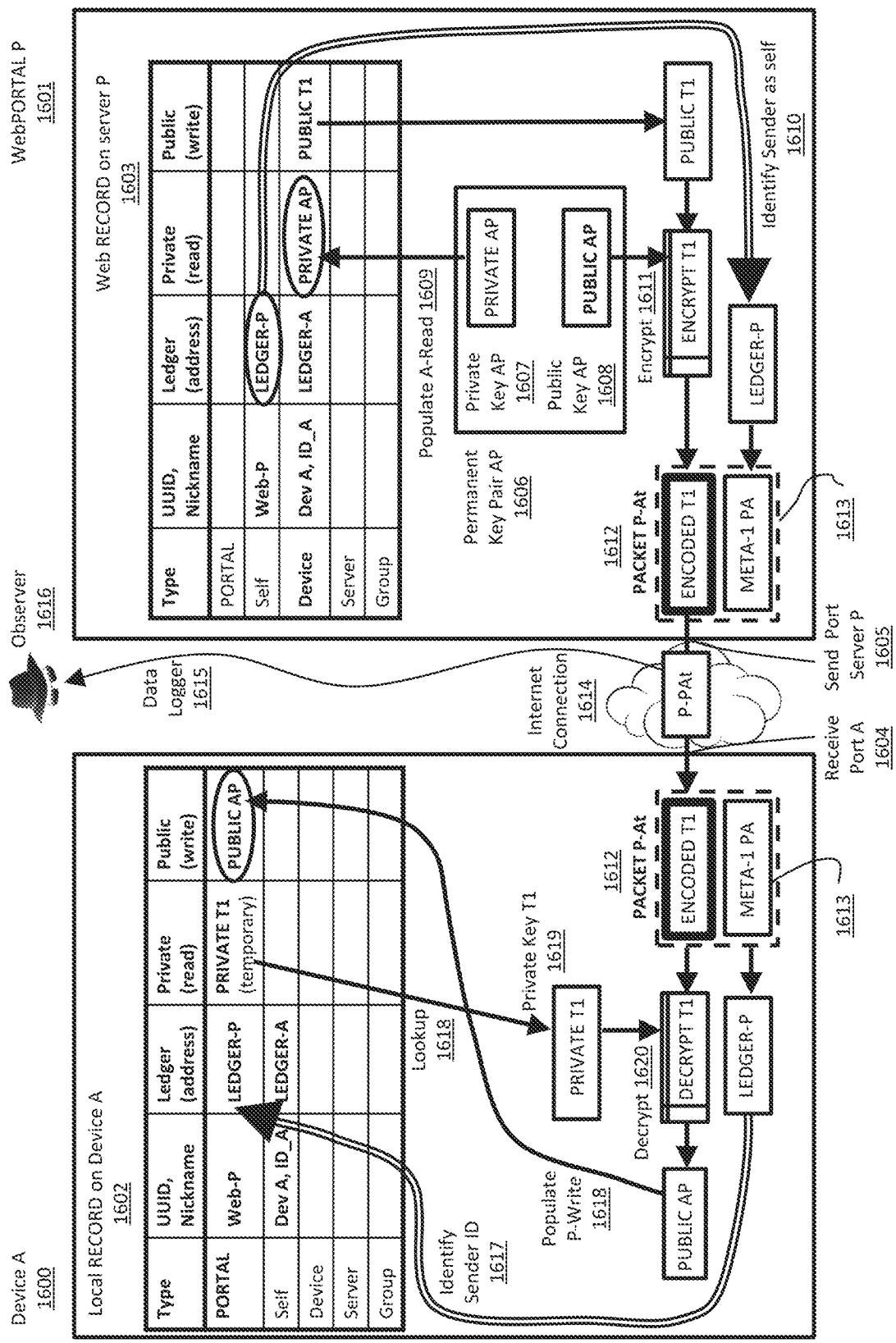
FIG. 16 is an example of a first permanent key exchange for sending secure messages from the device to the admin server.

FIG. 16 is an Example of a First Permanent Key Exchange for Sending Secure Messages from the Device to the Server.

FIG. 16 depicts the next steps in the network joining protocol: WebPORTAL Server P generates a Permanent Key Pair AP 1606, comprising Private Key AP 1607 and Public Key AP 1608. We name it permanent, to distinguish it from the Temporary Key Pair T1 1504, however, the permanent keys can be updated regularly if so desired. We refer to them as permanent to simplify the discussion.

We also use the naming AP to reflect that this key pair will be used for messaging from (device) A to (server) P. We will use this naming throughout. Also, we will explicitly highlight this further down, Permanent Key Pair AP 1606 does not need to be an asymmetric key pair, it can be replaced by a symmetric key pair, in which both the Private Key AP 1607 and Public Key 1608 are the same key. This is useful for higher level encryption and quantum-harden methods. One can also think of this as that the receiving side, WebPORTAL Server P, chooses its own Key Pair for connecting to, in this case device A. Thus, the AP key is generated by the receiving side, which is WebPORTAL Server P.

Of the Permanent Key Pair AP 1606, using Populate A-Read 1609, Private Key AP 1607 is stored in the Web RECORD 1603 at the Private (read) column at the row identified by Ledger-A address.

The Public Key AP 1608 is encrypted 1611 using the Public (write) key for Ledger-A, which is key Public T1, and placed in the, now ENCODED T1, DATA section of message packet P-At 1612. Also, the message identifier, being WebPORTAL Server P itself, i.e., Ledger-P address is placed in the META portion of Packet P-At 1612. This is highlighted by the Identify as Self 1610 connection.

The Metadata for Packet P-At 1612 is referred to as META PA 1613. This is because Packet P-At 1612 goes from Server P to Device A, as in P-to-A. The data content itself, i.e., Public Key AP 1608, is to be used for messaging from A-to-P, as we will see.

Packet P-At 1612 is then sent from Send Port P 1605 to Receive Port A 1604. Similar to the prior exchanges, Observer 1616, using Data Logger 1615 in the Internet Connection 1614 can obtain the Packet P-At 1612, but will not be able to read the Data content any longer as it has been encrypted using key Public T1, shown as ENCODED T1 and the Metadata META-1 PA is still protected by the TLS or https protocol.

Upon receipt of Packet P-At 1612 at Device A, Device A will have to decrypt the encrypted portion ENCODED T1. It does so by reading the Metadata META-PA 1613 section, which produces LEDGER-P as the message identified.

Device's A then Identifies Ledger-P as the Sender ID 1617 in its Local RECORD 1602 where it Looks up 1618 the stored Private Read key PRIVATE T1. It subsequently applies Private Key T1 1619 to Decrypt 1620 the ENCODED T1 section which produces Public Key AP (there is also metadata with instructions associated here, we will ignore this for purposes of illustration). Public Key AP is then stored using Populate P-Write 1618 in the Public (write) field for the Portal row, identified by Ledger-P.

Figure 17:
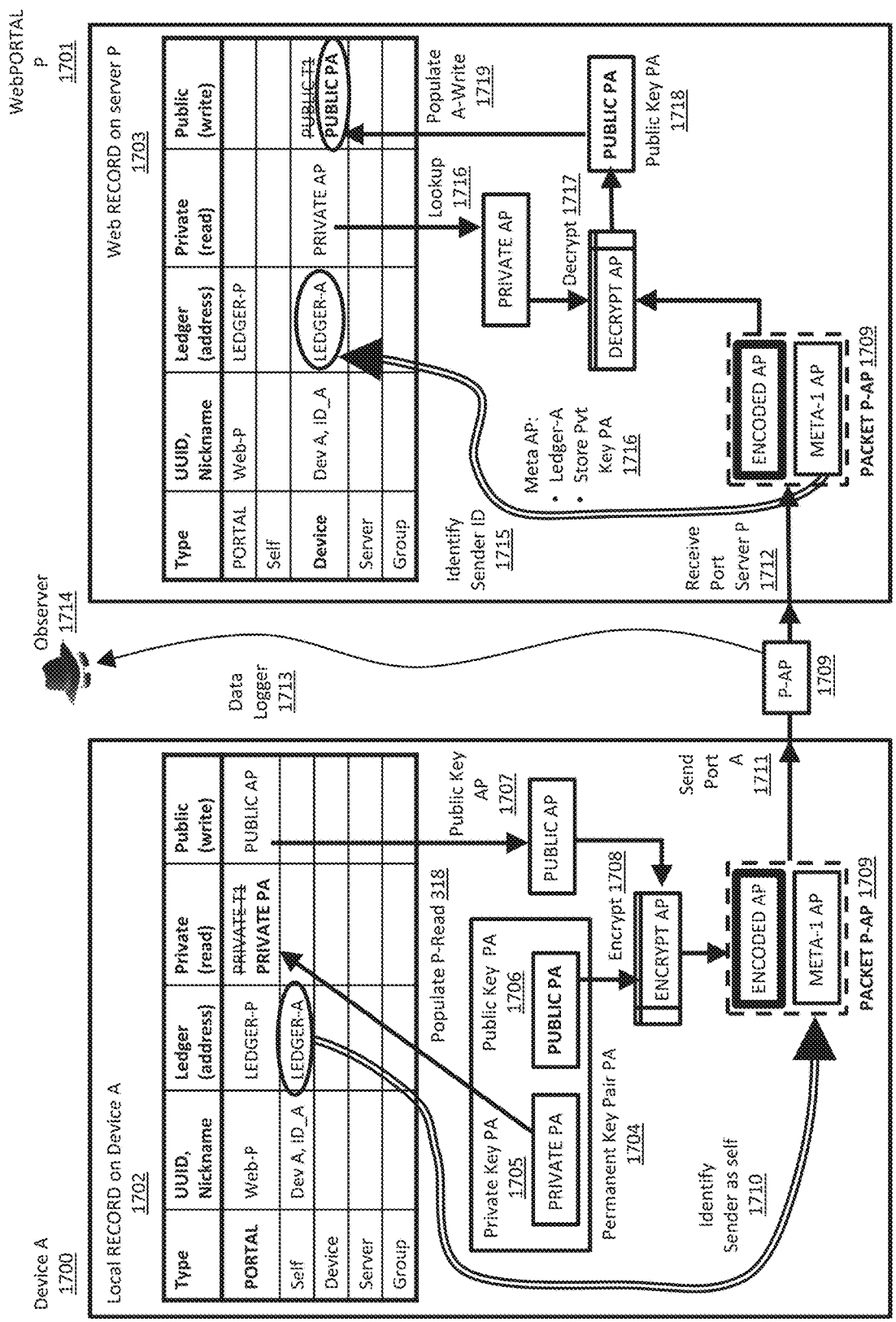
FIG. 17 is an example of a first permanent key exchange for sending secure message from the server to the device.

FIG. 17 is an Example of a First Permanent Key Exchange for Sending Secure Message from the Server to the Device.

Next, we identify in FIG. 17 Device A 1700, Web Portal P 1701, Local RECORD on Device A 1702 and Web RECORD on Server P 1703.

Device A generates the key pair for the reciprocal path PA, which reflects messages that flow from (Device) A to (Server) P, or A-to-P. Again, the receiving side generates the key pair for the message encryption between the two sides.

Device A starts with generating a Permanent Key Pair PA 1704, and stores the Private Key PA 1705 in the Local Record 1702 at the row identified by Ledger-P and PORTAL at the Private (read) column using the Populate P-Read 1618 connection. It overwrites key PRIVATE T1 at this point.

The Public Key PA 1706 is Encrypted 1708 using the Public (write) column for the row identified by Ledger-P and PORTAL, which is Public Key AP 1707, and stored in the ENCODED AP Data section of Packet P-AP 1709. Thus, the encryption key AP, from A to P, is used to securely send over the new encryption key PA, from P to A.

In the Metadata Field of Packet P-AP 1709, META AP, LEDGER-A is placed as Sender using the Self-Identifier 1710 connection.

Packet P-AP 1709 is then sent across the internet from Send Port A 1711 to Receive Port Server P 1712. An Observer 1714 using Data Logger 1713 is assumed to be able to read the META-1 AP portion of the packet, but not the ENCODED AP encrypted portion of the packet, should Observer 1714 be able to defeat the TLS encryption.

At the WebPORTAL Server P, Packet P-AP 1709 is received and the Sender information from the META AP is used to identify LEDGER-A (i.e., Device A) as the Sender. Server P then uses the Identify Sender ID 1715 to lookup 1716 the Private (read) key PRIVATE AP, which is subsequently used to Decrypt 1717 the ENCODED AP section of Packet P-AP successfully and which produces Public Key PA 1718 as well as relevant other Metadata Meta AP 1716. This Metadata then instructs Server P to place Public Key PA in Web Record 1703 at the Public (write) column for Row LEDGER-A using Populate A-Write 1719 connection, replacing key PUBLIC T1 with key PUBLIC PA.

Figure 18:
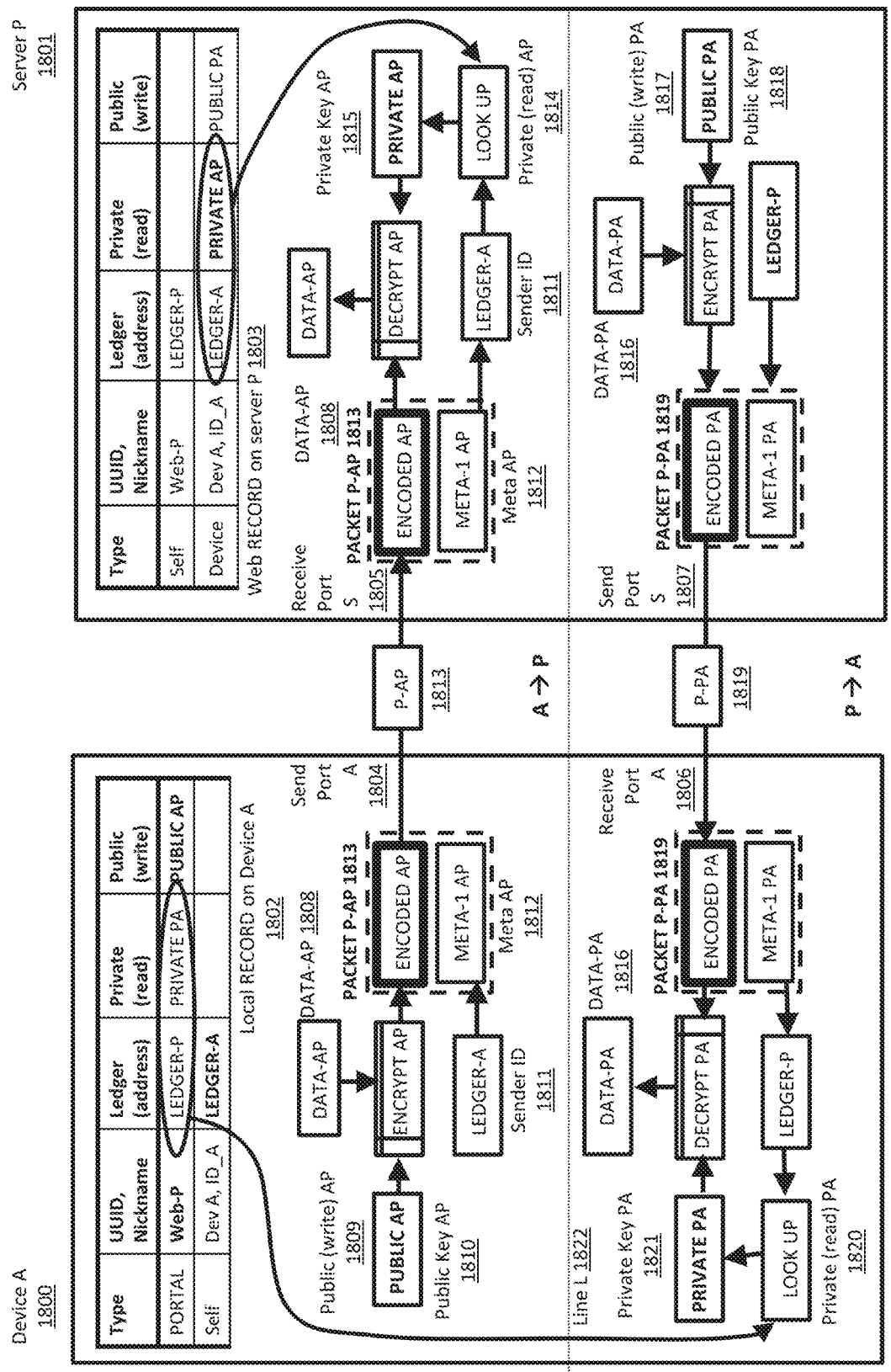
FIG. 18 depicts an overview of how messages are constructed between a device and the server.

FIG. 18 Depicts an Overview of how Messages are Constructed Between a Device and the Server.

As Device A 1800 has now joined the network, it has a permanent connection to WebPORTAL Server P 1801. We show in FIG. 18 how Local RECORD 1802 and Web RECORD 1803 are now populated with the names and nicknames, LEDGER-P and LEDGER-A addresses, and the two key pairs: PRIVATE PA and PUBLIC PA, and PRIVATE AP and PUBLIC AP.

We also show Line L 1822. Above Line L we depict communications from A to P (AP in short) and below the line we depict communications from P to A (PA in short).

For Device A to format a proper message, the following steps can be identified: DATA-AP 1808 is encrypted using the Public (write) AP 1809 field at the PORTAL, LEDGER-P address. This produces Public Key AP 1810. This key is then used to encrypt DATA AP and produce the ENCODE AP section of Packet P-AP 1813. The sender, Device A, identifies itself by LEDGER-A 1811, and this is placed in the Meta AP 1812 section of Packet P-AP.

Packet P-AP is sent from Send Port A 1804 to Receive Port S 1805 on Server P which reads the META-AP section and retrieves Meta AP 1812. In there, it identifies the Sender ID 1811 as LEDGER-A after which it looks up the Private (read) AP 1814 field which produces key Private Key AP 1815 which is the correct key for successfully decrypting the ENCODED AP section of Packet P-AP 1813 to retrieve the original data content DATA-AP 1808.

In short, we have established a connection from A-to-P using PUBLIC AP to write a message and PRIVATE PA to read a message, which is a standard way for asymmetric key encryption for message exchanges.

The return path, from P to A, or PA is reciprocal. FIG. 18 depicts DATA-PA 1816 which is then encrypted using the Public (write) PA 1817 found by looking up Device A at LEDGER-A in Web RECORD 1803. This produces key PUBLIC PA 1818 which is used to encrypt and Packet P-PA 1819 is formed and sent to Device A.

Device A identifies LEDGER-P as the sender ID and then uses the Private (read) PA 1820 look up to retrieve Private Key PA 1821 for decrypting which is used to produce DATA-PA 1816 at Device A.

Figure 19:
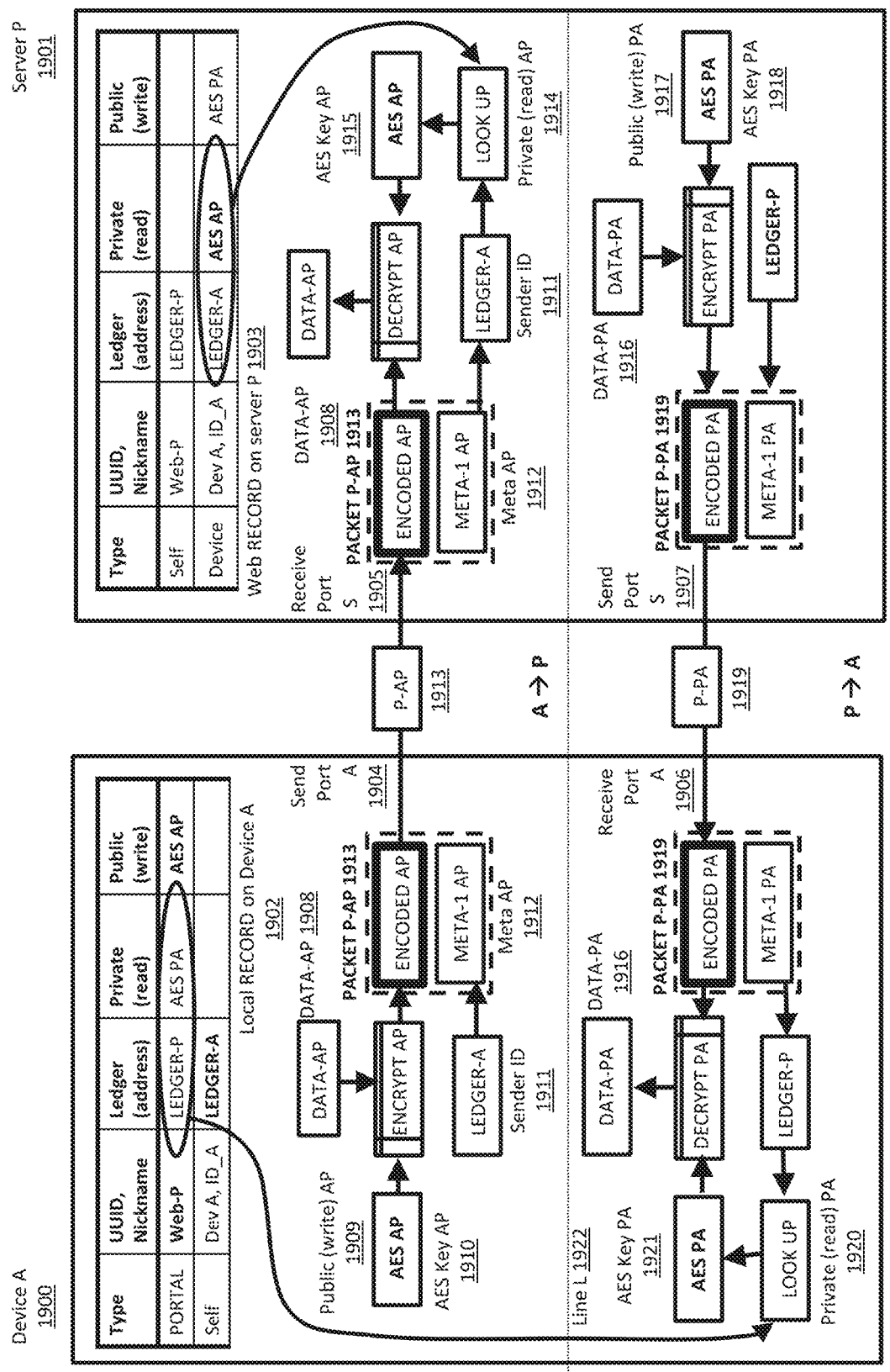
FIG. 19 shows the example of FIG. 18 using symmetric keys, rather than asymmetric keys.

To someone skilled in the art, using a dual private/public key structure may seem overkill, as the reverse encryption (write with private key, read with public key) also works, and can be applied as the keys are exchanged in a private and secure manner, so they are kept private. However, having a dual key structure comes with very little cost, and enables additional benefits, such as the key structure selection is controlled by the receiving device, it is an additional layer of authentication for the devices, conversations cannot be followed unless both keys are available, and, when using symmetric keys (in FIG. 19), there is a unique key used for each direction of communication. In some embodiments one may wish to forego the dual structure, whereas in other embodiments, one can extract the extra benefits of doing so. FIG. 19 Shows the Example of FIG. 18 Using Symmetric Keys, Rather than Asymmetric Keys.

In FIG. 19 the key pair PUBLIC AP and PRIVATE AP has been replaced by single key AES AP, and the key pair PUBLIC PA and PRIVATE PA has been replaced by single key AES PA. In other words, the asymmetric encryption method is replaced by a symmetric encryption method.

One can follow the same protocol as in FIG. 18 and verify that the method and results are the same, except for the actual keys that are used for encryption and decryption, which is now done using the same key in both Device A and in Server P.

For a Server, this is typically less desirable, as a Server breach would unlock many messages, whereas the public/private key pairing prevents this (the server having write only keys to devices).

But for device-to-device messaging this may sometimes be preferred. In device-to-device messaging, key pairs are stored in both devices, e.g., Device A and Device B. The risk of using the same key for both write and read is already handled in the protection scheme for the private keys on each device. Thus, symmetric key pairing has the same level of key protection as the asymmetric key pairing. But symmetric key encoding can be done faster, and can be used for higher strength. As an example, symmetric encryption using, e.g., AES-256, can yield a higher level of protection than asymmetric encryption, such as, e.g., RSA, ECDH-RSA, ECDH. For quantum-harden protocols, symmetric keys will be preferred in the future.

FIG. 19 is depicting Client to Server (Device A to/from Server P) connections. We will show later below that a similar pairing can be done between Clients, whether or not direct connections exists between the Clients.

For one embodiment the public private key structure is chosen. We will use this for the remainder of this description. In another embodiment, a symmetric key exchange, except for the T1 exchange, can be chosen. In a third embodiment, key chain techniques can be used, where the keys to be applied follow either a static or a dynamic rotation or lookup pattern.

Session and Messaging Keys may also be used. Session keys are between Devices and Servers, whereas Messaging Keys are between devices. This distinction helps in explaining that messages that are exchanged between devices cannot be decrypted by any server in the network, as servers only hold Session Keys, whereas the messages are encrypted with Message Keys. We will utilize this in this description.

Note that the selected key, key method, key strength, key type (symmetric/asymmetric) is chosen by each device and server as they pair up. The Key Generation does not specify that a public/private key pair must be generated, but that a key must exist for Private (read) and Public (write) entries in the RECORDS on each device and server. There are no restrictions to such keys, and the decision can be made at each device when it generates its receiving key. The send keys are thus controlled by each receiving device.

Once an exchange has been established, the key, key method, etc., can be modified by the receiving device or server at any time, without breaking the protocol for new messages. Older received messages would have to be decrypted and then re-encrypted if they are to be kept in an encrypted fashion upon such change.

Figure 20:
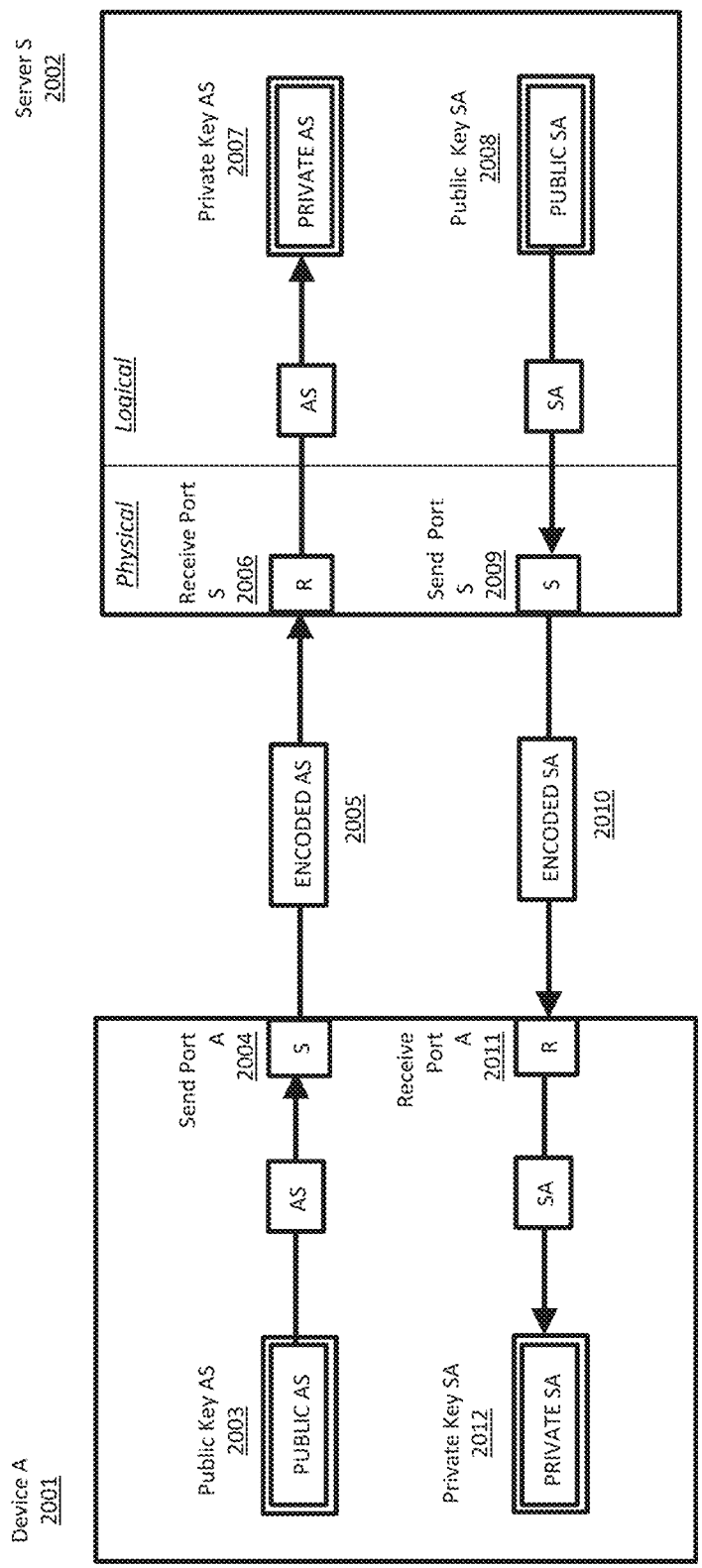
FIG. 20 depicts how devices are paired to the server, in a logical manner.

FIG. 20 Depicts how Devices are Paired to the Server, in a Logical Manner.

As we have described how devices join the network, we have also implied how incoming messages are properly decoded. However, we have to demonstrate that devices can pair with each other, using servers, and that the system will work across any number of servers in between.

In this context, we ignore internet servers. These are implied in the internet connections. With servers here we mean trusted network servers that are operated by the ThunderPort Network administrators or grantors thereof. These are all dedicated servers to the network, and they do not perform internet service, but they are part of the message handling within the Network.

FIG. 20 depicts the same information as FIG. 18, but in a simplified manner. In a message from Device A 2001 to Server S 2002, we would use Public Key AS 2003 to encrypt a message AS that is sent out over Send Port A 2004 as an Encoded AS 2005 message.

At Server S 2002, this message is received at Receive Port S 2006, which then is decoded into message AS using Private Key AS 2007.

In this figure, we use the box AS and SA as the logical depiction of a connection from A-to-S and from S-to-A. We distinguish this from the physical connection which is shared between all connections.

So, logical connection AS shows an encryption (2003) step using PUBLIC AS ending with a decryption (2007) step using PRIVATE AS. AS, as used here, means the 'logical port' for this protocol, as explained prior.

This pattern is reciprocal in each direction.

We will use this depiction method to describe pairing between devices.

Figure 21:
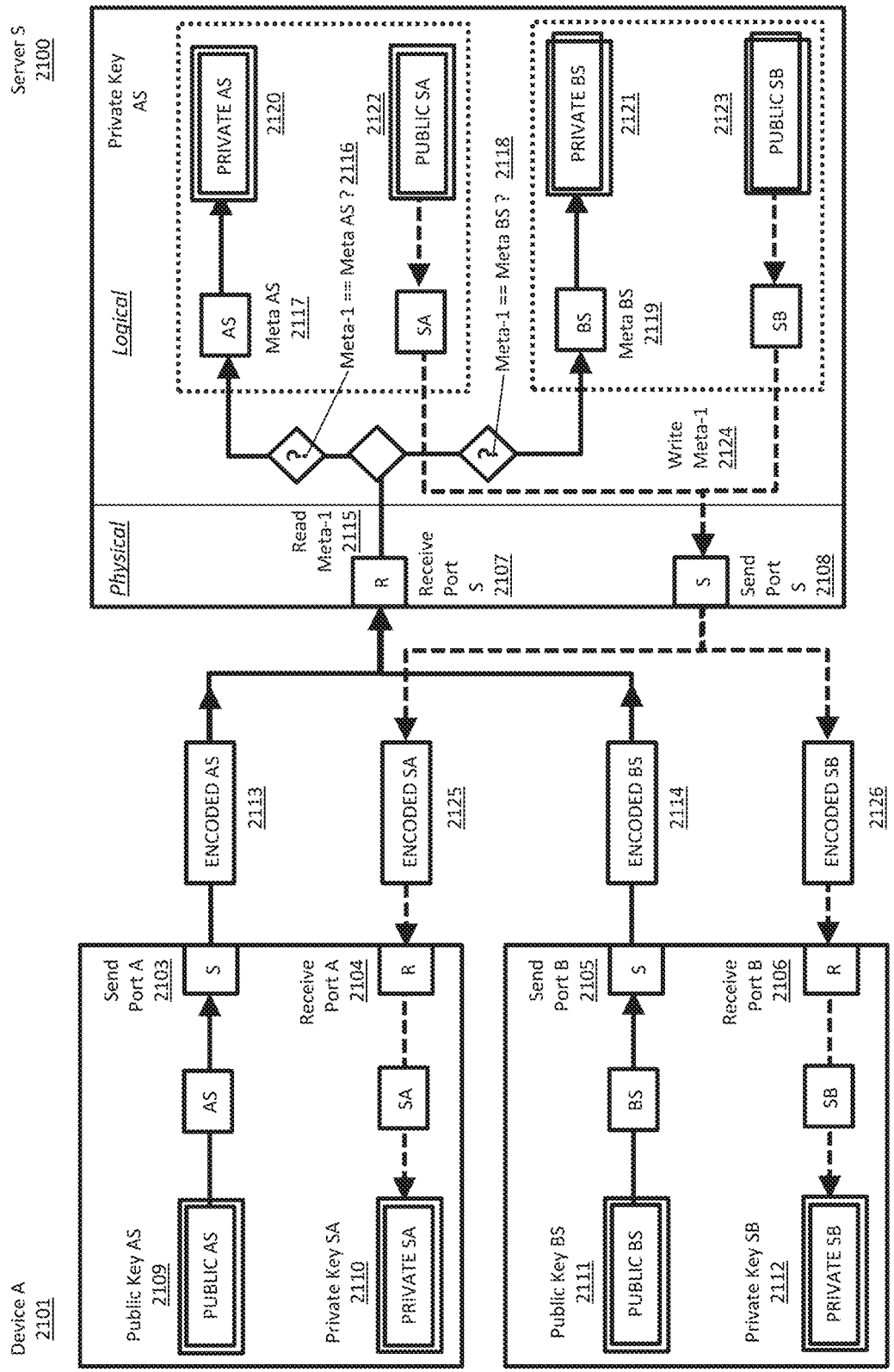
FIG. 21 is an example of a second device also paired to the same server, and depicts how the server can discriminate between messages from device A and device B.

FIG. 21 is an Example of a Second Device Also Paired to the Same Server, and Depicts how the Server can Discriminate Between Messages from Device a and Device B.

In a first embodiment, Server S 2101 is a WebPORTAL Server S as that is the only server to which devices, such as Device A 2100 and Device B 2102 are initially paired.

In such a case, both Devices A and B are paired to Server S and we will demonstrate that that suffices to then enable a pairing between Devices A and B themselves.

Servers can be added to the network in a similar fashion as adding devices, and they can pair between themselves and between any device using the same method.

For this description, we use Server S, and not Server P.

We show the physical ports on device A: Send Port A 2103 and Receive Port A 2104; on device B: Send Port B 2105 and Receive Port B 2106; and on Server S: Send Port S 2108 and Receive Port S 2107.

We already explained how an incoming message is decoded from its Metadata to identify the sender which is depicted in Read Meta 2115 step. If the Metadata identifies AS, Meta==METAAS ? 2116, (also Sender==LEDGER-A), then META AS 2117 path is chosen, and thus the logical connection is AS, and decryption key Private Key AS 2120 is successfully applied.

Similarly, if Read Meta 2115 identifies Meta==Meta BS ? 2118, then Meta BS 2119 is chosen, and thus the logical connection is BS, and decryption key Private Key BS 2121 is successfully applied.

We already mentioned that fast key lookup can be established by using a hash table to store the keys, the hash using the Metadata info.

Figure 22:
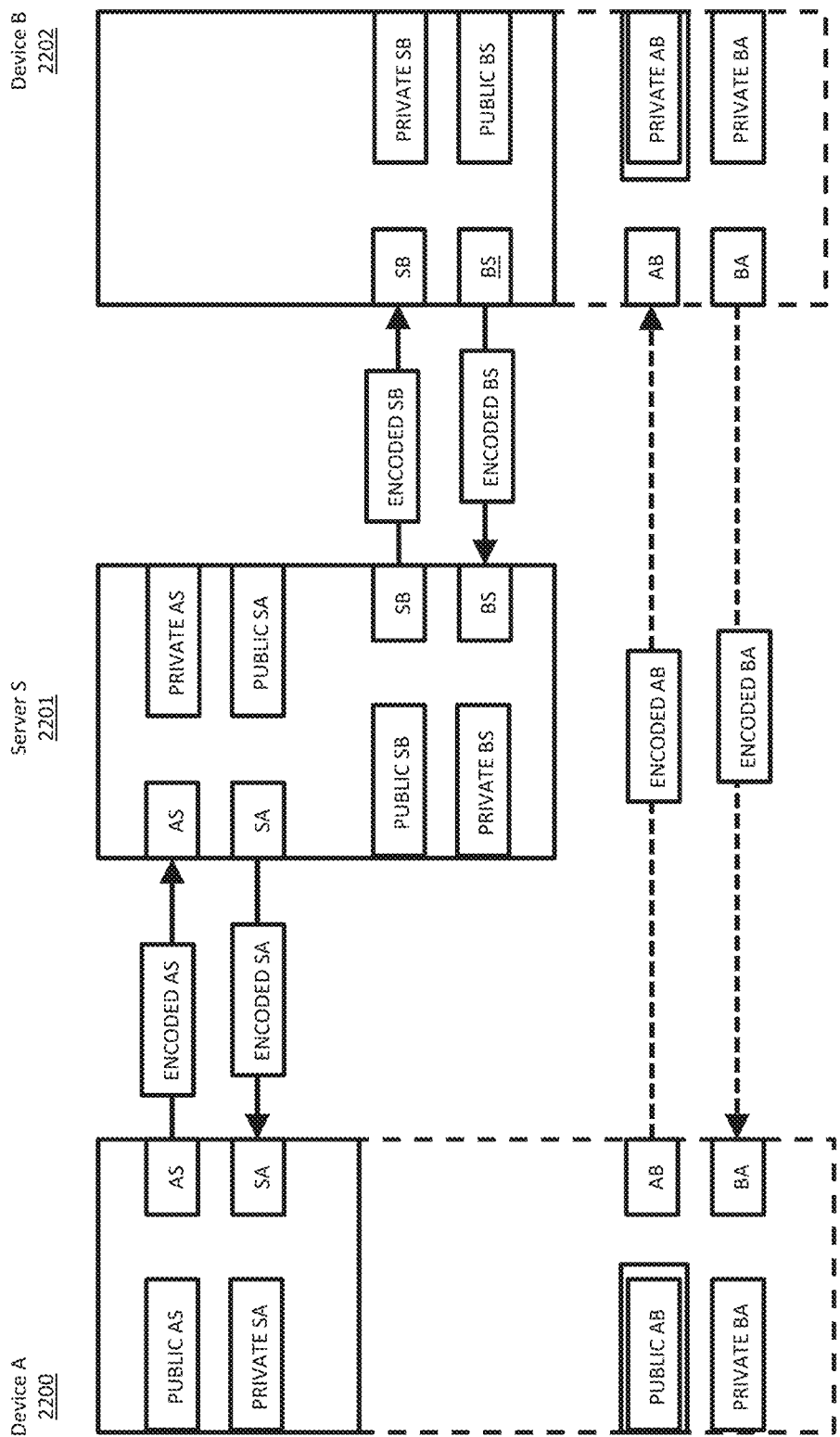
FIG. 22 shows FIG. 21 in the logical annotation, including a path between devices A and B.

FIG. 22 Shows FIG. 21 in the Logical Annotation, Including a Path Between Devices A and B.

We can simplify FIG. 21 by removing the Send and Receive Ports, and depict the connections as logical connections, which are virtual, and depend on proper encoding and decoding as described.

FIG. 22 redraws FIG. 21 and simplifies the diagram. Shown are three devices: Device A 2200, Device B 2202, and Server S 2201. Connection AS goes from Device A to Server S (AS) and uses Public AS key to encrypt and Private AS key to decrypt. Connection SA goes from Server S to Device A (SA) and uses Public SA key to encrypt and Private SA key to decrypt.

This can be extended to describe the connection between Device B and Server S as SB and BS as shown.

Additionally, we show a logical pathway between A and B as AB and BA.

As A and B are client devices, the physical pathway between them requires at least one server to be utilized in the pathway, until A and/or B can also respond as a server. (The latter is not needed in the ThunderPort network, it remains a future option).

Figure 23:
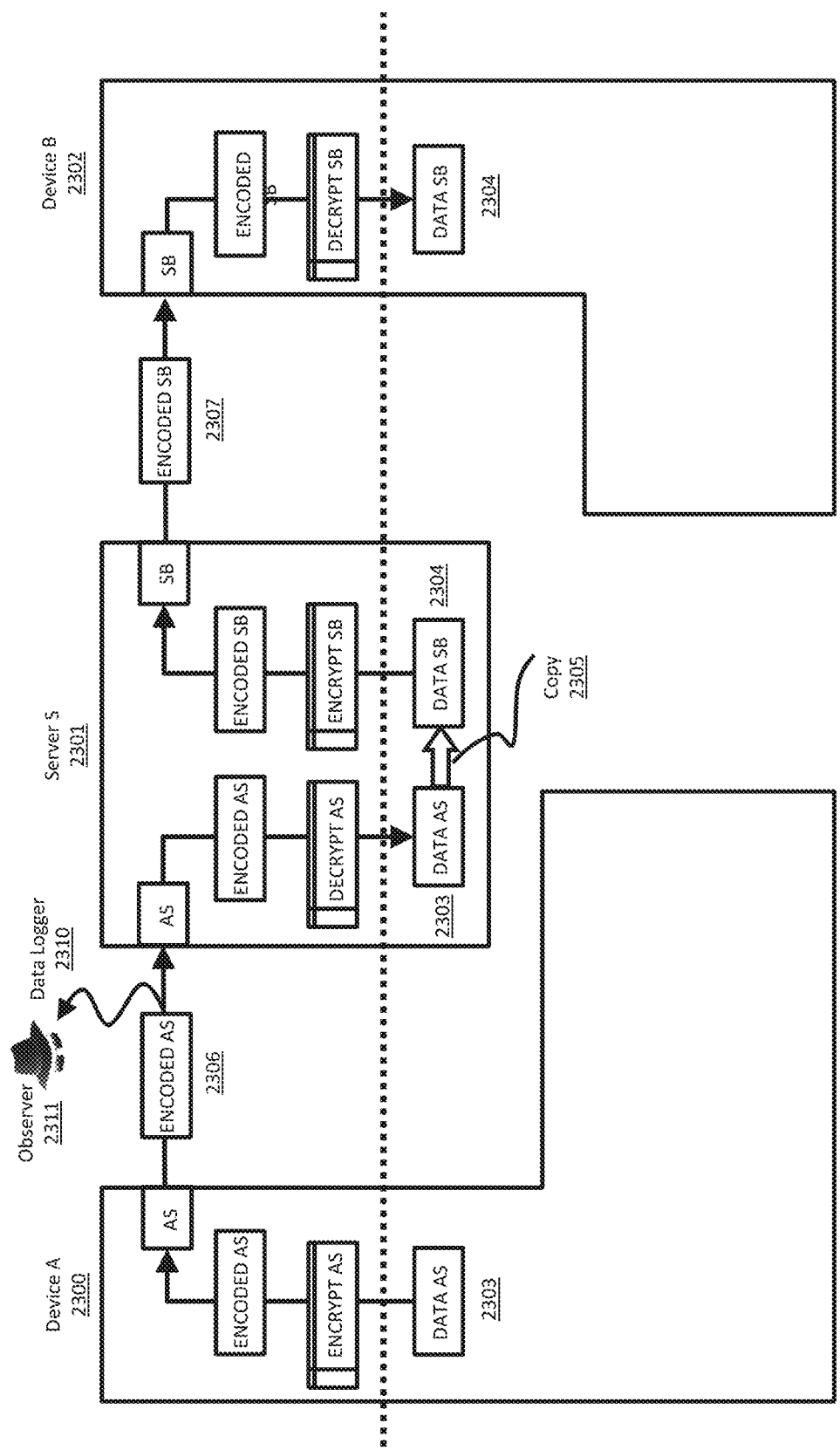
FIG. 23 is an example of how the server can receive a message from Device A and forward it to Device B.

FIG. 23 is an Example of how the Server can Receive a Message from Device A and Forward it to Device B.

In FIG. 23 we show how Data AS 2303 can be send from Device A 2300, over logical connection (channel) AS as Encoded AS 2306 message to Server S 2301. A Data Logger 2310 and Observer 2311 cannot observe the Encoded portion, so DATA AS is protected.

Similarly, Server S can send DATA SB 2304 from Server 2301 over channel SB to Device B 2302 which receives Data SB upon decryption. Again, DATA SB is also protected.

Packet Encoded AS 2306 and Encoded SB 2307 are protected from Observer 2311, but its content DATA AS 2303 itself is visible to Server S.

DATA AS 2303 is decrypted in Server S 2301 and then Copied 2305 into DATA SB 2304 and sent to device B as newly encrypted and formed packet.

The two packets 2306 and 2307 are isolated from each other and an IP trace route will not connect them.

Figure 24:
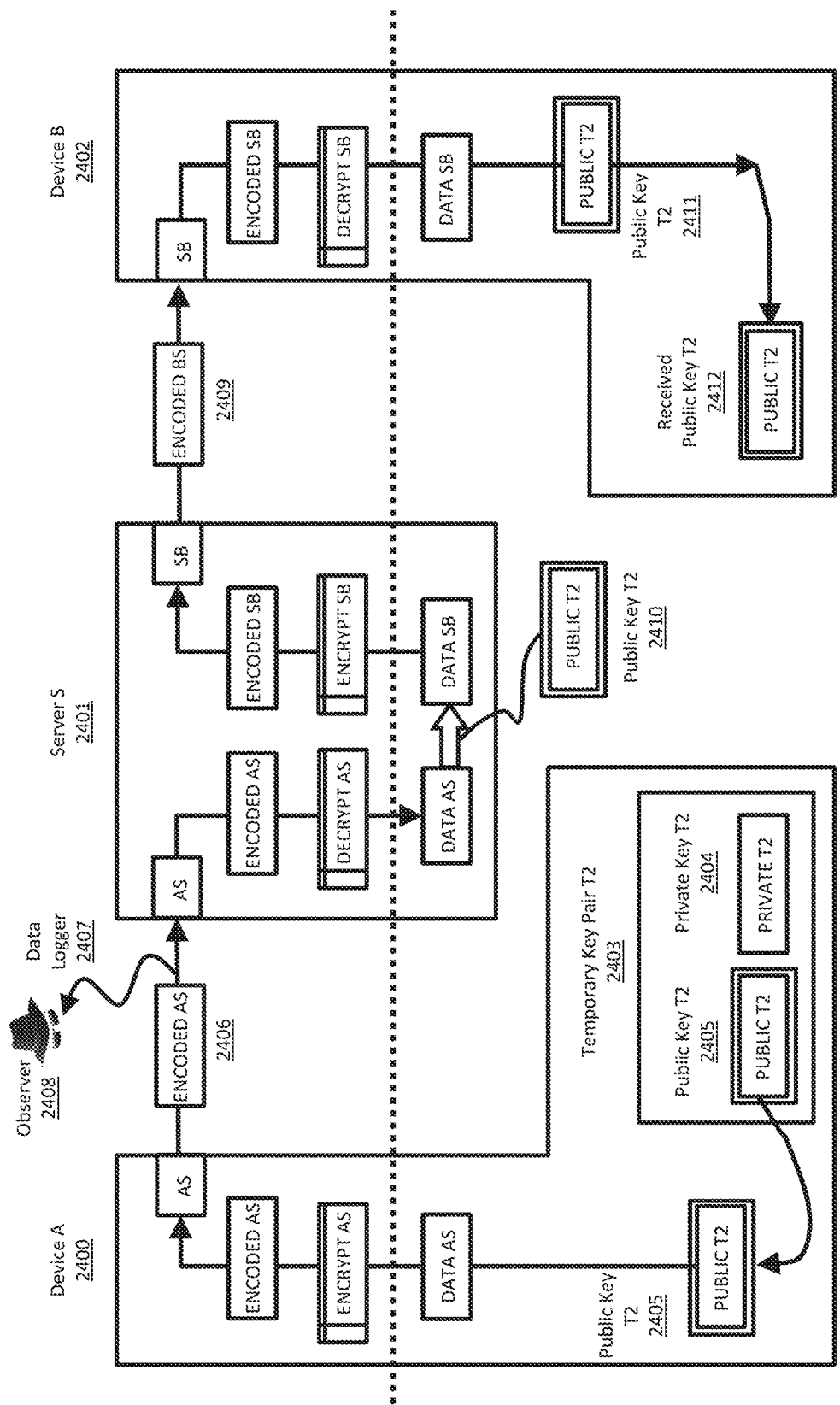
FIG. 24 is an example of how the method from FIG. 22 can be used to send a temporary key from one device to another, when pairing.

FIG. 24 is an Example of how the Method from FIG. 23 can be Used to Send a Temporary Key from One Device to Another, when Pairing.

In FIG. 24 we take FIG. 23 and add on the Temporary Key exchange that we first introduced in FIG. 15. We use the same sequences and record keeping, but now between Device A and Device B to populate the appropriate fields in the Local RECORDS on both devices. In this Step, Device A adds the Private T2 key to the Private (read) record for LEDGER-B in its local RECORD, and Device B adds the Public T2 key to the Public (write) record for LEDGER-A in its Local RECORD. (This record keeping is analogous to FIG. 15, but is omitted in FIG. 24).

Figure 25:
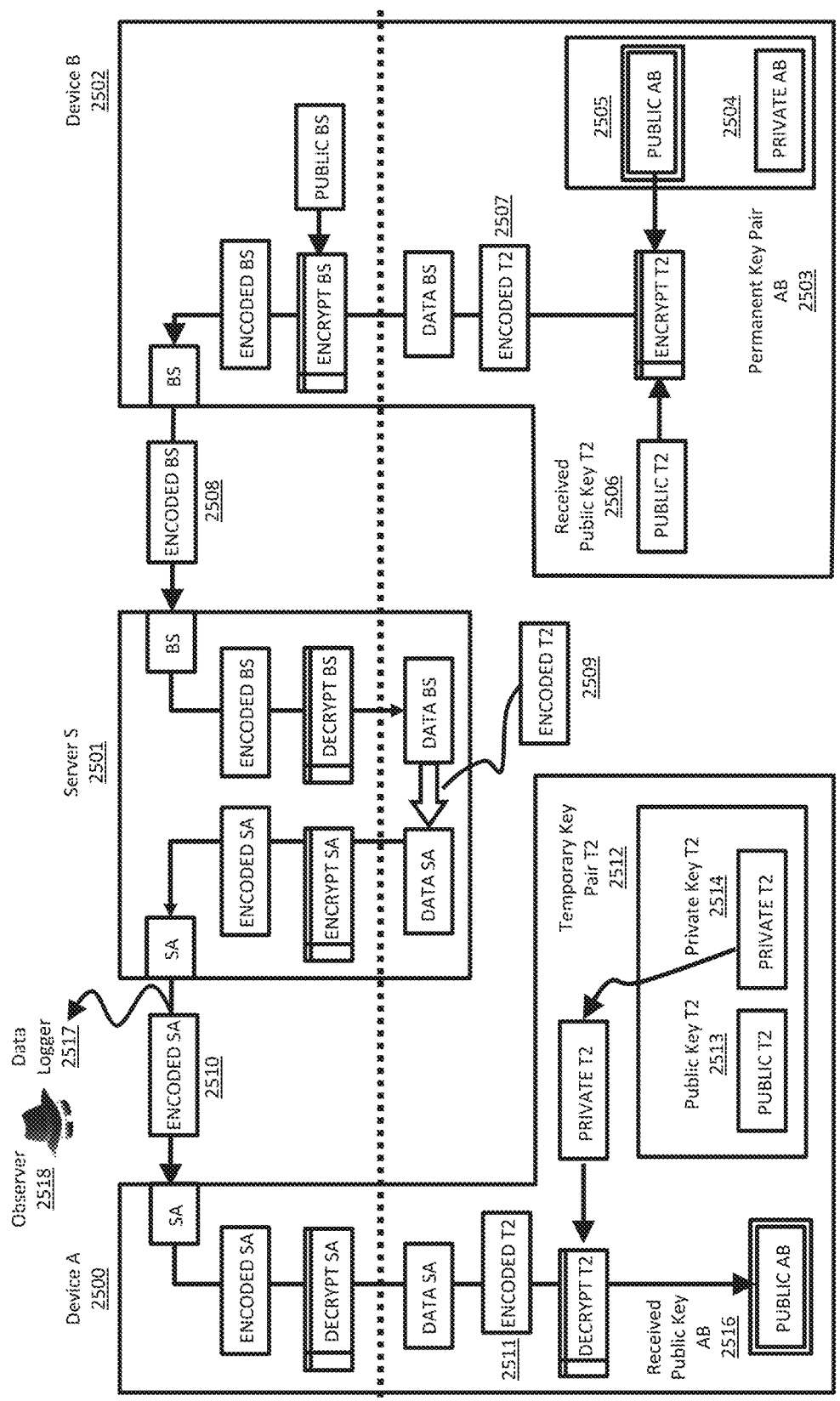
FIG. 25 is an example of how device pairing and device-to-server pairing can be viewed as analogous, using the ability to transport secret messages through the server.

FIG. 25 is an Example of how Device Pairing and Device-to-Server Pairing can be Viewed as Analogous, Using the Ability to Transport Secret Messages Through the Server.

Next, Device B generates the permanent Key Pair AB and stores the Private AB key in its Local RECORD for LEDGER-A at the Private (read) column. Device A, upon receipt, stores the Public AB key in its Local RECORD for LEDGER-B at the Public (write) column.

Again, the Local RECORD is not shown in this figure, but is analogous to FIG. 16.

Also, the last steps, completing the reciprocal key exchange, is analogous to FIG. 17, and FIG. 18 is omitted, as it should be clear now how this process completes.

Figure 26:
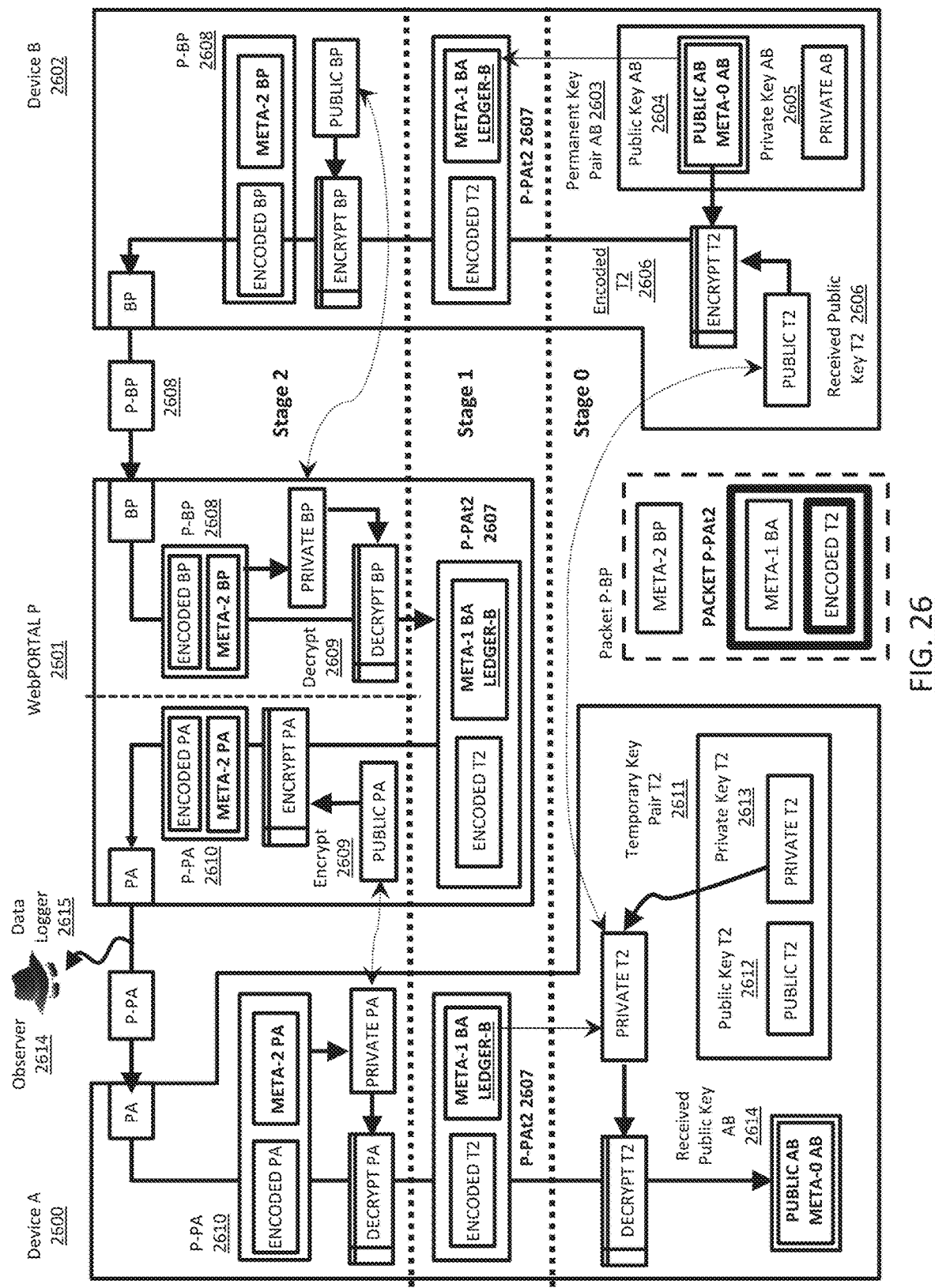
FIG. 26 shows FIG. 24 with details added that shows the metadata layer versus the data layer in the transport.

FIG. 26 Shows FIG. 25 with Details Added that Shows the Metadata Layer Versus the Data Layer in the Transport.

In FIG. 26 shows the same exchange as FIG. 25, but using Server P, instead of Server S, and the logical connections are now formed to AP, PA, and PB, and BP. Also, for clarity, the messages ENCODED BS and ENCODED SA are now shown with Metadata, so P-BP 2608 is identical to Encoded BS 2508 and P-PA 2610 is identical to Encoded SA 2510, except for Server being P rather than S.

This is added to clarify that messages always form a packet, and that packets can be nested, where applicable. The nesting is self-solving, as will explained further down.

Figure 27:
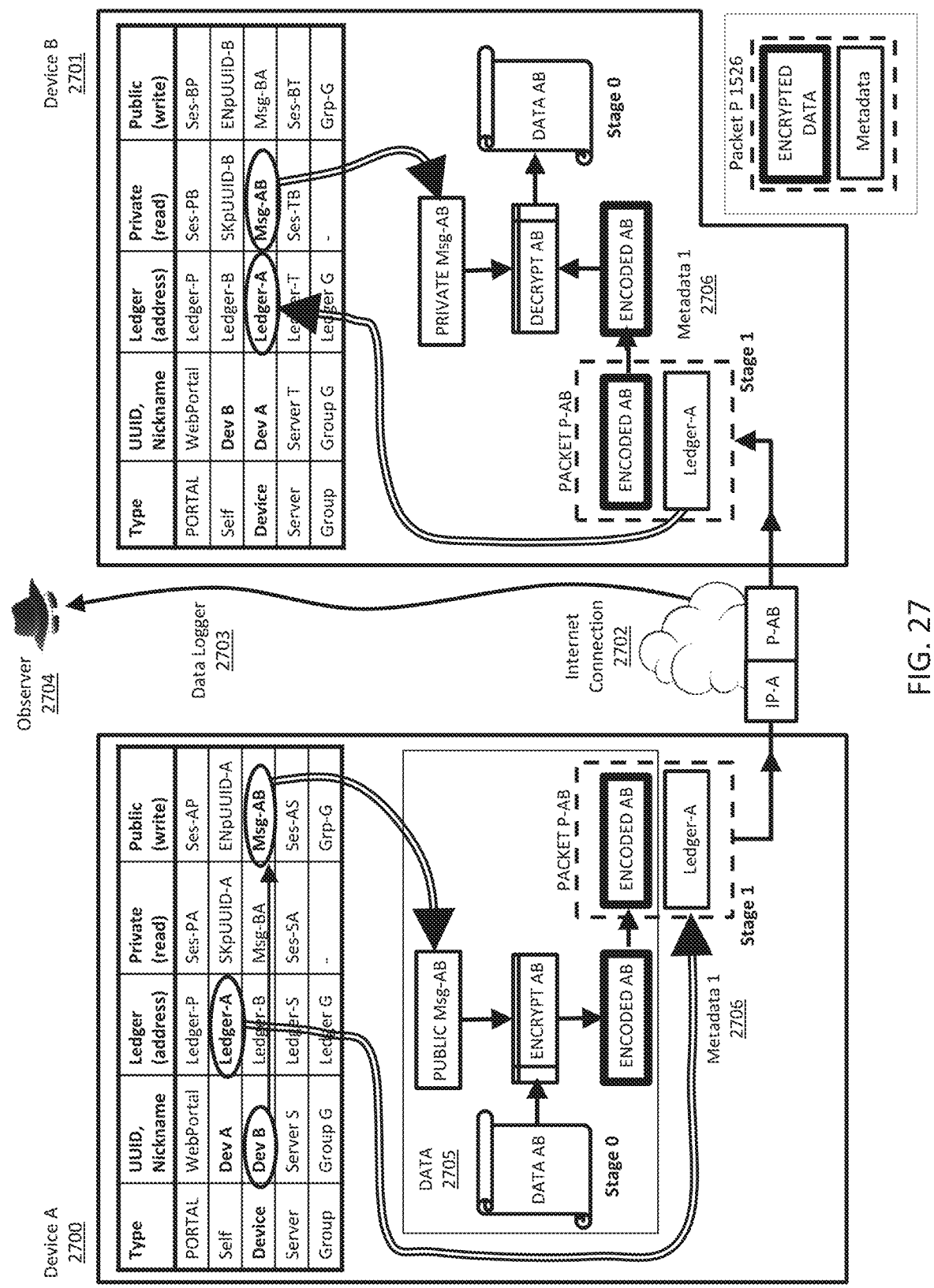
FIG. 27 is an example of a direct message exchange between device A and B.

FIG. 27 is an Example of a Direct Message Exchange Between Device A and B.

Given that devices are paired, we will first address how a message is sent through the network from a first Device A 2700 to a second Device B 2701. Later on, we will address how such a message is actually addressed and how the ThunderPort network knows how to find a route between the two devices.

In FIG. 27 we first consider the message creation. For a message from Device A to Device B, a Packet P-AB is created using LEDGER-A as the Sender ID. AS Device B is the intended recipient, Public (write) Msg-AB key is used for encryption of the data in Packet P-AB, shown as ENCODED AB, and the Sender ID is put in the external Metadata for Packet P-AB. (We ignore the internal Metadata part for now).

Comparing to Packet P 1526 (of FIG. 15), which we identified earlier as a standard messaging packet, we can see how DATA 2705 occupies the ENCRYPTED DATA section as ENCODED AB (both depicted in bold outline) and Metadata 2706 occupies the Metadata section.

Packet P-AB is then sent over Internet Connection 2702 to Device B 2701. We are aware that an Observer 2704 using Data Logger 2703 can observer the Packet P-AB and its IP information IP-A. The IP information is always visible, but it may be desired to hide sometimes, and the same may apply to the external Metadata 2706. We will show how we can do such in the next figure.

In FIG. 27 we can see how Device B receives packet P-AB and can look up the Sender ID LEDGER-A to find Private (read) Key Msg-AB which is then used to decrypt the ENCODED AB section of Packet P-AB.

It is important to point out that the Message Keys Public Write Msg-AB and Private Read Msg-AB are not exposed to the internet, nor to the servers in the Network. The term 'Public' is not applicable in the sense that this is a true public key—the key is hidden from all but Devices A and B (hence the ability to also make this a same, symmetric key).

Observer 2704 who receives a copy of packet P-AB would first have to bypass the TLS/https encryption layers, and, assuming such can be done successfully, would then end up with Packet P-AB, alike Packet P1526 shown in the insert, with external Metadata and ENCRYPTED DATA. The external Metadata lists LEDGER-A as the Send ID (from where) and LEDGER-B as the Receive ID (to where).

Even though this information gives Observer 2704 zero information as to which key or encryption method was used, Observer 2704 can record that a message was sent from Device A to Device B. This may be undesirable, and we will obfuscate this by using ThunderPort network servers in between device A and device B to forward the message.

In addition, the path between Device A and Device B may not exist as a direct IP route. This is very likely if Devices A and B are both client-side devices, as client-to-client connections are not provided. In some cases, we may want all devices to support server-side connections, to enable such pathways, but in a client-to-client pathway, a server will be chosen.

We assume, before we address network routing, that Device A connects to a Server S, and that Device B connects to a Server T, and that Server S and Server T are connected to each other. Connected here means that they are paired to one another with session keys. We will discuss the steps that take place in this message exchange next.

Figure 28:
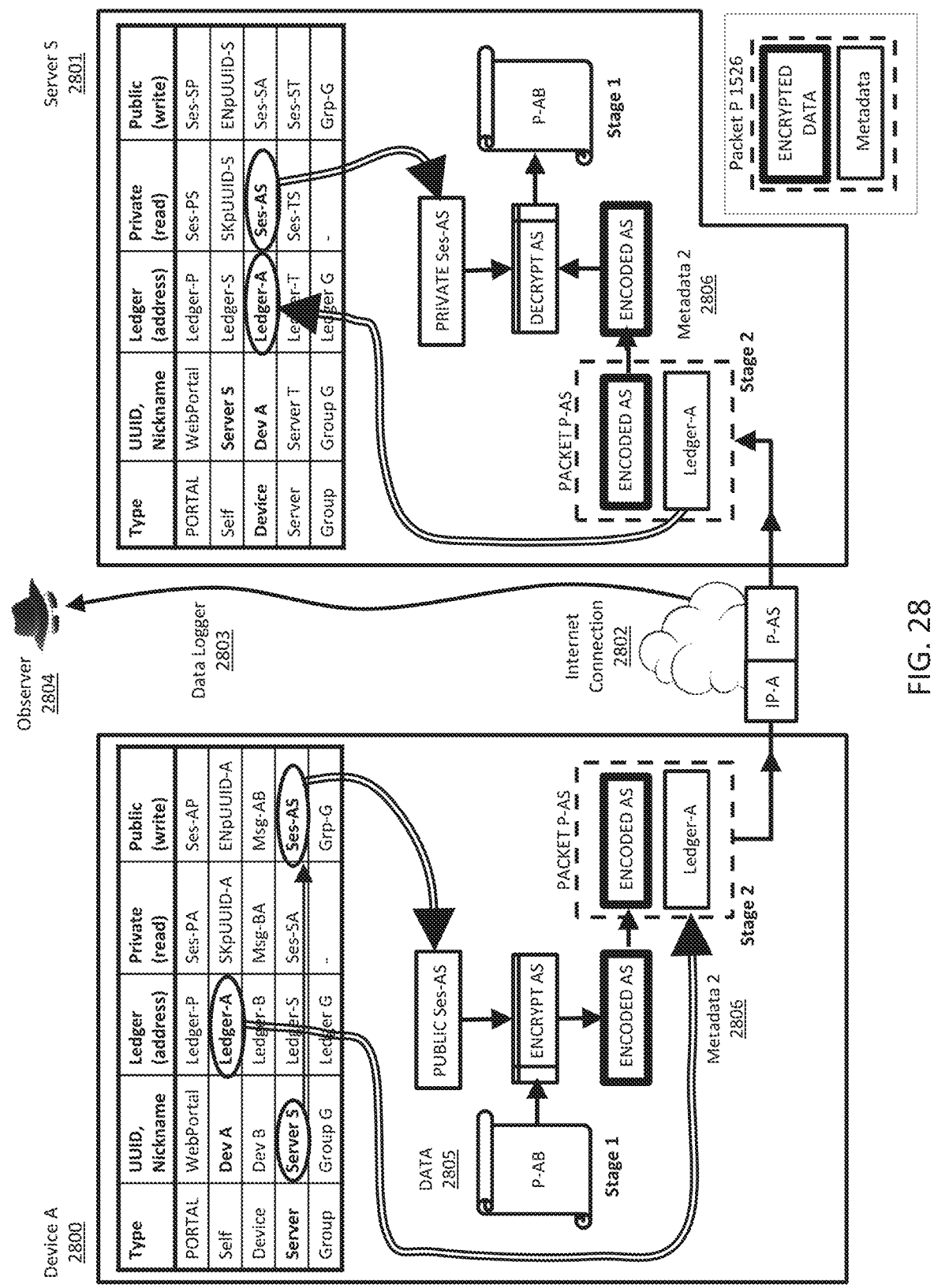
FIG. 28 is an example of a direct message exchange between device A and server S.

FIG. 28 is an Example of a Direct Message Exchange Between Device a and Server S.

In FIG. 28, Device A 2800 is paired with Server S 3801. Instead of sending Packet P-AB itself to Server S, Packet P-AB is re-encrypted using the pathway AS from Device A to Server S. Thus P-AB gets encrypted to form P-AS, using the same method as before, but now using Server S as the target. The Sender ID LEDGER-A still is present, but the Receiver ID is now LEDGER-S, and the external Metadata for Packet P-AB (Sender A, Receiver B) is now encrypted into the ENCODED AS section. An observer 2804 of P-AS would no longer be able to identify that Device A was communicating with Device B, only that Device A is communicating with Server S, by interpreting the IP-A header data.

Therefore, TLS or https protection for the connection from device A to server S is redundant.

Server S, on the other hand, decodes message P-AS and retrieves the original P-AB message and can then analyze the external Metadata of P-AB again, as this is now decrypted. However, as we explained prior, Server S can only retrieve message P-AB, not the content DATA AB inside this message, as this requires the decryption key which is stored on Device B (the destination itself). Let's assume that Server S does not connect to Device B, but it knows that Server T does. (How this is done will be explained below).

Figure 29:
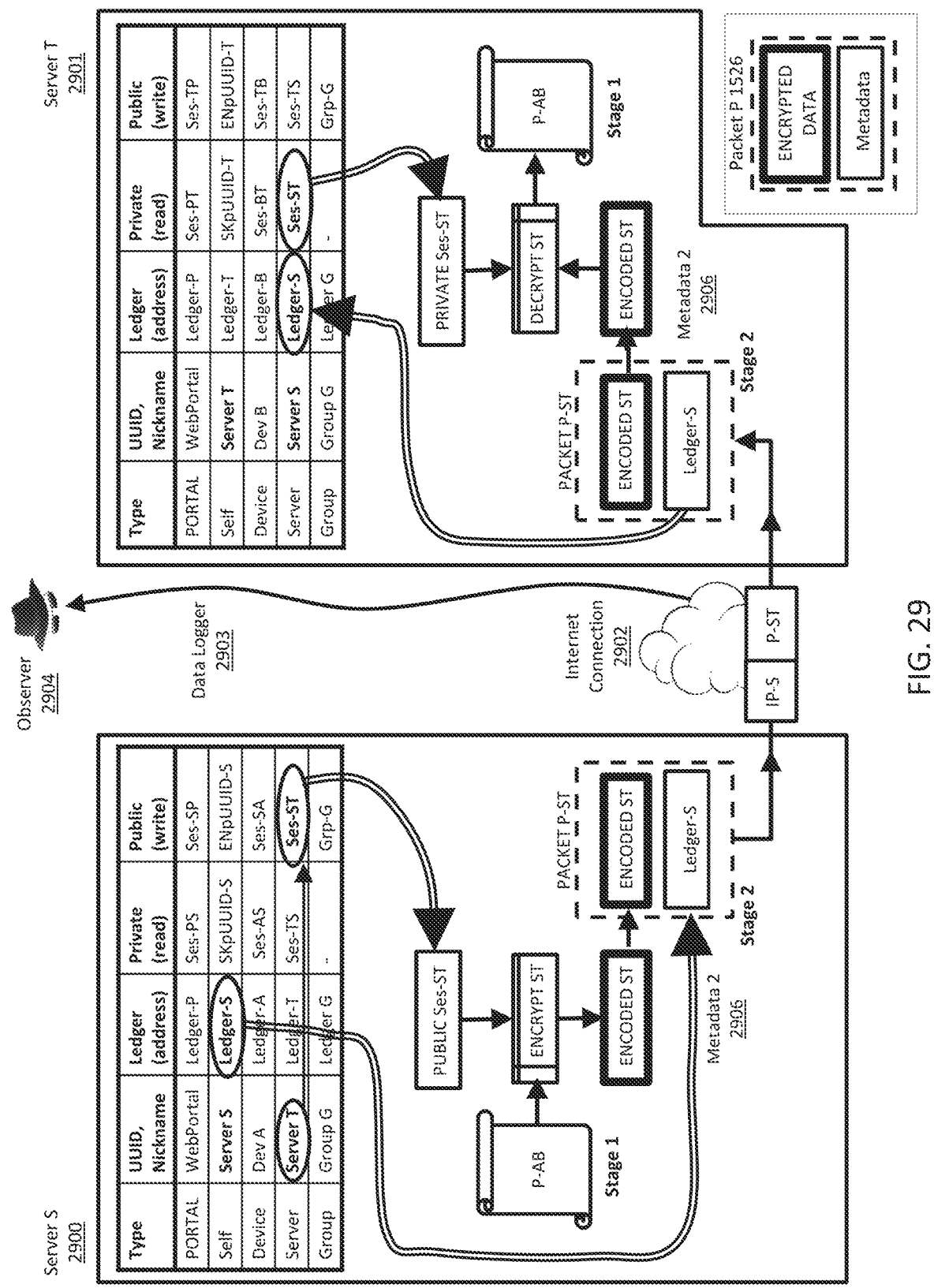
FIG. 29 is an example of a direct message exchange between server S and server T.

FIG. 29 is an Example of a Direct Message Exchange Between Server S and Server T.

In FIG. 29, message P-AB is now encoded as P-ST, representing an exchange between Server S and Server T. The original Metadata 1 2706 (Sender A, Receiver B) is now fully encapsulated in the encrypted portion of the message, and the current external Metadata 2 2906 (Sender S, Receiver T) no longer gives an Observer 2904 the indication that a message was exchanged between Device A and Device B. Please note the Observer can view the IP addresses (IP-S and IP-T) as these are visible in the internet packet. Content P-ST is encrypted and is not visible to the Observer. Between Server S and T, again, no TLS encryption is needed. In fact, TLS is only used for the WebPORTAL server, upon the initial joining the network, as all other server connections use encrypted content, as shown in Packet ST in this case. Pairing request are also encrypted using the Stage 2 encryption method.

Figure 30:
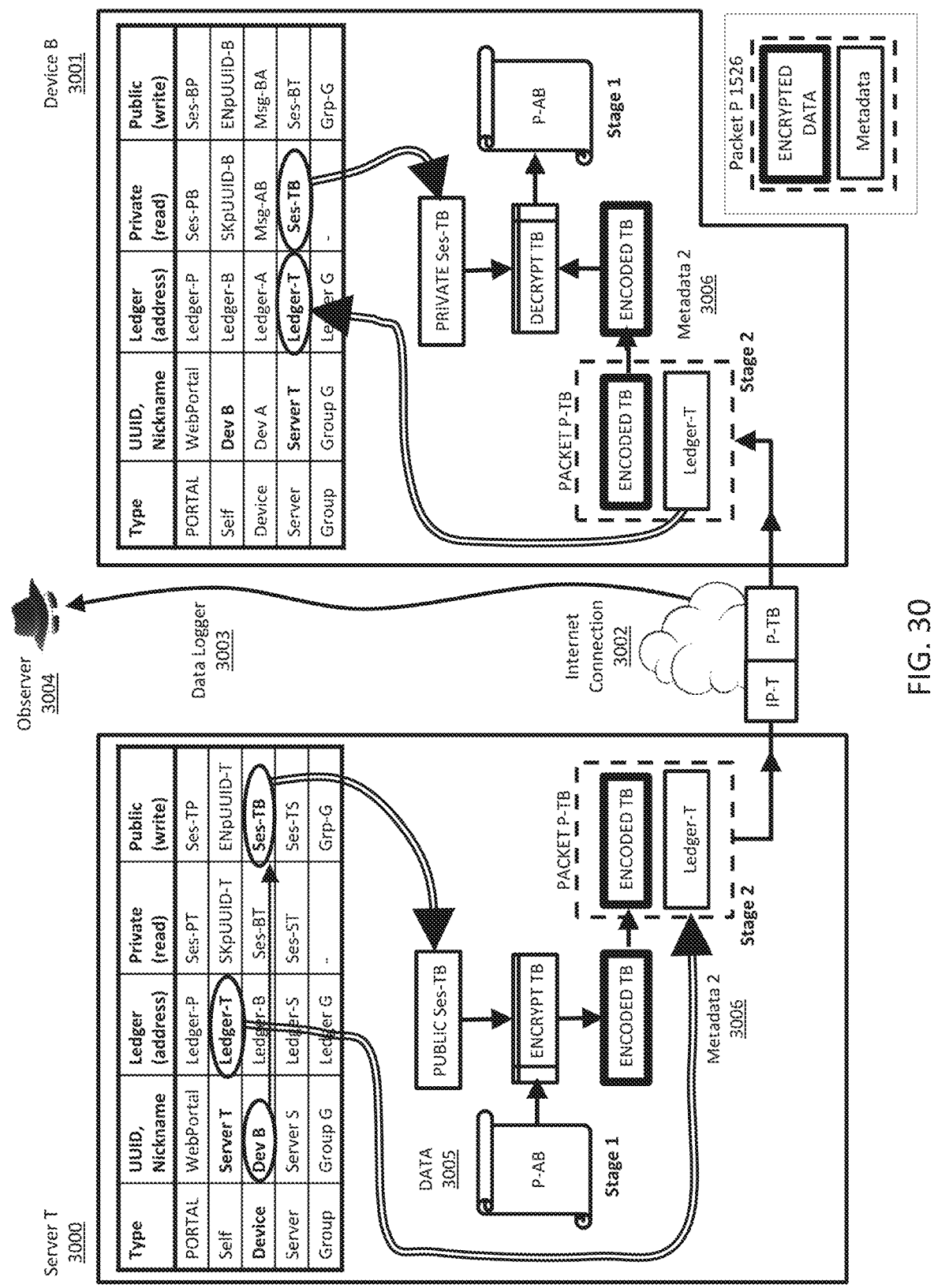
FIG. 30 is an example of a direct message exchange between server T and device B.

FIG. 30 is an Example of a Direct Message Exchange Between Server T and Device B.

In FIG. 30, Server T takes received packet P-AB (from packet P-ST) and has to send packet P-AB to Device B, to which it is paired. In this step, Server T creates packet P-TB. All encoding is as in the previous figures, except that the Packet P-TB is formed with Device B as recipient. Device B receives Packet P-TB and, after decryption, ends up with Packet P-AB.

Figure 31:
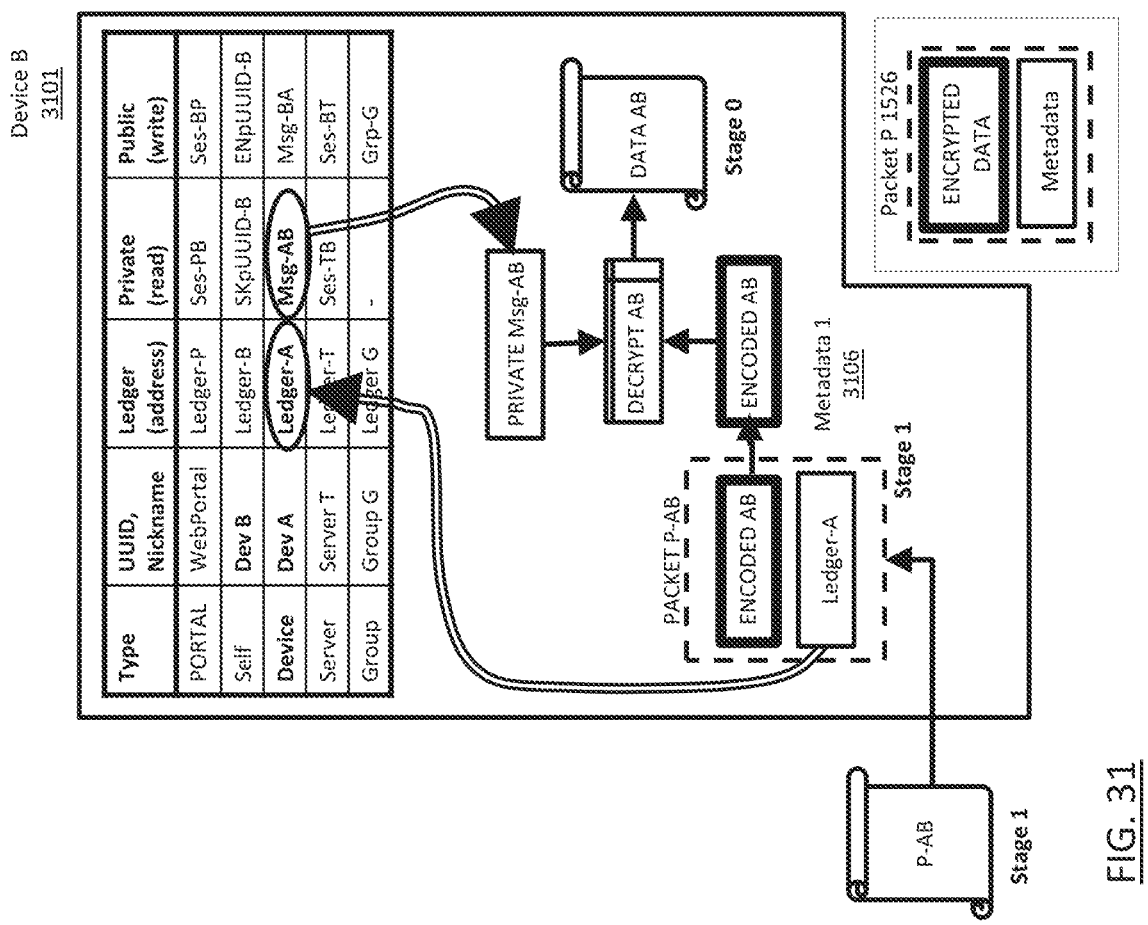
FIG. 31 is an example of device B decoding packet P-AB into data AB.

FIG. 31 is an Example of Device B Decoding Packet P-AB into Data AB.

Then, in FIG. 31, it should be clear that Device B can decrypt packet P-AB using the Messaging Key that was exchanged between Devices A and B as depicted, and that this step is identical to what was shown in FIG. 27.

In the chosen embodiment, we have detailed an encrypted message exchange from Device A to Device B (in FIG. 27), which is sent indirectly (through servers S and T) without leaving an IP trace route that Device A and Device B communicated to each other.

We have shown this same sequence A-S-T-B in Chapter I using FIG. 8 thru FIG. 12 when explaining metadata handling. We will address message routing in the next Chapter.

Chapter III

Figure 32:
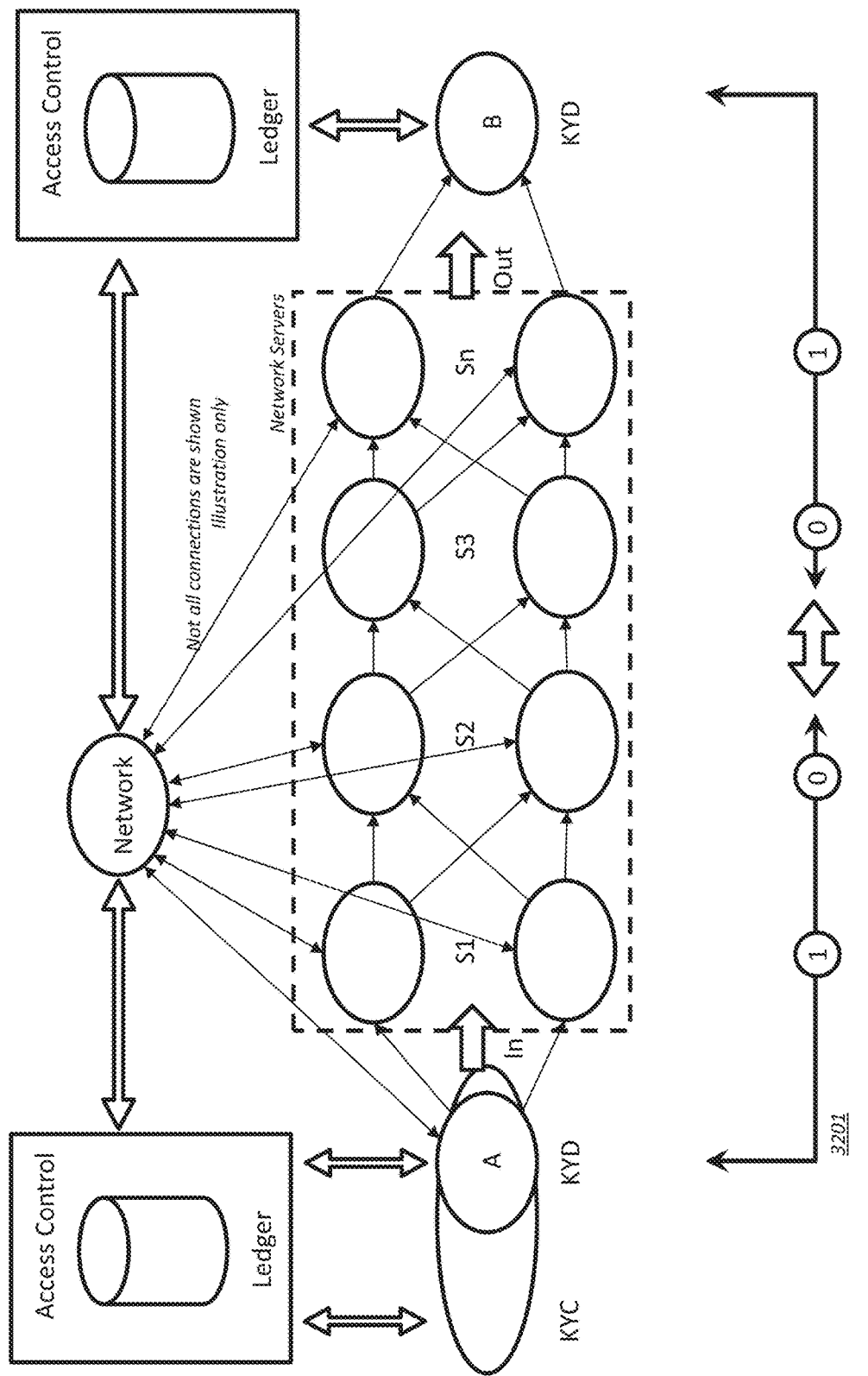
FIG. 32 is an overview of the ThunderPort network.

FIG. 32 is an Overview of the ThunderPort Network.

Depicted are a known customer (KYC) and known devices A and B (KYD). The network includes a series of trusted servers S1 through Sn.

In this application we will explain how the network creates routing through the network using the DLNN ledger which holds information regarding both the sending and receiving device. In the image we show a line at the bottom

3201 with 1-0-0-1 as markers. We will explain what they mean and how they are derived.

Figure 33:
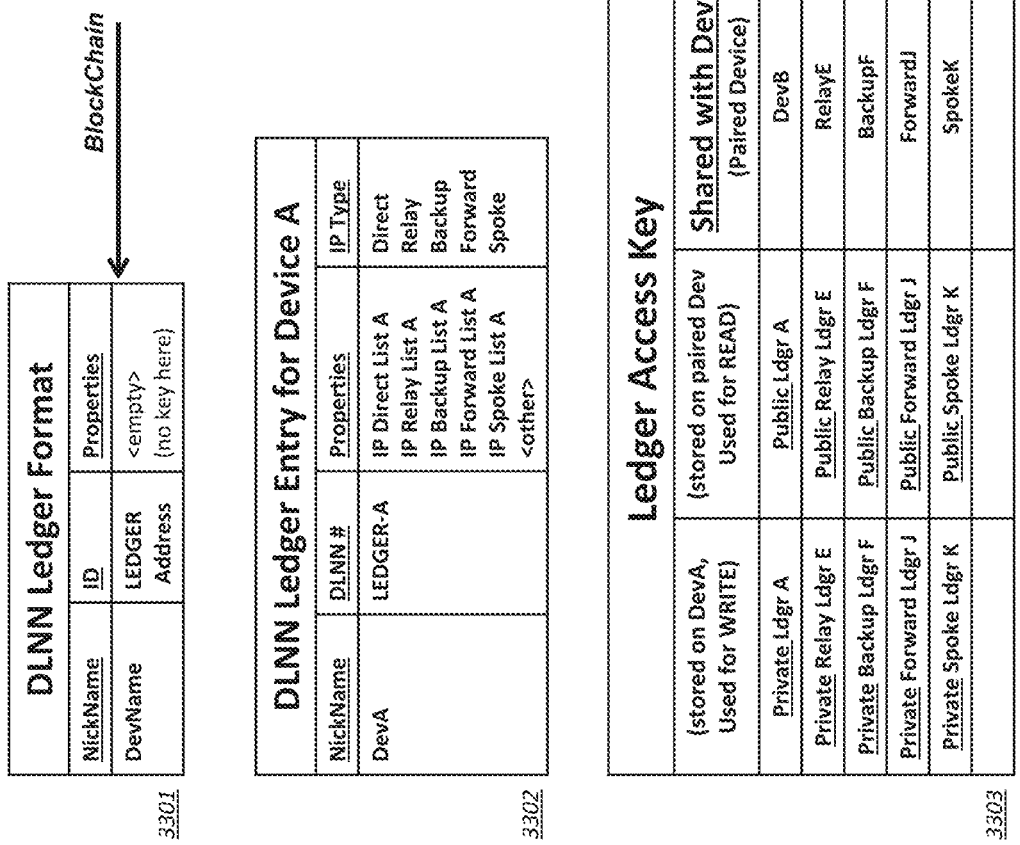
FIG. 33 is an introduction to the DLNN ledger.

FIG. 33 is an Introduction to the DLNN Ledger.

In ThunderPort, we use a Distributed Ledger Node Network (DLNN), or Ledger in short, to hold decentralized information regarding entities on the network. Ledgers are used to register user (Customers), devices, servers, groups and files, in a decentralized fashion, and can be optimized based on their specific role.

The following are different types of Ledgers:

KYD—Know your Device
KYN—Know your Node (server)
KYG—Know your Group
KYF—Know your (Secure) File
KYC—Know your Customer
KYW—Know your (Digital) WalletKYI—Know your (Digital) ID This list is neither complete nor exhaustive. For instance, we could subdivide listed groups by region or by name or hash values. We can also identify each Ledger type by adding a pre-fix in each address. Each Ledger entry can only be written into by the respective owner. Reading of entries can be done by the ThunderPort network servers (nodes) and devices (end-nodes). Typically, a device itself can read its own Ledger. Read access is controlled in two fashions: a) restricted access to the Ledger read interface itself (using ThunderPort pairing methods, as explained in chapter I); and b) pairing keys needed to extract data of a given field, as such data is encrypted and requires an exchanged key to interpret such data.

The ledgers all have a similar structure, which we will explain using the KYD ledger as an example. In the KYD ledger, all devices are entered, and one can implement this Ledger as a central database, a distributed database, or a blockchain organized data record. The blockchain approach holds several benefits such as decentralized access and immutability of the records. To optimize the Ledger further, one will see that the Ledgers are organized in the ThunderPort network mostly from a "Write few, Read often" principle. This reduces the operating cost of the Ledger network, and justifies ThunderPort's approach of making this into a private ledger, i.e., hosted on private servers and access controlled. The blockchain redundancy enables the extra security layer that a database (central or distributed) might lack. Access to such private ledgers is handled through a DLNNPORTAL (not shown). That is, any access to the Ledger requires credentials and an access method within the ThunderPort network.

Each of the Ledger types are arranged similarly. Shown is the DLNN Ledger Format 3301 for Devices (KYD). Any devices, or end-node, on the network will have an entry in here. Users can have multiple devices. At it simplest, the structure of the device ledger has a (nick)name, an address, and properties. Properties mostly relate to how this device interacts with the network, this goes into pairing rules between devices and selected servers. In the Ledger, each device, which joins the network, is given an entry which, among other properties, reflects its name and Ledger Address. For devices, most interesting is the server connections that exist related to each device. DLNN Ledger Entry for Device A 3302 is such an example. This represent the Ledger entry that was created for Device A with the specific fields that were populated upon registering device A. Each device will have similar properties, which can be optimized on specific rules. E.g., servers can be chosen upon location, by allocation, by pooling, by corporate or other rules, and more. Please note that there is no imposed network rule here, each device can choose freely from available servers, a concept which we will deepen in this application.

Pairing between the device and selected servers can be done automatically. Upon creation of the device ledger, it is known which servers must be paired to the device, and which servers must be paired to one another. Pairing refers to the key exchange method between two devices or servers which then creates the ability to send encrypted messages back and forth. If a device specifies a link to a server, then it must be able to send and receive encrypted messages from that server. If a device specifies a connection between two servers, such servers must be paired to each other. Such server pairing can be implied by the routing specification (explained below in FIG. 39). Also, such servers may not need to be paired with the device if direct routes are not specified.

One could auto-pair servers upon specification, or allow certain servers to only appear at certain levels to reduce the number of server pairings that would be required. Generally, pairing overhead is deemed light and fast key-lookup can be realized through the use of a hash table.

The properties are shown as a List. One example of such a list is the Relay server. Devices, when they connect to the ThunderPort network, will ultimately be identified by an IP address. The ThunderPort network hides this IP address as much as possible from communications, but in routing messages, the ThunderPort network must ultimately have an IP address to connect to a device.

Because many devices may be handheld devices, such as cell phones, they may not be capable as operating as servers, but all can operate as clients. A device, once logged in into the ThunderPort network, effectively logs in to any or all of its 'Relay' server list. E.g., if this list has 5 servers, the device will form a server-client connection with each of said five Relay servers, and each of them can be seen as a starting point or an end point in the ThunderPort network. This is used in routing messaging, as the IP address of the device only needs to be known to the Relay server(s) in such a case. Both push and pull methods, in a client-server relationship, can be supported.

Another list of interest is the Direct list. The intent here is that the device can publish IP addresses that it visits frequently, or where it is at currently, which would allow a paired device to make a direct connection with said device. For example, a device could read its own list of IP addresses, and if the current IP does not match, it could write this into the Direct List, to be discoverable by a paired device in direct connection method. If the IP address is already listed, no action needs to be taken to be discoverable. On some networks the device may receive the same IP address and port extension that it had previously, on other networks this may not be true.

For this to work, one of the two devices acts as a server. We use Stage 1 communications (P-AB) as explained in chapter I. This is a technique to bypass the ThunderPort network when the IP address does not need to be hidden, and privacy is not an issue. An example could be streaming (to the device), which is consuming information, not generating it. A network benefit of this approach is that significant bandwidth can be off-loaded from the network, enabling higher efficiency for both the streaming data transfer and for the network operating itself. The connecting device will also know the IP address (and geographic location) of the sourcing device.

Others lists, such as Forward, Spoke, Hub, and so on will be explained in this application. The Backup list is described in chapter V.

The Ledger Access Key 3303 is a method for each device to control which servers have access to which field. Not only is the Ledger access controlled (one must pair and authenticate oneself to access each Ledger), but the properties themselves are only readable by those nodes (servers and/or devices) that have been given a read key. In this organization, only the originating device, which created the Ledger, has write access to the Ledger. All other entities have read access only.

Figure 34:
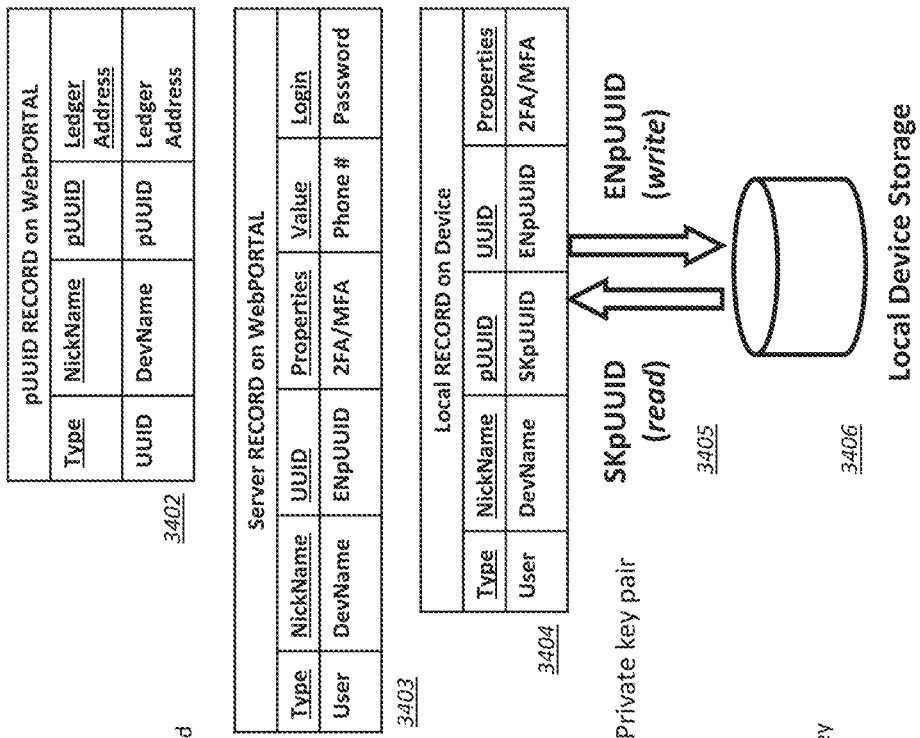
FIG. 34 shows how a device gets uniquified.

FIG. 34 Shows how a Device Gets Uniquified.

Many techniques exist nowadays that allow for management of private keys on a device, without such keys being visible to hackers. Examples hereof are TEE/SE, TRH, Trusty-OS, FBE, KeyMaster, StrongBox, GateKeeper, EHS, Secure Enclave, and so on.

Also, identification methods of the hardware for the device include getImei( ), getDeviceID( ), SString, UUIDstring, etc.

Prior to registering a device into the ThunderPort network, a user creates a User Account. A user goes through several layers of verification before becoming a trusted user to be able to start pairing devices to other devices on the network.

FIG. 34 shows a device registration process. We draw attention to the usage of a Pass Phrase, in Section e) in Table 3401—a use provided text which is not kept anywhere, but, when provided, produces a hash value that passes certain checks, so it can authenticate the user, in context of all other provided data checks. This can be used during backup and recovery, and will be addressed in chapter V.

There are three aspects of our approach: Soft ID, Remote Data Check, and Unique Encryption Key. We describe each of them:

Soft ID is based on a unique ID, nicknamed pUUID (private Unique User ID), and unique Ledger Address, effectively a pUDID (private Unique Device ID). An administration server, nickname WebPORTAL, registers such IDs in its private database (RECORD) as well as creates the corresponding ledgers: the pUUID in the KYC DLNN Ledger 3402 and the PUDID in the KYD Ledger (not shown). In the WebPORTAL server RECORD 3403 also an entry is made for the user. Similarly, a RECORD is also made for each device belonging to a user (not shown).

On the device itself, a local RECORD 3404 shows the same information, but it shows both the public field UUID and the private field pUUID. The private field is not shared outside of the device, only the public field.

FIG. 34 shows the pUUID handling. One can see how a pUDID handling would be similar.

The Soft ID exist in two manners: one for each user (UUID) and one for each device (UDID). Both are utilized when entries are made into the ThunderPort network, and are heavily guarded on each device.

Remote Data Check is essentially a verification step which takes place outside the device. In Table 3401 we list this as 'kept on device and WebPORTAL', but the WebPORTAL can delegate some of this information to the Relay servers to which a device connects when launching the ThunderPort application.

In its simplest form, the Data Check verifies 'soft' device information. This can vary from configuration, software revision, but also file system, file location, and—if at OS level—hidden and deleted files, SIM card info and more. A digital footprint is thus formed on the device, and this digital footprint is stored on the relay server. When the application starts up on the device, this information is being checked in the background. If a hacker were to make a device clone, these checks will fail, unless the copied device is identical in every which way. There are additional soft checks, such as last IP address, distance and time between IP addresses, and so on. Also, all communication between the device and its network check is fully encrypted, using the methods described in chapter II. Additionally, the Data Check can also check hardware information, and, on mobile device, SIM card information, if allowed to.

There may be additional techniques involved in checking the device when re-joining the network. Our goal is to make it practically impossible for a cloned device to pass all such checks.

Unique Encryption Key ENpUUID and SKpUUID 3405 is the third unique element. In fact, there are four unique keys: ENpUUID, SKpUUID, ENpUDID and SKpUDID. The SK keys are Storage Key and are used for opening local data 3406 on the device, and the EN keys are Encryption Keys and are used for writing such data onto the device.

The distinction between them is how the device, and the network, uses said keys. The network administration server does keep the EN keys but not the SK keys. In principle, the network administration server does not need the UDID key, only the UDID Ledger address. Because in our simple depiction, LedgerAddress and pU(UD)ID are analogous, we assume that both are kept on the WebPORTAL server. For this application, we ignore the pUDID for simplicity's sake, and focus on the pUUID instead. The pUDID would allow device level control, whereas the pUUID allows for user level control. That is, each device is uniquified (Device Ledger Address), as is each user (User Ledger Address), but encryption on the local device would be using the same key on all user devices, rather than a different key for each device. One benefit for doing so is that encrypted data (files) can be sent between user devices without having to reencrypt them. They can be archived and retrieved on new user devices. One drawback is that it is a less tight security level than device specific encryption. Both can be made to work together.

With using pUUID, one can easily understand that a private message, sent from the WebPORTAL server, is encrypted. The device can take advantages of this by storing required information on a remote server and pulling this in during startup of the application. The method can be constructed such that cloned devices will fail for a variety of reasons. In one example, hidden and deleted file information from the device can be stored at a remote server, only accessible when the app runs on the device. But for the app to pass this check, the hidden and deleted file system information must match the stored image on the remote server. This creates a catch-22 for cloned devices as they have to clone an exact image (file nodes, hardware all must be identical, included hidden and deleted files), and, upon failure, the app will fail its startup tests. Other techniques also exist. Care should be taken that no intercept inside the device takes place—the app checks for background apps, running apps, debug mode, and so on, and will shut down if it finds inconsistencies.

In short, we have devised methods to assure that devices are uniquified and that they are verified. As more advanced hardware and software provided methods, such as listed at the top of this figure description, become available, such solutions will be incorporated. We rely on two outcomes: 1. The SKpUUID key remains hidden and is only accessible (formed) through the application software; and 2. The application software will only operate on non-compromised devices that pass sufficient security checks and will fail to start on devices that are compromised.

In summary, the described methods allow for devices to exist on the ThunderPort network, and be fully addressable, in a secure fashion. Attacks such as Spoofing, Cloning, Phishing, Man-in-the-middle are arrested.

Figure 35:
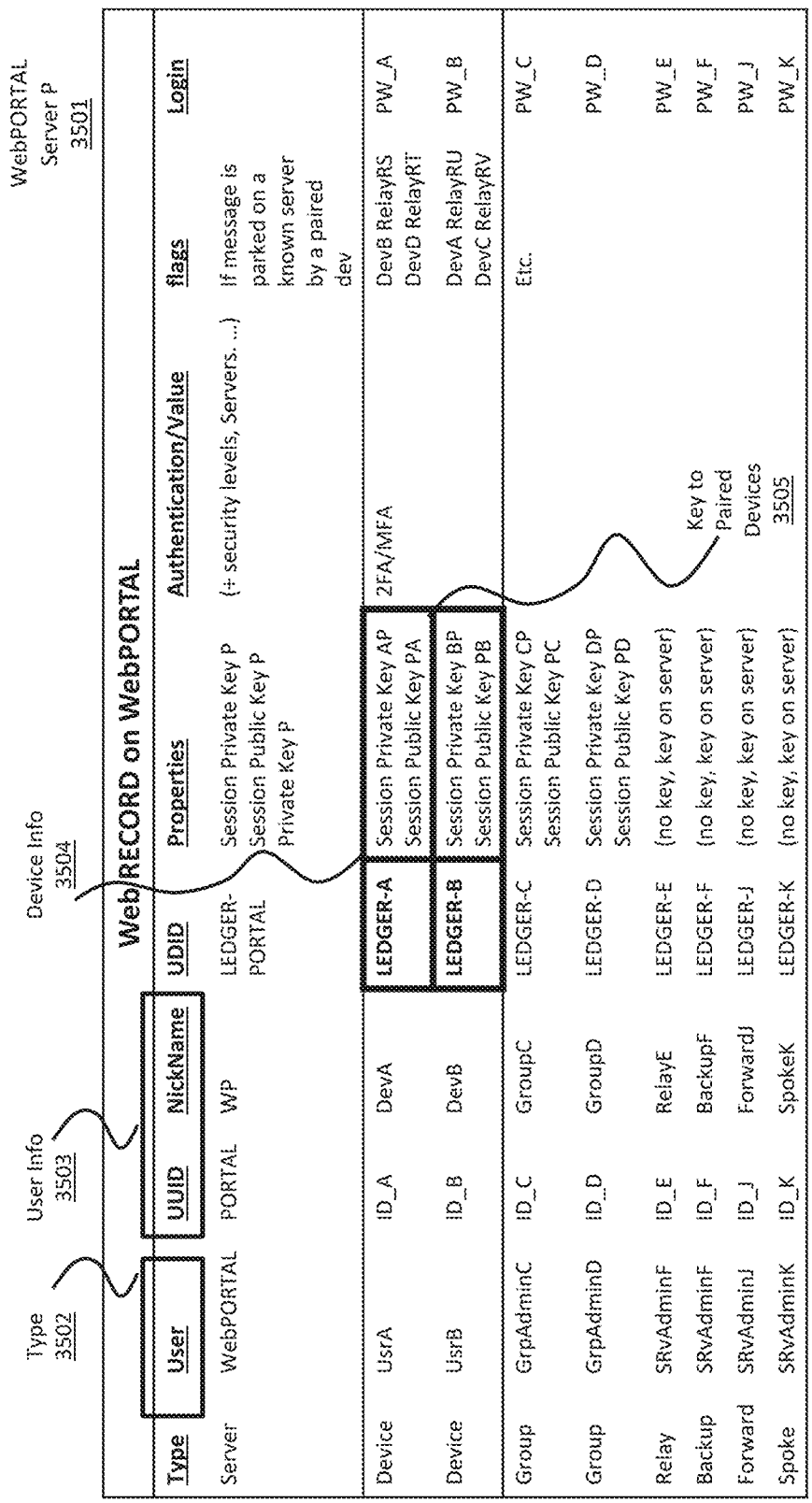
FIG. 35 depicts a Web RECORD on the WebPORTAL server P 3501.

FIG. 35 Depicts a Web RECORD on the WebPORTAL Server P 3501.

In here, we highlight the following fields: Type 3502, User Info 3503, Device Info 3504, and the Paired Keys 3505. This information gives the WebPORTAL server both methods and access to communication from the administration server to the device and back.

Figure 36A:
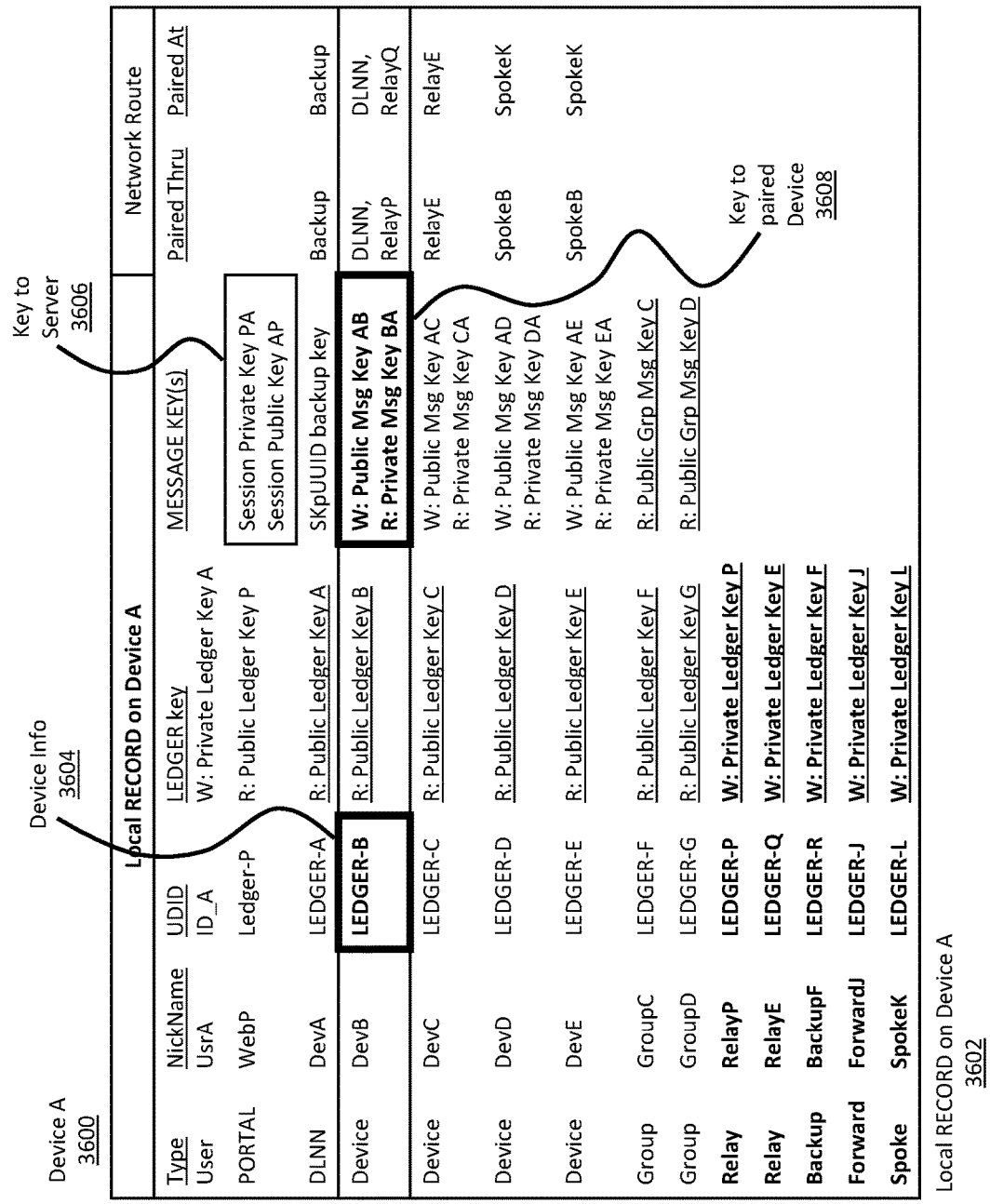
FIGS. 36A and 36B depict similar data on each device A 3600 and B 3601.
Figure 36B:
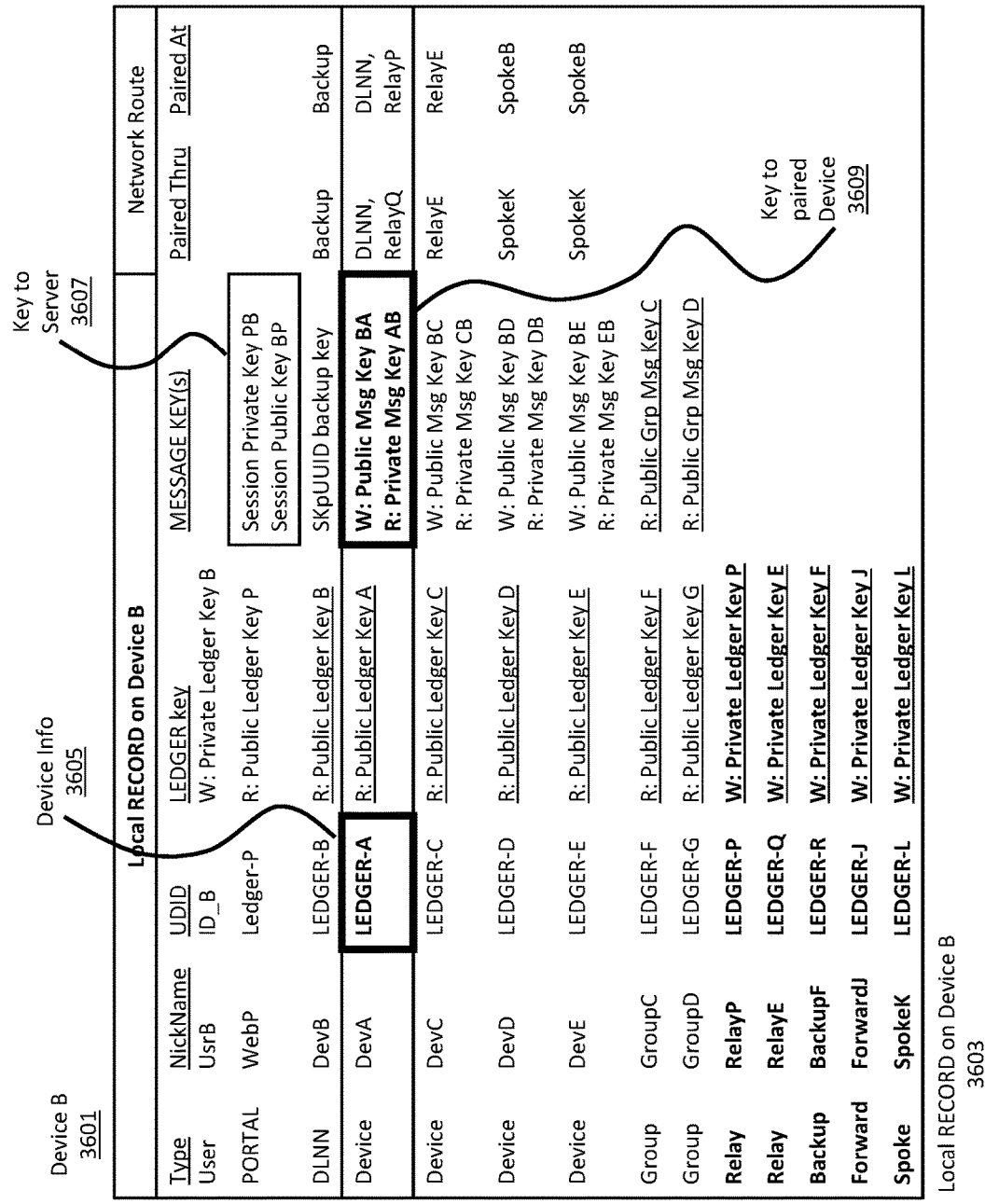

FIGS. 36A and 36B Depict Similar Data on Each Device a 3600 and B 3601.

Each device has a Local RECORD 3602 and 3603, in which the Device Info 3604 and 3605, the Key to the Server 3606 and 3607, and the Paired Device Keys 3608 and 3609 are highlighted.

Figure 37:
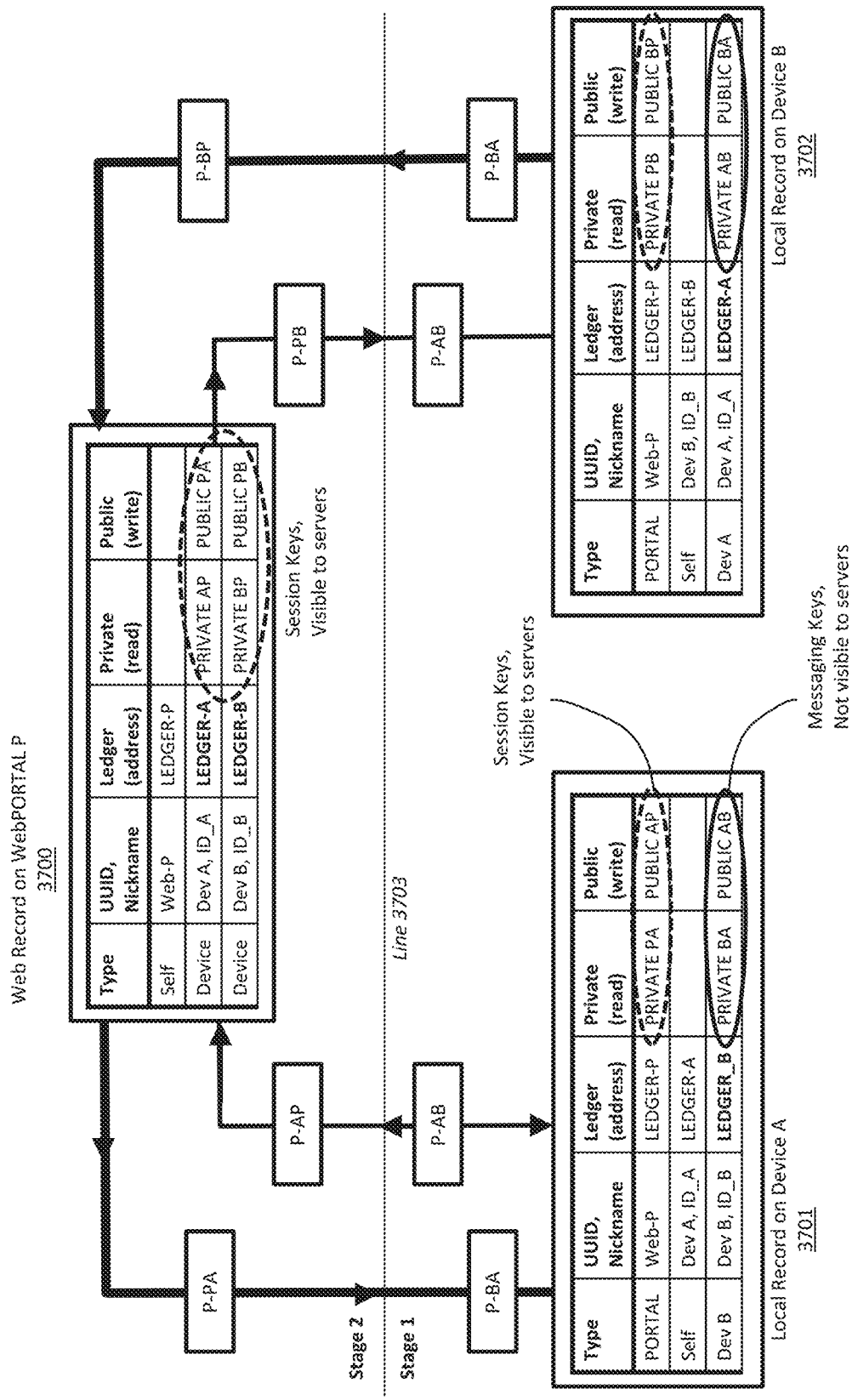
FIG. 37 depicts a secure message exchange from device A 3701 to device B 3702 through the WebPORTAL server P.

FIG. 37 Depicts a Secure Message Exchange from Device a 3701 to Device B 3702 Through the WebPORTAL Server P.

This reflects the device pairing between device A and device B, as shown on the Local Records 3701 and 3702. How this setup is achieved is detailed in chapter II. Similarly, both devices are paired to the WebPORTAL server P which has a Web Record 3700 showing such pairing. In addition, we show the P-AB Stage 1 and P-AP Stage 2 packaging. Line 3703 is the demarcation line of such messaging. In chapter I all of these methods are described in more detail. Here we summarize in stating that a data packet that is transferred from device A to device B gets encrypted at Stage 1 using the (write) Key Public AB which will be decrypted at device B using the matching (read) Key Private AB. At Stage 2, the necessary Metadata 1, which is the Ledger-A address, which is the handle to look up the key in Local Record 3702 on device B, is encrypted to the next node, which is WebPORTAL server P. Thus, a Packet P-AP is created which has this Metadata 1 encrypted. On WebPORTAL server P, this Packet P-AP is decrypted and Metadata 1 is visible in the P-AB packet while the encrypted data remains encrypted.

WebPORTAL server P can be replaced with a sequence of servers, the final one which connects to device B. Each next hop between servers re-encode the packet back up to Stage 2 and each next server will decrypt Metadata 1 and create a new packet for the next hop.

We will next explain how such packets are routed through the ThunderPort network.

Figure 38:
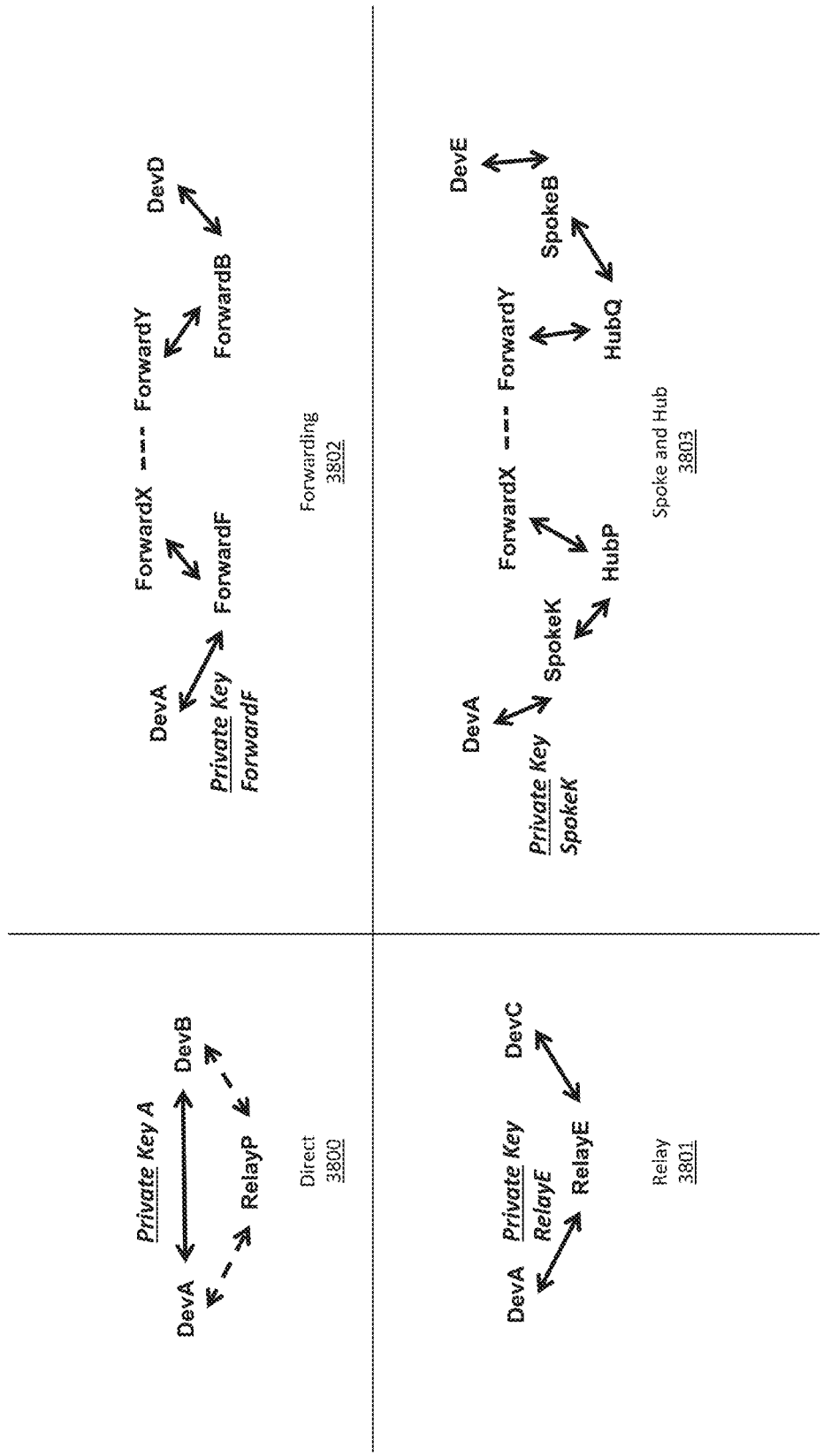
FIG. 38 shows a number of examples of how routes can be formed in the ThunderPort network.

FIG. 38 Shows a Number of Examples of how Routes can be Formed in the ThunderPort Network.

The Direct Path 3800 depicts a communication between two devices which is direct, meaning that they can send and receive IP messages. As stated above, this requires one of the devices to usurp the role of a server, while the other can remain in a client role. Even in such a case, both devices may not be online at the same time, and a live connection cannot be formed. In such a case, a Relay Server P is envisioned, which could hold messages once they time-out after they fail to reach the other device.

More general is the Relay Path 3801, in which the messages are always routed to the Relay Server E 3801. In this example, both devices are connected to the same relay server E, at which time such a connection is similar to a connection through the WebPORTAL server P as in FIG. 37. Generally, one can assume that device A and C would connect to different relay servers, and if such is the case, a path between the relay servers is created.

Forwarding Path 3802 and Spoke and Hub Path 3803 shows such more complicated paths. The path from device A to device D uses Forwarding servers, whereas the path from device A to device E also shows Hub and Spoke servers. Such names and conventions are illustrations of the flexibility of the ThunderPort network routing approach. We name them internet-based paths, as the actual transmission from node to node through the ThunderPort network takes place using IP packets, and is IP address based. However, because each transfer is a unique packet which is created for each hop, with fully encrypted content (Metadata 1 and original Data), an internet observer cannot follow such packet through the internet. Furthermore, packet sizing may be padded and unpadded, to thwart size and volume matching (AI) detection algorithms.

All diagrams in FIG. 38, and more, can be easily implemented. For example, diagram 3803 could be set up between two companies, or between two different sites, or could be country, even continent based.

As we explained in chapter I, Metadata 1 level information can be aggregated in the network. The network is not to monitor messages, nor to bring out such information to a recipient device, but there are many scenarios in which bookkeeping takes place. One such example could be done through Diagram 3803. Envision that HubP is a location server for a large company. All devices in that area connect to a Spoke server through which they reach the Hub server P. A message that goes outside the local zone, e.g., a sister site overseas, gets forwarded to a Forward server X, and eventually gets picked up at a Forward server Y, which connects to a similar Hub and Spoke structure at the sister site—server Hub Q and Spoke B respectively.

The company, in HubP server, is now able to track which devices communicate with which other devices, both intra-server and inter-server can be tracked, although the HubP server cannot see any of the data (and Metadata 0) that is being transmitted.

This means that the ThunderPort network can be extended from a privately hosted network by ThunderPort into intranets that run the ThunderPort software on internal servers. Such servers can track locally provided data, but cannot see the ThunderPort network data itself, as this is shielded (stripped). This allows for many commercial solutions to be created which enable data which administrators are seeking, while also providing privacy and security for businesses and consumer users.

Also shown are Private Keys A, RelayE, ForwardF, SpokeK. This is a reminder that transmissions in the network is between paired nodes (servers and devices). In each segment of a routing path, the two adjacent nodes are paired in the direction of travel.

What is typically done is that each device pairs to a select set of servers for specific functions, such as relay, backup, spoke, etc., and also the WebPORTAL (admin) server.

Then, servers belong to levels, such as S1, S2, S3, Sn in FIG. 32, and connections between such servers are also paired directly to each other. Thus, not all servers are paired to all others, nor are all servers paired with a device, with the WebPORTAL server being a possible exception.

We will next explain the Device Ledger and how routing is created on the ThunderPort network.

Figure 39:
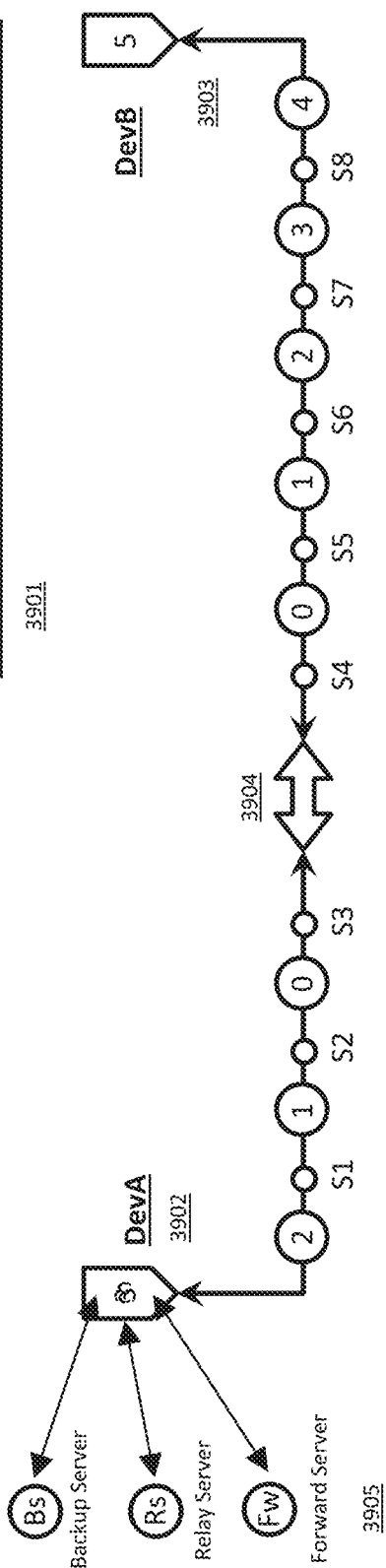
FIG. 39 shows the server template information for a device ledger.

FIG. 39 Shows the Server Template Information for a Device Ledger.

We use diagram 3803 to populate this template. Defining the Ledger content for device A follow diagram 3803. For Device B, we add another two levels: a Relay and a Section server. This is to illustrate that the definition is free forming and not bound by specific rules.

In DLNN Ledger Entry for Device A 3900 we see a list of IP Types, such as Relay, Backup, and Forward (Direct is to itself, not to a server). We also show them connected to device A 3902 at the list at 3905. We ignore these server types as we are focused on a path which starts with the Spoke servers. A spoke server and a Relay server may in fact be the same server. This is a server which communicates directly to the device, typically in a client-server handshake method. Devices typically connect to multiple of such servers, as defined by this Ledger entry.

Shown in bold font in 3900 we see several additional fields below the Spoke type. First, we introduce the concept of levels. Each device specifies how many hops are defined in its Ledger entry by specifying a Start Level. E.g., if the Start Level is set to 3, then there are three hops defined in this Ledger. For simplicity, we count down to level 0, which is common among all devices. So, Start Level=3 implies that there are three hops: 0-to-1, 1-to-2, and 2-to-3. In FIG. 39, device B specifies in its Ledger that Start Level=5, i.e., 5 hops: 0-to-1, 1-to-2, 2-to-3, 3-to-4, and 4-to-5. Furthermore, in message routing, when level 0 is reached, another hop is required to connect from device A level=0 to device B level=0, or a 0-to-0 hop. We refer to this as a crossover point 3904. If a message routes from device A to B, it will start at the Start Level defined by device A, or 3, and end at the Start Level defined by device B, or 5. The sequence choosing then is a count-down, followed by the crossover, followed by a count up. Or, in this case: 3-to-2, 2-to-1, 1-to-0, 0-to-0, 0-to-1, 1-to-2, 2-to-3, 3-to-4, 4-to-5. Prior to crossover point 0-to-0, the Ledger Entry for Device A 3900 is used, past the crossover point 0-to-0, the Ledger Entry for Device B 3901 is used. Also, prior to the crossover point, we count down, past the crossover point, we count up. Thus, the ledgers, as shown, imply nine hops: three as defined by device A, five as defined by device B, and one implied by the crossover point. Also, to be explicit, nine hops implies eight servers, shown as S1, S2, S3 thru S8. The first three, S1, S2, and S3, are defined by the Ledger Entry for Device A 3900, and the latter five, S4, S5, S6, S7, and S8, are defined by the Ledger Entry for Device B 3901. We also refer back to FIG. 32 and FIG. 1 to see how this is arranged in the network.

Now, in forming the connections, the servers for each level have to be specified. Since the Start Level is the device itself, we only have to define the levels below the Start Level. At each level we can add a list of servers. E.g., device A specifies servers SpokeK and SpokeI at Level 2, servers HubP and HubR at Level 1, and servers ForwardX and ForwardY at Level 0.

The path from A to B now follows this pattern:

A→S1→S2→S3→S4→S5→S6→S7→S8→B

In this example, S1 can thus represent either SpokeK or SpokeI, S2 can thus represent either HubP or HubR and so on.

For the Ledger information, this is sufficient information. There are however hidden pieces of information implied in this definition. E.g., device A can only communicate to servers SpokeK and SpokeI if it pairs to each server first and exchanges keys and ledger addresses. Similarly, each Level 2 server listed must also be paired with each Level 1 server. And each Level 1 server must be paired to each Level 0 server. So, in this case, SpokeK is paired with HubP and HubR, so is SpokeI. HubP is paired to SpokeK and SpokeI as well as ForwardX and ForwardV, so is HubR. During each paring information is exchanged between said servers, which does not need to be stored in the device nor server ledgers, rather this is stored on the Local Records on each server.

Server pairings can be forced implicitly. That is, pairing requests between servers can be generated from a grouping request in a device ledger. This way, device defined levels will always propagate. One could also do the reverse: at each level, the device can only select from servers at that level.

The exception is Level 0. All servers specified at Level 0 connect to each other. They also connect to the Level 1 servers, if so defined. Level 0 is a special case, in which the network switches information (crossover point) from the sending device ledger (A) to the receiving device ledger (B), and all such possible connections are formed dynamically, and are not pre-defined. Thus, all Level 0 servers must be able to communicate with each other, hence they are all paired to each other.

The multiple servers, listed at each level, also result in network resiliency. Imagine that a random selected server is down for e.g., maintenance, and the message is not accepted. In such a case, a time-out protocol will trigger, and this will result in selecting another server from the same level for the message forwarding. So, if servers are down, overloaded, or internet networks are down between the ThunderPort network servers, the ThunderPort network will simply continue to operate as long as it can keep finding pathways.

Of course, once all servers at a level are exhausted, the protocol would have to kick back to the previous server. This can all be done programmatically. Built in limiters can prevent messages from clogging up in such cases. But sending back a message to the originating device, or rather the relay server that serves that device, is fairly easy to accommodate, which could hold the message until the network starts to respond again.

Also, we will address this again below, this definition shows that device A has 2 choices going to Level 2 (SpokeK, SpokeI), again 2 choices to Level 1 (HubP, HubR), and so on. Since each level has two levels (an arbitrary choice), in this definition, there are 2**8, or 256 possible actual pathways defined.

Figure 40:
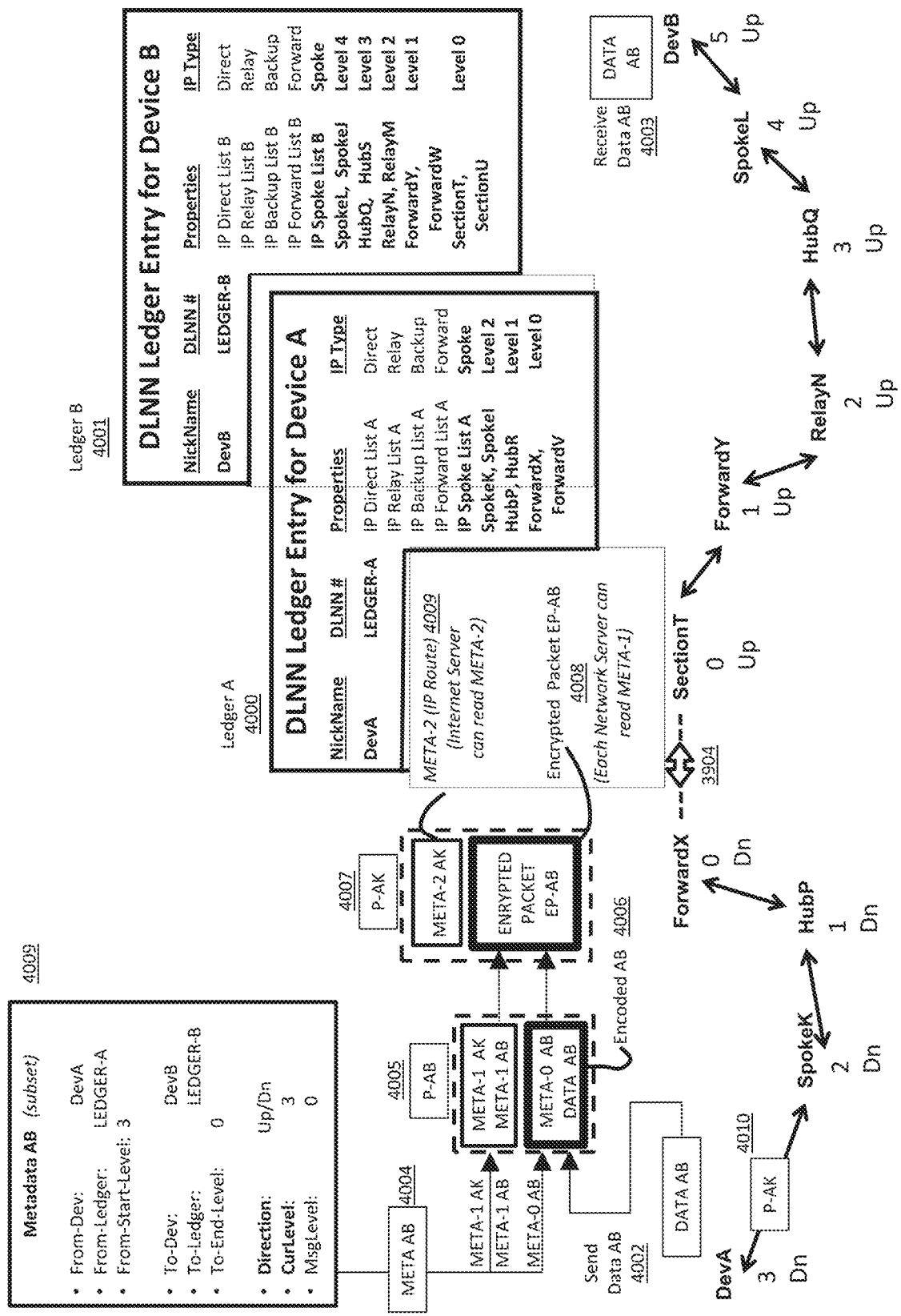
FIG. 40 illustrates how the route is formed.

FIG. 40 Illustrates how the Route is Formed.

FIG. 40 uses the same information that is defined in FIG. 39. So, the Ledgers A 4000 and B 4001 are identical to those in FIG. 39. We will now add detail how the ThunderPort network uses this Ledger information to form a route from device A (using Ledger A 4000) to device B (using Ledger B 4001). We will go through this method step-by-step.

We start at device A (DevA), where the Send Data AB 4002 is identified as DATA AB. Also, META AB 4004 is shown, which holds Metadata for the message to be sent. In this Metadata we identify fields such as the sender (From-Dev, From-Ledger, From-Start-Level), the recipient (To-Dev, To-Ledger, to-Start-Level). Three additional fields are also identified as Direction (up or down), CurLevel and MsgLevel. Direction is set to Dn, CurLevel is the Start Level of device DevA and MsgLevel is set to 0.

Following the methods explained in Chapter I and II, device A forms (stage 1) packet P-AB 4005 which has the Send Data AB 4002 encrypted and stored as the Encoded AB 4006 segment. It will also include META-0 AB if available, and META-1 AB is then used as Metadata 1 at Stage 1. After this step, MsgLevel is set to 1.

Device A now makes its first choice: Using Start Level=3, device A selects one of the servers listed at Level=2. We assume that device A selects server SpokeK.

Next, device A forms (stage 2) packet P-AK 4007, referring the packet to be transferred from device A to server SpokeK. In this packet, Metadata 1, comprised out of META-1 AB and META-1 AK (if any) is encrypted using the key pair identified by META-2 AK, which is used as the handle for the key, or key index.

Packet P-AK 4007 is now ready for transmission to server SpokeK.

This transmission is shown as P-AK 4010. We note that this transmission is not necessary a direct server to server connection, there may be multiple internet servers in between the two servers If device A is a mobile device, there will be an ISP server, and perhaps several internet servers. We address SpokeK by an IP address, not a DNS address, and SpokeK does not follow a standard server protocol, it will only accept properly formatted network messages which have proper keys and encryption.

After server SpokeK receives packet P-AK 4007, it decrypts the Encrypted Packet EP-AB 4008 which yields back the Metadata 1 (META-1 AK and META-1 AB) and the Encoded AB segment of Packet P-AB 4005. Server SpokeK now has access to the Metadata AB 4009 fields Spoke K will now edit the last three fields. Direction is left unchanged—it is still down, MsgLevel is also untouched, we remain at level 1. In fact, for a normal route, MsgLevel remains at level 1 for the entire route, only to step down to Level 0 once packet P-AB is retrieved in device B. However, the system allows recursion, or short-cuts, in which a packet underway can be reassembled into a new packet that can for a direct end-to-end route between servers. We will explain this in the next figure. In such a case, the MsgLevel is increased by 1.

The CurLevel field is updated by the direction, Dn means decrement, so the new value is 2. Server SpokeK then looks at the device A ledgers for servers at the next level, being Level 1. It finds HubP and HubQ and it randomly selects one of them. In FIG. 40 we assume that it chose HubP. Packet P-AB, which has the Encoded AB 4006 data and the META-1 AB and META-1 AK information now can be expanded with additional information that server SpokeK adds. We nickname this META-1 KP (not shown). All this gets encrypted for server HubP, using the KP key, and a new packet P-KP is created very similar to P-AK, except that the META-2 PK data holds the information for server HubP to decrypt the META-1 data. Note that META-2 4009 data is not encrypted, and is visible to internet servers performing routing. Since META-2 is actually equivalent to the IP addresses between the servers, no real information leaks here. The IP Packet would also show that the two servers communicate with each other.

Because each packet is newly formed, a trace-route will only show the direct server connections, and not the actual message path, as this is hidden in the META-1 data which is encrypted and not accessible to the internet servers, only to the ThunderPort network servers.

This process repeats, and at server ForwardX, the curLevel field reaches 0. When Server ForwardX it cannot decrement the CurLevel since this is already at 0. The message has reached a crossover point 3904. Instead of decrementing CurLevel, server ForwardX flips the direction field—from down to up—and opens the recipient ledger, by reading the To-Ledger filed which points to LEDGER-B. This entry is shown as Ledger Entry for Device B 4001.

Server ForwardX next reads this ledger and selects a server at Level 0. In this case it selected server SectionT in the path shown. This the crossover has been made.

Before the crossover, i.e., the Direction being Dn, the From-Ledger is used to select servers at each step. After the crossover, i.e., the Direction being Up, the To-Ledger is used to select servers at each step. The CurLevel indicates, after decrementing or incrementing, which next server group can be selected from.

E.g., when the message reaches server HubQ, the CurLevel will be incremented to 4 with the Direction set to Up, which prompts server HubQ to select between servers SpokeL and SpokeJ, and selects SpokeL.

Each server is thus reading only one device ledger, guided by the Direction field: if Direction=Dn, the servers select from the From information. If Direction=Up, the servers select from the To information. The server at Level 0, server ForwardX, flips the Direction to Up, based on CurLevel reaching 0, and uses the To information also.

Ledger information can be cached in the server for higher expediency, as most of the ledger information is read only. Care must be taken with decryption and access methods—protected servers should not store any decrypted information on disk.

Note that addressing can be done through relay servers, rather than direct communication to devices. In such a case, the final server, SpokeL does not communicate with device B directly, but would connect to one of the connected relay servers for device B, inserting one additional step in the path. This is a minor detail for accuracy, it does not change the overall approach outlined here.

What has thus been formed is a pathway between two devices, using the ledger, Metadata, and node pairings in the network. Any two devices can form a path between them, but only paired devices can complete a data exchange, as it requires paired keys for the send Data AB DATA AB 4002 in packet P-AB 4005.

Technically, devices will reject all incoming messages which have a Metadata identified (From-Dev and From-Ledger) which is not included in its key index table (in the Local RECORD on the device). Relaxing this allows other types of communications between devices, for which we see no use at this time. Rather, the increased security by rejecting all non-paired messages is preferable.

Routes formed between any two devices are dynamic, and packet sizing can be arbitrarily modified by adding and removing padding. Also, timing variables can be introduced (artificial delays), to remove predictability and observability. Moreover, the random selection methods of pathways allow for many different paths to be used ongoingly. In the given example, we have eight servers in succession. Adding a Relay server at either end makes this a sequence of 10 servers. If we assume that each layer allows for a selection of at least five different servers, the total number of combinations become 5**10, or 1 M combinations. That is, the shown path has a 1 in a million chance of occurring. However, as at each level one of the servers must be selected, i.e., one out of 10, each server has a chance of 1 in 10 that it will be included in the path.

Ten server hops is likely overkill. A more typical solution would maintain a higher selection (e.g., 20) at each level and a shorter path (e.g., 4). In this case, there are 20**4 combinations, or 160,000 possible pathways. Additionally, this lowers the chance of a server being used to 1 in 20, rather than 1 in 10, and increases the network throughout by reducing (hop) delay and bandwidth requirements.

Internet servers that connect between the ThunderPort network servers would thus only see fractions of actual fully encrypted conversations. Even 'nation state' AI monitoring solutions would not be able to trace all traffic between devices, although it is known that ISP records matching is a typical starting point to identify devices (and or servers) communicating with one another. Use of relay servers including partial packets, time delays, and more can be effective in defeating such analysis tools.

The ThunderPort network can achieve fully end-to-end encryption, full privacy, invisible connections (to the internet), enables entities to co-host (corporations, government, etc.) without compromising security. Security, simplicity and ease-of-use are attained.

Figure 41:
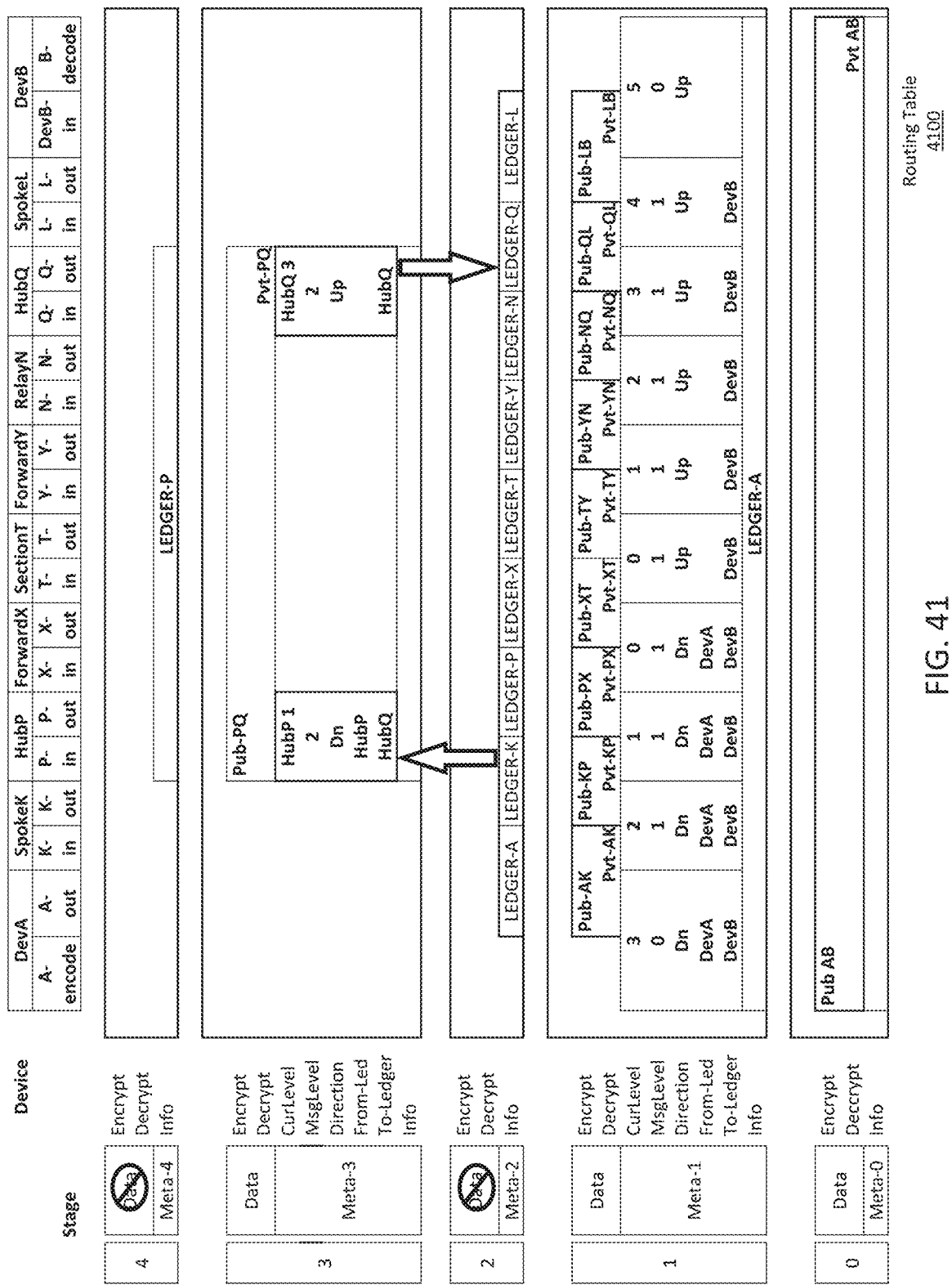
FIG. 41 depicts the route from FIG. 40 in a tabulated format.

FIG. 41 Depicts the Route from FIG. 40 in a Tabulated Format.

In FIG. 41, Routing Table 4100, shows in a simple overview how the data is moved through the network. At the left, one can see the Stages, Stage 0 at the top down to Stage 4 at the bottom. At the top one can see the path that was taken from device A to device B.

Stage 0 reflects the encrypted DATA and META-0 packet, which is encrypted with Public Key AB in device A and decrypted with Private Key AB in device B.

Stage 1 reflects the message as it is moving from server to server. Once can see the META-1 fields being visible and modified at successive servers, and one can see the encryption and decryption taking place between each server. This reflects the P-AK 'type' of packets as they move between servers, (P-AK being the first packet between device A and server K).

Stage 2 reflects the identifier for each successive encryption, which is needed for the receiving server to know which paired key to apply to the incoming message.

There is no data associated to Stage 2, as this reflects an internet IP packet.

Stage 3 reflects recursion. This can be used for shortcuts. One can e.g., envision those servers HubP and HubQ belong to a server farm in a certain location. Rather than routing the message from HubP to ForwardX, SectionT, and ForwardY, a short-cut between HubP and HubQ can be formed. This is a MsgLevel 2 type of message. In this message, the incoming packet gets re-addressed using new Metadata. Thus, the entire packet, P-KP in this case, gets treated as a P-AB message, and is encrypted for the target HubP, using a new pairing key pair PQ (public on P, private on Q).

Chapter IV

Figure 42:
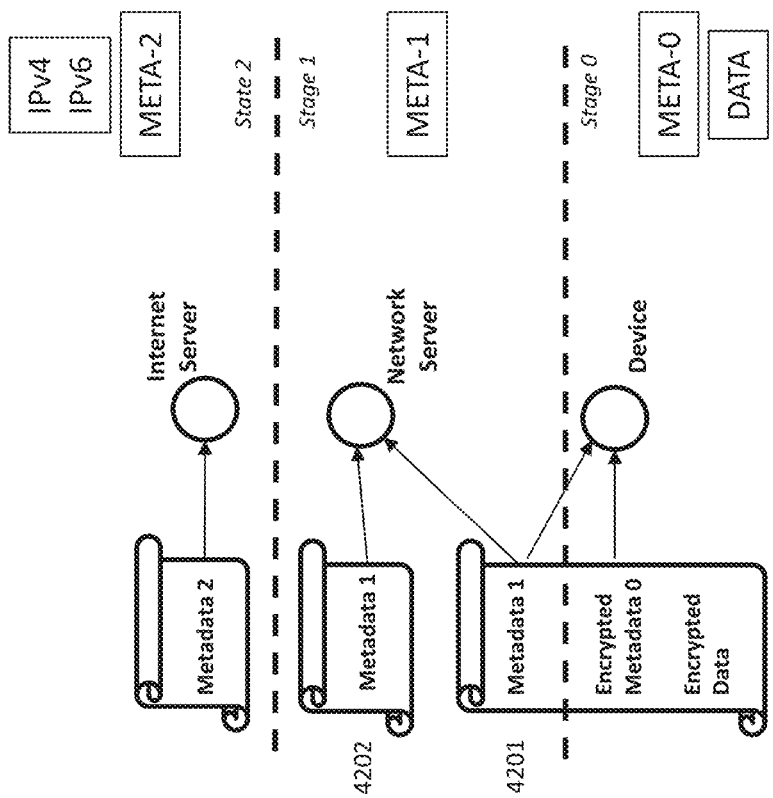
FIG. 42 depicts the basic messaging structure.

FIG. 42 Depicts the Basic Messaging Structure.

In chapter I we describe the message hierarchy existing out of META-0 and DATA at Stage 0, META-1 at Stage 1, and META-2 at Stage 2.

In chapter II we describe how such messages can be securely exchanged between nodes in a network, end nodes typically being devices or servers and internal nodes typically being servers.

In chapter III we describe how the META-1 information can also be used to steer the routing of such messages through the ThunderPort network.

In this part we will go deeper into what the messages may also be used for: a command layer. There are four types of Metadata:

META-0: Encrypted Metadata 0. This Metadata is encrypted in the original message, together with the DATA to be transmitted, and will only be visible to the receive device. This Metadata is not visible to any other node in the network.

META-1: Metadata 1 4201. This is the META-1 Metadata which was created by the sending device and this holds the sender, recipient, and basic routing parameters information, as explained in chapter III.

META-1: Metadata 1 4202. This is the META-1 Metadata which was created by sequentially visited nodes that move a message along in the ThunderPort network.

META-2: This Metadata is used to inform each next node recipient how to decrypt META-1 for an incoming message and is embedded in standard IP packets.

In this part we introduce action commands. One can envision the ThunderPort application program running at each node and end node as an interpreter of a command, shell, language. Such a language forms scripted files which do not need to be compiled. Compiled files, executables, can be supported as well.

In the ThunderPort network, communications are secure, complete, and unmodified. Scripted files, which arrive at an end node, META-0, are additionally encrypted and will have checksum information as to their integrity. We will refer to these as Data Commands.

Scripted files which arrive at internal nodes (servers) are encrypted in transport, but are readable by each node visited. This is by design. We show this as META-1. We will refer to these as Protocol Commands.

We will explain this distinction further in FIG. 45.

Figure 43:
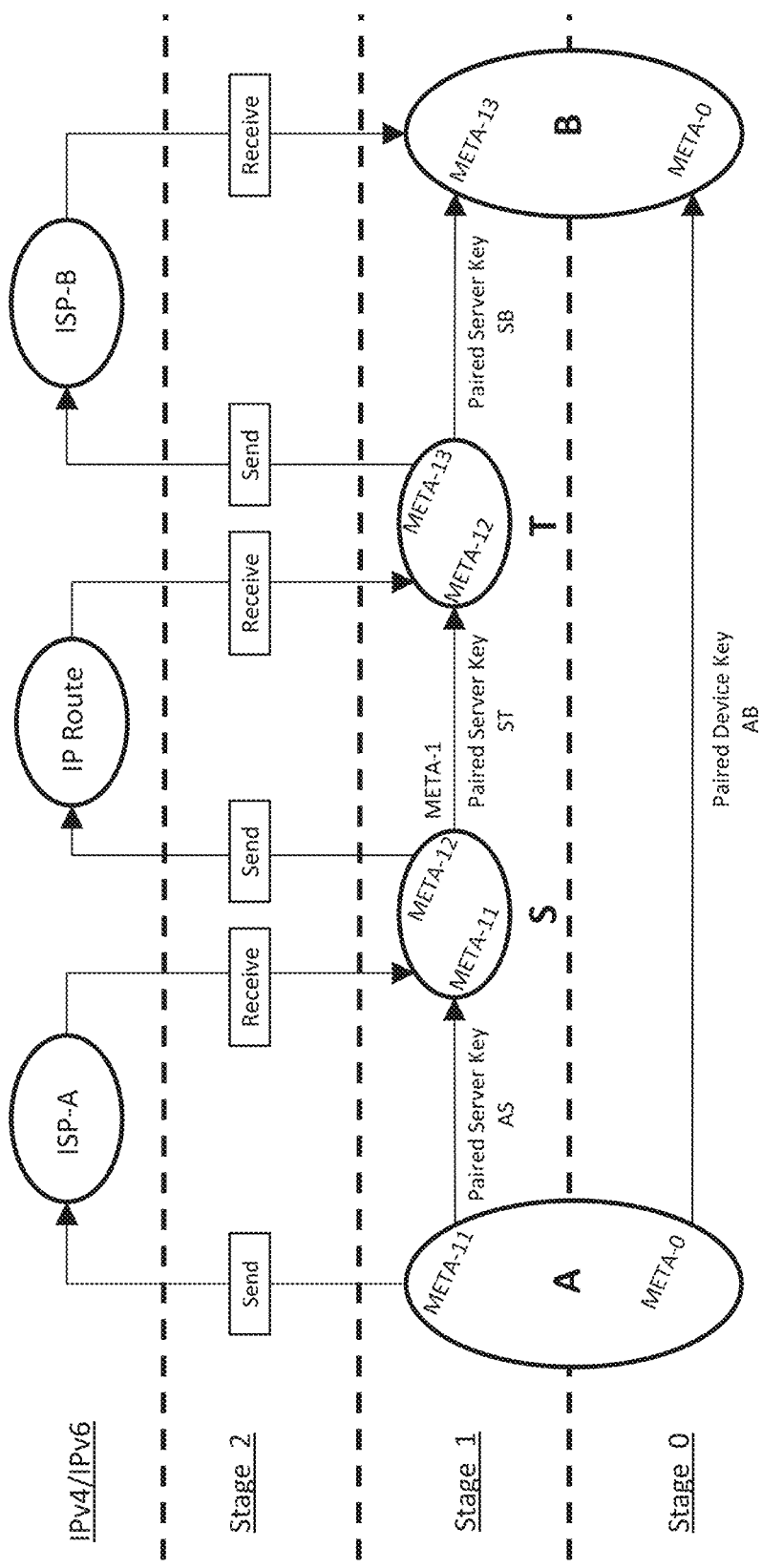
FIG. 43 depicts the basic messaging exchange sequence.

FIG. 43 Depicts the Basic Messaging Exchange Sequence.

First, we bring back the basic message routing through the ThunderPort network. This figure is analogous to FIG. 49 in chapter I but simplified. For this description we merely want to focus on META-0 and META-1 behavior.

In FIG. 43 we can clearly see how META-0 is transferred from device A to device B, through the ThunderPort network, and is only visible to both devices. When we embed Data Commands in META-0, such script file is received on device B unmodified, and can remain encrypted unless used. Device B has the read key—it has previously sent the write key to device A and did not keep a copy. So, unless symmetric keys are used, in which read and write keys are identical, there is no way for hacker software to modify the script file received on device B.

Protocol Commands, embedded in META-1, are encrypted in transit through the internet at Stage 2. At each node (server) the messages are at Stage 1 and the META-1 data is visible. By design, as the META-1 data is used for routing information, and used to decrypt the final message once received at device B. This also means that the Protocol Commands are visible to each server.

Server integrity in the ThunderPort network may be secured by the following. First, any ThunderPort network server can be accessed only through the ThunderPort protocol. Thus, a malicious attack request will not complete. Second, any successful access is based on prior pairing. For this, one has to be a qualified entity in the network. Third, the servers run integrity check daemon programs ongoingly, which scans the system for malicious files, port-mapping, root access, intercepts, debuggers, etc. Although this in principle is superfluous, this is easy to establish. Fourth, the servers do not offer interactive shells: all interaction to a server are preformatted messages, and only META-1 information triggers server activity. That is, the server responds to an incoming message with a data-program response, not an interactive shell response. Fifth, system administration functions are performed. For this, we envision the server being in an 'admin mode' in which it does not perform messaging. Once (re)-configured, the server goes through a boot sequence, which validates programs through network checks, and starts up in 'network mode', that is, all ports will be closed except for the port on which the ThunderPort network services run and this port will only respond to properly formatted messages, which in turn can only come from paired devices. As such, admin shells are locked out, and an admin would have to resort to an IPMI control which allows (remote) rebooting, but not login. The admin can then reboot the server in 'admin mode' to gain access to the server, which turns off the network services. Such a reboot would flag the server status on the network, and the server could be performing an automatic extra configuration check, or force a manual inspection, which it must pass before it would be allowed to return to network mode. A protocol can be developed that protect server integrity and blocks malicious attempts to gain control of the server.

As a result, ThunderPort network servers are deemed secure. We consider such servers private, and they can be hosted in standard data-centers.

Although this is simplified for this discussion, in the ThunderPort network, Stage 1 messaging is deemed secure.

Now, when we consider FIG. 43, we can see how each server has access to the META-1 information, and we rely on the server integrity to maintain network integrity. META-1, as previously explained contains the decryption handle for the end-node as well as the routing information for the network, all injected by the sending device.

The sending device can also inject script files, with Protocol Commands. Such commands can vary in many ways. It can trigger a server to perform an additional check, or to start a verification call back sequence, or to track performance statistics.

As the META-1 data is aggregated through the routing, the last servers, prior to the end node, can accumulate such information for the network. This role is typically reserved for Relay servers, as previously discussed. So Relay servers can have additional software layers that can analyze accumulated data, store or upload this to Analysis servers, and strip this META-1 data from the message before forwarding it to the end node.

Additionally, the ThunderPort network can push Protocol Command script files to any of its nodes which trigger upon certain conditions. E.g., random (time interval), always, context-based conditions, are examples hereof.

Because network routes between devices are dynamic and formed only when the message is in route, there is no guarantee that a certain server is used in the path. This can only be forced by the sending or receiving device—by limiting the list at one of the levels to only a single server. The benefit of this is that an 'always' check can be performed.

If such a structure is desirable, for protocol verification, the 'single server' can be envisioned as a group of servers, rather than a true single point. This can be explicit (all servers at that level behave similarly) or this can be implied (a group of servers in which each acts as the same server).

A more typical way to trigger certain protocol checks it to set up predefined levels. E.g., if a message starts at Level 3 and reaches Level 1, the server, which gets the message through the routing, can then trigger a protocol check which is trained for this condition. As this can be an unknown server, this type of check is pre-installed in all servers.

Figure 44:
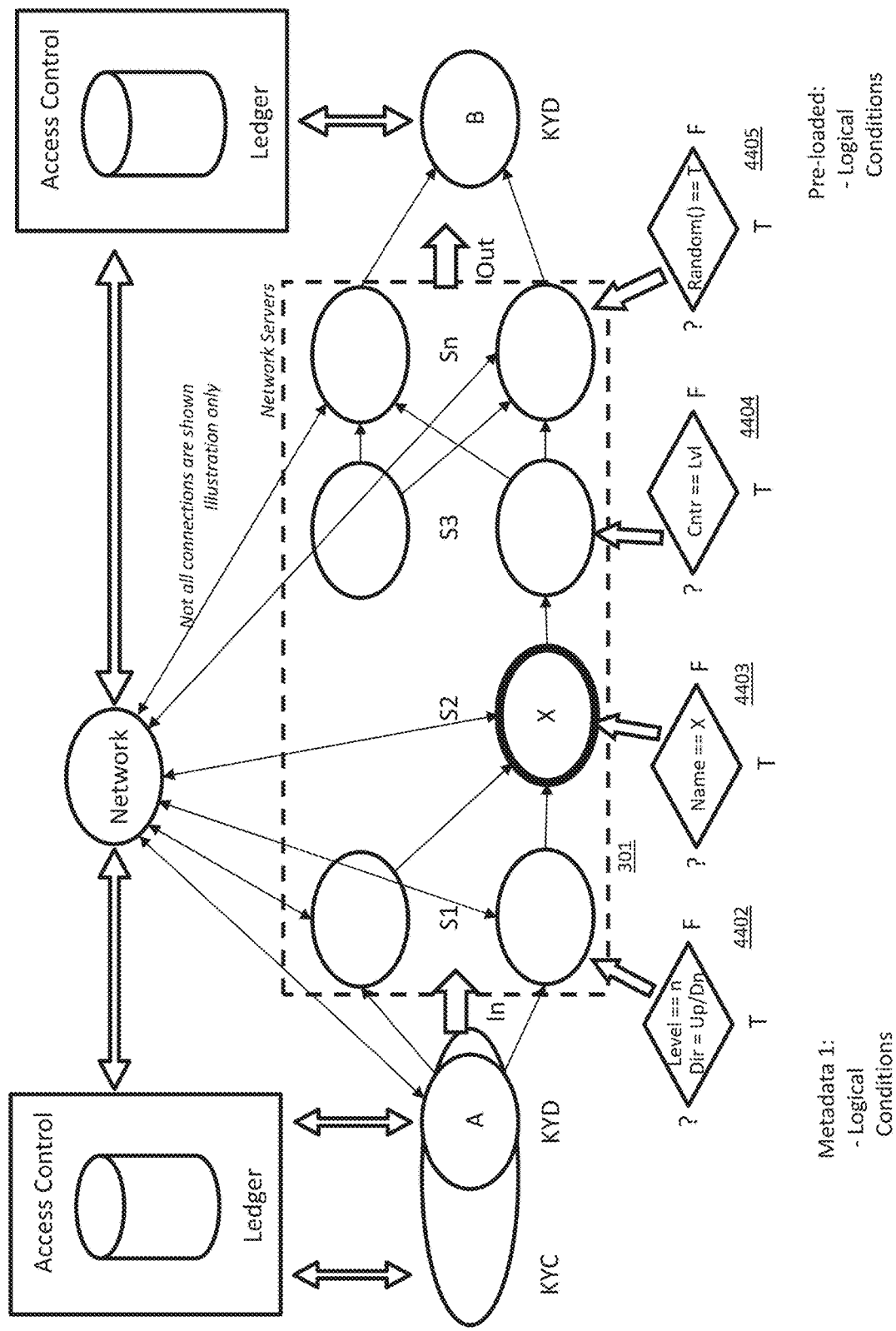
FIG. 44 depicts the ThunderPort network with focus on decision during message routing.

FIG. 44 Depicts the ThunderPort Network with Focus on Decision During Message Routing.

In FIG. 44 we show these modifications: server X 4401, at S2 level, is shown as a single server. In such a case, a protocol command can be structured which triggers on the server name, such as 4403 shows. This command can be inserted by the sending device in Metadata 1. Of course, with the caveat that such a route may be down at times, unless server X has redundancy, as there is no way to complete the path without using server X.

Other checks are shown as 4402, 4404, and 4405. These depict other types of triggers that can occur, based on context or predefined trigger methods. These checks can be inserted in the Metadata 1 and be evaluated at each server, or can be always included when the server unpacks and repacks a message.

FIG. 45 Depicts Examples of Commands Inside Messages.

Next, we take a look at what type of messages we might make use of. We spoke earlier of Data Commands in Metadata 0 and Protocol Commands in Metadata 1. FIG. 45 gives some examples.

Rather, the big distinctions between the two command levels are twofold:
1) Data Commands are always interpreted at the end-node. That is, the node receiving the command is known. Protocol Commands can trigger on nodes that are unknown.
2) Data Commands can have persistent local data; Protocol Commands can only operate on network persistent or 'in-flight' data.

The two commands can work together at the end nodes. An example: a license expiration check at a device could trigger a license update request, which initiates a protocol back to a license/admin server.

A remark: End nodes are not necessarily devices. In smart contracts, many end nodes will be dedicated servers, paired to one another or to user devices. From the ThunderPort network, such servers are not nodes, but end nodes, and they are alike devices.

Protocol Commands are mostly applied to verification, whereas Data Commands are mostly applied to data gathering and manipulation.

Figure 46:
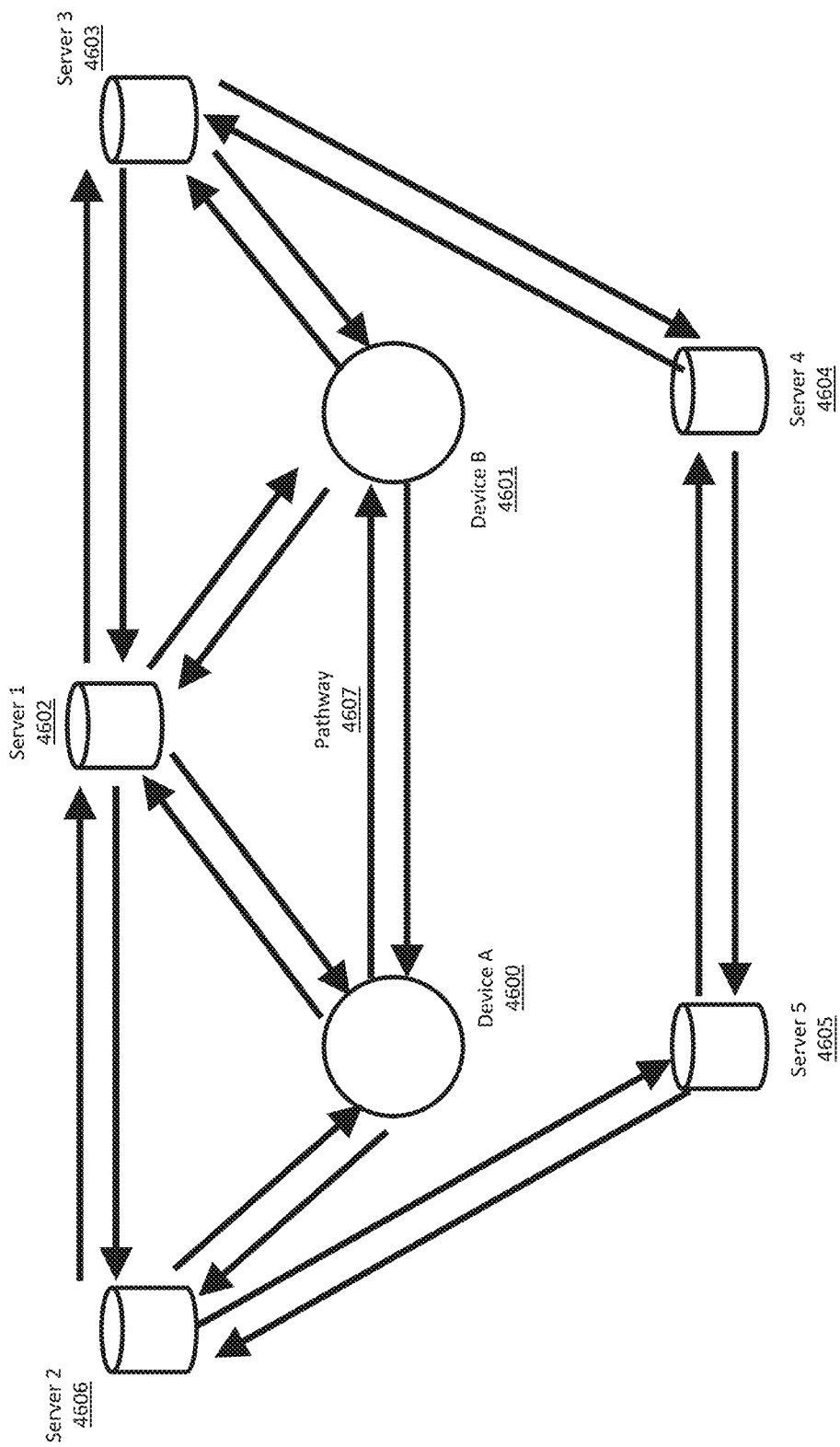
FIG. 46 highlights a network interconnect structure.

FIG. 46 Highlights a Network Interconnect Structure.

FIG. 46 is a contrived example, but we show this to explain Protocol Commands and verification. Shown is pathway 4607 between device A 4600 and device B 4601. This pathway implies a message route such as depicted in FIG. 43 or FIG. 41. We omit such details in this diagram. Implied is that this represent all possible physical pathways that can be selected.

We show a number of other servers present in the network: Server 1 4602 through Server 5 4605. (If these were used to route the message, then we ignore that for now).

And, for this example, we merely put in a verification request in Metadata 0. So, the network does not see this request until device B decrypts it.

Figure 47:
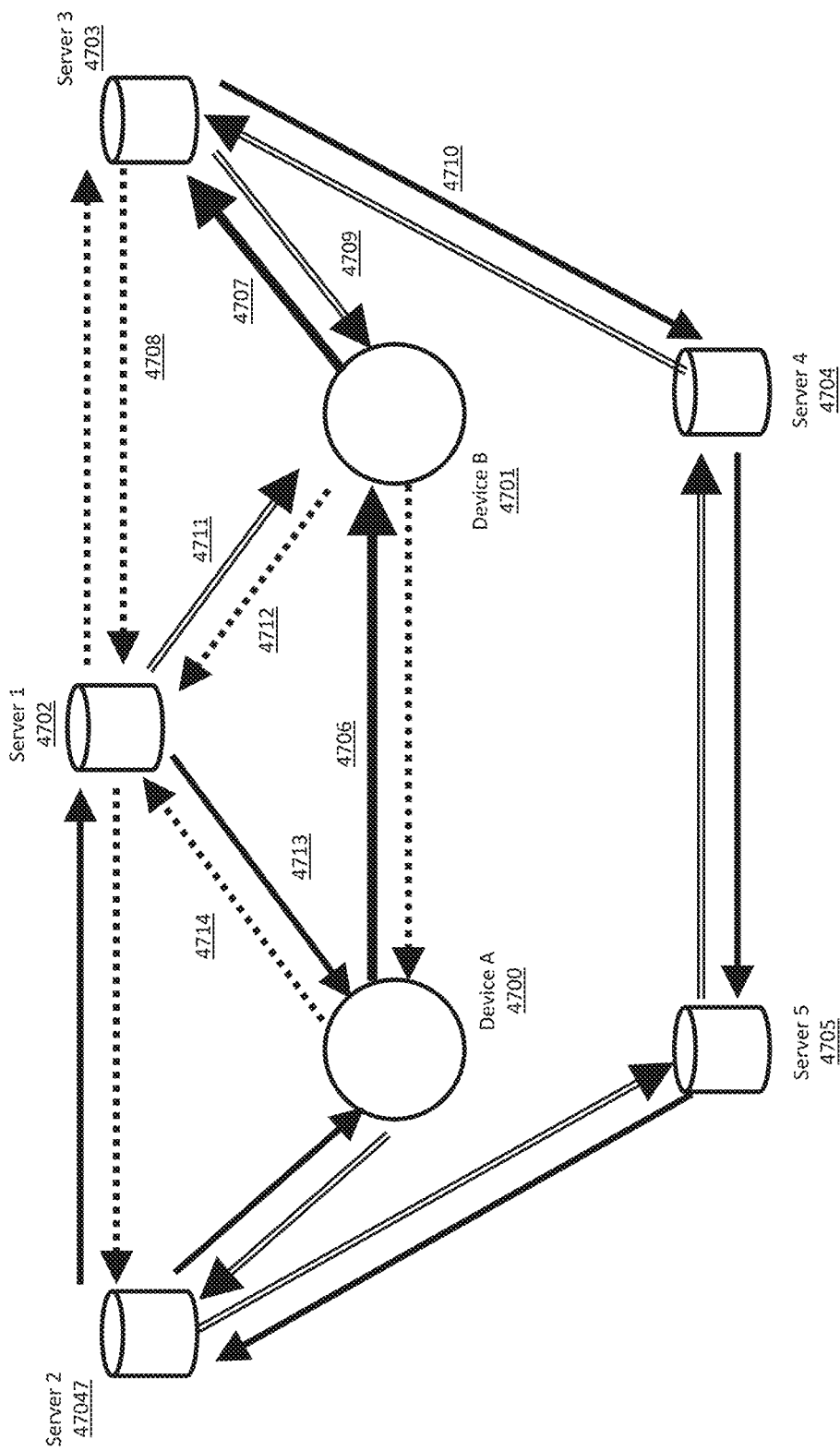
FIG. 47 depicts how command message can trigger parallel activity on a network.

FIG. 47 Depicts how Command Message can Trigger Parallel Activity on a Network.

In FIG. 47 we now depict how this Metadata 0 request can trigger a host of network activities: We use three line-types: solid for forward actions (new request), double outline for check back verification, and dotted for remote confirmation. This is a mere illustration of activities; it is not meant to represent a specific protocol.

We show the original message as a solid thick arrow 4706. Upon receipt, device B could send a Protocol Command over connection 4707 to Server 3 4703, which in itself triggers another Protocol Command over connection 4708, 4709 (check back with device B), and 4710. Each of these Protocol Commands can start other commands, such as check back with device A, check with Server n (n being a number), and so on. In this example, one could imagine a protocol being defined which effectively checks all arcs in this network diagram, and includes two call backs to device A with one final confirmation.

At ThunderPort, we not only complete such a Protocol Command and Data Command language, but may also make this available for developers with simulator that depict the activity.

The network depicted may not be a network of ThunderPort servers. Rather, these could all be end-points in a smart-contract defined protocol. That is, the ThunderPort network is implied, and all the arcs actually represent Metadata 0 communications. Such a protocol can now implement complex smart contracts, which could autocomplete, or which could halt and wait for interaction at each point. All arcs would be through the ThunderPort network. FIG. 47 shows an introduction of how Metadata can communicate Protocol and Data Commands which are utilized to implement complex protocols. Such protocols can be used for network integrity verification and smart contract implementation.

In this part, we will explain how this Metadata approach can be utilized to realize a method of connecting user devices and enable social functions such as data sharing, search, and remote file management.

Figure 48A:
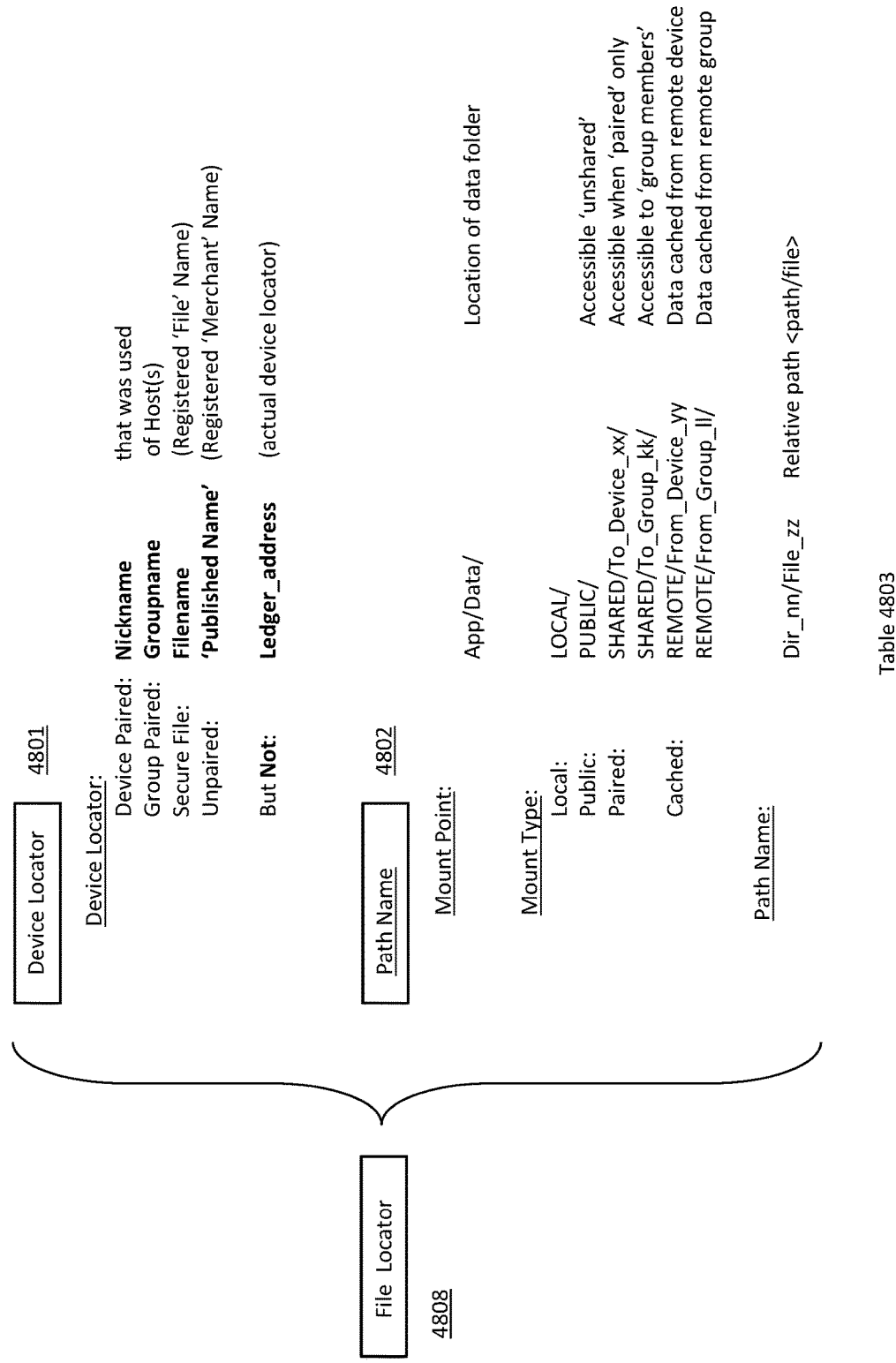
FIGS. 48A and 48B depict a file locator approach which works across devices.
Figure 48B:
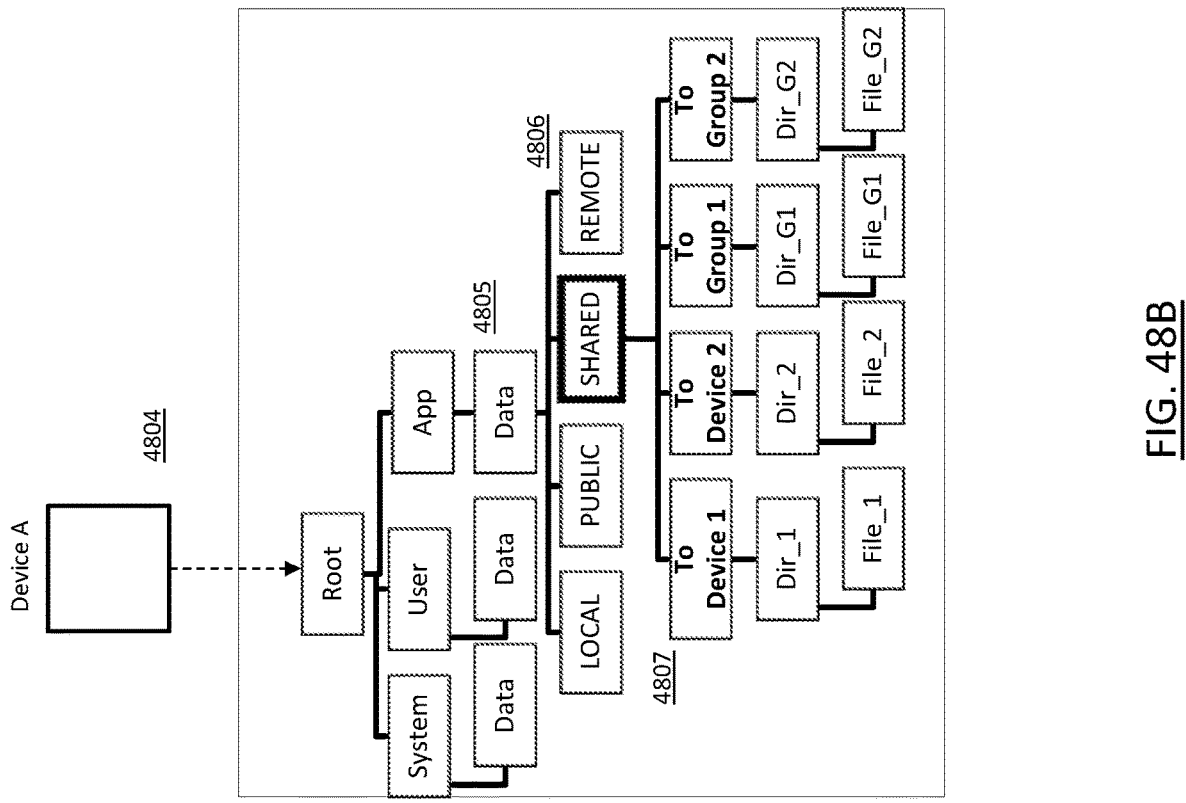

FIGS. 48A and 48B Depict a File Locator Approach which Works Across Devices.

We introduce two elements required for locating a file in the ThunderPort network: 1: Device Locator 4801; and 2: Path Name 4802. The Device Locator identifies a remote device. The Path Name identifies the filename on the remote device starting from a file mounting point.

When combined, they form a File Locator 4808 which enables a device to link to a file located on a remote device.

Device Locators are constructed such that they are meaningful for a device, but not for sharing between devices. We wish to hide the Ledger addressing scheme as part of the Device Locator method. This is for privacy reasons. One can think of an email contact showing up as "Jim A<jimA@abc.com>". In a comparison, "<jimA@abc.com>" would be the proper addressing, as it shows the absolute name for the location. In our case, this is the Ledger address. However, "Jim A" suffices for the person that has the contact list on its device.

Remember, in the ThunderPort Network, connections are paired connections. (Two exceptions are addressed below.) In a paired connection, the device, group, file, account, server, etc. (all different DLNN ledgers) that one pairs to also receives a given nickname. Nicknames mean nothing as a global locator—they are only meaningful on the device. This is done on purpose. The Device Locator is not meant to be shared, it is meant to be a method to indicate which paired device (or server) one wants to connect with.

If one used the Ledger Address as the Device Locator 4801, file locations can be shared globally. In principle, this can be done, but this opens up methods and ways for data mining that we may wish to block.

Two exceptions include the following: 1) Merchants: We will explain in the Search section below how merchants can promote themselves in search activity. For Merchants, a registered name, rather than a Ledger address, will be utilized. 2) Proxy: We will also explain this in the Search section below. Proxy represents a link to an unpaired contact, also used in search. Proxy providers actually do not share files and directories, rather they provide content.

Path Names are a familiar construct. One version, shown in Table 4803 is that of using forward slashes between directory names with the remainder past the last forward slash representing the filename in the last directory.

Table 4803 depicts a Mount Point as "App/Data". Next it shows a Mount Type, in this list we include: Local, Public, Paired, and Cached. And then it shows a Path Name, as Dir_nn/File_zz.

We explain this pictorially at the right-hand side of FIG. 48. First, we see device A 4804. When the app is installed on a device, the app will have a directory assigned to itself. This will be located at the Mount Point 4805. The Mount Point in this example is/Root/App/Data. The prefix "/Root" can be omitted in some operating systems, or it may be expanded in others. Underneath the Mount Point, we see a set of directories 4806 which matches the table Mount Types in Table 4803. This is not meant to be exhaustive. We can also see the Path Name: e.g., Dir_2/File_2 could be a representative file of the Dir_nn/File_zz format There is one more hidden layer in 4807 which shows "to Device xx" and "to Group yy" type of fields. This may be hidden, as this is managed by the pairing, and is included in the mounting. Without going into further detail, the "to Device/Group" and "from Device/Group" layer does not have to be a physical layer, it can be managed differently. Similarly, files that are to be shared, do not physically have to be in a directory such as "to Device" or "Shared", this can be handled through tag and index files. A user interface to the user can hide all this. Sharing is however done on a pairing basis, and pairing information determines what remote device will show to one another.

If device A has been nicknamed e.g.: "John", then the Device Locator will be set to "John". In this case "John" refers to a local reference from the paired device.

The 'absolute' Path Name would be "/root/app/SHARED/To_Device_2/Dir_2/File_2" on device A, if all directories are expresses as shown in FIG. 48. But, if types and device links are done through application software, rather than through explicit directory naming structures, the Path Name could be reduced to "Dir_2/File_2" and the file would then carry "SHARED" and "To_Device_2" as properties of that file.

Either way, we describe a method to refer to a file in the ThunderPort network by a File Locator, which is comprised out of a Device Locator+Path Name. Any device can thus point to files that are residing on remote devices.

Figure 49:
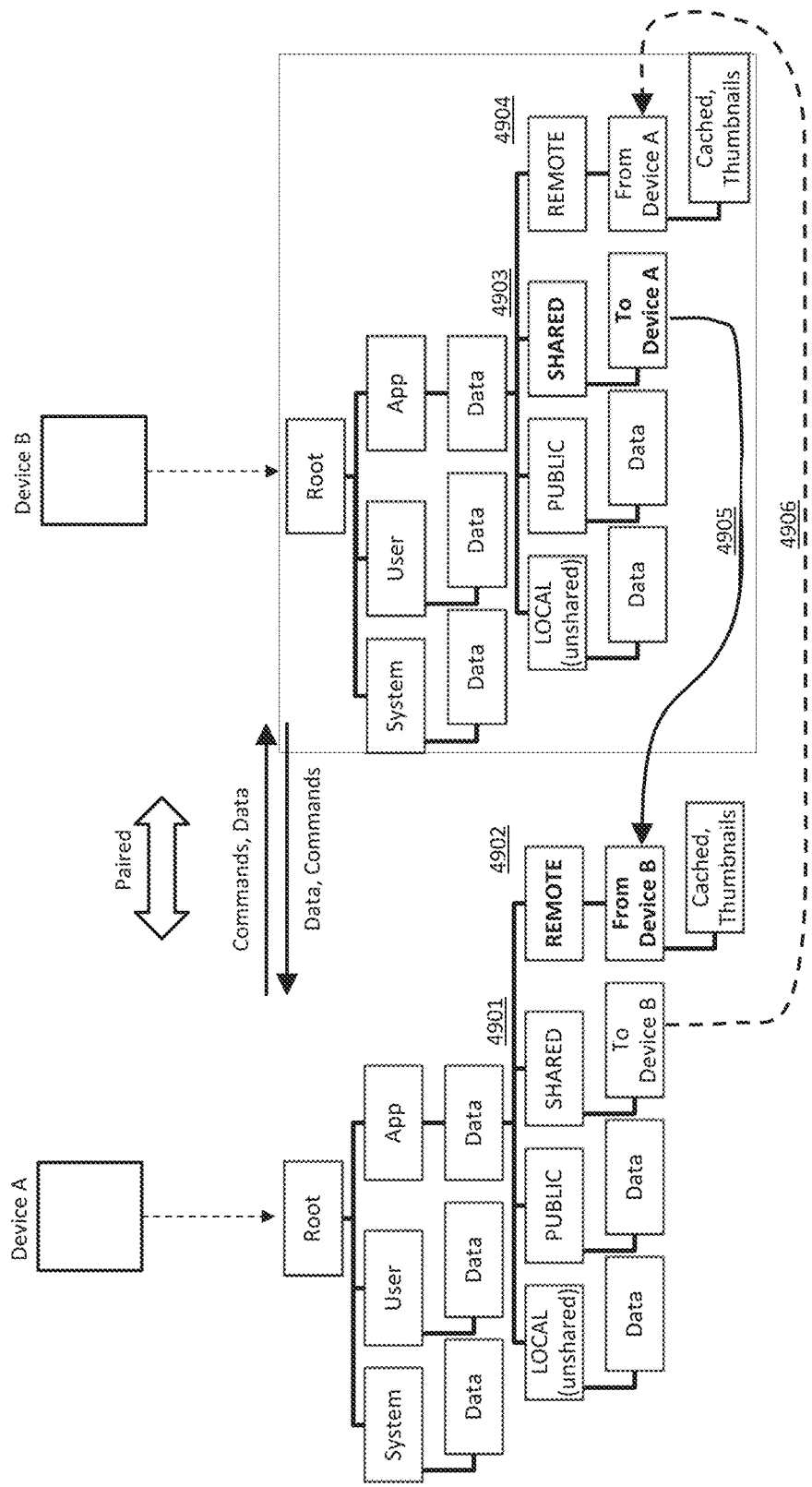
FIG. 49 depicts how devices can link to each other.

FIG. 49 Depicts how Devices can Link to Each Other.

In FIG. 49 we show two devices, device A and device B, side by side that are sharing files. We omit the Dir_nn/File_zz layer, and merely depict how the two devices can locate data on each other's device. For this, we first identify the two directories SHARED 4901 and 4903 in each device and the two directories REMOTE 4902 and 4904 in each device.

Then, we see arrow 4905 linking the "To Device A" folder in the SHARED 4903 folder on device B to the "From Device B" folder in the REMOTE 4902 folder on device A. This "From Device B" folder then holds cached data and thumbnails.

Linking across devices is now possible using the File Locator.

What we thus have established is a data organization on both devices, virtual and physical, which has linked shared data between two devices, not only as an access method but also by allowing cached and thumbnail data, assuming that the file rights are such that the sharing allows for this. Various sharing rules may be used.

In our message structure which we introduced in FIG. 1, we have the DATA and META-0 layer which we utilize here. We can embed commands such as "find <wildcard>" to search for files with certain properties (date, person, location, name, other tags) on a remote device. However, such searches are limited: e.g., one cannot search in the pairing hierarchy to another device nor the LOCAL folder, but searches in PUBLIC or SHARED-to-the-device folders are valid.

It should also be noted that files that are shared do not have to be physically placed inside the named folders. If a user tags a file to "share with John, share with Phyllis, share with Jim", this results in datasets that hold such information. The file does not need to be relocated, nor does the file need additional properties have added to it. File management systems and file browsers are familiar with this concept. Care must be taken in the user interface as to how to display this.

Alternatively, some user interfaces have 'drop folders' which auto-tag files that are placed in such folders. These folders may also exist outside the application hierarchy. Properties are associated with files which allow them to become visible to a 'shared device' (or 'shared user').

Having established the linkage of FIG. 49, and having a search function resulting in a match found on the remote device, we can then also invoke the DATA and META-0 message communications to actually fetch the file on the remote device, and transport this to the requesting device.

This method can also be applied between devices and servers, and can be initiated from either side: e.g., a server can push a file to a device, such as an updated marketing presentation. Or vice versa, a user can download a music file from a music server securely using this method. Each shared file carries many properties, most notable properties such as lease-time, can-be-edited, can-be-forwarded, local-copy-allowed, or remain-encrypted, etc.

The latter property may operate as follows. If device B shares a file with device A, this file will be encrypted by device B when it sends it to device A. So, device A does not receive a digital copy of the file from device B, rather, it receives a uniquely encrypted copy of the file from device B. This encrypted copy can only be read on device A, and is useless for other devices.

Device B can allow for the encrypted copy to be decrypted and stored as a local copy on the remote device. In such a case, the local copy can still be tracked, but additional copies made are outside the monitoring scope. This may be valid for picture sharing between family members, but may not be desired for copyright materials such as music or video.

This brings up an additional layer of protection: encrypted files must be decrypted by the local ThunderPort application to retrieve their unencrypted copy. However, this unencrypted copy will be exposed to the filesystem, and one can make unauthorized digital copies. In an embodiment, ThunderPort envisions to not decrypt files into a local digital copy, but rather into a stream of data to be displayed in the final application, such as the picture, the text editor, the presentation file display software, the music or video player, and so on.

Although this does not prevent re-capture (e.g., taking a picture or video of the screen using another device), it does prevent unauthorized sharing of the original digital content, as only the encrypted content will exist in the device.

Encrypted digital content has two benefits: 1) it remains access-controlled (by decryption) which allows local licenses (e.g., time licenses) and remote licenses (e.g., server controlled) to be applied. 2) Further distribution of the content is blocked, as the decrypted files would never exist, they are only generated 'in flight' when needed.

Figure 55:
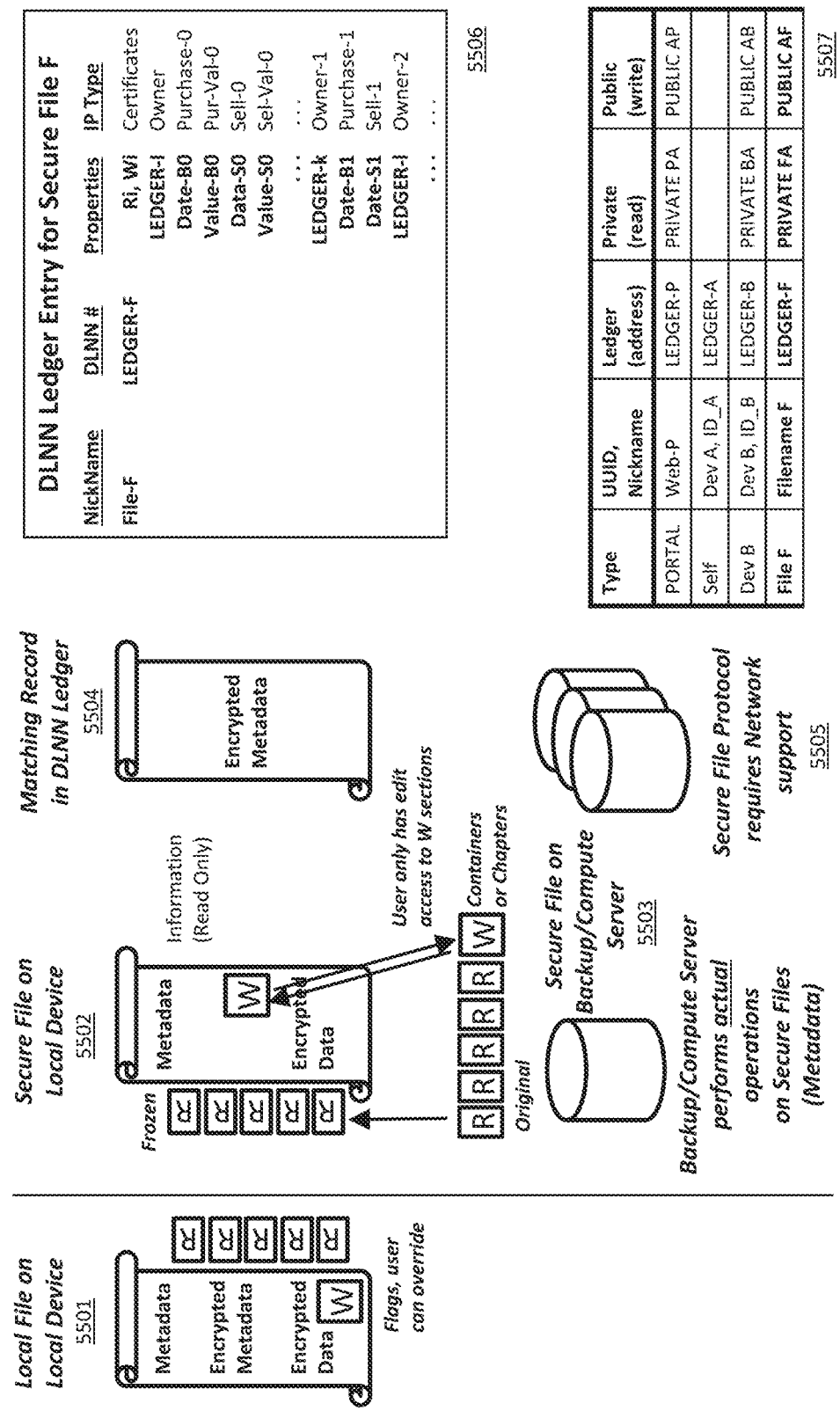
FIG. 55 depicts a regular file versus a secure file interaction.

This may not be sufficient for high-value digital data, which we will explain in FIG. 55. For this we introduce another concept: Secure Files.

But for most practical applications, the encrypted content, coupled with secure players, viewers or editors, satisfies a lot of applications, such as DRM or remote DOC file management.

First, we want to deepen the search functions. We have explained how paired devices (and/or servers) can facilitate searches between one another. This can be powerful, because one does not need to upload any information into 'the cloud'.

The same search can be used to also find information in the ThunderPort network from devices (and servers) to which one has not previously paired. For this we turn to FIG. 50 for an example.

Figure 50A:
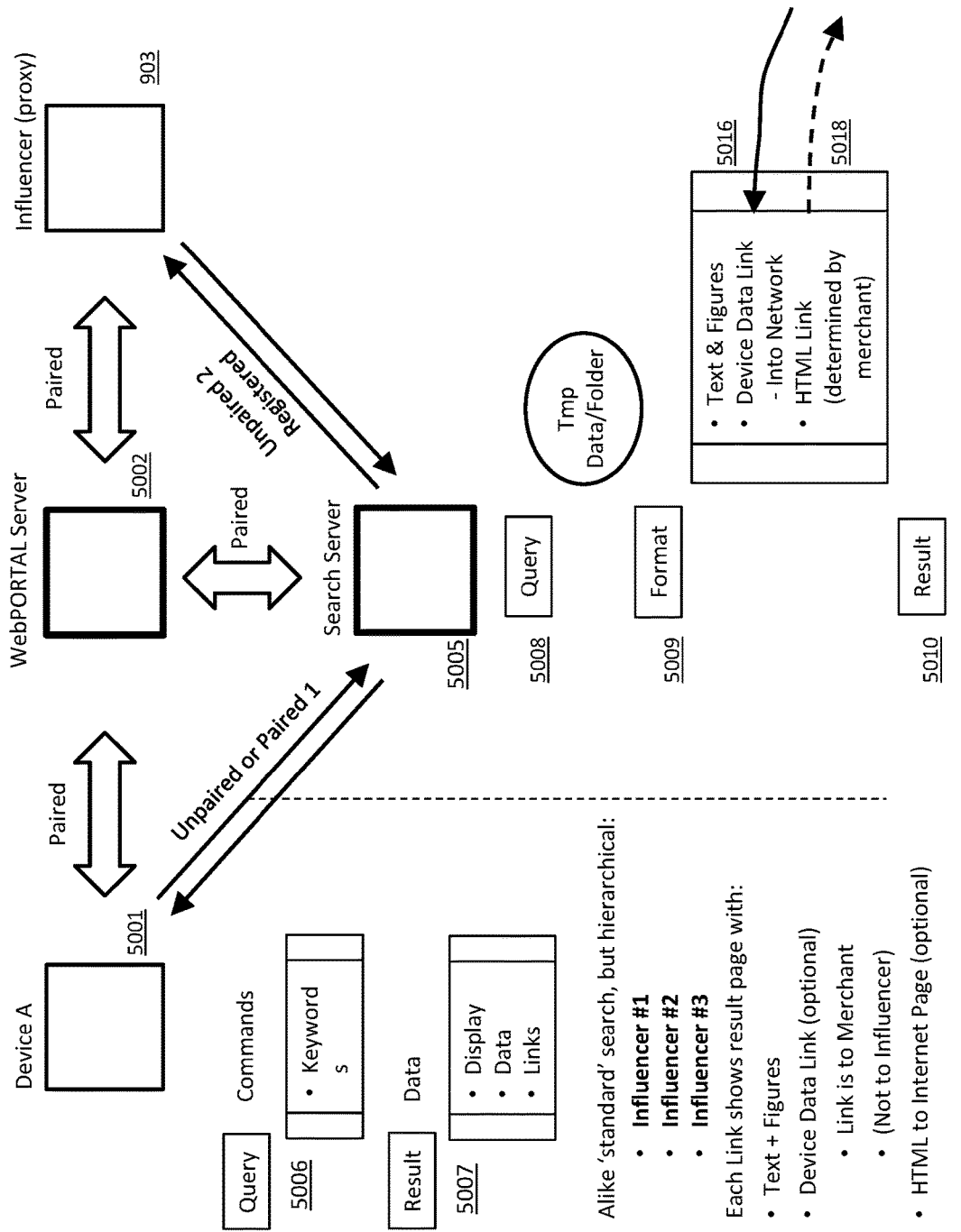
FIGS. 50A and 50B depict how influencers can aggregate data and produce non-paired results.
Figure 50B:
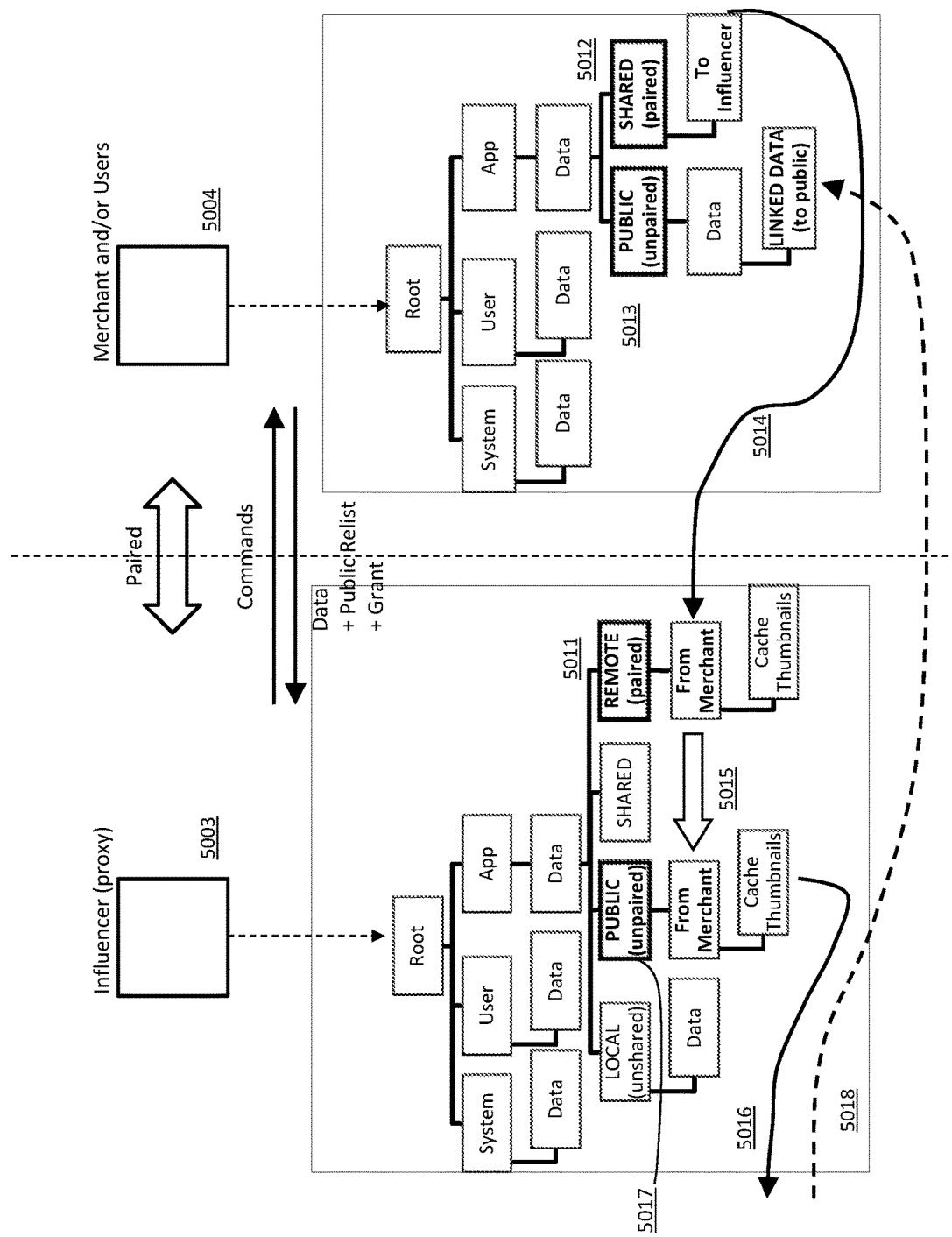

FIGS. 50A and 50B Depict how Influencers can Aggregate Data and Produce Non-Paired Results.

Previously, we showed how devices would link data between a SHARED and REMOTE folder (or property). In FIG. 50 we will expand this to how this is envisioned for merchants.

First, we introduce an Influencer 5003 and a Merchant 5004. Influencers are used as a proxy. Merchants can also be users, as long as they are paired to the influencer.

Pairing between the Influencer and the Merchant takes place similar to pairing between devices A and B in FIG. 49. We see how a SHARED directory 5012 on the Merchant 5004 device is then linked 5014 to a REMOTE directory 5011 on the Influencer 5003 device.

We also introduce the directory named PUBLIC on both devices: 5013 and 5017. It was shown in FIG. 49 but not used, here we will use the PUBLIC directories.

Next, we consider the user device A 5001, the WebPORTAL administration server 5002, and a Search server 5005. User device A 5001, Search server 5005, Influencer 5003, and Merchant 5004 are all in the ThunderPort network, and are thus paired to the WebPORTAL server 5002, but device A has not been paired to either the Search server or the Influencer (or the Merchant). So, the 'standard' remote device search function cannot be utilized.

When a user uses device A to start a search Query 5006, it will enter certain keywords, expecting a result. The ThunderPort application will then send this Query to a Search server 5006 which it selects based on geolocation data.

These searches may not compete with or replace existing search engines. Rather, they complement such search engines by providing local searches into Merchants that provide services for such community. The Merchants do not have to create HTML pages, a website, a Facebook page, etc. Anyone can be a Merchant.

Certain searches are not well served in the existing search engines. Imagine that one is on vacation in Mexico and would like to find a reputable Taco Stand near the hotel where one resides. This is where we introduce the proxy search: The ThunderPort network will identify a search server which covers the area where the hotel is located. This does not need to be GPS based geolocation, this can be done based on IP address alone. The server thus identified will take the search string "Taco Stand" and send this to proxies that it has identified as serving the area. This is a List, not shown in FIG. 50, that the Search server creates either static or dynamic, based on certain parameters: 'best match', 'fastest response', 'closest location', 'English language', 'local score', and so on.

Next, the Search server sends the Query message to each of the Influencers it has identified in the List. Each of the Influencers contacted have a limited time to produce a formatted search result: this can look like an HTML formatted page, except that provided links can be both to HTML pages as well as PUBLIC directories on ThunderPort Merchant devices. Influencers can speed up the response by having pre-formatted search results, assuming many searches will use similar key words.

Then, the Search server receives a message 5009 from each Influencer until a certain time-out occurs, or sufficient Influencers have responded. At that time, it formats a hierarchical message, which is then sent back to the requesting device A. This Result 5007 looks different than a traditional search, in that it lists each influencer, which a sub-page that can be expanded. In the sub-page, one sees the message as the Influencer created this, with links that the Merchant created: both HTML and PUBLIC directories are supported.

A user can click on either link, and enter a web browser for the HTML page, or view the PUBLIC directory browser inside the ThunderPort network.

One can think of this search method as a 'live' search. There are no giant databases and machine farms searching the internet and computing relevancy. Influencers can be locals, e.g., students, with sufficient computer skills to produce search result pages. Influencers may prefer to operate on Personal Computers or Private Servers, rather than mobile devices, as they may see increased activity. Merchants can be anyone, they can operate from a mobile device, and do not need to host, upload, or format anything in particular. The PUBLIC directory may have a simple format that fits Merchants without having to edit files (just enter data and images through some forms and a user interface).

However, such search can provide relevancy and be very current. E.g., queries such as "Which bar has early hour specials?" or "Where is tonight's action?" may mean little for traditional searches, but could be interpreted meaningfully by the Influencer.

Also, aside HTML pages that may exist, this search does not search the 'internet', rather it searches 'local devices.' It is a different method of connecting people.

This type of searches can be implemented on a global scale. Influencers can be at any location around the world. Payment between merchants and influencers can be administered by the ThunderPort network as it can track user's activity and convert this in scores. This type of search could allow influencers to make a decent wage while merchants pay very little compared to current solutions.

Also, Influencers will cater to local language, behavior, keywords. These search results are optimized by people, and may vary significantly between different locations.

One also should note that the expense of this search solution can be extremely low. Other than Search servers which ping and format messages, there is little to no overhead. Data is stored on Merchant and Influencer devices. Bandwidth consumed is minimal. And the relevancy of these searches can be very high, making them popular.

An example: searches can search into groups (this will be explained in chapter V), which makes them very accessible and relevant. Since the group information is not posted, an internet search would be moot.

Local communities can expand from "the Taco Bar near the hotel" to "anyone selling straw hats in the USA", they are not necessarily bound to a locality.

Figure 51A:
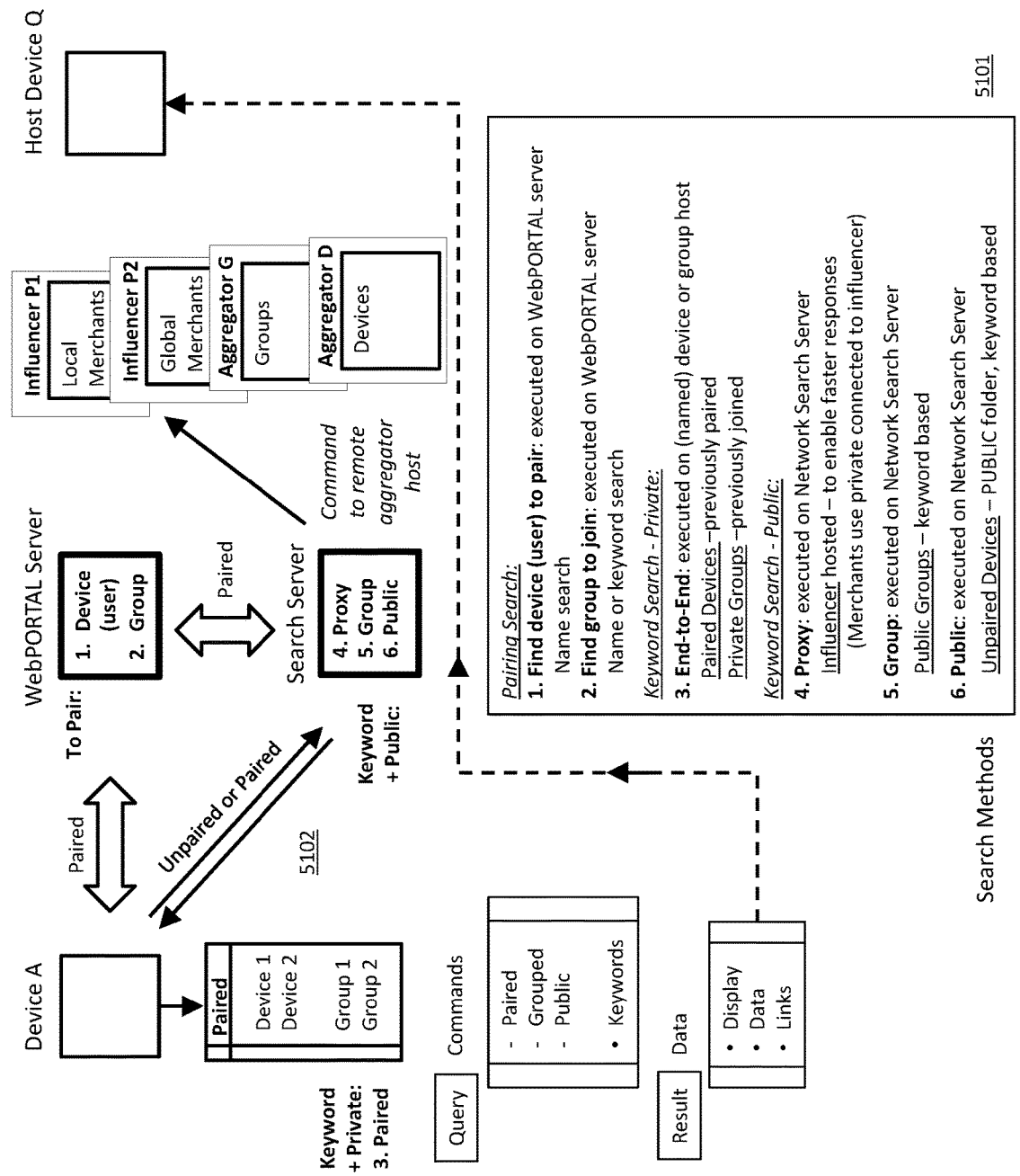

FIGS. 51A and 51B Depict how Search Functions Become Distributed Search Functions.

FIG. 51 steps up the search function one step higher, and it combines all the search methods into one. In Table 5101 we first identify the methods introduced:

1) Device (User): This is a search to pair with another device (or user). We do not distinguish in this application between device and users. Please note that devices are in the Device DLNN Ledger, and users are in the User DLNN Ledger. In one embodiment, the devices can pair. Hence our focus on devices. Device pairing would typically take place between two users on the system. However, in one embodiment, device and user searches will not be supported. In one embodiment, users must first contact each other through other means before they can be linked in the ThunderPort network.
2) Group: Group (name) search is a specific search request, as it is executed on the WebPORTAL server too. This is explained in chapter V. In one embodiment, only groups that want to be publicly visible show up in these searches. Other, private groups use other means of having group members find them and join them.
3) Paired: Paired searches are valid. One can search for shared data on a paired device or in a paired private group.
4) Proxy: Proxy represent a search into unpaired devices from local Merchants using Influencers (and Search servers). The slide shows both Influencers and Aggregators. Influencers could represent Local Merchants P1, Global Merchants P2, whereas Aggregators could represent (public) Groups G or (PUBLIC directories in) Devices D. Other distinctions are also possible.
5) Group: Group (data) search represent a search into unpaired public groups that publish their data publicly.
6) Public: Public search represents searches into PUBLIC directories of mostly Merchants.

Search types 5) and 6) could be slow and yield very little useful info, unless specific search strings can be used. In one embodiment, search types 5) and 6) could be hidden and be utilized to understand and optimize the network and system behavior.

Most meaningful searches are 3) Paired and 4) Proxy.

We also depict how filtering can be constructed in some type of user interface, an example of such is drawn up in Table 5103 which shows the various data fields one could use to search, using wildcards and selections.

Diagram 5102 depicts in a graphical manner how search data is manipulated through the network. Search happens in three different places, depending on how the users sets up interface 5103.

Searches 1) and 2) are provided by the WebPORTAL Server.

Search 3) is done, in a first step, by the device itself, using locally cached information. A deeper search can be done by invoking a remote search, in which case the search command is transmitted as an action command to the remote paired device which can then provide a search result on the paired remote data. Such a search request can take longer, and may wait for a remote device to come back on line (e.g., by holding the request at a relay server). Note that such searches are also limited to provided tags (pictures of grandma, pictures at grandma, grandma's birthday, etc.). Efficiency of this search depends on how users organize (autotag) or tag data.

Search 4) is explained above in more detail, and relies on a Search server, and should have a fast response.

Searches 5) and 6) are more specific geared towards finding unpaired information, such as provided by published groups in 5) and published merchants in 6). E.g., one could find groups that share a keyword ('butterflies', 'stamps', 'photography') in 5), or merchants that use a keyword ('watches', 'tickets', 'furniture') in 6). Without sufficient filters, these searches can be very slow. Interim search results could be displayed as results are being provided. Also, such searches are not intended for data-mining purposes, and the network can impose time-out limits to curb use of these type of searches. SEO type of optimizations are also possible, but are outside the scope of this application.

Figure 52:
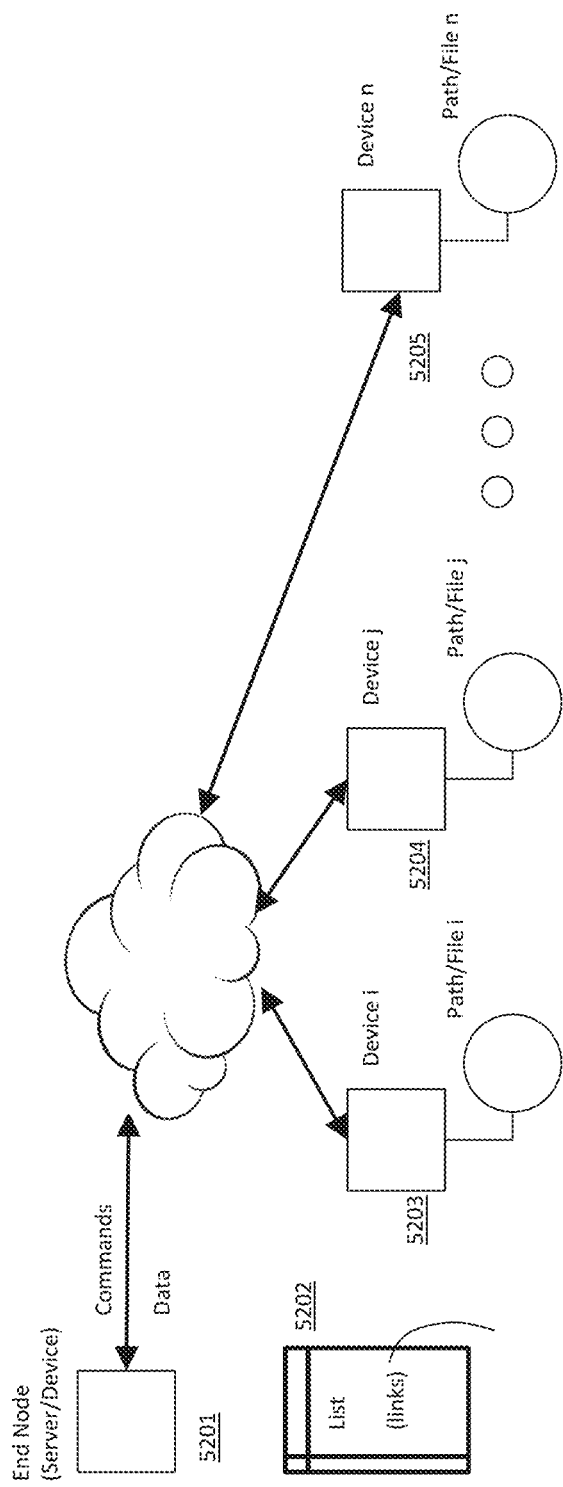
FIG. 52 depicts how commands can be used to track distributed content.

FIG. 52 Depicts how Commands can be Used to Track Distributed Content.

End Node 5201 can be a server or a device. E.g., assume a music file server which wishes to track downloaded music files, or a marketing server, which wishes to track downloaded presentation files.

Each file which gets downloaded would have specific properties, such as "remain-encrypted" and "track-location". The first implying that access to the downloaded file can only be done through the ThunderPort application software (which has the ability to decrypt the content) and the second property implying that the file can only be located and/or moved through the same ThunderPort application software. Other properties may also exist.

Then, a file that is downloaded, can be used (played for a music file, browsed/presented for a marketing presentation file) as often as the user wants (if allowed) and as long as the user wants (if allowed).

In a first embodiment, devices are all paired to the End Node. This can be relaxed through use of a proxy, but pairing devices and End Nodes simplifies the discussion somewhat.

Since the devices are thus paired to the End Node, upon each download, the End Node 5201 can now simply add the Device Locator 4801 and Path Name 4802 as discussed in FIG. 48. So, the End Node is able to compile a List 5201 of all devices which have a downloaded encrypted copy of the requested file.

Now imagine that the marketing department updates the presentation and wishes to update all downloaded encrypted copies. It could simply run the list through an update command, which would 'push' the updated file to each of the devices, following the paired encryption method between the end node and the user node, such as device i 5203, device j 5204, device n 5205 and so on. All such activity is merely a sequence of META-0 and DATA which is exchanged between the end node and the devices.

Figure 53:
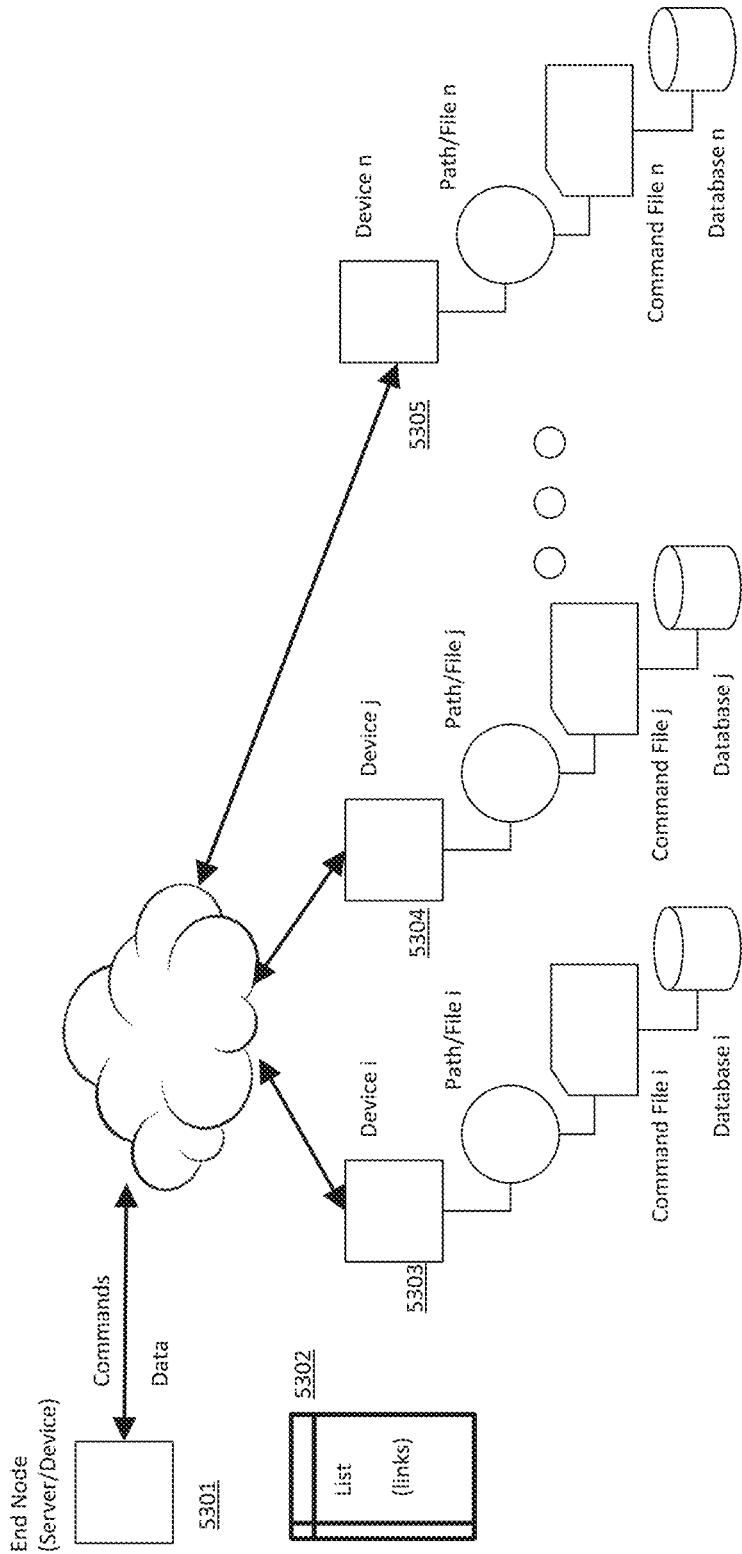
FIG. 53 depicts how commands can be used to observe and return activity tracking.

FIG. 53 Depicts how Commands can be Used to Observe and Return Activity Tracking.

The Music download server may wish to obtain statistics, rather than pushing a new version. We show this process in FIG. 53.

Using the same List 5302, each downloaded file would have, in the META-0 data, added additional commands, such as: "increment a counter upon each time played", or "count accumulated play time", or "record time-of-day when played", and so forth. This command is then associated to the file, and when the ThunderPort application software decrypts the file for use in the, in this case Music Player, either the ThunderPort software (using the Data Command file), or the Music Player (using a standard reporting file) can record such required analysis statistics. In either case, there will be a Command File and a Database, both stored locally on the user devices (5303, 5304, thru 5305).

If done through ThunderPort, these records can be maintained encrypted, and made inaccessible to the user. If done through the Music Player, this can be done in a more database like fashion. Either way, the local data keeps track of items that the provider wishes to track or obtain.

Now, the End Node can sweep the device list, and trigger a command to report back such recorded analysis statistics. Or, conversely, one can create a command which 'reports back' on a pre-set (e.g., weekly) interval.

Other commands can also be envisioned, such as 'extend license' if one is a subscriber to an End Node provider, or a business user. Or the device can send a 'license extension request' if the license has expired and so on.

A complete documentation system can be created this way which can track documents across many devices and operate on them remotely.

Another way to envision this is that the ThunderPort network, combined with the META-0 and DATA fields in the messages can create a distributed system, which can be made to operate as a complete file system, by automating (hiding) the remote access mechanism. Users, of course, have to opt-in to such systems.

Aside from the aforementioned authentication and security measures, one can envision additional measures to be put in place as well. An example: a command file that is encrypted in a pairing with e.g., End Node K could only operate on files that are encrypted (thus received) by End Node K.

Figure 54:
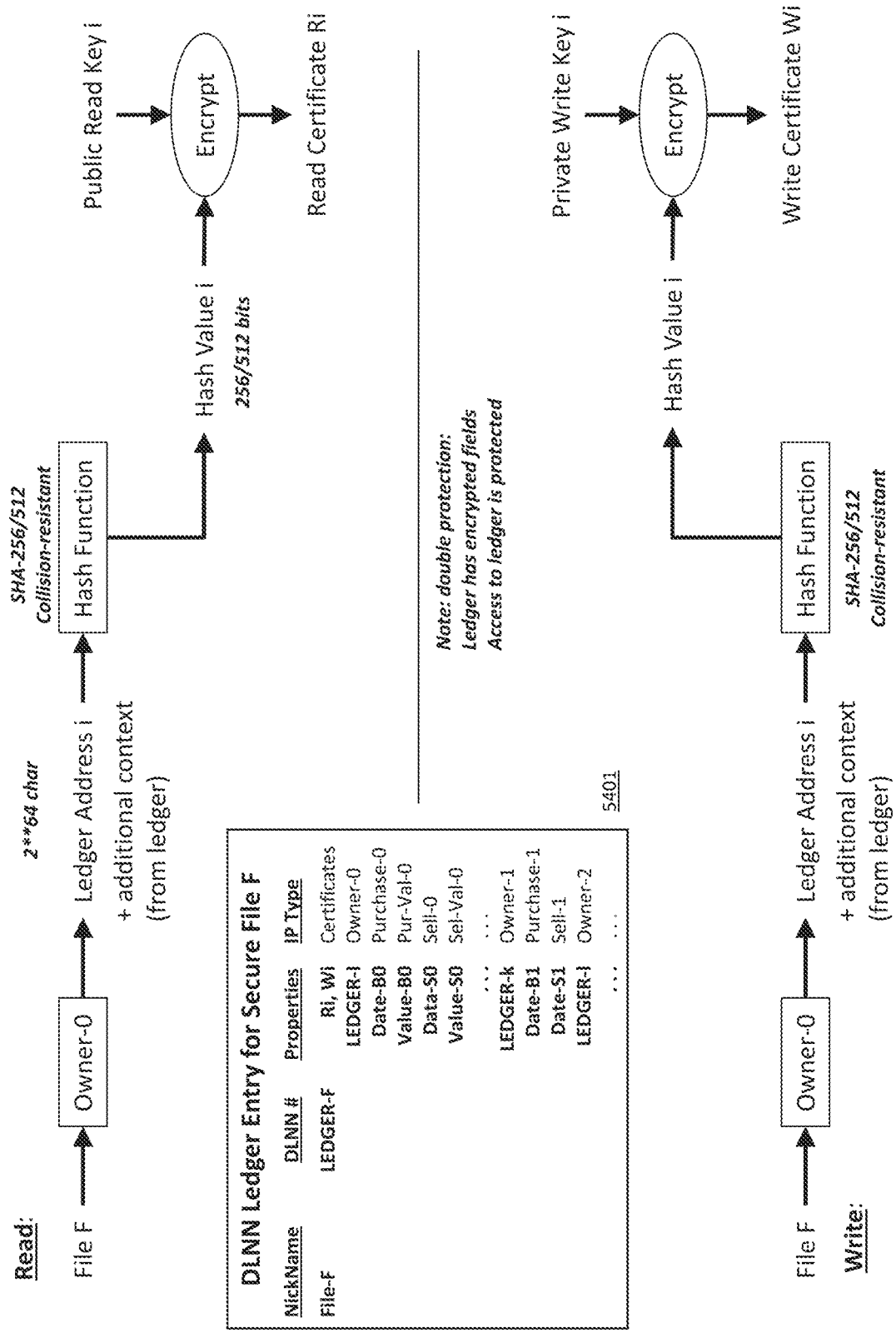
FIG. 54 introduces the DLNN ledger for secure files.

Future smart contracts can be built on top of this system and address many complex protocols, in which many end nodes cooperate on a single contract. The ThunderPort network itself can become part of smart contracts (through the use of Commands), or can be totally transparent—i.e., all smart contract activity appends at end nodes (servers and devices) and the ThunderPort network ensures privacy and security enroute FIG. 54 Introduces the DLNN Ledger for Secure Files.

Thus far we have demonstrated the user of Metadata and encryption across a network which allows files to be transferred securely and controllable from a remote end node.

However, as long as one has access to a file on the local device, a hacker can always modify the file's content, whether it is encrypted or not. It is harder to modify encrypted files, but it does leave a loophole.

To allow for total secure files to be operated upon in the network, we introduce a DLNN Ledger Entry for Secure File F 5401. This Ledger can store properties of the secure file. If a blockchain is used, these properties would be immutable. If a central or distributed database is used, these secure files are subject to the database integrity. For here we assume immutability by using a block chain.

For a device to take ownership of a secure file, it must first pair with the Secure File DLNN Ledger F 5401. This is somewhat similar to how servers each pair with the Device DLNN Ledger. This implies pairing—needed to decrypt certain fields—and access control—needed to access the ledger—in a similar fashion. For Secure Files, two additional features are assured: 1) Accessing the file can only be done by the paired owner. 2) Modifying the file can only be done by the network. The first part can be enabled using hashing and certificate methods. The second method gets more involved with the ThunderPort network as we will explain in the next figure.

If we compare a secure file in the DLNN Ledger with a secure file in a blockchain ledger, then a number of differences may exist.

First, blockchains store the actual digital copy inside the blockchain. The Secure File Ledger does not. It merely records history of the Secure File, and handles access to the file, e.g., for when one wants to show the content, verify or change (sell) the ownership rights, the file history and so on.

Second, the actual file exists somewhere in the ThunderPort network, and is tracked by the Secure File Ledger. In fact, the actual, uniquely encrypted digital file is held in a backup server for the device owner. The local file on the device is the same uniquely encrypted digital file, but if the device or file get destroyed, no harm is done to the actual Secure File.

Third, digital copies in the blockchain are just copies. In the ThunderPort network, the actual file is encrypted and is only accessible through the network. Modifications of the file cannot be done at an end node—it follows a protocol which requires the network, the various Ledgers, the backup server all to collaborate. This is structured such that one cannot modify a local copy of the file, thus protecting the Secure File.

Fourth, modifying the Secure File Ledger is part of the protocol which allows modifications. Typical modifications, such as transfer of ownership, are not kept in the file, they are kept in the Ledger. However, the Secure File itself could also have properties which are kept in the file itself, such as a digital signature (list) of all the previous and current owners of the file, and so on.

In the ThunderPort network, Secure Files are not meant to merely replace NFTs in the blockchain. In Smart Contracts there is a need for record keeping that is trusted by all parties. Some Smart Contracts rely on end node record keeping (e.g., a real estate transaction bringing together a buyer, a seller, a mortgage lender, a bank (account), an escrow provider, a title company). Each entity is trusted to keep its own records, and there is no confusion as to where the actual records of the transaction reside.

Other Smart Contracts are of a public (or controlled) public nature, such as construction records, shipping records, or value-added manufacturing steps. For this, blockchains might suffice, albeit that encryption is not (yet) done for blockchain data, only for blockchain write operations. But one could easily also encrypt the record, and hand out the read key to all the participants.

The most complex Smart Contracts are those where multiple parties must contribute (sign off) on the contract, without necessarily being able to view what the other parties are doing. Examples are Health Records or Defense Contracts (e.g., manufacturing involving secrets).

In the ThunderPort network all these can be addressed using Secure Files, all this gets enacted through Metadata in message exchanges. We will demonstrate this in FIG. 55.
FIG. 55 Depicts a Regular File Versus a Secure File Interaction.

At the left of FIG. 55, we show a Local File on a Local Device 5501. This file can have multiple sections, each of them being read-only to the user, marked by R. One section, marked by W, could be editable by the user. An example of such a file could be a document which requires a signature from multiple parties. As the file travels around, each party adds the signature in the proper place.

However, as the file is local, the file, even if uniquely encrypted, is subject to tampering. With Secure Files we wish to block all tampering attempts. This is shown as the Secure File on Local Device 5502.

From a user perspective, the actual file on the local device is identical, 5501 represent both the regular file and the Secure File from a user device perspective.

From a network perspective, the Secure File 5502 is handled very differently. The user can still edit an open section of the file, e.g., adding a signature, or, if a movie file, adding a music score, but cannot edit, overwrite, destroy any other part of the file. This is because the actual file is not actually on the device, the actual file, as stated, resides on a Backup (or Compute) Server.

However, since the device is the actual owner to this file, the Backup Server cannot modify the file either, as the device must initiate such action. The DLNN Ledger Entry for Secure File F 5506 comes into play here as the intermediary which verifies and validates possible actions that can be taken. The actual modification process of the file is further complicated by involving a protocol which invokes more servers and more network protocols 5505, assuring that anyone who tries to tamper cannot do so without rebuilding major portions of the network. For such protocol we will use the certificates shown in FIG. 54.

One method to enable such control can be done by using encrypted Metadata in the META-0 layer which cannot be read by the device. In structure 5501, the device would be able to read all DATA and META-0 and META-1 Metadata. It decrypts the file, and have, in principle, full access to the file. Even if flags are set, they can be ignored, overwritten, or altered. This is true for the Local File 5501. In network usage, DATA and META-0 can be kept hidden at all times: that is, the user is not allowed to store unencrypted copies, and unencrypted information only exists within the application software, e.g., when viewing, editing, listening to its content. This requires cooperation of such playback tools.

A Local File 5501 can be enhanced as shown: rather than read-only mode, the file can be open for partial write—that is, each user can have write access to a specified partition in the file. This allow file corroboration between multiple users without causing conflict, and all can operate on a copy of the local file, which can be merged later on. The file essentially becomes a folder. Other methods, such as source code control methods, can also be used.

A Secure File 5502 however is very different. This file is protected by its own Ledger Entry 5506 and requires network cooperation to enable certain transitions. There are two factors to consider: File Content and File Rights. In the Local File 5501 these are not broken apart, whereas in the Secure File 5502 these are.

File Content refer to the ability to modify a portion of the file. In many cases, as shown, only a small section of the file will be editable, such as a signature on a document, the signature being the only writeable portion in that document. However, and this is significant, the Secure File on Local Device 5502 is in fact a copy, whereas the Local File on Local Device is the original. So, Secure Files cannot be modified at all on a local device. A user, which modifies the highlighted writable portion, such as the signature, in fact sends this upon (e.g., upon saving the changes) to a Secure File server 5503, typically a Backup or Compute Server in the network, which will incorporate any allowed changes, but block any other modifications.

This is first hurdle to protect File Content.

File Rights is very different—in File Rights the rights are administered away from the file. The Ledger Entry for the Secure File F 5506 can be seen as an immutable blockchain. Any modifications are done in the Ledger, not in the file. Local Files on Local Devices 5501 have no such element. Secure Files require a network protocol to exist for allowing modifications. This is depicted in 5505. What is put in the Ledger is controlled by the Network Protocol. Users may have access to certain properties, that pertain to their ownership (e.g., User 4 can edit properties associated to "User 4"), but not fields that are part of the Secure File Ledger, e.g., "Purchases 4=User 4".

Furthermore, access to the Ledger is enabled by the Secure File Ledger pairing with the device as shown in 5507. The key Pair AF and FA represent access to and from the ledger, with the connotation that only fields allowed by the protocol are accessible.

An example of such a Secure File could be seen as an NFT. In this structure, the NFT record, the Ledger Entry 5506, can be set up as a private blockchain, with controlled access. With the certificate methods from FIG. 54 ownership can be demonstrated to would-be purchasers. The actual Secure File itself is not visible to anyone. It resides on the owner's device as the Secure File on Local Device 5502, and it fully protected by this being a backup to the actual Secure File on a server 5503.

In a first version of the protocol, file properties can be modified upon certain ledger actions, such as sale or purchasing. In a more complex version of the protocol, one can see how the Secure File can actually represent account values, rather than digital content, and funds can be transferred between similar accounts on the network, each having their own Ledger Entry. Whether or not such fund transfers require ledger updates depends on the chosen protocol. Sometimes this may be necessary for bookkeeping efforts, other times for security reasons. However, this allows for a method to be created which is fully private and protected.

We point that in addition to the network protocols one can also include commands in the META-0 layer of the Secure File which can trigger autonomous actions on the file, which the network protocols can take advantage of.

Smart Contracts that were touched upon in FIG. 48 can take advantage of Secure Files on the network. This allows Smart Contracts to also share data within the ThunderPort network.

Figure 56:
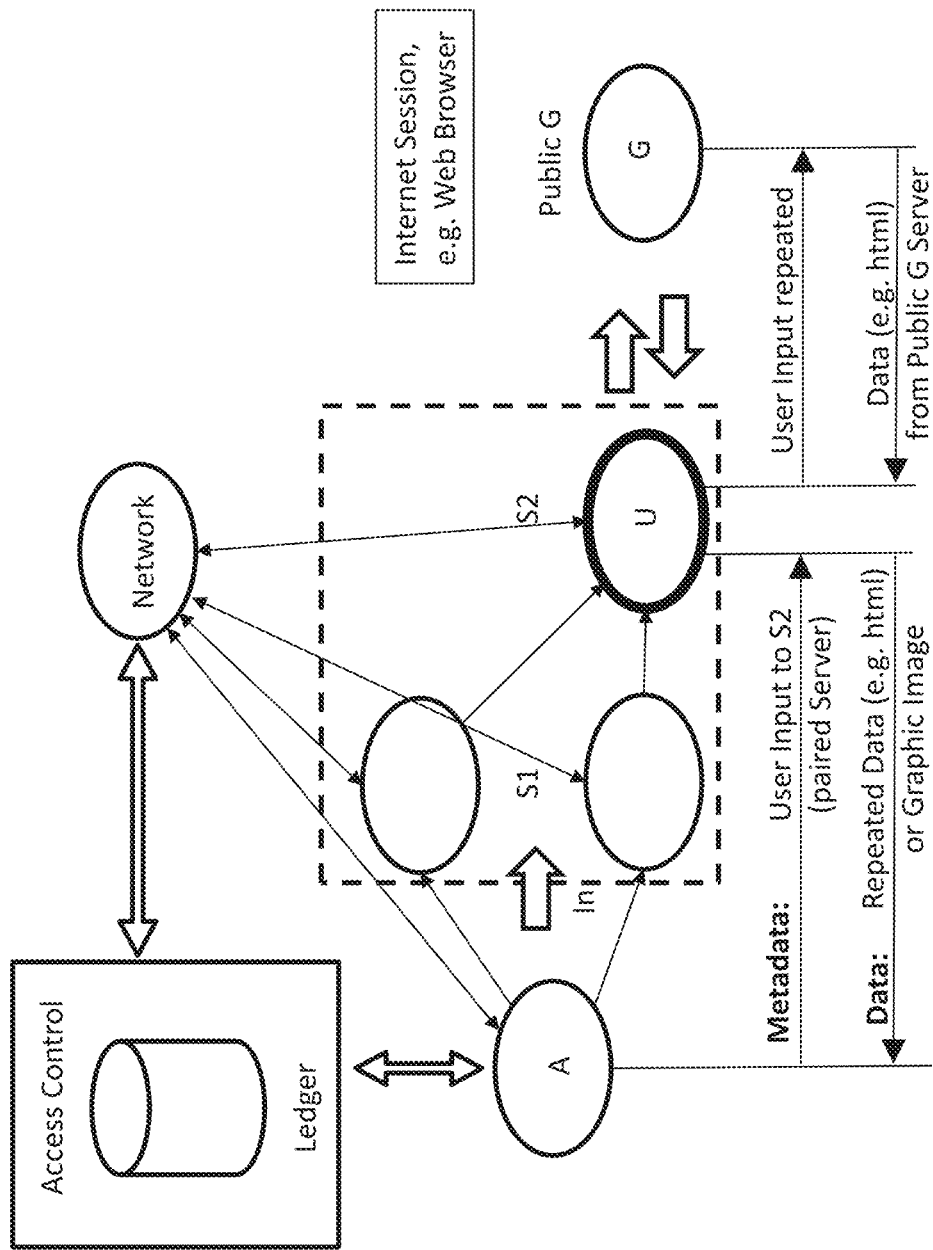
FIG. 56 depicts how the network enables incognito internet access.

FIG. 56 Depicts how the Network Enables Incognito Internet Access.

The ThunderPort network can also be used to provide incognito VPN and VNC sessions. An example of such is displayed in FIG. 56.

In FIG. 56 we show a public server G. This is outside the ThunderPort network, and one can envision this to be a standard internet server, such as a DNS or IP based server which one can communicate with. A typical use case would be a web server, e.g., www.google.com or www.facebook.com. This server responds to incoming queries and sends back answers to requests.

Instead of the user connecting to such a server, the ThunderPort network designed specific servers to communicate to said standard internet servers. A server U is shown. From the internet server perspective, server U is just any other server that initiates a session.

However, server U does not retain any server, or browser, related data. Items such as cookies are removed before a session starts, and no information is kept around as to who is using this interface.

From the user perspective, server U has been setup as a incognito access point to the internet, and using the standard routing and messaging techniques, device A can send, and receive, data and Metadata from server U, fully encrypted and protected after it is paired with server U.

So, device A starts e.g., a web browser session and types in 'www.google.com'. This string is then captured and send to server U. Server U starts a clean web browser session with no history, cookie, login, user IP address, tracking. In this case, server U does not encrypt outgoing messages to public server G, but it does encrypt all return data sent back to Device A.

One can envision the session to appear on device A in one of two fashions: 1) content driven or 2) rendering driven. In case of 1), server U would merely take the data-packets which it received from public server G and forward them to device A. Device A would use a standard web browser to show this graphically (text and figures). In case of 2), server U would actually render a web browser session, and capture the graphic commands themselves, and forward those to device A. Either method ends up in device A having a render of the web browsing session as if device A is talking to public server G directly. Any input from A—key click, text, mouse—is sent to server U and is recreated on server U in the web browser session. From public server G, this is normal user operation, and there is no link to the actual user, as such information is all stripped away, or not included in the action. Server U does know the actual session users, being device A, as it handles incoming and outgoing messages. Since it is a ThunderPort network server, its integrity is assured, similar how Metadata 1 is assured in the network. Furthermore, server U does not need to keep records, it can remove all data when the session ends.

Connections between device A and server U are standard message routing connections in the ThunderPort network. Typically, a relay server would be visited first, followed by a sequence of ThunderPort network nodes (servers). Tracing between device A and server U is therefore not possible.

A VPN is not required, as the ThunderPort network routing already protects (encrypts) data and (hides) IP addresses. One might still prefer to use a VPN, as this hides the visibility that one is accessing the ThunderPort network from the ISP.

A VNC session is not required at the device. The VNC session is actually taking place at server U, not device A. To perform a VNC from device A to server U we would recode a designated interface that does no logging, using a similar transport (content or graphics) between server U and device A.

Chapter V

Figure 57:
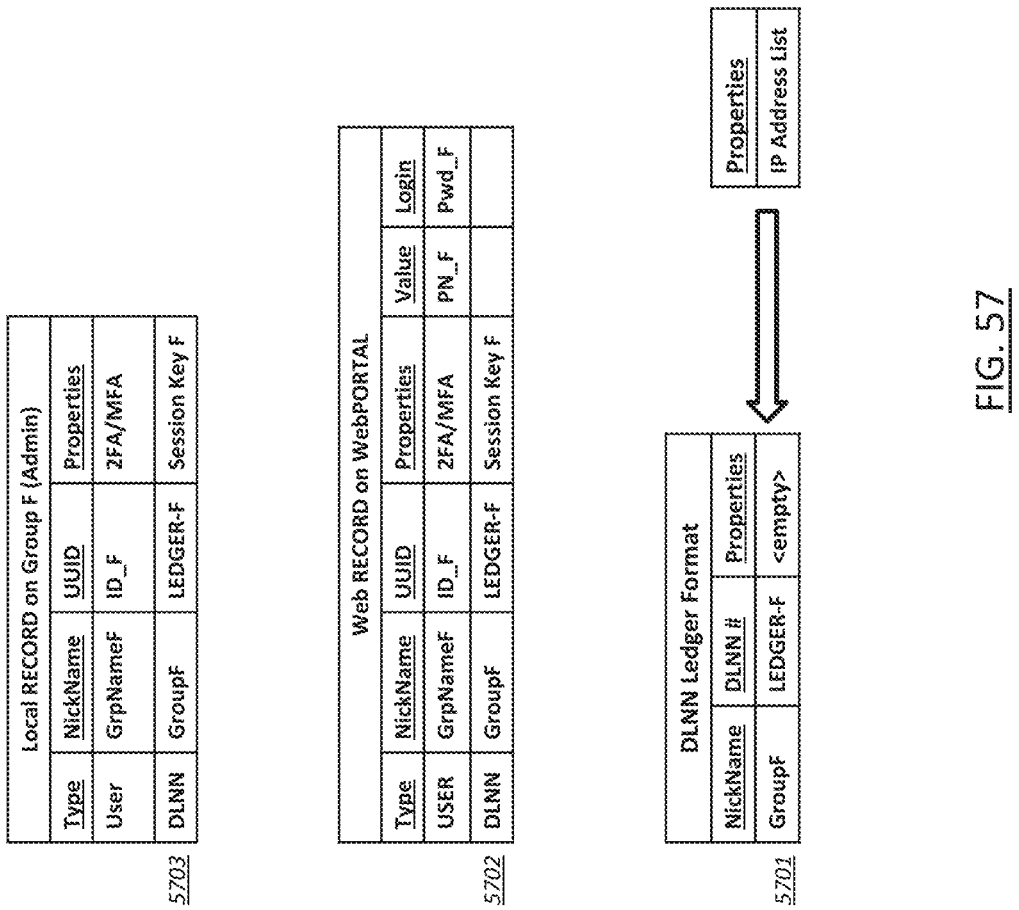
FIG. 57 introduces the Group DLNN Ledger.

FIG. 57 Introduces the Group DLNN Ledger.

First, we introduce the Group DLNN Ledger Format 5703.

In chapter III we showed detail about the Device Ledger. Here we introduce the Group Ledger. (In chapter III we identified ledgers for: device; node; group; file; customer). Ledgers don't carry types, but one could e.g., distinguish between them through using a type prefix for the ledger addresses.

The Group Ledger Format 5701 is similar to the Device ledger Format, but there is no 'group' device which can respond to incoming requests. Instead, an Admin device is identified. This will be under the Properties section in the ledger.

Similar to device records, the administration server Web-PORTAL keeps an administration Web RECORD 5702 for ledger entries added to the system.

Local RECORD 5703 is a group record, which will be entered into the Local RECORD which is being kept on the Admin device. There can be multiple groups per Admin and there can be multiple Admins per group. Next, an Admin creates a group. This means that Records 5701, 5702, and 5703 get properly initiated. Everyone can be an Admin to their own group.

Lastly, a session key is shown on the entry in both the Web RECORD 5702 and the Local RECORD 5703. This is for controlling other properties in the Ledger.

The Group Ledger may be used in a two-fold manner: 1) It enables messages to be sent from one to many, in a distributed fashion. Everyone can host their own group in the ThunderPort Network, there is no central server that hosts group and group messages; 2) It enables messages to be interactively exchanged, such as in chat rooms, voice or video calls, without using a central server. We will explain both methods below.

Furthermore, we will discuss group interactions in the context of push messages into the group as in a 'non-hosted group'. It is also possible to archive the group and have members pull messages from the group archive or search the group archive for past messages, as in a 'hosted' group.

For non-hosted groups, there is little overhead on the admin's device, as described below. For hosted groups, a storage method handles foreseen bandwidth and storage requirement. An example of such hosted group could be a private video channel group. Members would not receive the group information through push, but rather would get short messages, encouraging them visit the group and stream the video for viewing. This is useful when bandwidth and storage limitations are being considered on receiving devices.

Examples of push and pull groups can be seen in Twitter® and YouTube®. As Twitter messages are short, they can be sent to the group members in their entirety without overloading the recipient's bandwidth and storage capacity. Downloading YouTube videos would not only stress such bandwidth and storage capacity, it also deals with different formats, based on receiver's settings, as well as digital rights management, for which streaming is preferred versus downloading such video.

Both Twitter and YouTube have an archive and can be searched. Facebook® Feed's are generally not searchable but messages passing through can be either downloaded or archived for future retrieval.

Again, we will describe the group structure from the perspective of a non-hosted group, and we will describe video chats in a multi-participant configuration, although enabling archives such as Twitter or YouTube, having info messages being send rather than video-downloads, and enabling Facebook's download or archive options is also possible. When addressing group security and privacy— only group members can access group information. The rights of a group member who joins a group late may be handled in different ways. In some groups, all archived data should be accessible (e.g., a hobby club or bridge club with history), in other groups, the member should only see information going forward (to prevent outsiders from researching groups, etc.).

Aside from hosted versus non-hosted groups, groups can also be of different types. E.g., a 'private' group can only be seen by members, and members can only join e.g., by being introduced by a group member. Such private groups are not visible to non-members and do not show up in searches for group information. Other private groups can be found in the network by such group information search functions. The group description (group info page) can stage what the group is all about and encourage members to join. E.g., a stock market analysis group could operate this way: the admin is monetizing the group and would use a paywall to restrict access, and only subscribers would be given access. The group information does show up in searches, but access to group messaging requires joining the group first. Another group type would be publicly visible, and have no paywall. But it could still require members to join the group first, meaning that all group interactions remain encrypted (and private). Another group type would be a fully public, open, and visible group, in which joining is not required. A group such as this is not necessarily a members-only group, but a method to move information quickly to interested people. Data does not need to be encrypted, nor be private.

In all such groups, we use an encryption method. The last group mentioned could sidestep this method, however, we foresee this being made simpler by using a 'standard' key, which would be pre-programmed in the software application. That is, data remains encrypted as far as internet traffic is concerned, but users would not have to pair with such groups.

Lastly, in live video chat, audio chat, or other multi-participant setups where many to many live interactions plays a significant role, such participants can be added to these groups 'on-the-fly', rather than forming registered member lists. We will explain when we discuss such groups below.

Figure 58A:
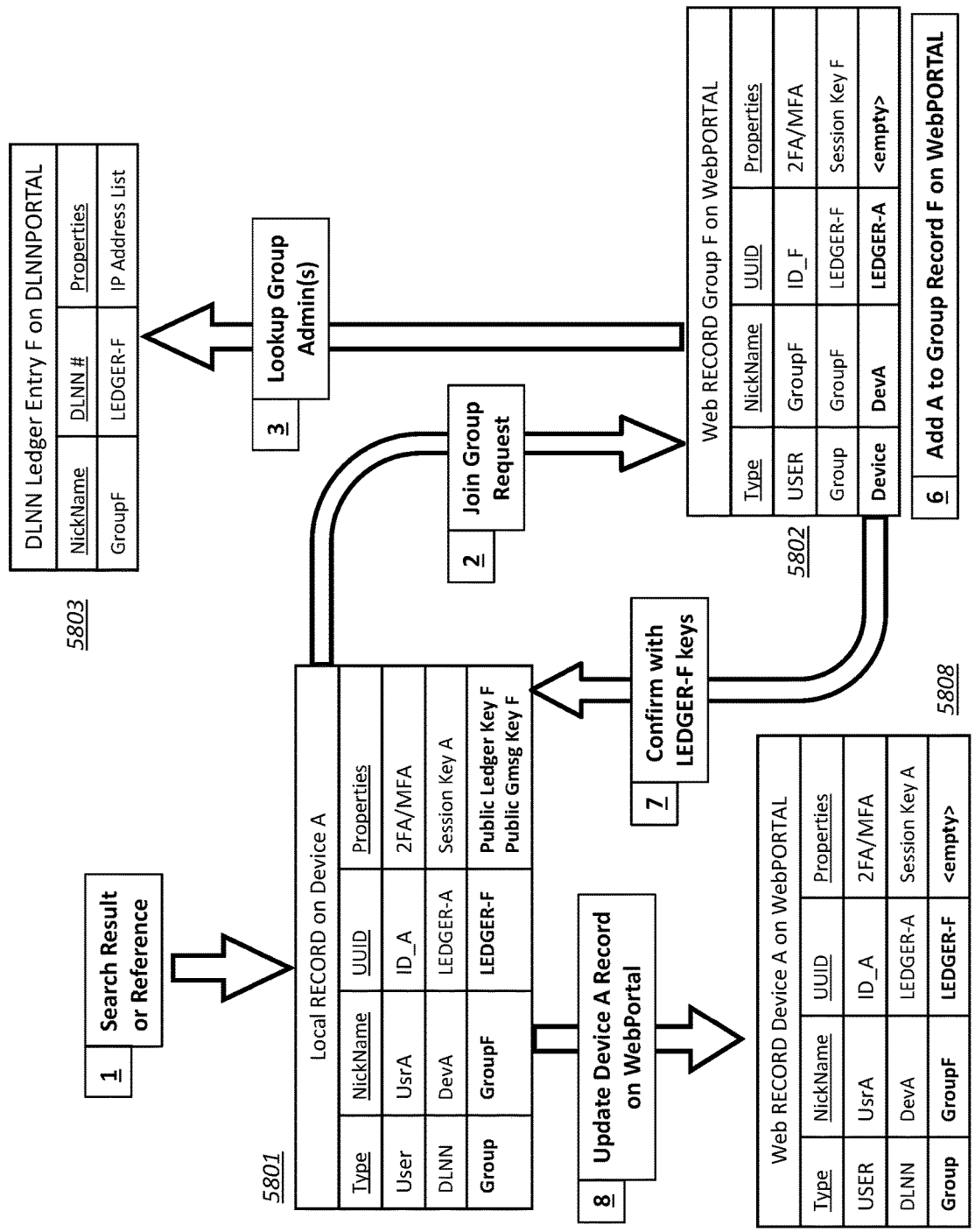
FIGS. 58A and 58B depict the process of a device joining a Group Ledger.
Figure 58B:
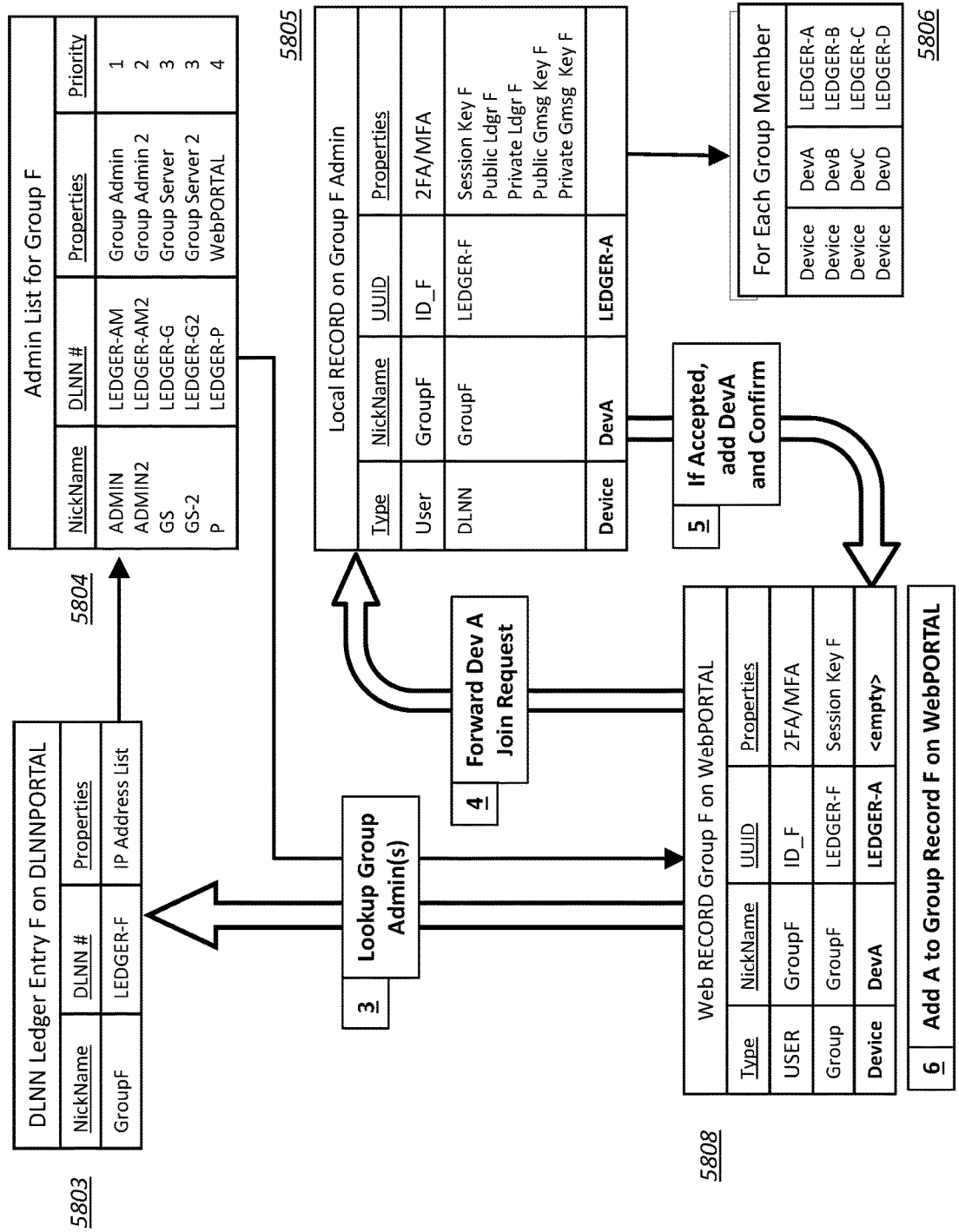

FIGS. 58A and 58B Depict the Process of a Device Joining a Group Ledger.

Starting with the standard, non-hosted groups, the process of joining a group is depicted in FIG. 58. In this figure, we show records on devices in a flow diagram. The records do not trigger actions, rather, the protocol executed on the device does such. For simple depiction, we assume that records and devices can be used analogously in explaining the sequence. We identify the following eight steps:

Action 1: Search Result or Reference.

Key to joining a group is knowing its existence and having a handle, or reference, to the group. A group can be found through search methods, as explained earlier, but only if the group wants to be listed in search results. Private groups can only be joined if members or admins introduce other users to join this group. Therefore, a reference to a group must have been obtained before the group joining process can commence. Also, we will describe this in terms of a single device joining. It is conceivable that a member could pair all their devices in the network automatically upon joining a group.

Action 2: Join Group Request

Before device A adds GroupF to its Local RECORD 5801, it must obtain a confirmation request. So, a Join Group Request is sent out to the administration server WebPORTAL 5802 which will handle the request.

Action 3: Lookup Group Admin(s)

Approval of joining a group is handled by the group Admin(s). So, in a first step, the WebPORTAL server 5802 will look up the DLNN Ledger Entry for the requested Group F 5803 and derive the list of Admins for this group 5804. A group must have at least one admin, which is by default the person who created the group.

Conventions can be added here, e.g., as additional properties, such as Group Admin for feedback, Group Admin for joining, Group Admin for posting, etc. This allows Group Admin to designate devices that can handle incoming requests differently. E.g., a Group Admin that allows automatic member posting could set this up on a (paired) Personal Computer, whereas a Group Admin who wishes to review its member post first could set this up on a preferred mobile device. For simplicity, we only show a Priority field, which tells the WebPORTAL server which admins to contact in which sequence. Same priorities could be interpreted as operations that are to take place in parallel, such as the two Group Servers shown here at priority 3 each.

Message posting is handled through Group servers, and no the Admin devices, as we will detail below. Group servers are optional and are recommended for large groups (groups with many members). If no Group Servers are specified, the WebPORTAL server will handle this group role, and will delegate actions to Relay servers, as we will also detail below.

In this example, the WebPORTAL server selects on Admin (LEDGER-AM) based on Priority, as we have no properties in the ledger that specify further detail (such as joining, posting, query, etc.).

Action 4: Forward the Group Joining Request from device A.

In this step, the WebPORTAL server sends a Join Request for device A to the Group F Admin 5805 device. (Remember we overlay devices and records in this figure).

Group Pairing is to the group, not to the Admin. We handle message routing to the admin below. The Admin has a LOCAL RECORD on Group F on (each of) its device(s) which specifies access to the Group Ledger, depicted as Session Key F and Private Ldgr F, as well as the Private Gmsg Key F. The latter is used for creating group messages, and the corresponding Public Gmsg Key F is handed to paired group members to decrypt incoming messages.

In this description we describe device to device. One could also apply this from user to user, and enable all user associated devices at once. The WebPORTAL server can contact each admin successively and continue to the next admin if responses were to time out, or it could contact all admin and await the first response. Such actions can all be described in additional properties on the Admin List 5804.

When the Admin 5805 for the Group F accepts the request from device A (or user A), it will add device A to its group record member list, shown as DevA, LEDGER-A. It will also send out a confirmation to the WebPORTAL server 5808. Note that the admin does such for each group member request 5806.

Action 5: Confirmation by Admin.

When the confirmation is sent back to the WebPORTAL server, the member's joining is accepted, and four records are to be updated: 1) the Local RECORD For Group F on the Admin device(s); 2) the Web RECORD for Group F on the WebPORTAL admin server; 3) the Local RECORD on device A, which will have a Group F pairing entry; and 4) the Web RECORD for Device A on WebPORTAL, which will include that device A has joing Group F.

Action 6: Add A to Group Record F on WebPORTAL

At this step, the Web RECORD Group F is updated on the WebPORTAL server by adding DevA and LEDER-A to the Group F RECORD. Note that this record does not have the group messaging (Gmsg) keys as the WebPORTAL server never sees such keys.

Action 7: Confirm with Ledger Keys.

After the confirmation message, Admin device 5808 completes a standard key exchange sequence between Admin device 5808 and device A 5801, as explained in Chapter II, with these two differences: 1) Only the first half of the key pairing sequence is completed, i.e. Admin device 5808 sends a public key, but device A 5801 does not send a reciprocal public key, and 2) Admin device 5808 sends the shared Public Group Gmsg Key F, and not a privately paired keypair. As a result of 1) it is worth noting that Admin device and device A are not paired. Device A is merely paired for receiving and decrypting group messages, not to communicate with the Admin device. And as a result of 2) it is worth noting that this is a reverse setup: the Admin encrypts messages using a private key, and members would read using a (shared) public key (unless such keys are also made symmetrical, such as AES keys). It is also worth nothing that, as pairing is not to the device but to the group, that any admin device can create a group message, as they would share the proper key. There is a difference between group and device pairing: in device pairing we generate a key in both directions. In group pairing, we only pair in one direction. We use the same key in the reverse direction, which we will explain below.

At this point, the Local RECORD on Device A is updated with the Group F information, namely its name: GroupF; address: LEDGER-F; and decryption message key Public Gmsg Key F.

We are also showing Public Ledger Key F, which is part of a method of accessing properties on the group ledger, which is used to access group archived and stored data.

The Public Ledger Key F is optional, and enables device A to access certain properties of the group ledger, e.g., one could control archiving access with such a key. The Public Gmsg Key is the key that decrypts group messages at the local device A. Such messages would be encrypted with the Private Gmsg Key, which the group administrator holds in its group record, shown in 5805 under the DLNN entry. Also, as shown in chapter II, private/public asymmetric key pairs can be replaced by symmetric keys in the ThunderPort network, as keys are always kept hidden.

Action 8: Update Device A Record on WebPORTAL.

As a last step, of the four records that we highlighted are to be updated, the Web RECORD for Device A on the WebPORTAL also gets updated to reflect that device A has joined Group F. Again, the WebPORTAL server does not get to see any keys, so this information is not part of the record.

In one embodiment, WebPORTAL records can be distributed to device-dedicated paired and relay servers. In another embodiment, all such records are on the WebPORTAL server. The latter makes the explanations simpler.

After completion of step 8, all records are now updated for Device A to participate in the group messaging. Again, we will describe a non-hosted group method.

This process is repeated for each group member, 5806.

Figure 59:
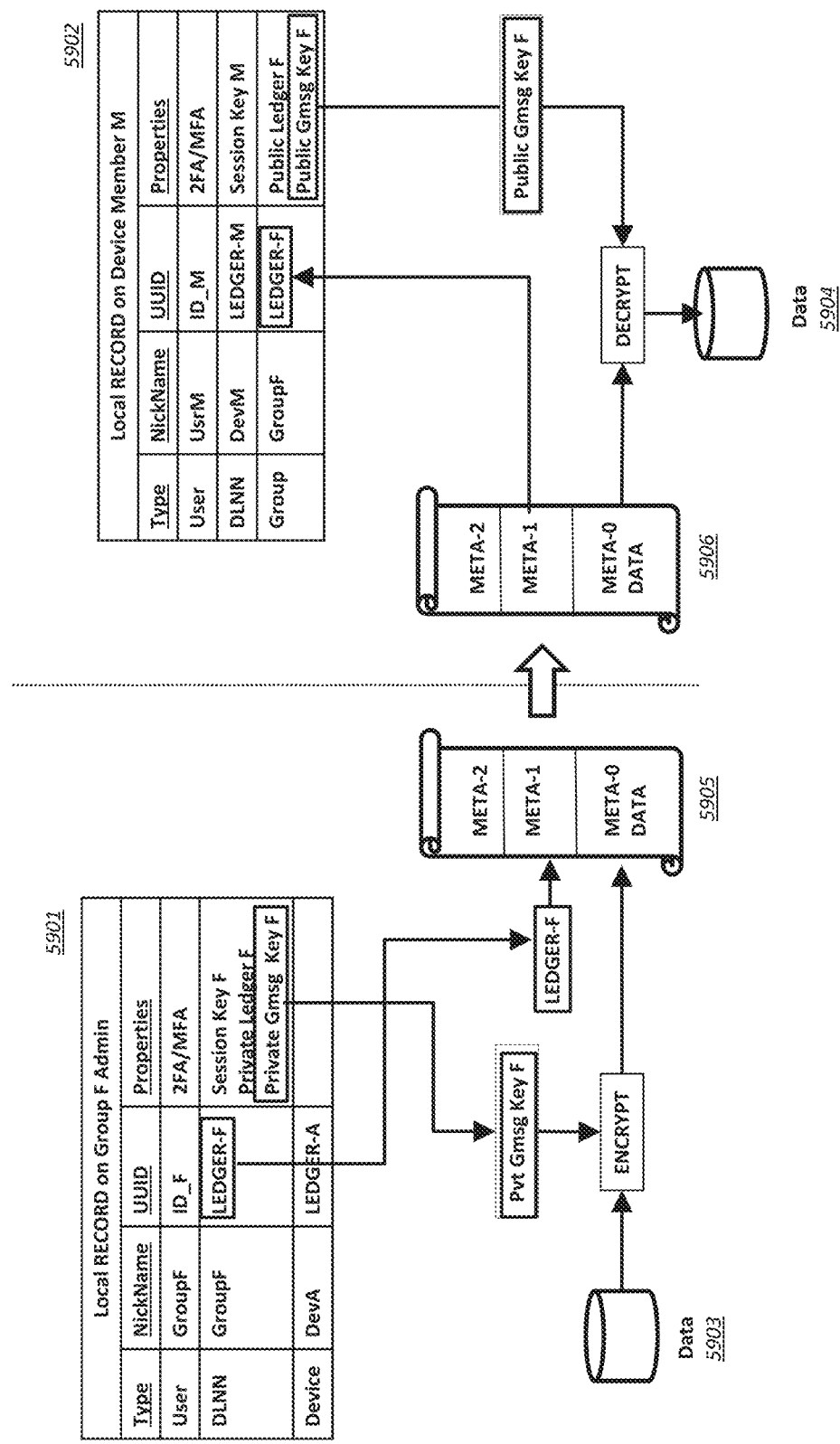
FIG. 59 depicts how the Group Admin encrypts, and a group member decrypts.

FIG. 59 Depicts how the Group Admin Encrypts, and a Group Member Decrypts.

FIG. 59 shows how the admin creates a group message, and how a device retrieves the information from such message. In chapter I and in chapter III we explained how messages are formed in packets, using P-AB, P-ST and internet packets, which effectively creates a message shown as 5905. This message has three separate fields: META-2, META-1, and META-0/DATA. In ThunderPort, META-2 is the key index (or handle) which tells a receiving device which locally stored key should be applied to open up the META-1 information. META-1 information holds the key index for the final receiving device, which (only) has the locally stored key to open up META-0/DATA.

One can see in the diagram that a group admin would use the info from the Local RECORD for Group F to apply the Pvt Gmsg Key F to encrypt the Data 5903 to form META-0/DATA segment. The key index, LEDGER-F is then put in the META-1 data, and this is encrypted, decrypted, re-encrypted through the server routes in the ThunderPort network.

When the message reaches the group member's device, member M 5902, the META-0/DATA will be unchanged, and the META-1 may have additional information, but would still have the key index reference LEDGER-F in it. Using this information, device member M will read from its Local RECORD 5902 that LEDGER-F indexes to local key Public Gmsg Key F, and it will apply this key to the META-0/DATA segment and will successfully decrypt this and retrieve DATA 5904.

Because this is a group message, all group members have been given this same key and key index. Thus, they all can decode the message the same way.

So, in group messages, the formatted message 5905 is not specific to a group member, it is readable by all the group members, in the same fashion. Thus, message 5905 can be replicated and sent through the ThunderPort network to all group members, who can all retrieve data 5904 locally.

Figure 60:
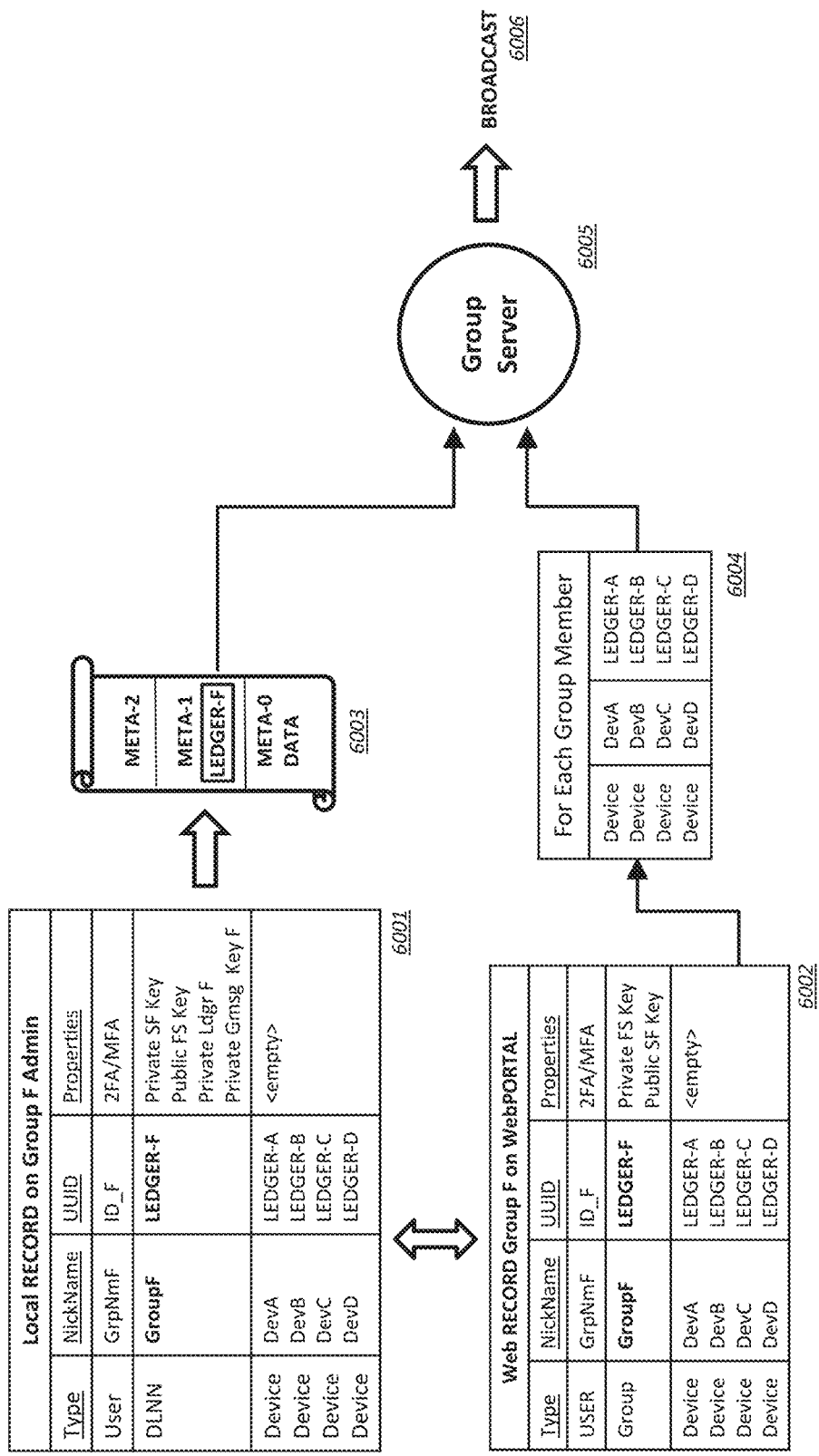
FIG. 60 introduces a group server that broadcasts messages to the group.

FIG. 60 Introduces a Group Server that Broadcasts Messages to the Group.

In FIG. 60 we show the message 6003 which has the encrypted META-0/DATA with key index LEDGER-F in META-1 data, which can be read by all group members.

The second part for a group message is the list of all group participants. This group can be found in both the Local RECORD of the Group F Admin 6001 on the admin device, as well as the Web RECORD for Group F on the WebPORTAL server 6002. Typically, the group member list is structured on the WebPORTAL by default—it already has the data locally.

When a Group Server 6005 is added, the Group Server can offload the WebPORTAL. Without a Group Server, the WebPORTAL server will perform this role. We will explain how the Group Server reaches all members, i.e., BROADCASTS 6006 the message.

Figure 61:
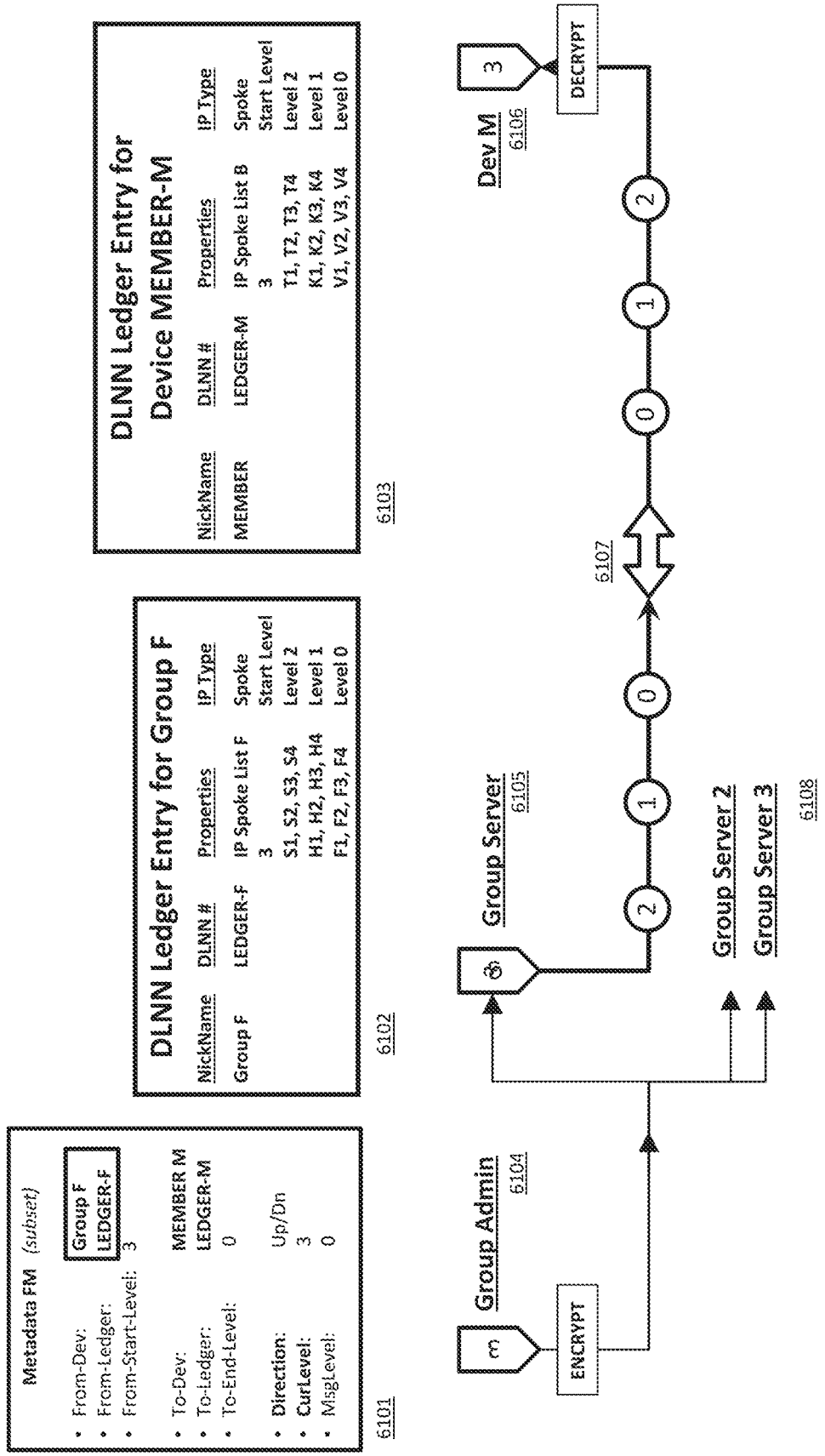
FIG. 61 explains the message encrypted and routing path through the network.

FIG. 61 Explains the Message Encrypted and Routing Path Through the Network.

FIG. 61 takes FIG. 39 from Chapter III and adds the Group Server to this. Instead of a sending device, we see Group Server 6105 as the sender. And we also see Group Admin 6104 as the encryption step for the message. Prior the sending device did the encryption. In group messages this can be done differently.

We show the Metadata FM 6101, which is the META-1 data in the messaging, which gets configured by Group Server 6105 to specify Group F as sender and LEDGER-F as the From-Ledger (i.e., the key index). This message can be sent to any group member by adding the proper member information at the To-Dev and To-Ledger, in case of Member M (device M) this would read as MEMBER M and LEDGER-M.

This process, of updating the META-1 information is repeated for all group members.

Then, using the standard routing method described in chapter IV, we can see how the Group Ledger is very similar to the Device Ledger in terms of specification of which servers exist at which levels. Server pairing rules are the same as with using the Device Ledger. In this case we can see that a message will travel from the Group Server to any one of S1, S2, S3, or 45 servers, followed by H1, H2, H3, and H4, and so on. When the crossover point 6107 is reached, the remainder of the message routing is the same as the standard routing for devices.

The structure is not limited to a single group server, 6108 shows that multiple group servers can be utilized in parallel.

Figure 62:
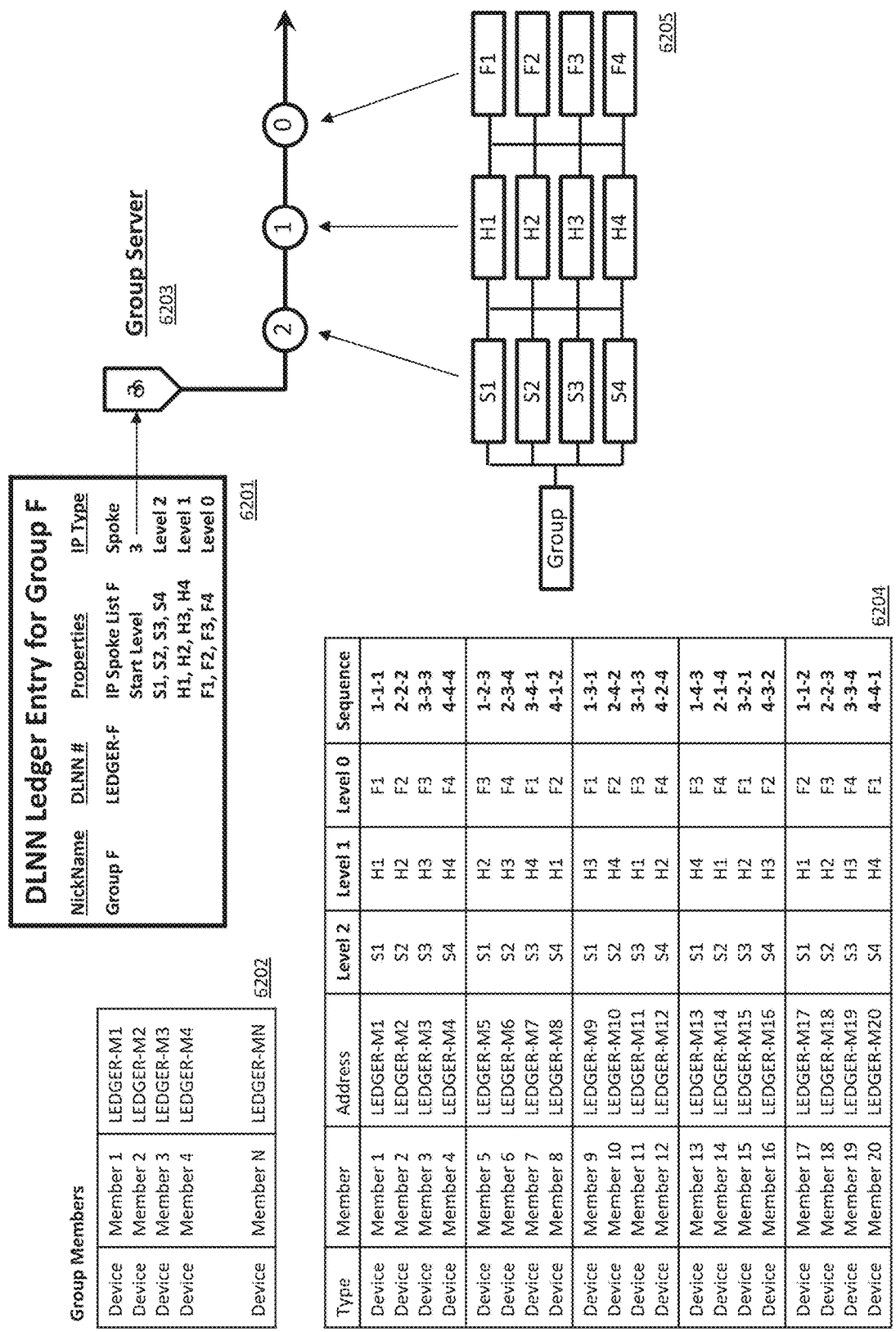
FIG. 62 details how large group messaging can be optimized.

FIG. 62 Details One Way how Large Group Messaging can be Optimized.

Aside from using multiple group servers, we quickly address how the ThunderPort network may get loaded in group message routing. Shown is the Group Ledger 6201 for Group F.

Generally, a route could 'pick randomly' from each level and form dynamic routes based on randomness, which would level out network activity. For group routing, this may be adequate. One could also contrive sequences which are not random, but balance out the network as well. An example: Group Member list 6202 shows a list of member devices. If we assume 20 group members, and 4 servers at three levels, one can study table 6204 which shows a non-random sequence which balances the network resources: Each server is used exactly 5 times in the table, and no route is repeated. Of course, 3 levels with four servers each allow for 4**3=64 different unique pathways.

Diagram 6203 depicts again the message route leaving Group Server 6203 and diagram 6205 depicts the connections that are possible at each layer.

Both table 6204 and diagram 6205 are reminders that one can optimize routing in the ThunderPort network, but the network may not optimize to the shortest (fastest) route, rather to have a non-traceable route. Optimization could include server loading and server distance, to the extent that it may avoid repeated long-distance hops. Or it could handle message timeouts (and reroutes) more efficiently. Such optimization can be done at the network level, or can be done at each server level, as they can track message activity and incompletion.

Figure 63:
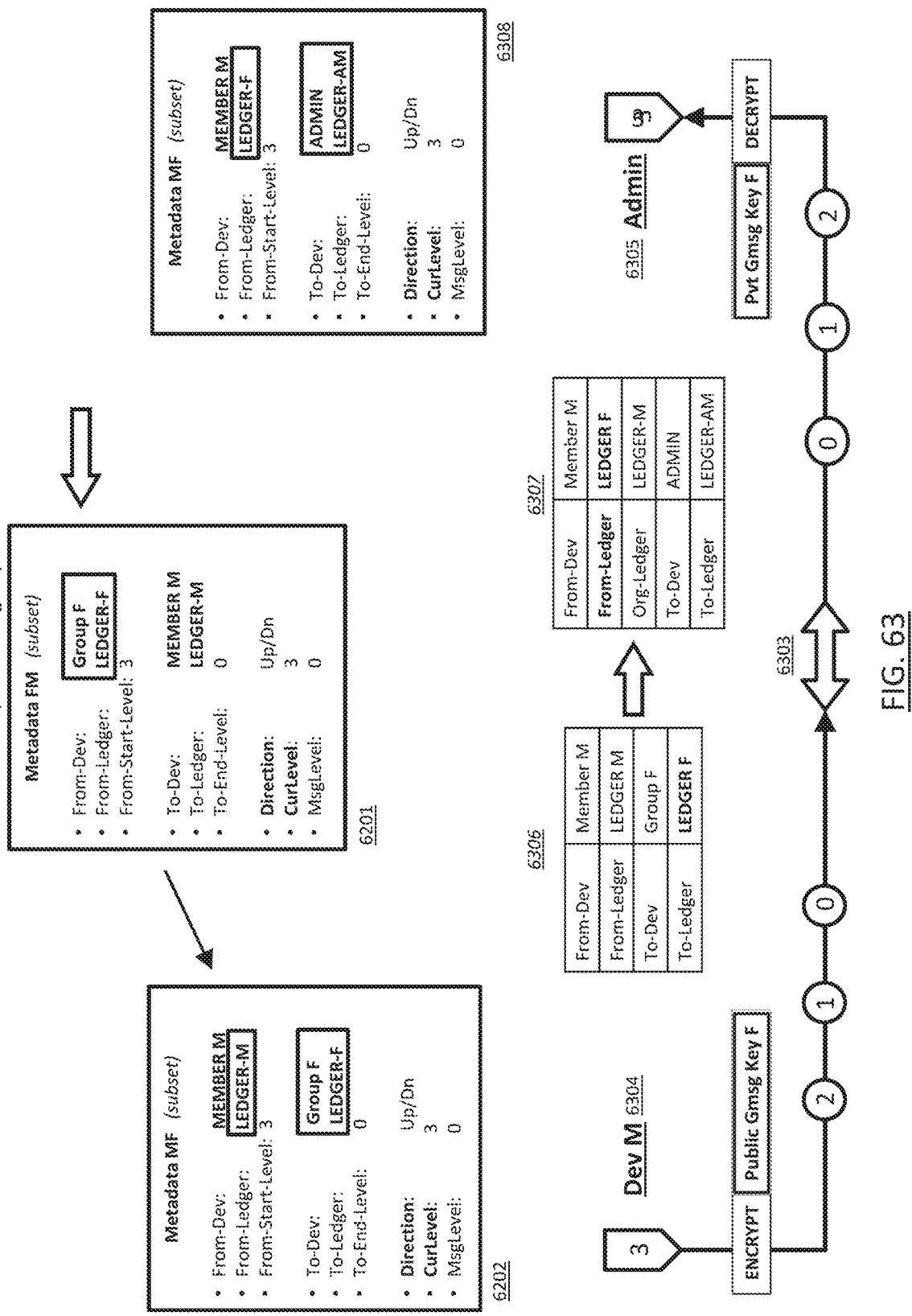
FIG. 63 depicts how a member can respond to a group, the message being forwarded to the Admin.

FIG. 63 Depicts how a Member can Respond to a Group, the Message being Forwarded to the Admin.

When a member receives a group message, the member can respond to this message. It is up the admin to decide if such a message gets automatically posted, e.g., in a thread (hosted group), or submitted to the group upon receipt (non-hosted group, e.g., a group-chat), or whether the admin wants to manually promote such a response, or even whether the response is for the admin only and not meant for the group.

The way this is done is the group member simply responds to the message, which results in reversing the To- and From-information in META-1 6301 and 6302: From-dev becomes Member M, From-Ledger is LEDGER-M, To-Dev becomes Group F, and To-Ledger becomes LEDGER-F.

Encryption on Device M 6304 is done using the same key that was used for read: Public Gmsg Key F. This encrypts the META-0/DATA segment.

Now, at the crossover point 6303 the message has to be re-addressed from the Group to one of the Admin devices. Using the properties that were established in Admin List 5804, one could have a Priority, or, more likely, a specific Admin device listed for member responses, which need manual review, another Admin device to handle member posts, which could have automatic approval and forwarding to the group, and another Admin device to handle member queries, which could go through an automatic direct response, and so on.

If we assume that the Admin List 5808 resolved to using device ADMIN and address LEDGER-AM, then the server, at crossover point 6303, makes the following changes: To-Dev changes from Group F to ADMIN; To-Ledger changes from LEDGER-F to LEDGER-AM; From-Ledger changes from LEDGER M to LEDGER F; and the field Org-Ledger is added and populated with LEDGER-M.

Other methods of handling the preservation of LEDGER-M address also exists, such as having this field being always present, or being retrievable if needed. In this embodiment we describe the process using the Org-Ledger for Group messaging as it is not needed in device-to-device messaging.

After this change, routing the message is again a routing to a device, and the process described in FIG. 40 is followed to complete the message route to device ADMIN at address LEDGER-AM. The To-Dev and To-Ledger updated fields guarantees that the ThunderPort route sends the message to the device Admin 6305.

Next, Admin device 6305 receives the modified META-1 metadata MF 6308. In here, the From-Ledger tells this device to decrypt the incoming message using the stored key for key index LEDGER-F, which is Pvt Gmsg Key F, i.e., the matching key for the incoming, encrypted message.

The Org-Ledger is used should the admin wish to respond privately to the group member.

Figure 64:
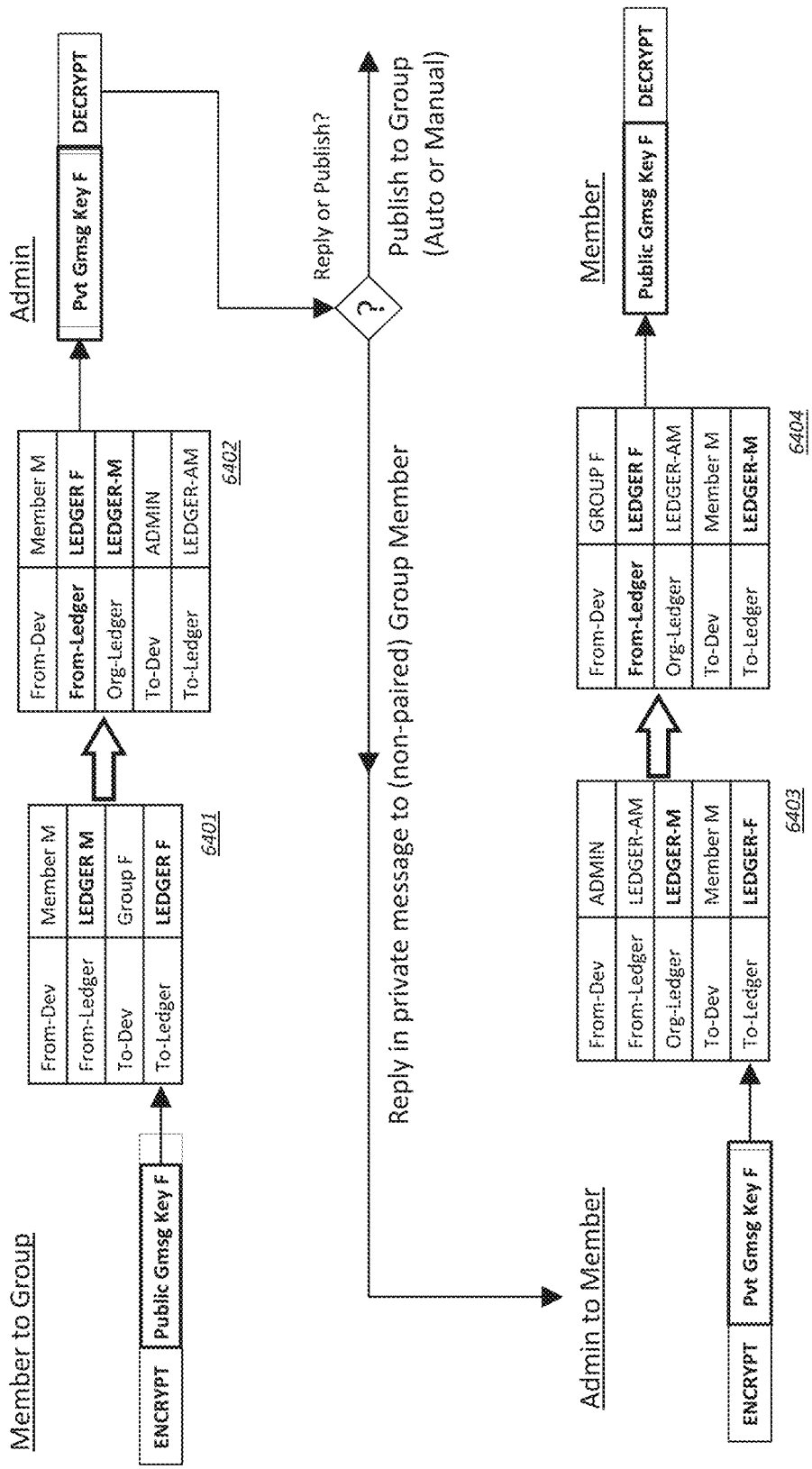
FIG. 64 depicts how an Admin can receive and respond to a group member's message, or publish this to the group.

FIG. 64 Depicts how an Admin can Receive and Respond to a Group Member's Message, or Publish this to the Group.

Focusing on the META-1 data at the crossover points, we can compare the Member to Group responds, which ends up being re-routed to the Admin device. The Admin, when responding to the member, can send a private message to this member.

This message exchange uses the group key, and requires no prior pairing between the group member and the admin, unlike the standard device messaging between paired devices on the ThunderPort network.

Again, Metadata 6401 and 6402 depict how the Metadata is manipulated at the crossover point to both fit the ThunderPort message routing standard as well as the receiving, admin, device standard decryption methods. As one can see, Public Gmsg Key F is used to encrypt by Member M, and Pvt Gmsg Key F is used to decrypt by Admin.

Admin can decide to auto-promote, or publish, the response to the group, or have a manual, or automatic, approval step. This does take place on the Admin device. For busy or large groups this can form a bottleneck. If auto-publishing, or algorithm-based publishing, is desired, one can enhance this method to take place on a $2^{nd}$ admin device, which could be e.g., a private server, so that the Admin device itself is not bothered.

Now, if the Admin wants to send a private response message back to group Member M, there is no need to pair Member M's and Admin's devices. Instead, the admin responds by forming META-1 6403. In here, META-1 is manipulated to populate the From-dev as ADMIN, From-Ledger LEDGER-AM, To-Dev MEMBER M, and To-Ledger LEDGER-F. Org-Ledger is kept as LEDGER-M.

The message, as such constructed, would not reach Member M, as it points to LEDGER-F. But LEDGER-F is the correct key index for the decryption key. So, the method relies again on the server at the crossover point to manipulate the fields correctly: META-1 6404 now shows that the From-device is overwritten by GROUP F, with the From-Ledger as LEDGER-F. The To-Dev is Member M and the To-Ledger is LEDGER-M. So the forward routing will be correctly routed to Member M's device, and the key index correctly points to LEDGER-F.

On Member M's device, the addition of the Org-Ledger LEDGER-AM field could be used to trigger that this is an admin message for the group, and not a group message itself A conversation which goes back and forth can now be continued this way.

Figure 65:
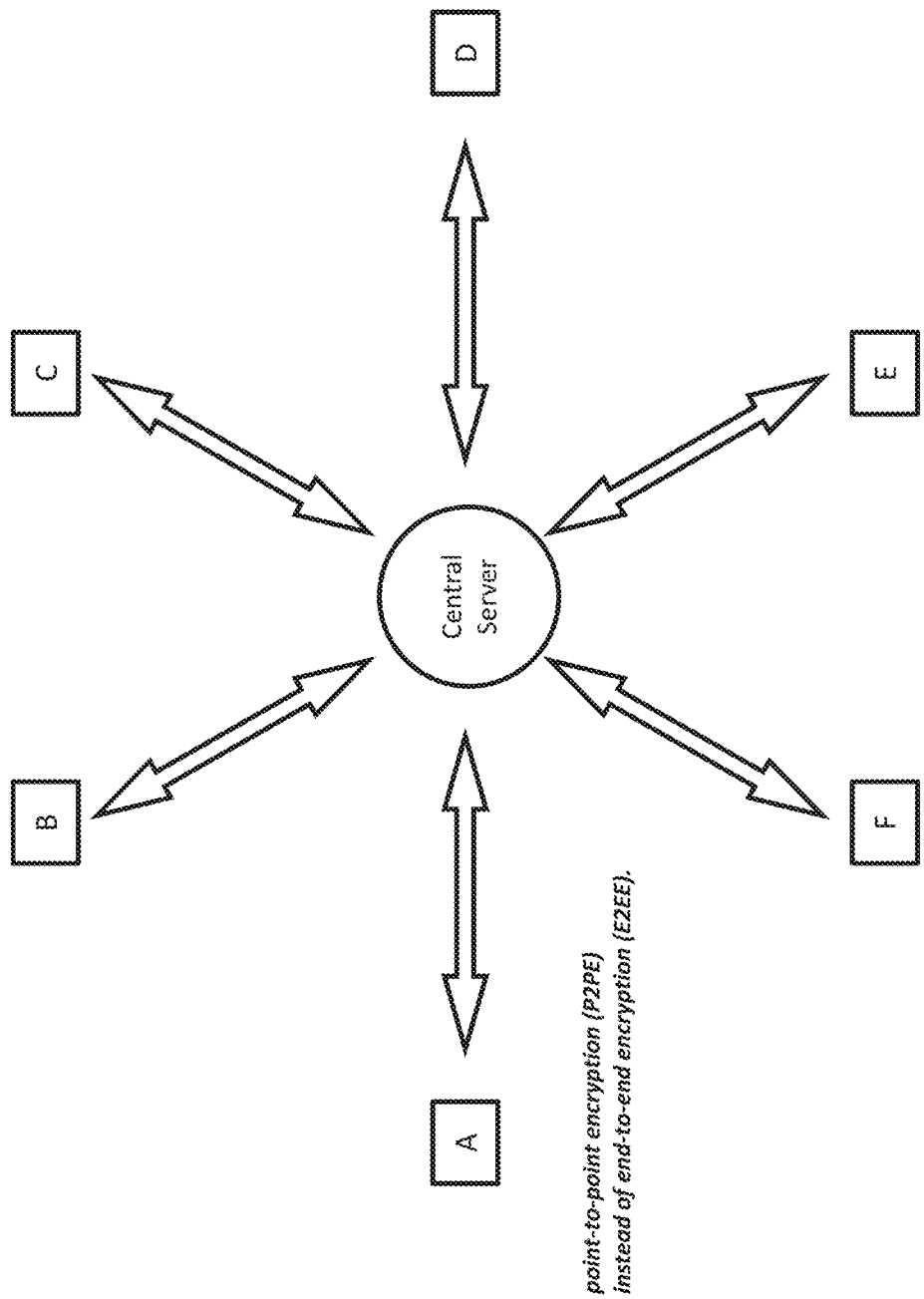
FIG. 65 depicts the essential E2EE vs P2PE problem for multi-participant stream encoding.

FIG. 65 Depicts the E2EE (End-to-End Encryption) Vs P2PE (Point-to-Point Encryption) Problem for Multi-Participant Stream Encoding.

Next, we will switch to multi-participant live interactions, mostly voice, video, or live chat rooms. These are more closely related to non-hosted groups, as the data is in-flight (and might be recorded) but not in an archive, such as a hosted group.

First, in FIG. 65 we depict the basic problem facing all solutions for such live interactions: if the interactions between the participants is to be private, it must be encrypted such that only the participants have access to its content. An architecture, such as drawn in FIG. 65, does not address this problem, as the Central Server is not allowed to see the content. Several solutions, including Zoom®, started out as in FIG. 65 and this was deemed P2PE: Point-to-point-encryption. Although safe from internet onlookers, the central server now has the same access to all communications as do the participants. This is not satisfactory for true privacy solutions.

Expanding from FIG. 65, one approach designates at least one participant, e.g., take A, which takes in all streams from all other participants, decrypts it, and then re-encrypts it for broadcast back to all others. So, in such a case, all viewers would view the stream being sent out from A, whereas each viewer would send a response stream to A only.

In this solution, only the participants can see the private stream, and this is deemed E2EE: End-to-end-encryption. In this case, the Central Server is reduced to message routing, as it can no longer see message content.

However, for many users, this is not good enough: without further obfuscation, the Central Server can still track how many participants there are, how long they are on line, where they are located (including who they are in many cases), and so on. So E2EE is only a partial solution for privacy.

Figure 66A:
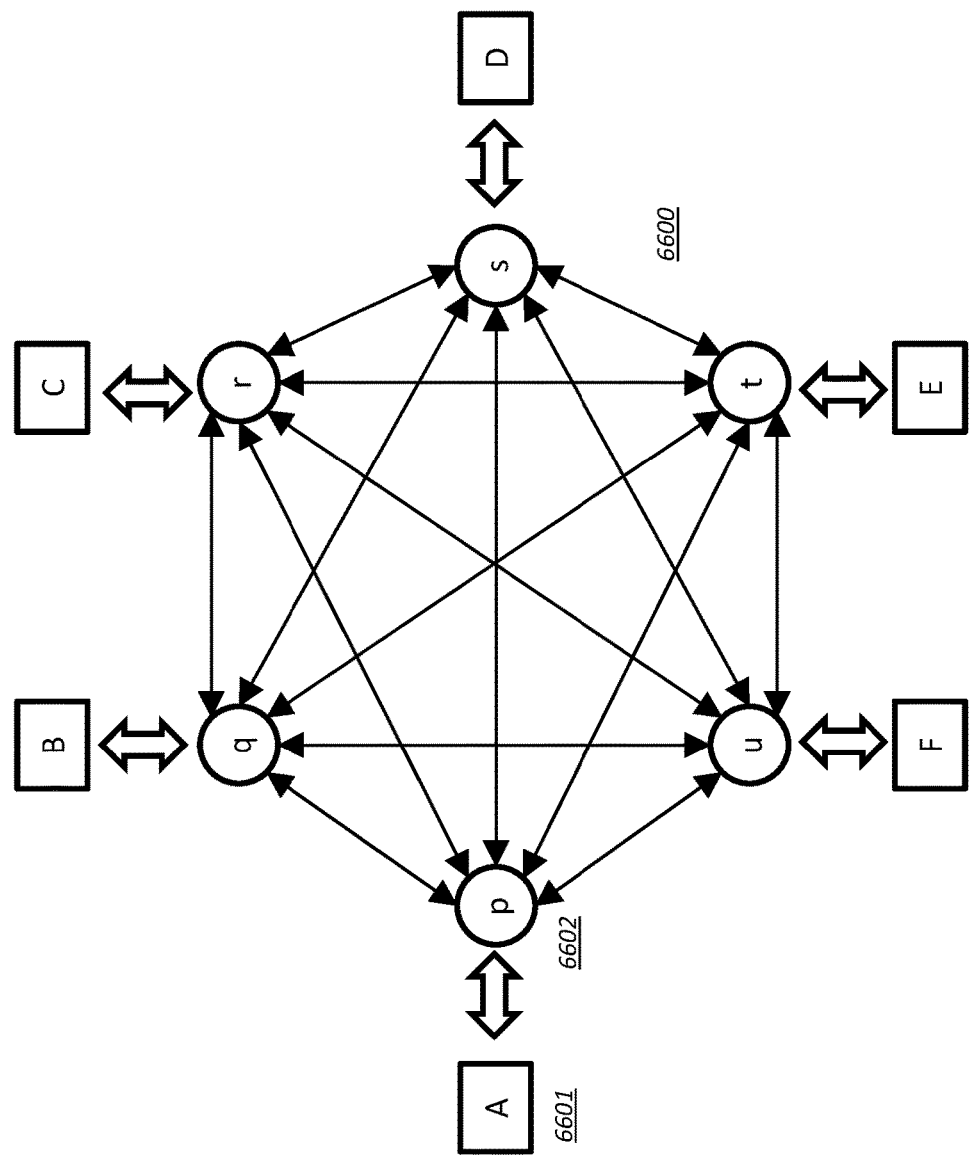
FIGS. 66A and 66B depict the ThunderPort network approach to multi-participant stream encoding.
Figure 66B:
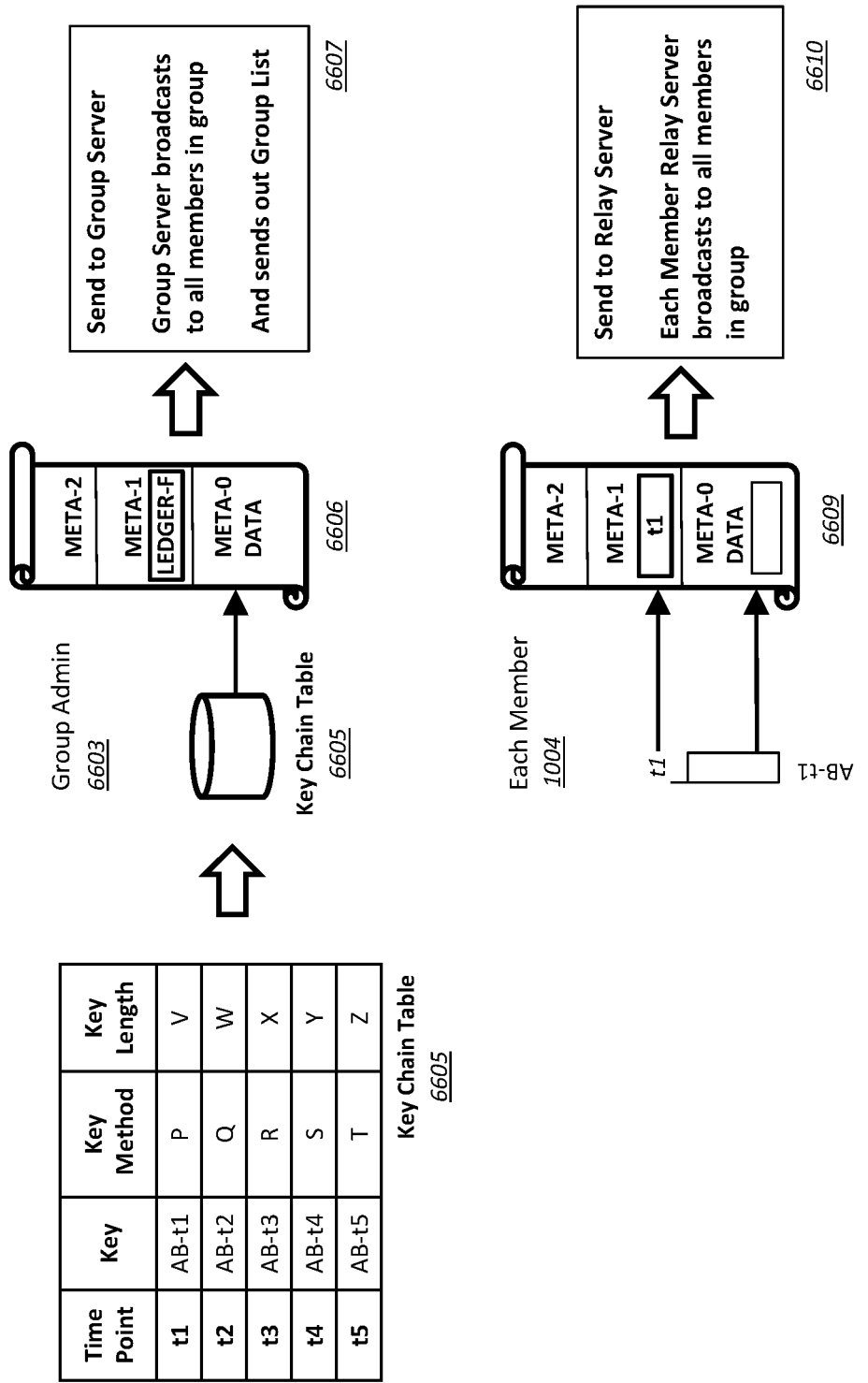

FIGS. 66A and 66B Depict the ThunderPort Network Approach to Multi-Participant Stream Encoding.

In FIG. 66 we depict the ThunderPort network, which overcomes the E2EE partial solution. Shown is a ThunderPort network 6600, where only the end-points are displayed: Each member 6601 is shown (A through F) and for each member we show an associated Relay Server 6602 (p through u).

As we have already established privacy routing through the ThunderPort network, we omit this in this slide, and we focus on message formatting.

First, a group broadcast is initiated by a Group Admin 6603 which now sends out a Key Chain Table 6605. The Key Chain Table is described in FIG. 13 in chapter I.

The Admin uses the standard group messaging method to create message 1006 which gets routed to each participant 6607. All participants can decode this message with their group key which is indexed by LEDGER-F.

In this method, all the members prior pair with the group. Another method can be established, which uses the WebPORTAL server to exchange a temporary key for the session only, similar to initial device pairing. In this alternate method, the members do not need to pair, but they register for the temporary key.

Drawbacks here are that members can be identified, as they have to be registered in the ThunderPort network already, and that temporary keys give out more detail. A permanent key could obfuscate this.

Next, each member 6604 starts encoding its own stream—audio, video, etc.—using the Key Chain method. This is an effective, lower effort stream encoding, yet yields higher levels of security. We depict this encoding of each segment as 6608. We see key AB-t1 being applied, with the key-index being t1, and the DATA then encrypted. Decryption requires the Key Chain table which points t1 to be key AB-t1.

Each message by each member 6609 is broadcasted into the group, using a Group Server, the Relay Server, the WebPORTAL, or the user's device itself. (They can all be made to work.) All Group members then receive all streams from all participants 6610.

Figure 67A:
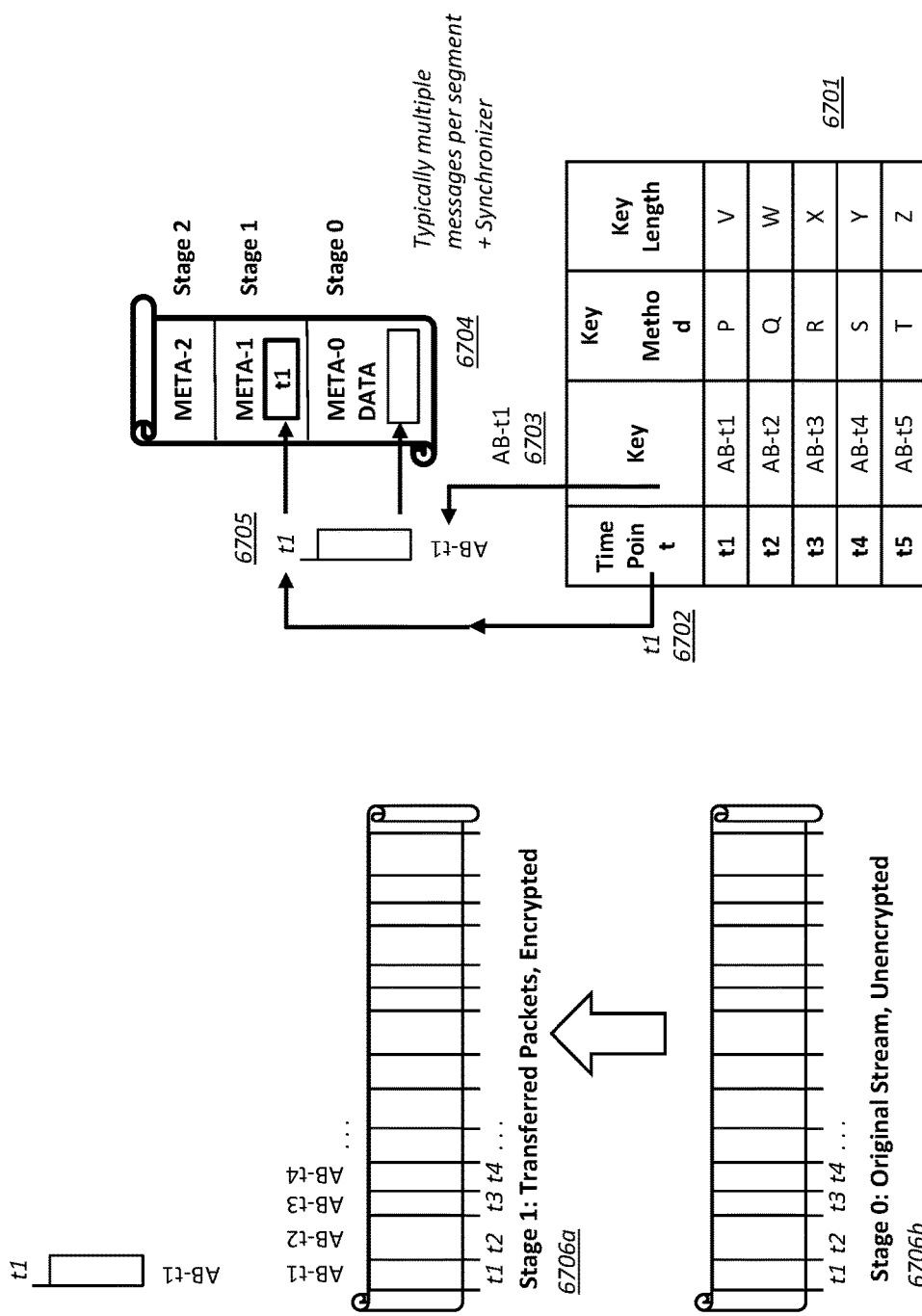
FIGS. 67A and 67B detail further the multi-participant stream encoding.
Figure 67B:
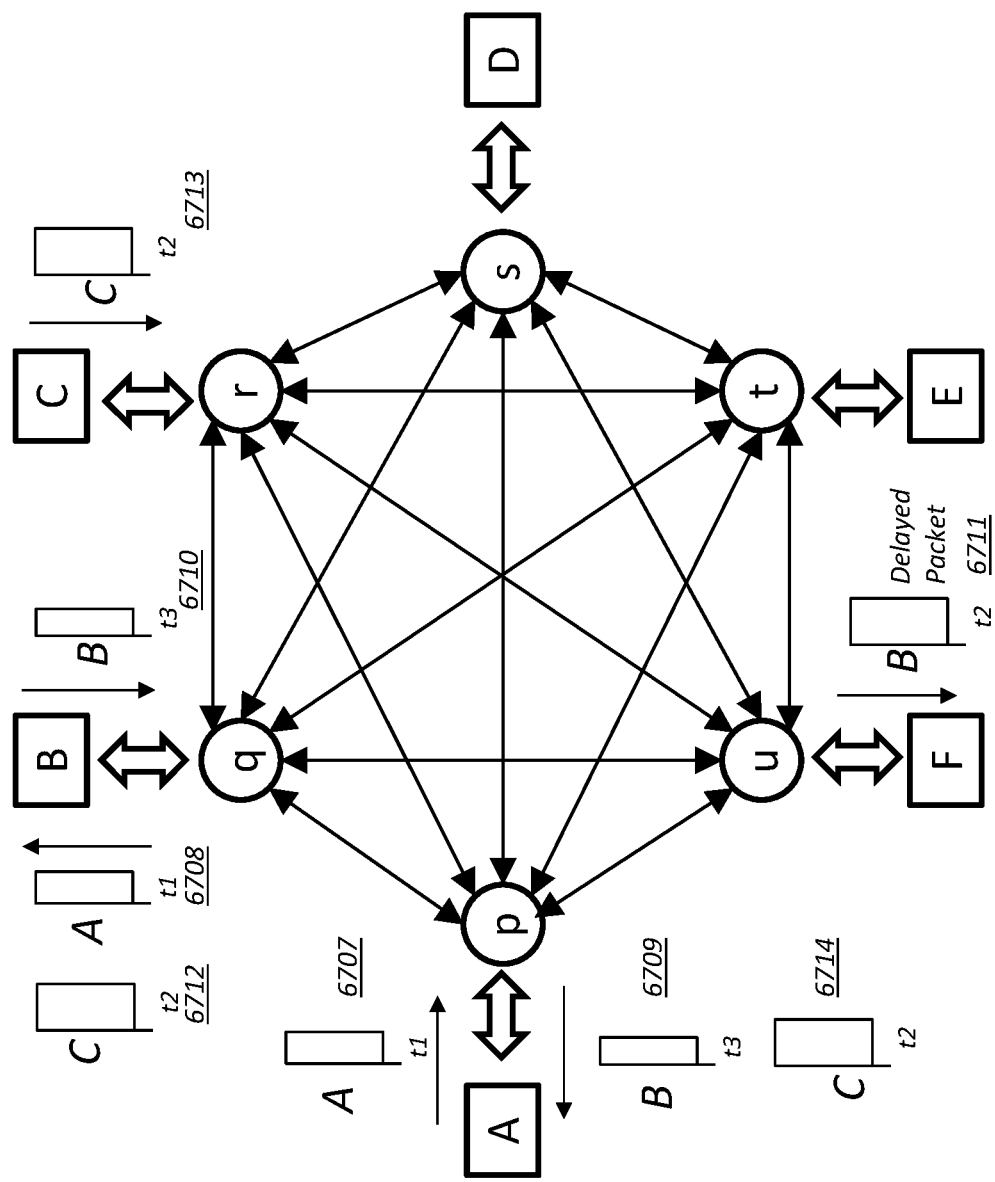

FIGS. 67A and 67B Detail Further the Multi-Participant Stream Encoding.

In FIG. 67 we go deeper into the stream encoding, receipt and decoding, and we show the Key Chain table 6701 in more detail. This Key Chain table, as shown in FIG. 66, was sent out to each member that participates in the session. A stream becomes encoding using multiple keys, key methods, and time points, depicted as 6706.

Each time point where the encoding changes is in the Key Chain table, such as t1 6702, which points to key AB-t1. This key stays in effect until time point 2 is reached, at which point in time the key encryption changes to using key AB-t2.

Each segment that is encrypted using this method 6705 is then put into a proper formatted message 6704. Please note that the relationship between 6705 and 6704 is not one-to-one. There can be multiple messages formed per encrypted section.

Message 6704 is the same as 6609 and is broadcasted to all the participants. Each participant now must decrypt each incoming message, but this exactly what is desired in E2EE.

The routing is done using the Relay or Group servers p though u, so the participants devices are not bother with the streaming itself, only the decryption and encryption, as well as the formatting (audio/speakers, video/screen, etc.) and the (live) recording of one's own input.

Two interesting things take place: one is key-exhaustion followed by synchronicity. First the key-exhaustion, we already addressed this in chapter I, a time-table can 'wrap around' using a module offset each time it wraps. Given that a table should hold enough entries for e.g., two hours of interaction, the wrap would only occur once every two hours. Having the wrap allows for sessions of unbounded length.

The synchronicity is one that is explained in FIG. 67. First, when participants start streaming, their time indexes may be out of sync. E.g., one could start a time index when one joins the session, and as people join at different times, their time indexes do not match. Or, the admin could reset the indices, so everyone is in sync, but the network routing is not balanced, and different participants will start receiving incoming messages from other participants at different timepoints at the same time: e.g., participant F receives a message from B at time point t2 6711, whereas participant A receives a message from B at time point t3 6709, which is ahead.

A quick side-node: the messages are self-contained, decrypting each message does not depend on actual time stamps, it depends on matching the reported time with the key for that section of time. As the time point is being sent out, each message is decrypted by each recipient, regarding on its own timepoint. For example: participant A sends out a t1 message 6707 while receiving a t3 message 6709 from B and a t2 message 6714 from C.

Synchronicity relates to perceptible delays in a group conversation. In an example, if a person is in Tokyo, while all other participants are in New York, the person in Tokyo may receive the actual streams late, due to distance over the internet, and the response incurs the same delay, exaggerating the effect. In a discussion, this could become noticeable.

A function could be created which measures relative delays at each participant's location, and inserts delays to make the stream appear close at all participants sites in terms of real time, by adding different delays to different participants. This is meant by synchronizing the streams. Delay does not mean that the 'slowest node' dictates, but it could balance the experience for all participants by making the audio, video, etc. somewhat more synchronous.

Figure 68:
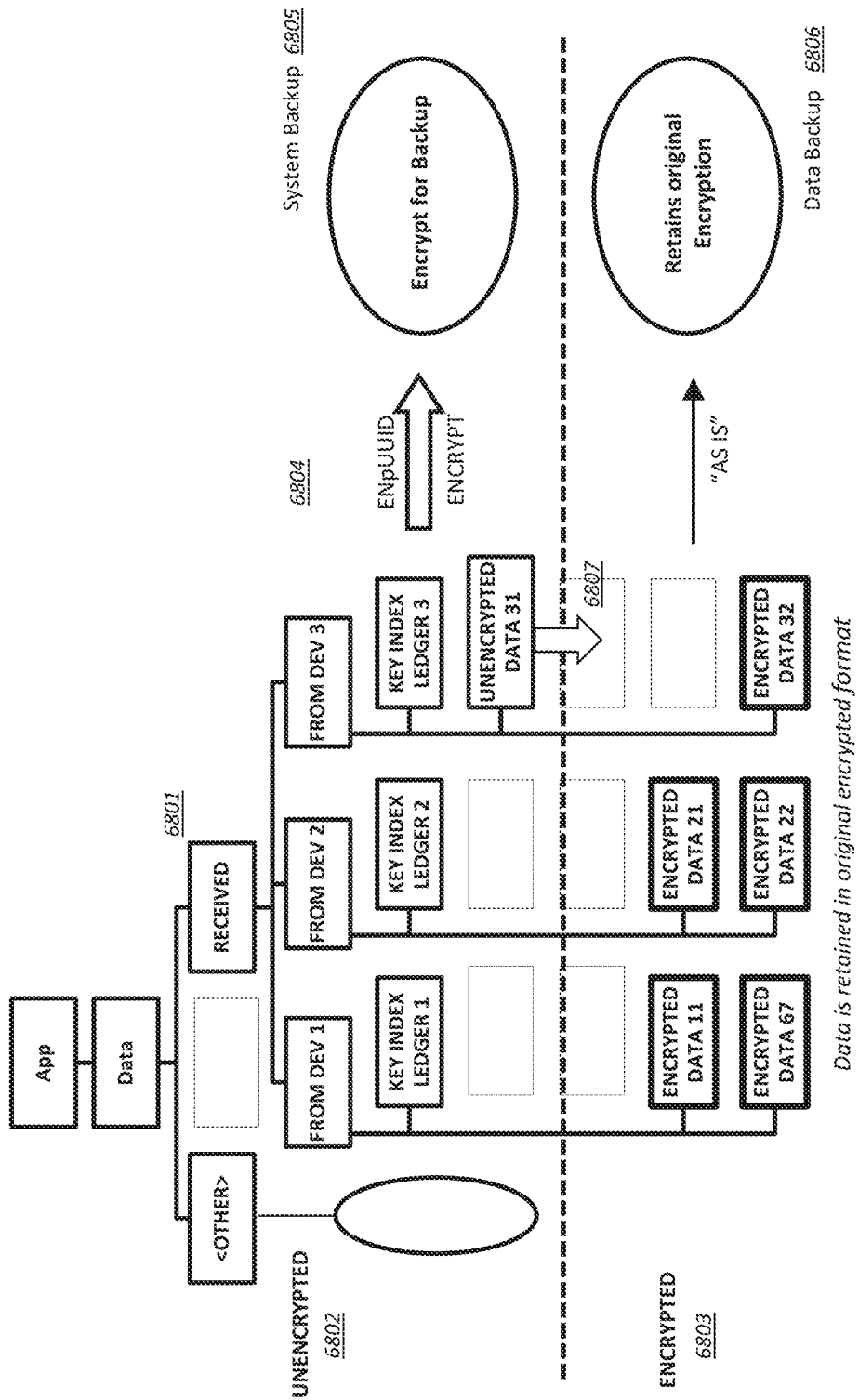
FIG. 68 depicts application data on a device and shows data that is kept encoded.

FIG. 68 Depicts Application Data on a Device and Shows Data that is Kept Encoded.

The ThunderPort network carries data on users' devices, and it allows for encrypted backup. To understand this backup, we first introduce the application directory, 6801. Aside from directories that were shown in chapter IV, we highlight a RECEIVED directory, which contains encrypted data as it was received from other devices. We mark two layers in the directory structure: UNENCRYPTED 6802 and ENCRYPTED 6803. The directory in the UNENCRYPTED section is not encrypted on the device (but it could be), whereas the ENCRYPTED section typically shows file that have been received and are decrypted when used, not stored in a decrypted fashion. An exception is shown in UNENCRYPTED DATA 31, in the FROM DEVICE 3 folder, which could have been encrypted if the sender gave such rights. E.g., when one transfers file to oneself, they would typically be decrypted.

Encrypted files may refer to files that come from creators that wish their files to remain encrypted, examples hereof are audio and video recordings, perhaps even presentation formats, distributed by marketing departments, and so on.

For backup, encrypted files are preferred—if a file exists in both an encrypted and a decrypted version, the backup would only backup the encrypted file, and leave the unencrypted file on the device only. If the file exists in the unencrypted version only, the backup would create an encrypted version. Or, for expediency, unencrypted data files could be skipped for backup purposes. This can be controlled by the applications and user preferences.

We also distinguish between a System Backup 6805 and a Data Backup 6806. The System Backup includes all relevant data for the application to work at the user's device. The Data Backup includes all received data files.

Figure 69:
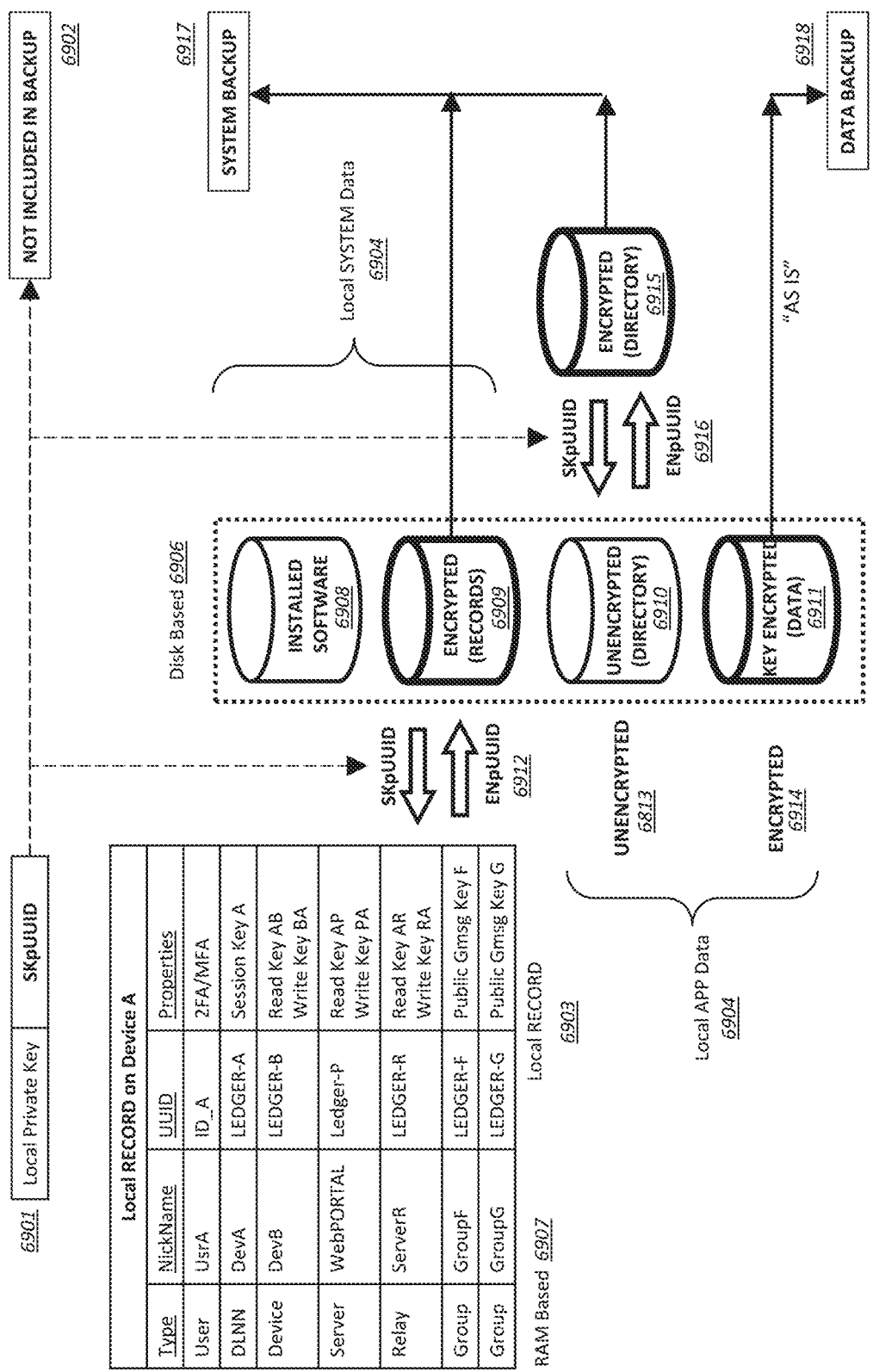
FIG. 69 depicts how efficient backups can be created.

FIG. 69 Depicts how Efficient Backups can be Created.

On the user's device there are actually four distinct sections of storage on the disk 6906: the installed application software 6908, the encrypted RECORDS 6909, the unencrypted directory structure and files 6910, and the encrypted (mostly DATA) files 6911.

In chapter III we explained device ID pUUID and pUDID, and the use of write-to-disk encryption, using ENpUUID and read-from-disk decryption, using SKpUUID. We use the same nomenclature here. Please note that actual implementations may use pUDID instead of pUUID.

The local private key, SKpUUID shown here, is the key which the device heavily guards, is used to open the Local RECORDs 6903 when the app is running. This is the decryption key. The Encryption Key ENpUUID encrypts when data is written to the disk. So, one can see the main application for these two keys to move between disk 6906 and memory 6907 using 6912 encryption and decryption.

From the previous figure, we include the Local APP Data which has UNENCRYPTED 6913 and ENCRYPTED 6914 sections, and then we introduce how the backups are organized in full:

SKpUUID is not backed up, this key only exists on the device, and is protected. More details on this are in the provisional filing.

The SYSTEM DATA does not include the INSTALLED SOFTWARE 6908, but does include the ENCRYPTED (RECORDS) 6909 and the ENCRYPTED (DIRECTORY) 6915, which is created for backup only from the UNENCRYPTED (DIRECTORY) 6910.

The KEY ENCRYPTED (DATA) is already encrypted data, which relies on keys from the Local RECORD 6903, and their corresponding key index, e.g., in a directory structure such as suggested in 6801 in FIG. 68.

The SYSTEM BACKUP 6917 and DATA BACKUP 6918 do not have to go to the same backup server. Both however are fully encrypted, and can only be decrypted by the device itself. If the SYSTEM BACKUP and DATA BACKUP are not kept in sync, care must be taken that the decryption key indices (not the keys) remain organized such that the DATA BACKUP can be properly restored.

Generally, this enables efficient backup schemes to be provided.

Restoring from Backup requires the SKpUUID key to be present, or be recreated.

If this key is present, then the device still has access to the ENCRYPTED RECORDS 6909 present and should pass the Data Check outlined in FIG. 34 in Chapter III.

Also, the software application has to pass all of its validation checks to enable access to restoring from Backup. The basic idea is that the backup does not bring information to the device, with two notable exceptions: 1) Migration to a new device and 2) Restoring a lost device.

Thus, if the ENCRYPTED RECORDS 6909 are corrupted, the application software will not operate and request user assistance, whereas, if the ENCRYPTED RECORDS 6909 pass all checks, the application software will operate and alleviate some of the user checks.

We can simplify this as two situations. In A) the user has a functioning device whereas in B) the user has a non-functioning, or lost, device.

To restore from backup in I) the software will handle the verification requests, whereas in II) the user has to provide the Pass Phrase that was used, but only stored as a hash value.

With a functioning device, with functioning application software, the backup is automatic and merely restores the data on the device. With a non-functioning device, the user must pass sufficient checks to assure user validity. A key component is the user supplied Pass Phrase, which is only stored by its hash value, thus the user must remember this sentence. Additionally, user supplied info and multi-factor authentication methods will also have to pass before the backup becomes accessible.

When the backup becomes accessible, with a functioning device, the backup can be restored automatically and immediately—as it is assured that this is the same device that was backed up. We view this as Present-Restore. Or, if one is migrating to a new device, this enables automatic and instant migration, or Present-Migrate, since the original device is authenticated and accepted in the ThunderPort network.

With a non-functioning (or lost) device, the backup is handled as a Lost-Migrate, and this requires an additional verification protocol steps such as: 1: Mandate Pass Phrase Check; 2. Disable Old Device or Entire User Account; 3: Check Last and Current IP location; 4: Enact a Time Lock; 5: MFA Request to User; 6: Authenticate by Reference; 7: Etc.

From a user's perspective, Present-Restore and Present-Migrate require no special user interaction, as this is automated through a validated device. But Lost-Migrate could be used to form an attack vector and this requires additional checks and user interactions. For a user, these additional checks are easy to pass, but for a hacker, these checks pose severe obstacles. The protocol for lost-migrate may include additional steps other are shown here.

If a user has multiple devices, one of the MFA methods could include one of the other devices, which guarantees that only the user's device can pass the MFA check, blocking any would-be attackers.

If a device was lost and the user migrates to a new device, and the lost device shows activity—which the ThunderPort network will detect—both devices will be locked out, and the user will be prompted for a Lost-Migrate protocol. This to assure that devices after cloning, even if successful, will fail to operate within the ThunderPort network.

Also, if the SYSTEM BACKUP 6917 itself is lost there is still recovery possible for the ENCRYPTED RECORDS 6909 from the administration server: it has pairing information for the device, but not exchanged keys. This data can be used to rebuild the Local RECORD on the device, but all keys have to be re-requested to enable communication again.

If DATA BACKUP 6918 itself is lost, there is no recovery possible for the Local APP Data 6904.

The ThunderPort network relies on trusted servers, and, as explained, this can be realized by closing all ports and only allowing ThunderPort protocols to gain access to the server, and forcing admin functions to be done over IPMI and a 'sysadmin mode' versus 'network mode'. In this way, servers can be collocated at data-centers and be deemed safe.

The ThunderPort network does rely on device registration but not on user registration. In one embodiment, user registration precedes device registration, so that all network participants have been verified. User ID verification is needed by most partners that pair with a device, such as contacts (people) and access (trusted web services, such as banking). This would lead to repeated user ID verification, and general mistrust of users. By verifying users up front, the network alleviates some of these burdens, and enables a higher level of trust.

This not to confuse with the network services: neither the user's credentials, nor the user's device credentials are ever exposed to contacts within or outside of the network. We do think that there are benefits of verification services, as to confirm ID verification, but we see no need to expose user IDs through the network.

In one embodiment, mobile devices, who operate in client mode, would connect to a 'relay server' as explained above. In this structure, devices would poll such servers, and a route between them would use a minimum of three servers: the relay servers at both ends, and a node server in between.

All communication to and from such relay servers is already encrypted, so need for other encryption methods (VPN, TLS) goes away, and the servers can operate in a non-DNS, exposing only the network ports and protocol for extra security.

Longer routes, with multiple hops, are not as expensive as they may appear. With collocating ThunderPort servers in data-centers, the 'first' hop, which comes from an ISP server, can often be completed in the data-center, or using the faster trunks in the internet. That is, physical distance between hops plays a role. As to server compute time, only the meta-data is decrypted and re-encrypted. This is very small message content. The data itself remains encrypted and is passed forward. In such a manner, the servers can operate on packets much faster than if they had to be decrypted and re-encrypted in their entirety. In addition, this architecture supports streaming video and gaming, including Virtual Reality/Augmented Reality.

The DLNN ledgers are configured such that write operations are limited and read operations happen more frequently. As such, distributed database solutions, such as blockchain and distributed ledgers are deemed efficient, as in such networks the write operation is the more costly one. Immutability of the ledgers makes the ledgers tamper proof, and hosting them privately, with both blocking access to the ledgers to only 'friendlies' and keying fields in the ledger to 'paired' only, the ledgers reach a high level of security.

The ThunderPort network does not intend to be a 'hidden' network, and, in fact, we expect many businesses to welcome the network, even use it as intranet. Should there be a problem, the ThunderPort network can use proxies, as the data content is already fully encrypted. Proxy servers would merely remap the IP addresses one more time, making is harder to block known IP addresses on outgoing or incoming routes. All other IP addresses remain inside the ThunderPort network, and are not exposed to company websites, only to internet routes.

CONCLUSION

A secure communications system for a network has been described which enables secure communications between any two members, and between group members. This security is achieved by private keys being used on a device level—that in embodiments are not stored in the cloud or on a server. An adversary gaining access to any one key would compromise a single device-device communication channel, but generally would not allow access to other devices or compromise other device communications. In addition, the data exchange may be over public networks with unencrypted IP headers, while the included message payloads are undecipherable except to the intended recipient device.

The address server is allowing devices to "securely-write" device activity (IP address) and/or grouping (Group Member List). These approaches prevent random or unsolicited messages (e.g., blocking spam messaging) and prevents reading messages outside of the established key pairs. In addition, because devices are mobile and can be on and offline, addressing can include relay, backup, and forwarding.

In addition, a security breach of the connection management server 110 only uncovers connections between users of the system; it does not enable in any way a method to read the messages. An adversary attempting to impersonate the connection management server using the private session will fail due to hardwired IP paths (to server) being used as well as the limited functionality of the messaging that the connection management server 110 can send in a non-interactive session. The presented approaches also allows for remote user search and remote data management.

Collectively these approaches enable users to use the internet without being visible, without their messaging activity being visible, without their messages being decipherable, and without them having to authenticate themselves each time, providing privacy, trust, security, and authentication to users in various embodiments. In particular, users may be provided authentication via multi-factor authentication with the connection management server 110. Users are provided privacy based on the message encryption provided by message and group keys. Users are provided security with the address server, which prevents unauthorized devices from discovering the address of a given device. Finally, additional trust is provided in embodiments via server-server encryption.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method comprising a sending device A executing instructions to effect a method for sending data to a receiving device B, the method comprising the sending device A performing the following:

encrypting DATA to be sent from device A to device B, the DATA encrypted using an AB key pairing between device A and device B, wherein encrypting the DATA comprises:
determining an encryption key for the AB key pairing, based on a local record that associates device B with the encryption key, wherein device A identifies device B by a ledger address to a ledger that contains properties of devices, and the local record associates device B's ledger address with the corresponding encryption key; and
encrypting the DATA using the encryption key;
encrypting metadata META-1 that holds from-to information indicating transmission from device A to device B, the META-1 encrypted using an ASi key pairing between device A and a first trusted server Si; and
transmitting the encrypted DATA and the encrypted META-1 to the server Si over the Internet in a transmission that associates the encrypted META-1 with the encrypted DATA.

2. The computer-implemented method of claim 1 wherein encrypting the META-1 comprises encrypting a combination of (i) the META-1, and (ii) the encrypted DATA, using the ASi key pairing.

3. The computer-implemented method of claim 1 wherein encrypting the META-1 comprises encrypting the META-1 using the ASi key pairing, without further encrypting the encrypted DATA.

4. The computer-implemented method of claim 1 wherein transmitting the encrypted DATA and the encrypted META-1 to the server Si comprises:
embedding the encrypted DATA and the encrypted META-1 within one or more additional layers of packets; and
transmitting a highest layer of the packets to the server Si over the Internet.

5. The computer-implemented method of claim 1 wherein device B's ledger address and corresponding entry in the ledger is generated by a central administration server.

6. The computer-implemented method of claim 1 wherein the local record is backed up on a backup server for the sending device A.

7. The computer-implemented method of claim 1 further comprising:
encrypting metadata META-0 to be sent from device A to device B; and
transmitting the encrypted META-0 to the server Si over the Internet, wherein the transmission also associates the encrypted META-0 with the encrypted META-1 and the encrypted DATA.

8. The computer-implemented method of claim 1 wherein the AB key pairing comprises a public/private key pair.

9. The computer-implemented method of claim 1 wherein the AB key pairing comprises a symmetric key.

10. The computer-implemented method of claim 1 wherein the DATA comprises video that is streamed from sending device A to receiving device B, and the AB key pairing is based on a key chain table.

11. A method for sending data from a sending device A to a receiving device B via a route through a trusted network of servers Si, wherein each of device A, servers Si and device B comprises a node of the route, the method comprising:
encrypting DATA to be sent from device A to device B, the DATA encrypted using an AB key pairing between device A and device B;
transmitting transmissions along hops between nodes of the route, each transmission comprising (i) the encrypted DATA; and (ii) encrypted metadata META-1 that holds from-to information indicating transmission from device A to device B, the META-1 encrypted using a key pairing between the two nodes at ends of the hop;
wherein the from-to information identifies device A by a ledger address for device A to a ledger that contains properties of devices and identifies device B by a ledger address for device B to the same ledger; and
at each server Si, decrypting the META-1 from the preceding hop and reencrypting the META-1 for the next hop.

12. The computer-implemented method of claim 11 wherein each transmission comprises an encrypted combination of (i) the META-1, and (ii) the encrypted DATA, using the key pairing between the two nodes at ends of the hop.

13. The computer-implemented method of claim 11 wherein the encrypted DATA is not further encrypted using the key pairing between the two nodes at ends of the hop.

14. The computer-implemented method of claim 11 wherein DATA is transmitted from sending device A to receiving device B via multiple different routes, and one route is a direct route from a relay server for sending device A to a relay server for receiving device B.

15. The computer-implemented method of claim 11 wherein the route includes a relay server for at least one of device A or device B.

16. The computer-implemented method of claim 11 wherein device A's and device B's ledger addresses and corresponding entries in the ledger are generated by a central administration server.

* * * * *

UNITED STATES PATENT AND TRADEMARK OFFICE
CERTIFICATE OF CORRECTION

| | | Page 1 of 1 |
|---|---|---|
| PATENT NO. | : 12,126,603 B2 | |
| APPLICATION NO. | : 17/492438 | |
| DATED | : October 22, 2024 | |
| INVENTOR(S) | : Henry Verheyen | |

It is certified that error appears in the above-identified patent and that said Letters Patent is hereby corrected as shown below:

On the Title Page

In Column 1, item (71) and item (72), under Applicant and Inventor's residence, delete "Marina, (CA)" and insert -- Marina, CA (US) --, therefor.

Signed and Sealed this
Fourth Day of March, 2025

Coke Morgan Stewart
*Acting Director of the United States Patent and Trademark Office*